US009309340B2

(12) United States Patent
Ishihama et al.

(10) Patent No.: US 9,309,340 B2
(45) Date of Patent: Apr. 12, 2016

(54) ETHYLENE-BASED POLYMER, POLYETHYLENE-BASED RESIN COMPOSITION AND USE THEREOF, CATALYST COMPONENT FOR OLEFIN POLYMERIZATION, OLEFIN POLYMERIZATION CATALYST CONTAINING THE COMPONENT, AND METHOD FOR PRODUCING ETHYLENE-BASED POLYMER BY USING THE CATALYST

(75) Inventors: Yoshiyuki Ishihama, Kanagawa (JP); Ryousuke Asakawa, Kanagawa (JP); Tsutomu Sakuragi, Mie (JP); Tetsurou Fukuda, Kanagawa (JP); Kazuya Sakata, Mie (JP); Masaru Aoki, Mie (JP); Kenji Kawagishi, Kanagawa (JP); Keiichi Yoshimoto, Kanagawa (JP)

(73) Assignee: JAPAN POLYETHYLENE CORPORATION, Tokyo (JP)

( * ) Notice: Subject to any disclaimer, the term of this patent is extended or adjusted under 35 U.S.C. 154(b) by 127 days.

(21) Appl. No.: 14/008,965

(22) PCT Filed: Mar. 29, 2012

(86) PCT No.: PCT/JP2012/058491
§ 371 (c)(1),
(2), (4) Date: Sep. 30, 2013

(87) PCT Pub. No.: WO2012/133717
PCT Pub. Date: Oct. 4, 2012

(65) Prior Publication Data
US 2014/0194277 A1    Jul. 10, 2014

(30) Foreign Application Priority Data

Mar. 30, 2011  (JP) .................................. 2011-073937
Mar. 30, 2011  (JP) .................................. 2011-073945

(51) Int. Cl.
*B01J 21/00*   (2006.01)
*B01J 23/00*   (2006.01)
(Continued)

(52) U.S. Cl.
CPC ........... *C08F 210/16* (2013.01); *C08F 4/65927* (2013.01); *C08F 10/02* (2013.01);
(Continued)

(58) Field of Classification Search
USPC .................................. 502/117, 100, 102, 103
See application file for complete search history.

(56) References Cited

U.S. PATENT DOCUMENTS 4,536,550 A   8/1985 Moriguchi et al.
6,063,871 A   5/2000 Kishine et al.
(Continued)

FOREIGN PATENT DOCUMENTS

CN   101323682 A   12/2008
CN   101519468 A   9/2009
(Continued)

OTHER PUBLICATIONS

Office Action issued Aug. 19, 2014 in Japanese Patent Application No. 2012-077350 (with English language translation).
(Continued)

*Primary Examiner* — James McDonough
(74) *Attorney, Agent, or Firm* — Oblon, McClelland, Maier & Neustadt, L.L.P.

(57) ABSTRACT

An object of the present invention is to provide a polyethylene-based resin composition excellent in the moldability and at the same time, excellent in the balance between impact strength and stiffness as well as in the transparency, and a molded product and a film, which are obtained by the molding of the polyethylene-based resin composition. The polyethylene-based resin composition of the present invention comprises from 41 to 99 wt % of (A) an ethylene-based polymer satisfying specific conditions and from 1 to 59 wt % of (B) an ethylene-based polymer satisfying specific conditions, wherein MFR of the composition as a whole is from 0.05 to 50 g/10 min and the density is from 0.910 to 0.960 g/cm³.

17 Claims, 3 Drawing Sheets

(51) Int. Cl.

| | | |
|---|---|---|
| *B01J 25/00* | (2006.01) | |
| *B01J 29/00* | (2006.01) | |
| *B01J 31/00* | (2006.01) | |
| *B01J 37/00* | (2006.01) | |
| *C08F 210/16* | (2006.01) | |
| *C08F 10/02* | (2006.01) | |
| *C08F 4/6592* | (2006.01) | |
| *C08J 5/18* | (2006.01) | |
| *C08L 23/08* | (2006.01) | |
| *C08F 4/659* | (2006.01) | |

(52) U.S. Cl.
 CPC .............. *C08J 5/18* (2013.01); *C08L 23/0815* (2013.01); *C08F 4/65908* (2013.01); *C08F 4/65912* (2013.01); *C08F 4/65916* (2013.01); *C08L 2205/025* (2013.01); *C08L 2314/06* (2013.01)

(56) References Cited

U.S. PATENT DOCUMENTS

| | | | |
|---|---|---|---|
| 6,207,606 B1 | 3/2001 | Lu et al. | |
| 6,492,472 B2 | 12/2002 | Lu et al. | |
| 6,713,562 B2* | 3/2004 | Kagami | C08J 5/18 525/240 |
| 6,936,660 B2 | 8/2005 | Kagami et al. | |
| 7,041,617 B2 | 5/2006 | Jensen et al. | |
| 7,456,243 B2* | 11/2008 | Jensen | C08F 10/00 526/348 |
| 7,601,662 B2 | 10/2009 | Bull et al. | |
| 7,842,763 B2* | 11/2010 | Jensen | C08F 10/00 526/113 |
| 8,030,241 B2 | 10/2011 | Jensen et al. | |
| 8,426,538 B2* | 4/2013 | Jensen | C08F 10/00 502/103 |
| 8,785,574 B2* | 7/2014 | Bando | C07F 17/00 502/103 |
| 2001/0014718 A1* | 8/2001 | Kagami | C08J 5/18 525/240 |
| 2006/0115403 A1 | 6/2006 | Yuen | |
| 2008/0090983 A1 | 4/2008 | Satoh et al. | |
| 2008/0202107 A1 | 8/2008 | Boorse et al. | |
| 2008/0226545 A1 | 9/2008 | Bull et al. | |
| 2008/0241060 A1 | 10/2008 | Li et al. | |
| 2010/0092362 A1 | 4/2010 | Li et al. | |
| 2010/0292421 A1 | 11/2010 | Bando | |
| 2011/0182790 A1 | 7/2011 | Chandler et al. | |

FOREIGN PATENT DOCUMENTS

| | | |
|---|---|---|
| JP | 60-36547 A | 2/1985 |
| JP | 02-276807 A | 11/1990 |
| JP | 05-043619 A | 2/1993 |
| JP | 06-306121 A | 11/1994 |
| JP | 07-149962 A | 6/1995 |
| JP | 07-224079 A | 8/1995 |
| JP | 07-252311 A | 10/1995 |
| JP | 7-309981 A | 11/1995 |
| JP | 08-048711 A | 2/1996 |
| JP | 08-311260 A | 11/1996 |
| JP | 09-031260 A | 2/1997 |
| JP | 9-95572 A | 4/1997 |
| JP | 11-138618 A | 5/1999 |
| JP | 11-140239 A | 5/1999 |
| JP | 11-292912 A | 10/1999 |
| JP | 2000-212342 A | 8/2000 |
| JP | 2001-163924 A | 6/2001 |
| JP | 2002-515521 A | 5/2002 |
| JP | 2004-149760 A | 5/2004 |
| JP | 2004-217924 A | 8/2004 |
| JP | 2006-063325 A | 3/2006 |
| JP | 2006-124567 A | 5/2006 |
| JP | 2006-233206 A | 9/2006 |
| JP | 2006-233208 A | 9/2006 |
| JP | 2006-312753 A | 11/2006 |
| JP | 2006-321991 A | 11/2006 |
| JP | 2007-177168 A | 7/2007 |
| JP | 2007-177183 A | 7/2007 |
| JP | 2007-520597 A | 7/2007 |
| JP | 2007-197722 A | 8/2007 |
| JP | 2007-204613 A | 8/2007 |
| JP | 2008-050278 A | 3/2008 |
| JP | 2009-144148 A | 7/2009 |
| JP | 2009-173889 A | 8/2009 |
| JP | 2009-197226 A | 9/2009 |
| JP | 2009-275207 A | 11/2009 |
| JP | 2010-031270 A | 2/2010 |
| JP | 2010-202791 A | 9/2010 |
| JP | 2011-001545 A | 1/2011 |
| JP | 2011-006589 A | 1/2011 |
| JP | 2011-137146 A | 7/2011 |
| JP | 2011-144356 A | 7/2011 |
| WO | WO 97/10295 A1 | 3/1997 |

OTHER PUBLICATIONS

Japanese Office Action issued Mar. 3, 2015 in Patent Application No. 2012-077372 (with English Translation).

Japanese Office Action issued Apr. 7, 2015 in Patent Application No. 2012-077350 (with English Translation).

International Search Report issued Jun. 19, 2012 in PCT/JP2012/058491.

Chinese Office Action and Search Report issued May 6, 2015 in Patent Application No. 201280026761.3 (with English language translation and English translation of categories of cited documents).

* cited by examiner

ETHYLENE-BASED POLYMER, POLYETHYLENE-BASED RESIN COMPOSITION AND USE THEREOF, CATALYST COMPONENT FOR OLEFIN POLYMERIZATION, OLEFIN POLYMERIZATION CATALYST CONTAINING THE COMPONENT, AND METHOD FOR PRODUCING ETHYLENE-BASED POLYMER BY USING THE CATALYST

CROSS REFERENCE TO RELATED APPLICATIONS

This application is a 371 of PCT/JP2012/058491, filed Mar. 29, 2012, the disclosure of which is incorporated herein by reference in its entirety. This application claims priority to Japan Patent Application 2011-073937, filed Mar. 30, 2011; and Japan Patent Application 2011-073945, filed Mar. 30, 2011, the disclosure of which are incorporated herein by reference in their entireties.

TECHNICAL FIELD

The present invention relates to an ethylene-based polymer having a developed long-chain branched structure and excellent in the moldability. As another aspect of the present invention, the present invention relates to a novel polyethylene-based resin composition and use thereof. More specifically, the present invention relates to a polyethylene-based resin composition excellent in the moldability and capable of producing a molded product excellent in the balance between impact strength and stiffness as well as in the transparency, and a molded product and a film each obtained by the injection molding, compression-injection molding, rotational molding, extrusion molding, hollow molding or blow molding of the polyethylene-based resin composition. Furthermore, the present invention relates to an olefin polymerization catalyst component containing a specific metallocene compound, an olefin polymerization catalyst containing the component, and a method for producing an olefin-based polymer by using the catalyst.

BACKGROUND ART

Recently, a film, a sheet, an injection molded product, a pipe, an ejection molded product, a hollow molded product and the like, which are made of a plastic, are used actively in various industrial fields. Among others, a polyethylene-based resin (ethylene-based polymer) finds widespread use, because this is, for example, inexpensive, lightweight and excellent in the moldability, stiffness, impact strength, transparency, chemical resistance and recyclability. In general, molding of the polyethylene-based resin is preformed in a molten state. However, in the case of an ethylene-based polymer alone, its melting characteristics may be insufficient, for example, in terms of flowability or the elongational viscosity may be inadequate, and in many cases, sufficient moldability can be hardly ensured or solid physical properties such as transparency and stiffness may lack.

As for the measure taken to compensate these deficiencies, a high-pressure polyethylene (HPLD) excellent in the moldability or an ethylene-based polymer differing in the molecular weight or density has been blended to improve the melting characteristics or solid physical properties (see, for example, Patent Documents 1 to 3).

Such a blend (ethylene-based resin composition) may satisfy the moldability but has a problem that reduction in the impact strength may be caused due to blending of HPLD or the molecular weight distribution or copolymerization composition distribution may be broadened to worsen the transparency.

Also, due to enforcement of the Containers Recycle Law or recent trend of resource saving, the amount of a raw material resin used needs to be reduced and from this standpoint, the demand for reduction in the wall thickness of a molded product is increasing, but in order to reduce the wall thickness, the stiffness (modulus) as well as the impact strength must be improved.

As the method for improving the impact strength, a method of reducing the density of the ethylene-based polymer is well known, but this method is disadvantageous in that the stiffness is also reduced (the polymer becomes soft), and for the purpose of reducing the wall thickness, there has been made, for example, an attempt to use a three-component blend composition obtained by further adding a specific HPLD to a combination of two kinds of specific ethylene·α-olefin copolymers differing in the density so as to enhance the moldability or transparency (see, for example, Patent Document 4).

According to this method, a polyethylene resin composition more excellent in the balance between impact strength and stiffness and also in the transparency than conventional compositions may be obtained, but the impact strength is unavoidably reduced due to blending of HPLD and furthermore, from the standpoint of stably supplying a product of constant quality in industrial level, a blend of three kinds of ethylene-based polymers is considered to be economically disadvantageous as compared with conventional compositions.

On the other hand, as to the method for improving the moldability, an attempt to introduce a long-chain branched structure capable of increasing the melt viscosity into an ethylene-based polymer has been made, but since the design for optimizing the long-chain branched structure is insufficient, reduction in the strength or transparency still cannot be avoided and the improvement level of moldability is yet low (see, for example, Patent Documents 5 to 8).

The polyolefin produced using a metallocene catalyst for olefin polymerization has a high uniformity in the polymer molecular structure such as molecular weight distribution or copolymerization composition distribution and is excellent in various mechanical properties such as impact strength and long lifetime and therefore, the amount used thereof is recently increasing. The metallocene-based polyolefin is excellent in various mechanical properties but, because of its narrow molecular weight distribution, is poor in the characteristics important to molding of a polyolefin, such as melt tension and melt flowability, and cannot satisfy sufficient performance in terms of mold processing.

As the method for improving the insufficient mold processability of the metallocene-based polyolefin, a method where the melt viscosity is increased by introducing a long-chain branch into a polyethylene by a polymerization reaction using a specific metallocene complex and the flowability or melt tension is thereby improved, is well known (see, for example, Patent Document 9). With respect to the specific metallocene complex for introducing a long-chain branch, a method using a bridged bisindenyl complex (see, for example, Patent Documents 10 to 13) or a constrained geometry half-metallocene complex (see, for example, Patent Document 14) is well known, but the long-chain branch obtained by such a method does not develop as in the structure of HPLD, and the improvement of melt viscosity of the polymer is not sufficient.

Also, as to the method for introducing a long-chain branch by a metallocene complex other than those described above, a method for producing a long-chain branch-containing polyethylene by using a bridged metallocene catalyst having a specific structure is known (see, for example, Patent Document 15), and specifically, an example of simultaneously using two kinds of metallocene complexes of dimethylsilyl-bis(pentadienyl)zirconium dichloride and diphenylmethylene(cyclopentadienyl)(fluorenyl)zirconium dichloride is shown. As the improved technology thereof, furthermore, a catalyst where the above-described two kinds of complexes are co-supported on the same support (see, for example, Patent Documents 16 to 18), and a catalyst where the kind of the complex combined is improved (see, for example, Patent Documents 19 and 20), are known. In these methods, it is supposed that one kind of a complex produces a polymer having a polymerizable double bond at the terminal (so-called macromer) and another complex is a complex excellent in the copolymerizability and copolymerizes with the macromer to form a long-chain branched structure.

Such a method may achieve introduction of a branched structure that is somewhat more developed than the long-chain branched structure by the conventional metallocene complex, but the level of development is still insufficient or those two kinds of metallocene complexes greatly differ in the copolymerizability of a comonomer, giving rise to a problem that the copolymerization composition distribution of the produced polymer may be broadened or the mechanical properties may deteriorate in association with production of a low-melting-point polymer.

Patent Document 21 has reported that when homopolymerization of ethylene is performed according to solution polymerization by using an asymmetric metallocene in which a cyclopentadienyl group and an indenyl group are carbon-bridged and methylaluminoxane, a branch-containing polyethylene can be produced, but the carbon number indicative of the branch length is from 1 to 20. Thus, the branch length is too short to exert an effect of improving mold processability as a long-chain branch, failing in exhibiting strain hardening of the elongational viscosity.

Also, Patent Document 22 has reported polymerization of propylene by a polymerization catalyst prepared by combining an asymmetric metallocene compound in which a cyclopentadienyl group and an indenyl group, each having a specific substituent, are bridged, with methylaminoxane, but this document is silent on the possibility of producing a long-chain branch when the polymerization above is applied to polymerization of ethylene, and the effect of improving the mold processability cannot be expected.

Furthermore, Patent Document 23 has reported a catalyst system capable of producing an ethylene polymer and an ethylene/butene copolymer, which are useful as a macromonomer, by using, out of asymmetric metallocenes in which a cyclopentadienyl group and an indenyl group are silicon-bridged, a metallocene having a methyl group on the 2-, 4- and 7-positions of the indenyl group and a modified clay compound, but the number of terminal double bonds of the polymer is small, and this document is silent on the possibility of producing a long-chain branch by this catalyst alone.

Recently, the present inventors have reported in Patent Document 24a method for producing an ethylene-based polymer improved in the mold processability by using a supported catalyst for olefin polymerization comprising, as an essential component, out of asymmetric metallocenes in which a cyclopentadienyl group and an indenyl group are bridged by a bridging group, a specific asymmetric metallocene having no substituent except for the bridging group on the cyclopentadienyl group and having a hydrogen atom or a specific substituent on the 3-position of the indenyl group. According to this method, an ethylene-based polymer having a large degree of strain hardening of the elongational viscosity is obtained and therefore, the mold processability is improved as compared with the conventional long-chain branched polyethylene, but since the long-chain branching index does not reach that of a high-pressure low-density polyethylene, more improvement of the long-chain branched structure is demanded.

Under these circumstances, it is required to solve the problems of the conventional ethylene-based resin composition and develop a polyethylene-based resin composition excellent in the moldability and capable of producing a molded product excellent in the balance between impact strength and stiffness as well as in the transparency. Furthermore, in order to solve the problems of a long-chain branch-containing polyethylene in conventional techniques and improve the mold processability of a metallocene-based polyethylene, it is required to develop an ethylene-based polymer having introduced thereinto a sufficiently large number of appropriate-length long-chain branches, an olefin polymerization catalyst excellent in the introduction of long-chain branch, and a production method of an olefin-based polymer.

BACKGROUND ART LITERATURE

Patent Document

Patent Document 1: JP-A-7-149962 (the term "JP-A" as used herein means an "unexamined published Japanese patent application")
Patent Document 2: JP-A-9-31260
Patent Document 3: JP-A-2006-312753
Patent Document 4: JP-A-2010-31270
Patent Document 5: International Publication No. 97/10295
Patent Document 6: JP-A-2006-63325
Patent Document 7: JP-A-2006-124567
Patent Document 8: JP-A-2007-197722
Patent Document 9: JP-A-2-276807
Patent Document 10: JP-A-8-48711
Patent Document 11: JP-A-8-311260
Patent Document 12: JP-A-2004-149760
Patent Document 13: JP-A-2004-217924
Patent Document 14: JP-A-6-306121
Patent Document 15: JP-A-7-252311
Patent Document 16: JP-A-2006-233208
Patent Document 17: JP-A-2006-321991
Patent Document 18: JP-T-2007-520597 (the term "JP-T" as used herein means a published Japanese translation of a PCT patent application)
Patent Document 19: JP-T-2002-515521
Patent Document 20: JP-A-2009-144148
Patent Document 21: JP-A-5-043619
Patent Document 22: JP-A-7-224079
Patent Document 23: JP-A-2008-050278
Patent Document 24: JP-A-2011-137146

SUMMARY OF THE INVENTION

Problems that the Invention is to Solve

An object of the present invention is, considering the above-described problems of conventional techniques, to provide an ethylene-based polymer improved in the mold processability. Another object of the present invention is, considering the above-described problems of conventional techniques, to provide a polyethylene-based resin composition excellent in the molding characteristics and at the same time, excellent in the balance between impact strength and stiffness as well as in the transparency; provide a molded product excellent in the balance between impact strength and stiffness and also in the transparency, which is obtained by the injection molding, compression-injection molding, rotational molding, extrusion molding, hollow molding, blow molding or inflation molding of the polyethylene-based resin composition; and provide use of the molded product. Still another object of the present invention is to provide an olefin polymerization catalyst component capable of producing a metallocene-based polyolefin or a metallocene-based polyethylene, in which a sufficiently large number of appropriate length long-chain branches are introduced so as to improve the mold processability of a metallocene-based polyolefin, particularly a metallocene-based polyethylene; an olefin polymerization catalyst containing the component; and a method for producing an olefin-based polymer by using the catalyst.

Incidentally, in the present invention, the polyethylene is a general term of an ethylene homopolymer and a copolymer of ethylene and the later-described olefin and can be restated as an ethylene-based polymer.

Means for Solving the Problems

As a result of a number of intensive studies to attain the above-described objects, the present inventors have found that when a specific ethylene-based polymer having a small amount of long-chain branched structure characterized by the elongational viscosity behavior and a specific ethylene-based polymer having a specific long-chain branched structure similarly characterized by the elongational viscosity behavior are combined and these two polymers are blended to give a specific MFR and a specific density, the obtained polyethylene-based resin composition exhibits good characteristics capable of solving the above-described problems. The present inventors have been accomplished based on this finding.

That is, according to a first aspect of the present invention, an ethylene-based polymer satisfying the following condition (B-1') to condition (B-6) is provided.

(B-1') $MFR_B$=0.001 to 200 g/10 min,
(B-2'') $Density_B$=0.880 to 0.970 g/cm$^3$,
(B-3) $[Mw/Mn]_B$=2.0 to 10.0,
(B-4') in a double logarithmic plot of elongational viscosity η(t) (unit: Pa·sec) and elongation time t (unit: sec) measured at a temperature of 170° C. and an elongational strain rate of 2 (unit: 1/sec), an inflection point of the elongational viscosity attributable to strain hardening is not observed, or when the inflection point is observed, assuming that the maximum elongational viscosity after strain hardening is $η_{B;Max}(t_1)$ and the approximate straight line of the elongational viscosity before hardening is $η_{B;Linear}(t)$, the degree of strain hardening $[λmax(2.0)]_B$ defined by $η_{B;Max}(t_1)/η_{B;Linear}(t_1)$ is from 1.2 to 30.0,
(B-5) the ratio $[λmax(2.0)]_B/[λmax(0.1)]_B$ of $[λmax(2.0)]_B$ defined in the same manner as in the condition (B-4') and $[λmax(0.1)]_B$ measured similarly by setting the elongational strain rate to 0.1 (unit: 1/sec) is from 1.2 to 10.0, and
(B-6) the polymer is produced by an ethylene polymerization reaction using a transition metal-containing catalyst.

According to a second aspect of the present invention, the ethylene-based polymer in the first aspect of the present invention, further satisfying at least one of the following condition (B-7) and condition (B-8) is provided:

(B-7) the branching index ($g_C'$) at a molecular weight of 1,000,000 as measured by a GPC measurement apparatus combining a differential refractometer, a viscosity detector and a light scattering detector is from 0.30 to 0.70, and
(B-8) the content ($W_C$) of components having a molecular weight of 1,000,000 or more as measured by a GPC measurement apparatus combining a differential refractometer, a viscosity detector and a light scattering detector is from 0.01 to 30%.

According to a third aspect of the present invention, a polyethylene-based resin composition comprising: (A) from 41 to 99 wt % of an ethylene-based polymer satisfying the following condition (A-1) to condition (A-4); and (B) from 1 to 59 wt % of the ethylene-based polymer claimed in claim 1 or 2, wherein MFR of the composition as a whole is from 0.05 to 50 g/10 min and the density is from 0.910 to 0.960 g/cm$^3$, is provided:

Conditions of ethylene-based polymer (A):

(A-1) $MFR_A$=0.3 to 100 g/10 min,
(A-2) $Density_A$=0.915 to 0.970 g/cm$^3$,
(A-3) $[Mw/Mn]_A$=2.0 to 10.0, and
(A-4) in a double logarithmic plot of elongational viscosity η(t) (unit: Pa·sec) and elongation time t (unit: sec) measured at a temperature of 170° C. and an elongational strain rate of 2 (unit: 1/sec), an inflection point of the elongational viscosity attributable to strain hardening is not observed, or when the inflection point is observed, assuming that the maximum elongational viscosity after strain hardening is $η_{A;Max}(t_1)$ and the approximate straight line of the elongational viscosity before hardening is $η_{A;Linear}(t)$, the degree of strain hardening $[λmax(2.0)]_A$ defined by $η_{A;Max}(t_1)/η_{A;Linear}(t_1)$ is from 1.0 to 2.0.

According to a fourth aspect of the present invention, the polyethylene-based resin composition in the third aspect of the present invention, wherein said ethylene-based polymer (B) satisfies the following condition (B-1) to condition (B-6), is provided:

Conditions of ethylene-based polymer (B):

(B-1) $MFR_B$=0.01 to 1.5 g/10 min and 100>$MFR_A/MFR_B$>1.0,
(B-2) $Density_B$=0.880 to 0.940 g/cm$^3$,
(B-3) $[Mw/Mn]_B$=2.0 to 10.0,
(B-4) $[λmax(2.0)]_B$ defined in the same manner as in the condition (A-4) of the third aspect of the present invention is from 1.2 to 20.0 and 20>$[λmax(2.0)]_B/[λmax(2.0)]_A$>1.0,
(B-5) the ratio $[λmax(2.0)]_B/[λmax(0.1)]_B$ of $[λmax(2.0)]_B$ defined in the same manner as in the condition (A-4) of the third aspect of the present invention and $[λmax(0.1)]_B$ measured similarly by setting the elongational strain rate to 0.1 (unit: 1/sec) is from 1.2 to 10.0, and
(B-6) the polymer is produced by an ethylene polymerization reaction using a transition metal-containing catalyst.

According to a fifth aspect of the present invention, the polyethylene-based resin composition in the third aspect of the present invention, wherein said ethylene-based polymer (B) further satisfies the following condition (B-2'), is provided:

(B-2') 1.070>$density_A/density_B$>0.990.

According to a sixth aspect of the present invention, the polyethylene-based resin composition in the third aspect of the present invention, wherein said ethylene-based polymer (A) is an ethylene polymer or ethylene.α-olefin copolymer produced by homopolymerization of ethylene or copolymerization with an α-olefin caused by a Ziegler-Natta catalyst produced using a magnesium compound and a titanium compound, is provided.

According to a seventh aspect of the present invention, a molded product obtained by an injection molding, compression-injection molding, rotational molding, extrusion molding, hollow molding or blow molding of the polyethylene-based resin composition in the third aspect of the present invention, is provided.

According to an eighth aspect of the present invention, a film obtained by an extrusion molding, hollow molding, blow molding or inflation molding of the polyethylene-based resin composition in the third aspect of the present invention.

According to a nineth aspect of the present invention, an olefin polymerization catalyst component comprising the following component (A-1b) and component (A-2b), is provided:

Component (A-1b): a metallocene compound represented by the following formula (1b):

[Chem. 1]

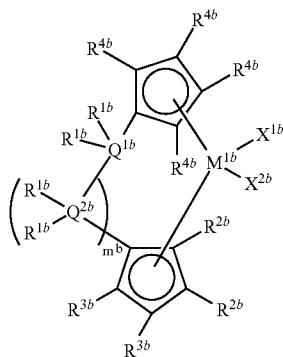

(1b)

[in formula (1b), $M^{1b}$ represents any one transition metal of Ti, Zr and Hf; each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1b}$ and $Q^{2b}$ independently represents a carbon atom, a silicon atom or a germanium atom; each $R^{1b}$ independently represents a hydrogen atom or a hydrocarbon group having a carbon number of 1 to 10 and at least two members out of four $R^{1b}$ may combine to form a ring together with $Q^{1b}$ and $Q^{2b}$; $m^b$ is 0 or 1 and when $m^b$ is 0, $Q^{1b}$ is bonded directly to the conjugated 5-membered ring including $R^{2b}$ and $R^{3b}$; and each of $R^{2b}$, $R^{3b}$ and $R^{4b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40 and out of $R^{2b}$, $R^{3b}$ and $R^{4b}$, only either one pair of adjacent $R^{3b}$ and $R^{3b}$ and adjacent $R^{2b}$ and $R^{3b}$ may form a ring together with the carbon atoms to which the pair is bonded], and Component (A-2b): a metallocene compound represented by the following formula (2b):

[Chem. 2]

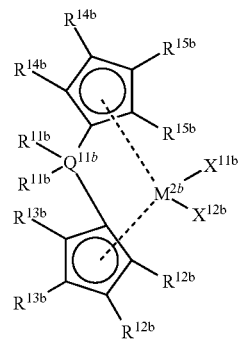

(2b)

[in formula (2b), $M^{2b}$ represents any one transition metal of Ti, Zr and Hf; each of $X^{11b}$ and $X^{12b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{11b}$ represents a carbon atom, a silicon atom or a germanium atom; each $R^{11b}$ independently represents a hydrogen atom or a hydrocarbon group having a carbon number of 1 to 10 and two $R^{11b}$ may combine with each other to form a ring together with $Q^{11b}$; each of $R^{12b}$, $R^{14b}$ and $R^{15b}$ independently represents an atom or a group selected from a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, and a silyl group substituted with a hydrocarbon group having a carbon number of 1 to 40, provided that at least one member is not a hydrogen atom; each $R^{13b}$ independently represents a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40; and out of $R^{12b}$, $R^{13b}$, $R^{14b}$ and $R^{15b}$, any only one pair of adjacent $R^{12b}$ and $R^{12b}$, adjacent $R^{13b}$ and $R^{13b}$ and adjacent $R^{12b}$ and $R^{13b}$ and any only one pair of adjacent $R^{14b}$ and $R^{14b}$, adjacent $R^{15b}$ and $R^{15b}$ and adjacent $R^{14b}$ and $R^{15b}$ may form a ring together with the carbon atoms to which the pair is bonded].

According to a tenth aspect of the present invention, an olefin polymerization catalyst component comprising a metallocene compound represented by the following formula (1c), is provided:

[Chem. 3]

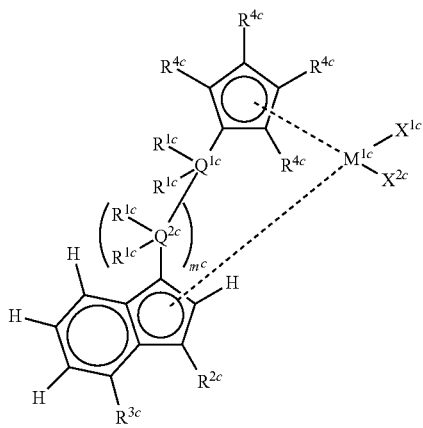

(1c)

[in formula (1c), $M^{1c}$ represents any one transition metal of Ti, Zr and Hf; each of $X^{1c}$ and $X^{2c}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1c}$ and $Q^{2c}$ independently represents a carbon atom, a silicon atom or a germanium atom; each $R^{1c}$ independently represents a hydrogen atom or a hydrocarbon group having a carbon number of 1 to 10 and at least two members out of four $R^{1c}$ may combine to form a ring together with $Q^{1c}$ and $Q^{2c}$; $m^c$ is 0 or 1 and when $m^c$ is 0, $Q^{1c}$ is bonded directly to the conjugated 5-membered ring including $R^{2c}$; each of $R^{2c}$ and $R^{4c}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and $R^{3c}$ represents a substituted aryl group represented by the following formula (1-ac)]:

[Chem. 4]

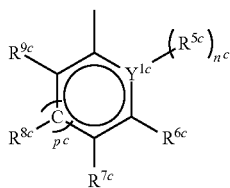

(1-ac)

[in formula (1-ac), $Y^{1c}$ represents an atom of Group 14, Group 15 or Group 16 of the periodic table; each of $R^{5c}$, $R^{6c}$, $R^{7c}$, $R^{8c}$ and $R^{9c}$ independently represents a hydrogen atom, a fluorine atom, a chlorine atom, a bromine atom, a hydrocarbon group having a carbon number of 1 to 20, a hydrocarbon group containing oxygen or nitrogen and having a carbon number of 1 to 20, a hydrocarbon group-substituted amino group having a carbon number of 1 to 20, an alkoxy group having a carbon number of 1 to 20, a silicon-containing hydrocarbon group containing from 1 to 6 silicons and having a carbon number of 1 to 18, a halogen-containing hydrocarbon group having a carbon number of 1 to 20, or a hydrocarbon group-substituted silyl group having a carbon number of 1 to 20; adjacent groups of $R^{5c}$, $R^{6c}$, $R^{7c}$, $R^{8c}$ and $R^{9c}$ may combine with each other to form a ring together with the atoms bonded to these groups; $n^c$ is 0 or 1 and when $n^c$ is 0, the substituent $R^{5c}$ is not present on $Y^{1c}$; and $p^c$ is 0 or 1 and when $p^c$ is 0, the carbon atom to which $R^{7c}$ is bonded and the carbon atom to which $R^{9c}$ is bonded are bonded directly; provided that when $Y^{1c}$ is a carbon atom, at least one of $R^{5c}$, $R^{6c}$, $R^{7c}$, $R^{8c}$ and $R^{9c}$ is not a hydrogen atom].

According to an eleventh aspect of the present invention, an olefin polymerization catalyst comprising the olefin polymerization catalyst component in the nineth or tenth aspect of the present invention, is provided.

According to a twelfth aspect of the present invention, a production method of an ethylene-based polymer, comprising producing an ethylene-based polymer satisfying at least the condition (B-4') among the conditions in the first aspect of the present invention by using an olefin polymerization catalyst containing the following components (A) and (B), is provided:

Component (A): at least any one of the following catalyst components (A-i) to (A-iii):

(A-i) the olefin polymerization catalyst component in the nineth aspect of the present invention, (A-ii) the olefin polymerization catalyst component in the tenth aspect of the present invention, and (A-iii) an olefin polymerization catalyst component containing a metallocene compound represented by the following formula (1d):

[Chem. 5]

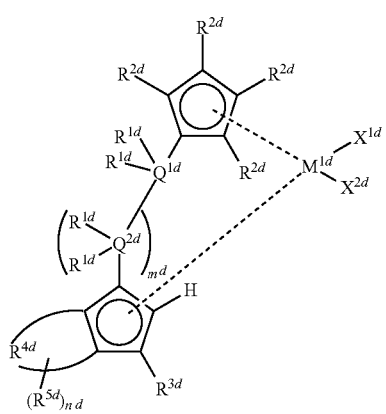

(1d)

[in formula (1d), $M^{1d}$ represents any one transition metal of Ti, Zr and Hf; each of $X^{1d}$ and $X^{2d}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1d}$ and $Q^{2d}$ independently represents a carbon atom, a silicon atom or a germanium atom; each $R^{1d}$ independently represents a hydrogen atom or a hydrocarbon group having a carbon number of 1 to 10 and at least two members out of four $R^{1d}$ may combine to form a ring together with $Q^{1d}$ and $Q^{2d}$; $m^d$ is 0 or 1 and when $m^d$ is 0, $Q^{1d}$ is bonded directly to the conjugated 5-membered ring including $R^{2d}$ and $R^{3d}$; each of $R^{2d}$ and $R^{3d}$ represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, provided that at least one $R^{2d}$ is not a hydrogen atom; $R^{4d}$ represents a saturated or unsaturated divalent hydrocarbon group having a carbon number of 4 or 5 for forming a condensed ring with the 5-membered ring to which $R^{4d}$ is bonded; $R^{5d}$ is an atom or a group bonded to a carbon atom of $R^{4d}$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and $n^d$ represents an integer of 0 to 10 and when $n^d$ is 2 or more, at least two $R^{5d}$ may form a ring together with the carbon atoms to which $R^{5d}$ are bonded], and Component (B): a compound capable of reacting with a metallocene compound of the component (A) to produce a cationic metallocene compound.

According to a thirteenth aspect of the present invention, the ethylene-based polymer in the first aspect of the present invention, which is produced by the production method of an ethylene-based polymer in the twelfth aspect of the present invention, is provided.

According to a fourteenth aspect of the present invention, the polyethylene-based resin composition in the third aspect of the present invention, wherein said ethylene-based polymer is the ethylene-based polymer in the thirteenth aspect of the present invention, is provided.

Advantage of the Invention

According to the present invention, an ethylene-based polymer having a developed long-chain branched structure and excellent in the moldability can be provided.

The polyethylene-based resin composition of the present invention has excellent molding characteristics and at the same time, has an effect that the balance between impact strength and stiffness is excellent and furthermore, the transparency is excellent. In addition, the molded product by the injection molding, compression-injection molding, rotational molding, extrusion molding, hollow molding, blow molding or inflation molding of the polyethylene-based resin composition is also excellent in the balance between impact strength and stiffness as well as in the transparency, so that a molded product reduced in the wall thickness can be provided in an industrially advantageous manner.

Moreover, according to the present invention, a method for producing a metallocene-based polyolefin or metallocene-based polyethylene having a sufficiently large number of appropriate-length long-chain branches, wherein an olefin polymerization catalyst component containing a specific metallocene compound is prepared and the catalyst component is used for an olefin polymerization catalyst, can be provided. In turn, a method for improving the mold processability of a metallocene-based polyethylene can be provided.

MODE FOR CARRYING OUT THE INVENTION

Figure 1:
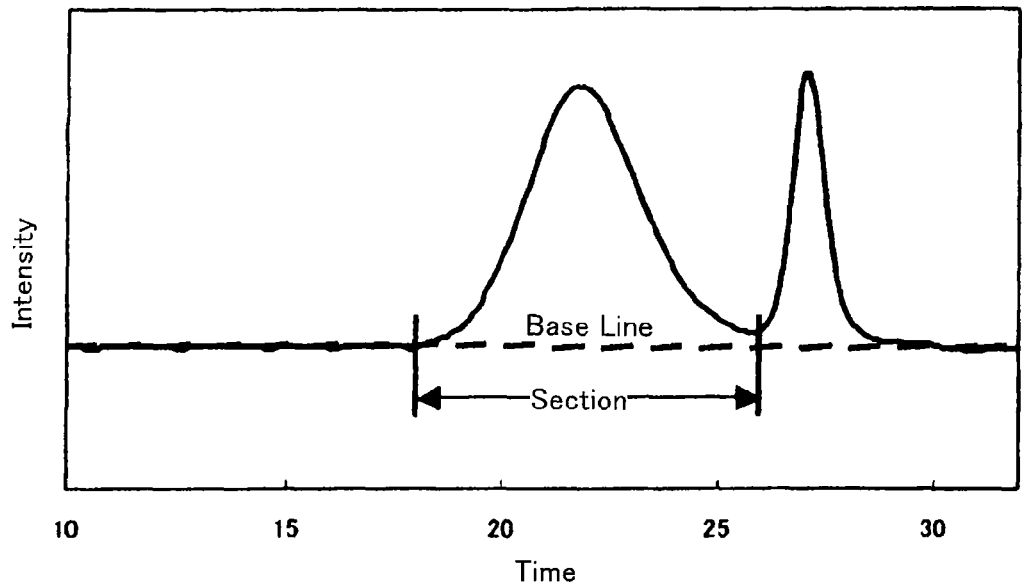
FIG. 1 is a graph showing a base line and a section of a chromatogram used in the gel permeation chromatography (GPC) method.

The present invention relates to a polyethylene-based resin composition obtained by blending a specific ethylene-based polymer (A) having a small amount of long-chain branched structure characterized by the elongational viscosity behavior and a specific ethylene-based polymer (B) having a specific long-chain branched structure similarly characterized by the elongational viscosity behavior to give a specific MFR and a specific density; a molded product obtained by molding the polyethylene-based resin composition; and use of the molded product. The present invention is described below item by item.

[I] Polyethylene-Based Resin Composition of the Present Invention

The polyethylene-based resin composition of the present invention is characterized by containing from 41 to 99 wt % of (A) an ethylene-based polymer satisfying specific conditions (A-1) to (A-4) (hereinafter, sometimes simply referred to as component (A)) and from 1 to 59 wt % of (B) an ethylene-based polymer satisfying specific conditions (B-1) to (B-6) (hereinafter, sometimes simply referred to as component (B)), wherein MFR of the composition as a whole is from 0.05 to 50 g/10 min and the density is from 0.910 to 0.960 g/cm³. Respective components constituting the polyethylene-based resin composition of the present invention, characteristics thereof, and the like are described below.

(1) Ethylene-Based Polymer (A)

The compound (A) that is one of components constituting the polyethylene-based resin composition of the present invention satisfies all of the conditions (A-1) to (A-4) described below.

1-1. Condition (A-1)

The melt flow rate ($MFR_A$) of the component (A) in the present invention is from 0.3 to 100 g/10 min, preferably from 0.9 to 20 g/10 min, more preferably from 1.4 to 10 g/10 min.

If $MFR_A$ is less than 0.3 g/10 min, the polyethylene-based resin composition may be inferior in the moldability, particularly in the melt flowability and spreadability, and if $MFR_A$ exceeds 100 g/10 min, the polyethylene-based resin composition or its molded product may be disadvantageously reduced in the mechanical strength such as impact strength, tear strength and tensile strength. Incidentally, in the present invention, MFR of the ethylene-based polymer and polyethylene-based resin composition indicates a value when measured under the conditions of 190° C. and a load of 21.18 N (2.16 kg) in accordance with "Test Method for Melt Flow Rate (MFR) and Melt Volume Flow Rate (MVR) of Plastics-Thermoplastics" of JIS K7210.

1-2. Condition (A-2)

The density$_A$ of the ethylene-based polymer (A) in the present invention is from 0.915 to 0.970 g/cm$^3$, preferably from 0.917 to 0.950 g/cm$^3$, more preferably from 0.925 to 0.940 g/cm$^3$.

When the density$_A$ is in this range, the polyethylene-based resin composition or its molded product is excellent in the balance between impact strength and stiffness and in the transparency. On the other hand, if the density$_A$ is less than 0.915 g/cm$^3$, the stiffness is reduced and when the product is a molded product having a small thickness, such as film and sheet, as well as various problems in using the product, a problem is disadvantageously brought about in the step of winding up the product or the post-processing step such as surface printing•lamination or when the product is a molded product having a large wall thickness, such as pipe and various containers, since the product is too soft and undergoes deformation, the wall thickness must be disadvantageously designed to be larger than necessary. Also, if the density$_A$ exceeds 0.970 g/cm$^3$, the impact strength or transparency is deteriorated and this is not preferred. Incidentally, in the present invention, the density of the ethylene-based polymer or the polyethylene-based resin composition indicates a value when measured by the following method.

Pellets are hot-pressed to prepare a 2 mm-thick press sheet, and this sheet is placed in a beaker having a volume of 1,000 ml. The beaker is filled with distilled water, covered with a watch glass, heated by a mantle heater and after coming to a boil, the distilled water was boiled for 60 minutes. Thereafter, the beaker is placed on a wooden table and allowed to cool. In this operation, the amount of the boiling distilled water after boiling for 60 minutes is set to 500 ml, and the period of time until reaching room temperature is adjusted not to fall below 60 minutes. Furthermore, the test sheet is immersed in a nearly central part of the water while keeping it away from contact with the beaker or water surface. The sheet is annealed for 16 to 24 hours under the conditions of 23° C. and a humidity of 50%, then punched into 2-mm squares, and measured at a test temperature of 23° C. in accordance with "Test Method for Density and Specific Gravity of Plastics-Unfoamable Plastics" of JIS K7112.

1-3. Condition (A-3)

The ratio ([Mw/Mn]$_A$) between weight average molecular weight (Mw) and number average molecular weight (Mn) of the component (A) in the present invention is from 2.0 to 10.0, preferably from 2.5 to 10.0, more preferably from 2.9 to 5.0. If [Mw/Mn]$_A$ is less than 2.0, the polyethylene-based resin composition may be inferior in the moldability, particularly in the melt flowability, or the polymer may be difficult to mix with other polymer components and therefore, this should be avoided.

If [Mw/Mn]$_A$ exceeds 10.0, the effect of improving the stiffness of the polyethylene-based resin composition or its molded product may be insufficient or the transparency may be deteriorated, and this is not preferred. Incidentally, in the present invention, each of Mw and Mn of the ethylene-based polymer or polyethylene-based resin composition indicates a value measured by gel permeation chromatography (GPC) method.

Conversion to molecular weight from retention volume is performed using a calibration curve prepared in advance with standard polystyrene. All of standard polystyrenes used are the following brands of Tosoh Corporation: F380, F288, F128, F80, F40, F20, F10, F4, F1, A5000, A2500 and A1000.

The calibration curve is prepared by injecting 0.2 mL of a solution after dissolving each standard polystyrene in ODCB (containing 0.5 mg/mL of BHT) to have a concentration of 0.5 mg/mL. As the calibration curve, a cubic expression obtained by approximation by the least square method is employed. For the viscosity expression ($[\eta]=K\times M^\alpha$) used in the conversion to the molecular weight, the following numerical values are used.

PS: $K=1.38\times10^{-4}$, $\alpha=0.7$
PE: $K=3.92\times10^{-4}$, $\alpha=0.733$
PP: $K=1.03\times10^{-4}$, $\alpha=0.78$ Incidentally, the measurement conditions of GPC are as follows.

Instrument: GPC (ALC/GPC, 150C) manufactured by Waters

Detector: IR detector (measurement wavelength: 3.42 μm), MIRAN 1A, manufactured by FOXBORO Column: AD806M/S (three) manufactured by Showa Denko Moving phase solvent: o-dichlorobenzene
Measurement temperature: 140° C.
Flow rate: 1.0 ml/min
Injection volume: 0.2 ml Preparation of sample: A 1 mg/mL solution of the sample is prepared using ODCB (containing 0.5 mg/mL of BHT) and dissolved over about 1 hour at 140° C.

Incidentally, a base line and a section of the obtained chromatogram are determined, for example, as shown in FIG. 1.

1-4. Condition (A-4)

The component (A) in the present invention satisfies the condition that in a double logarithmic plot of elongational viscosity η(t) (unit: Pa·sec) and elongation time t (unit: sec) measured at a temperature of 170° C. and an elongational strain rate of 2 (unit: 1/sec), an inflection point of the elongational viscosity attributable to strain hardening is not observed or when the inflection point is observed, assuming that the maximum elongational viscosity after strain hardening is $\eta_{Max}(t_1)$ and the approximate straight line of the elongational viscosity before hardening is $\eta^{Linear}(t)$, the degree of strain hardening $[\lambda\max(2.0)]_A$ defined by $\eta_{Max}(t_1)/\eta_{Linear}(t_1)$ is from 1.0 to 2.0, preferably from 1.0 to 1.5, more preferably from 1.0 to 1.2, and in a most preferred case, the inflection point is not observed or $[\lambda\max(2.0)]_A$ is from 1.0 to 1.1. Here, the approximate straight line of the elongational viscosity before hardening is a tangent line having a smallest gradient (here, however, the gradient is 0 or a positive value) among tangent lines of a curve of the double logarithmic graph in the range of t corresponding to a strain amount of 0.2 to 1.0.

If $[\lambda\max(2.0)]_A$ is less than 1.0, the ethylene-based polymer, polyethylene-based resin composition or its molded product may be in a non-uniform molten state or may have a thermally unstable structure, and this is not preferred. If $[\lambda\max(2.0)]_A$ exceeds 2.0, the melt tension and flowability during molding may be excellent, but the polyethylene-based resin composition or its molded product may be disadvantageously reduced in the impact strength or transparency.

In general, a polyethylene is processed into an industrial product by a shaping method involving a molten state, such film molding, blow molding and foam molding, and at this time, the elongational flow characteristics represented by the above-described elongational viscosity or degree of strain hardening greatly affect the ease of molding.

That is, a polyethylene having a narrow molecular weight distribution and having no long-chain branch exhibits bad moldability because of its low melt strength, whereas a polyethylene having an ultrahigh molecular weight component or a long-chain branch component has a property of undergoing strain hardening during melt elongation, that is, abruptly rising in the elongational viscosity on the high strain side, and a polyethylene exhibiting this property outstandingly is excellent in the moldability. A polyethylene resin having such elongational flow characteristics has an effect of, for example, preventing uneven wall thickness or blown rupture of a product in the film molding or blow molding, enabling high-speed molding, or making it possible to raise the percentage of closed pores at the foam molding and provides for merits such as increase of strength of a molded article, enhancement of design property, reduction in weight, improvement of molding cycle, and elevation of heat insulating property. However, on the other hand, if the elongational flow characteristics are too strong, there may arise a problem, for example, the impact strength of the molded product may be reduced due to strength anisotropy that is presumed to be attributable to molecular orientation during molding, or the transparency may be deteriorated due to reduction in the surface smoothness of a molded product, which is presumed to be attributable to a property of the melt elasticity being too high.

As a result of intensive studies on a polyethylene-based resin composition with an attempt to improve the molding process bound up with the elongational flow characteristics of a polyethylene and overcome the problem in mechanical properties of a molded product by designing the long-chain branched structure as a main factor governing the elongational viscosity characteristics, it has been found that, as described above, when an ethylene-based polymer (A) having a small amount of long-chain branched structure is used as a high MFR main component of the resin composition, that is, as a main component on the low molecular weight side, the polymer is excellent in contribution to enhancement of mechanical properties, particularly stiffness, and furthermore, excellent in prevention of deterioration of the transparency.

With respect to the measurement method for the degree of strain hardening, as long as the uniaxial elongational viscosity can be measured, the same value is obtained in principle by any method, and details of the measurement method and measurement apparatus are described, for example, in known literature, Polymer, 42 (2001), 8663.

The measurement method and measurement apparatus preferred for measurement of the ethylene-based polymer of the present invention include the followings.

Measurement Method:
 Apparatus: Ares manufactured by Rheometorics
 Fixture: Extentional Viscosity Fixture, manufactured by T.A. Instrument
 Measurement temperature: 170° C.
 Strain rate: 2/sec
 Preparation of test piece: A sheet having a size of 18 mm×10 mm and a thickness of 0.7 mm is prepared by press molding.

Calculation Method:
The elongational viscosity at 170° C. and a strain rate of 2/sec is plotted in a double logarithmic graph where the abscissa is the time t (sec) and the ordinate is the elongational viscosity η(Pa·sec). On this double logarithmic graph, assuming that the maximum elongational viscosity until reaching a strain amount of 4.0 after strain hardening is $\eta_{Max}(t_1)$ ($t_1$ is the time at which the maximum elongational viscosity is shown) and the approximate straight line of the elongational viscosity before hardening is $\eta_{Linear}(t)$, a value calculated as $\eta_{Max}(t)/\eta_{Linear}(t_1)$ is defined as the degree of strain hardening (λmax). Incidentally, occurrence or no occurrence of strain hardening is judged by whether an inflection point at which the elongational viscosity is changed from an upwardly projecting curve to a downwardly projecting curve with the elapse of time is present or absent.

Figure 2:
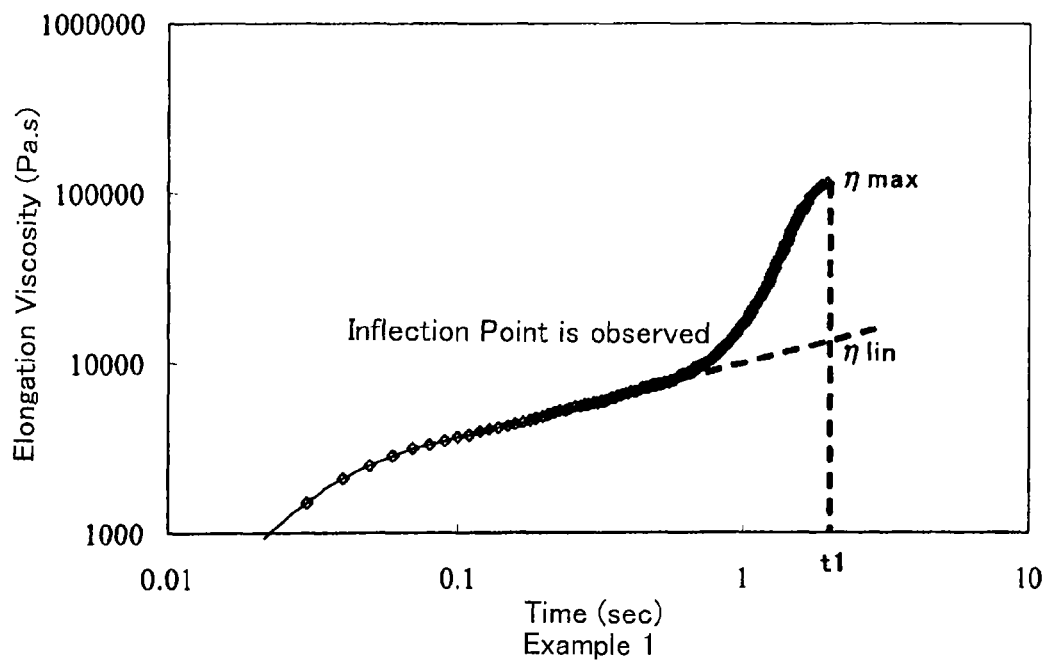
FIG. 2 is a plot diagram of the elongational viscosity when an inflection point of elongational viscosity is observed (a typical example of the ethylene-based polymer (B) in Examples).
Figure 3:
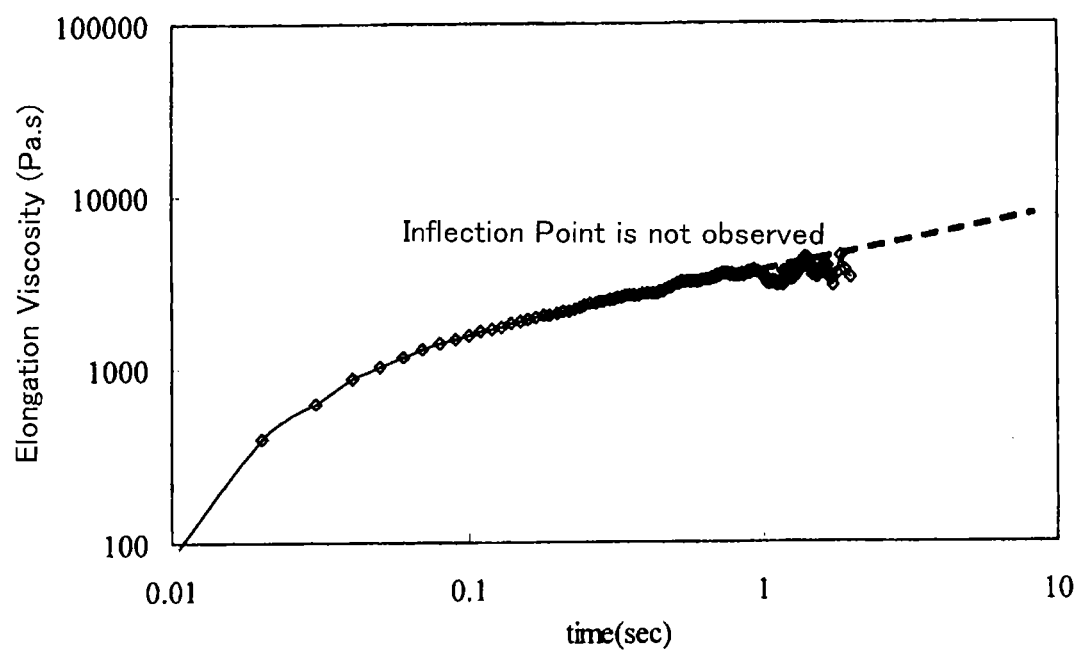
FIG. 3 is a plot diagram of the elongational viscosity when an inflection point of elongational viscosity is not observed (a typical example of the ethylene-based polymer (A) in Examples).

FIGS. 2 and 3 are plot diagrams of typical elongational viscosity. FIG. 2 is a case where an inflection point of elongational viscosity is observed, and $\eta_{Max}(t_1)$ and $\eta_{Linear}(t)$ are shown in the figure. FIG. 3 is a case where an inflection point of elongational viscosity is not observed.

1-5. Composition of Ethylene-Based Polymer (A)

The component (A) in the present invention is an ethylene homopolymer or a copolymer of ethylene and an α-olefin having a carbon number of 3 to 20. Examples of the α-olefin as a copolymerization component used here include propylene, butene-1,3-methylbutene-1,3-methylpentene-1,4-methylpenetene-1, pentene-1, hexene-1, heptene-1, octene-1, decene-1, tetradecene-1, hexadecene-1, octadecene-1, and eicocene-1. Only one of these α-olefins may be used, or two or more thereof may be used in combination. Among these, an α-olefin having a carbon number of 3 to 10 is preferred, and specific examples thereof include propylene, butene-1,3-methylbutene-1,4-methylpentene-1, pentene-1, hexene-1, heptene-1, octene-1, and decene-1. An α-olefin having a carbon number of 4 to 8 is more preferred, and specific examples thereof include butene-1,3-methylbutene-1,4-methylpentene-1, pentene-1, hexene-1, heptene-1, and octene-1. Particularly preferred α-olefins are butene-1, hexene-1, and octene-1. Incidentally, in the later-described olefin polymerization catalyst, even in the case of homopolymerization of ethylene, an α-olefin such as 1-butene and 1-hexene due to an ethylene oligomerization reaction may occur as a by-product in the polymerization system, or a reaction called "Chain-walking reaction" where a short-chain branch such as methyl group and ethyl group is produced in the main chain of an olefin polymer by an isomerization reaction of a bond between an active center metal and a terminal carbon at the growth terminal of olefin polymerization, is known, and the short-chain branched structure produced by such a reaction in the ethylene homopolymer is sometimes confused with the short-chain branched structure produced by copolymerization of an α-olefin.

Accordingly, the ethylene homopolymer as used in the present invention indicates a polymer produced as a result of polymerization proceeded without externally supplying an α-olefin as a comonomer, and the ethylene.α-olefin copolymer indicates a polymer produced as a result of polymerization performed by externally supplying the α-olefin. The term "ethylene-based polymer" is used for collectively referring to the ethylene homopolymer and the ethylene.α-olefin copolymer (including the later-described case of using, as a comonomer, a monomer except for an α-olefin).

The ratio of ethylene and an α-olefin in the ethylene-based polymer is from about 80 to 100 wt % of ethylene and from about 0 to 20 wt % of an α-olefin, preferably from about 85 to 99.9 wt % of ethylene and from about 0.1 to 15 wt % of an α-olefin, more preferably from about 90 to 99.5 wt % of ethylene and from about 0.5 to 10 wt % of an α-olefin, still more preferably from about 90 to 99 wt % of ethylene and from about 1 to 10 wt % of an α-olefin. When the ethylene content is in this range, the polyethylene-based resin composition or its molded product can have good balance between stiffness and impact strength.

The copolymerization may be any of alternate copolymerization, random copolymerization and block copolymerization. Of course, it is possible to use a small amount of a comonomer other than ethylene and an α-olefin, and in this case, the comonomer includes a compound having a polymerizable double bond, for example, styrenes such as styrene, 4-methylstyrene and 4-dimethylaminostyrene, dienes such as 1,4-butadiene, 1,5-hexadiene, 1,4-hexadiene and 1,7-octadiene, cyclic compounds such as norbornene and cyclopentene, and oxygen-containing compounds such as hexenol, hexenoic acid and methyl octenoate. However, in the case of using dienes, it is indisputable that the comonomer must be used within a range causing no development of a long-chain branched structure, that is, within a range satisfying the condition (A-4).

1-6. Production Method of Ethylene-Based Polymer (A)

As the component (A) in the present invention, an ethylene-based polymer having the composition above and satisfying all of the conditions (A-1) to (A-4) is produced and used. The production is performed by a method of homopolymerizing ethylene or copolymerizing ethylene with the above-described α-olefin, by using an olefin polymerization catalyst.

As the olefin polymerization catalyst, various kinds of catalysts are known at present, and the catalyst is not limited as long as the ethylene-based polymer (A) can be prepared within the limitations of the configuration of catalyst components and the design of polymerization conditions or post-processing conditions, but as an example of the technique suitable for the production of the ethylene-based polymer (A) and satisfying the profitability at the industrial level, specific examples include transition metal-containing catalysts for olefin polymerization described in the following (i) to (iv).

(i) Ziegler Catalyst

Examples of the olefin polymerization catalyst suitable for the production of the ethylene-based polymer (A) include a Ziegler-Natta catalyst that is an olefin coordination polymerization catalyst composed of a combination of a transition metal compound and an alkyl compound or the like of a typical metal. Above all, a so-called Mg—Ti type Ziegler catalyst in which a solid catalyst component obtained by loading a titanium compound on a magnesium compound and an organoaluminum compound are combined (refer, for example, to "Shokubai Katsyou Daijiten (Practical Dictionary of Catalysts); issued by Kogyo Chosakai, 2004" and "Shutsugan Keitou Zu—Olefin Jugo Shokubai no Hensen— (Application Flow Chart—History of Olefin Polymerization Catalyst—); issued by Japan Institute of Invention and Innovation, 1995") is preferred, because this catalyst is inexpensive, highly active and excellent in the suitability for polymerization process.

Among others, an Mg/Ti catalyst supported on an inactive support material described in JP-A-54-142192 and JP-A-54-148093 is preferred. More specifically, examples thereof include a catalyst obtained by a process where a porous silica previously treated with triethylaluminum is impregnated with a uniform mixed solution of a tetrahydrofuran solution of anhydrous $MgCl_2$ and $TiCl_3$ or $TiCl_4$ and then dried to a solid state, and a catalyst obtained by applying preliminary olefin polymerization to an Mg/Ti catalyst in the presence of an organoaluminum described in JP-A-63-117019, for example, a preliminarily polymerized catalyst obtained by a process where a mixed solution of $TiCl_4$ and methylhydrogenpolysiloxane is introduced into a solid component obtained by the reaction of $MgCl_2$, $Ti(OnBu)_4$ and methylhydrogenpolysiloxane and the obtained catalyst is subjected to preliminary ethylene polymerization in the presence of triethylaluminum. Other examples include an olefin polymerization catalyst in which a low-valent titanium atom-containing catalyst component obtained by the reaction of a magnesium·aluminum composite material and a quadrivalent titanium compound is combined with an organoaluminum compound, described in JP-A-60-195108; a solid-state catalyst obtained by adding dropwise ethylaluminum sesquichloride or the like to a uniform mixture of magnesium ethoxide, tri-n-butoxy monochloroethane and n-butanol, described in JP-A-56-61406 and the like; and an olefin polymerization solid catalyst containing magnesium, a halogen atom, titanium and an electron donor, described in JP-A-2001-139635 and the like.

(ii) Metallocene Catalyst

As an example of the polymerization catalyst suitable for the production of the ethylene-based polymer (A), a metallocene catalyst that is an olefin polymerization catalyst composed of a metallocene-based transition metal compound and a promoter component (see, for example, "Metallocene Shokubai ni-yoru Jisedai Polymer Kogyoka Gijutsu (Next-Generation Polymer Engineering Technology by Metallocene Catalyst) (Volume One and Two); issued by Inter-Research, 1994") is used, because this catalyst is relatively inexpensive, highly active and excellent in the suitability for polymerization process and furthermore, an ethylene-based polymer having a narrow molecular weight distribution and a narrow copolymerization composition distribution is obtained.

Among others, an olefin polymerization catalyst system containing a so-called metallocene complex and an alumoxane, described in JP-A-60-35007 and the like, and a catalyst system using a promoter component other than alumoxane, described in JP-A-8-34809, JP-A-8-127613, JP-A-11-193306, JP-T-2002-515522 and the like, are suitably used. As the metallocene complex, those where the center metal is Ti, Zr or Hf belonging to Group 4B of the periodic table exhibit high activity for ethylene polymerization and therefore, are suitably used. As for the ligand structure of such a center metal, various structures are known at present and being examined for the polymerization performance such as molecular weight of the produced polyethylene and α-olefin copolymerizability. As described above, the ethylene-based polymer (A) of the present invention preferably has no or a small amount of long-chain branched structure and for the production of an ethylene-based polymer having such a property, a so-called non-bridged complex where a ligand having a conjugated 5-membered ring structure is not bridged with another ligand by a bridging group, is preferred. According to the structure classification of metallocene compounds by the following formulae [1], [2], [3] and [4] described, for example, in JP-A-11-310612, compounds represented by formulae [1] and [3] are preferred, and a compound represented by formula [1] is more preferred. However, a higher concentration at the polymerization site of ethylene or α-olefin and a shorter polymerization reaction time are supposed to be disadvantageous for the production of a long-chain branched structure and therefore, the propriety of the metallocene compound is of course limited to a relative degree contingent on performing the polymerization under the same conditions. In addition, metallocene complexes described, for example, in JP-A-5-132518, JP-A-2000-154196 and JP-A-2004-161760 are also suitably used. Furthermore, a metallocene complex having a heteroatom-containing monocyclic or polycyclic heteroaromatic group as a substituent on a ligand of a conjugated 5-membered ring structure, described, for example, in JP-T-2002-535339 is also suitably used.

[Chem. 6]

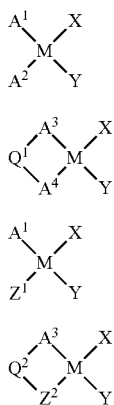

[1]

[2]

[3]

[4]

[wherein each of $A^1$ to $A^4$ represents a ligand having a conjugated 5-membered ring structure ($A^1$ to $A^4$ may be the same or different in the same compound), $Q^1$ represents a bonding group for bridging two conjugated 5-membered ring ligands at arbitrary positions, each of $Z^1$ and $Z^2$ independently represents a ligand containing a nitrogen, oxygen, silicon, phosphorus or sulfur atom bonded to M, a hydrogen atom, a halogen atom or a hydrocarbon group, $Q^2$ represents a bonding group for bridging $Z^2$ and an arbitrary position of the conjugated 5-membered ring ligand, M represents a metal atom selected from Group 4 of the periodic table, and each of X and Y independently represents a hydrogen atom, a halogen atom, a hydrocarbon group, an alkoxy group, an amino group, a phosphorus-containing hydrocarbon group or a silicon-containing hydrocarbon group, which is bonded to M; their details are as defined in the patent publication above].

(iii) Phillips Catalyst

The Phillips catalyst is a chromium catalyst where a chromium compound is supported on an inorganic oxide support such as silica, silica-alumina and silica-titania and at least a part of chromium elements supported is converted into a hexavalent chromium element by performing activation in a non-reducing atmosphere (see, for example, M. P. McDaniel, *Advances in Catalysis*, Volume 33, page 47, 1985, Academic Press Inc.; M. P. McDaniel, *Handbook of Heterogeneous Catalysis*, page 2400, 1997, VCH; M. B. Welch et al., *Handbook of Polyolefins: Synthesis and Properties*, page 21, 1993, Marcel Dekker). The Phillips catalyst exhibits high activity for ethylene polymerization and therefore, is suitably used. However, since the ethylene-based polymer produced using a Phillips catalyst tends to contain a long-chain branched structure or have a broad molecular weight distribution, its use as the ethylene-based polymer (A) of the present invention requires special care to satisfy the condition (A-3) or (A-4).

(iv) Post-Metallocene Catalyst

As an example of the polymerization catalyst suitable for the production of the ethylene-based polymer (A), a post-metallocene catalyst that is an olefin polymerization catalyst using a homogeneous metal complex (non-metallocene complex) except for the above-described metallocene-based transition metal compound (see, for example, "Polyethylene Gijutsu Dokuhon (Polyethylene Technology Guidebook; issued by Kogyo Chosakai Publishing, 2001", "Kin'itsu-kei Sen'i Kinzoku Shokubai ni-yoru Living Jugo (Living Polymerization by Homogeneous Transition Metal Catalyst); issued by IPC, 1999", and "Shokubai Katsuyo Daijiten (Practical Dictionary of Catalysts); issued by Kogyo Chosakai, 2004") is used, because this catalyst is relatively inexpensive and excellent in the activity and furthermore, an ethylene-based polymer having a narrow molecular weight distribution and a narrow copolymerization composition distribution is obtained.

Among others, suitably used are bisimide, iminoamide and bisamide compounds of a transition metal having a 4- to 8-membered ring chelate structure that is formed by bonding a ligand having at least two N atoms to a transition metal belonging to Groups 3 to 11 of the periodic table through those two N atoms and contains the transition metal, disclosed, for example, in JP-T-10-513489, JP-T-2002-521538, JP-T-2000-516295, JP-T-2000-514132, *Macromolecules*, 1996, page 5241, *JACS*, 1997, 119, page 3830, *JACS*, 1999, 121, page 5798, and *Organometallics*, 1998, page 3155; bis-hydrocarbyloxy and bis-hydrocarbylthio compounds of a transition metal having a 4- to 8-membered ring chelate structure that is formed by bonding a ligand having at least two O or S atoms to a transition metal belonging to Groups 3 to 11 of the periodic table through those two O or S atoms and contains the transition metal, disclosed, for example, in JP-A-6-136048; iminocarboxylate, thiocarboxylate and phosphine carboxylate compounds of a transition metal having a 4- to 8-membered ring chelate structure that is formed by bonding a ligand having at least one N, S or P atom and a carboxyl group (COO) to a transition metal belonging to Groups 3 to 11 of the periodic table through the N, S or P atom and the carboxyl group and contains the transition metal, disclosed, for example, in JP-T-2000-514132, JP-T-2003-535107 and JP-A-2007-77395; β-keto-phosphine, β-keto-imide and β-keto-amide compounds of a transition metal having a 4- to 8-membered ring chelate structure that is formed by bonding a ligand having at least one P or N atom and a carbonyl group (CO) to a transition metal belonging to Groups 3 to 11 of the periodic table through the P or N atom and the carbonyl group and contains the transition metal, disclosed, for example, in JP-T-2004-517933; γ-oxy-phosphine, γ-oxy-imide and γ-oxy-amide compounds of a transition metal having a 4- to 8-membered ring chelate structure that is formed by bonding a ligand having at least one P or N atom and an O atom to a transition metal belonging to Groups 3 to 11 of the periodic table through the P or N atom and the O atom and contains the transition metal, disclosed, for example, in JP-A-64-14217 and JP-T-2004-517933; a γ-sulfonato-phosphine compound of a transition metal having a 4- to 8-membered ring chelate structure that is formed by bonding a ligand having at least one P atom and a sulfonic acid residue ($SO^3$) to a transition metal belonging to Groups 3 to 11 of the periodic table through the P atom and the sulfonic acid residue and contains the transition metal, disclosed, for example, in JP-A-6-184214, JP-A-10-195090, JP-T-2002-521534, JP-A-2007-46032 and JP-A-2007-77395; and phenoxyimine and phenoxyamine compounds of a transition metal having a 4- to 8-membered ring chelate structure that is formed by bonding a ligand having at least an N atom and a phenoxy group to a transition metal belonging to Groups 3 to 11 of the periodic table through the N atom and an O atom of the phenoxy group and contains the transition metal, disclosed, for example, in JP-A-11-315109, *Chemical Communications* (2003), (18), 2272-2273.

As such a non-metallocene complex catalyst, those where the center metal is Ti, Zr, Hf, which belong to Group 4B of the periodic table, V, Cr, Fe, Co, Ni or Pd exhibit high activity and are more suitably used, and those where the center metal is Ti, Zr, Hf, Fe, Ni or Pd are still more suitably used. However, with some of these post-metallocene catalysts, the ethylene-based polymer produced tends to contain a long-chain branched structure, contain a short-chain branched structure mainly consisting of a methyl branch, or have a broad molecular weight distribution and therefore, its use as the ethylene-based polymer (A) of the present invention requires special care to satisfy the conditions (A-2) to (A-4).

In the present invention, the production of the ethylene-based polymer (A) is preferably performed by contacting ethylene with the olefin polymerization catalyst of (i) to (iv) above, more preferably with (i) a Ziegler catalyst or (ii) a metallocene catalyst, and thereby polymerizing or copolymerizing the ethylene. As the olefin polymerization catalyst, a plurality of kinds may be selected from (i) to (iv) and used. At the time of performing ethylene polymerization or copolymerization, any method, for example, a liquid phase polymerization method such as slurry polymerization, solution polymerization, bulk polymerization in a liquid monomer and suspension polymerization, or a gas phase polymerization can be employed. In the case of a slurry polymerization method, either a slurry polymerization method using a pipe loop-type reactor or a slurry polymerization method using an autoclave-type reactor can be used. The industrial polymerization process is described in detail in Kazuo Matsuura and Naotaka Mikami (compilers), "Polyethylene Gijutsu Dokuhon (Polyethylene Technology Guidebook)", page 148, 2001, Kogyo Chosakai Publishing. The polymerization method is preferably a slurry polymerization method or a gas phase polymerization method, more preferably a gas phase polymerization method.

The ethylene for use in the present invention may be an ethylene produced from a crude oil derived from a normal fossil raw material or may be a plant-derived ethylene. Also, the polyethylene produced in the present invention can be an ethylene-based polymer producing using a plant-derived ethylene. The plant-derived ethylene and the polyethylene include, for example, ethylene and polymers thereof described in JP-T-2010-511634. The plant-derived ethylene or its polymer has a property of being carbon neutral (not using a fossil raw material and not leading to an increase of carbon dioxide in the air) and can provide an environment-friendly product.

The liquid phase polymerization method is usually performed in a hydrocarbon solvent. As the hydrocarbon solvent, an inert hydrocarbon such as propane, n-butane, isobutane, n-pentane, isopentane, hexane, heptane, octane, decane, cyclohexane, benzene, toluene and xylene is used individually or as a mixture, or a liquid monomer is used. As the gas phase polymerization method, a commonly known polymerization method using a fluidized bed, a stirring bed or the like in the co-presence of an inert gas may be employed, and depending on the case, a so-called condensing mode in which a medium for removing the polymerization heat is allowed to coexist can be also employed.

The polymerization temperature is generally from 0 to 300° C., practically from 50 to 270° C., and although this may vary depending on the polymerization process employed, preferably, the polymerization temperature is from 60 to 110° C. in the slurry polymerization or suspension polymerization, from 100 to 250° C. in the solution polymerization or bulk polymerization in liquid ethylene, and from 60 to 100° C. in the gas phase polymerization method. The catalyst concentration and olefin concentration in the reactor may be an arbitrary concentration high enough for allowing the polymerization to proceed. The ethylene concentration may be from about 1 to about 10% based on the weight of the contents of the reactor in the case of slurry polymerization, suspension polymerization and solution polymerization, and in the case of gas phase polymerization, the concentration may be from 0.1 to 10 MPa in terms of the total pressure. The polymerization may be also performed by causing hydrogen to be present together, and this is commonly practiced as a method for adjusting MFR of the ethylene-based polymer (A). Hydrogen has an effect as a so-called chain transfer agent for adjusting the molecular weight in general. MFR can be adjusted to a certain extent by changing the polymerization conditions such as polymerization temperature and molar ratio of the catalyst. In order reduce the amount of the long-chain branch of the ethylene-based polymer (A), the ethylene concentration or hydrogen concentration is preferably higher.

As for the polymerization method, not only single-stage polymerization of producing an olefin-based polymer by using one reactor but also multi-stage polymerization using at least two reactors connected in series and/or in parallel for increasing the production amount or more precisely controlling the molecular weight distribution or comonomer composition distribution, can be performed. In the case of multi-stage polymerization, series multi-stage polymerization where a plurality of reactors are connected and a reaction mixture obtained by polymerization in a first-stage reactor is continuously fed in sequence to reactors of second and following stages is preferred. In the series multi-stage polymerization method, a polymerization reaction mixture in the reactor of a precedent stage is continuously discharged and transferred through a connecting pipe to reactors of subsequent and later stages. Also, the polymerization can be performed even when a so-called scavenger as a component for water removal is added to the polymerization system. As the scavenger, an organoaluminum compound such as trimethylaluminum, triethylaluminum and triisobutylaluminum, the above-described organoaluminum oxy compound, an organozinc compound, or an organomagnesium compound may be used, but an organoaluminum compound is most commonly used.

(2) Ethylene-Based Polymer (B)

The compound (B) that is one of components constituting the polyethylene-based resin composition of the present invention satisfies all of the conditions (B-1) to (B-6) described below.

2-1. Condition (B-1)

The melt flow rate ($MFR_B$) of the component (B) in the present invention is from 0.01 to 1.5 g/10 min, preferably from 0.05 to 1.0 g/10 min, more preferably from 0.1 to 0.8 g/10 min.

If $MFR_B$ is less than 0.01 g/10 min, the polyethylene-based resin composition may be inferior in the moldability, particularly in the melt flowability and spreadability, and furthermore, uniform mixing with the ethylene-based polymer (A) may be difficult, disadvantageously giving rise to production of an appearance failure such as gel, grain and fisheye or reduction in the impact strength or transparency. If $MFR_B$ exceeds 1.5 g/10 min, the effect that the polyethylene-based resin composition or its molded product may be enhanced in the mechanical strength such as impact strength, tear strength and tensile strength as well as in the transparency may not be sufficiently exerted, and this is not preferred. In relation to $MFR_A$, $MFR_B$ must further satisfy $100 > MFR_A/MFR_B > 1.0$ so that the polyethylene-based resin composition of the present invention or its molded product can be enhanced in the mechanical strength such as impact strength, tear strength and tensile strength and in the transparency, and it is necessary to satisfy preferably $20>MFR_A/MFR_B>1.1$, more preferably $15>MFR_A/MFR_B>1.2$, still more preferably $10>MFR_A/MFR_B>2.0$. Incidentally, $MFR_B$ indicates a value when measured under the same conditions as in the condition (A-1).

2-2. Condition (B-2)

The density$_B$ of the component (B) in the present invention is from 0.880 to 0.940 g/cm$^3$, preferably from 0.891 to 0.940 g/cm$^3$, more preferably from 0.895 to 0.925 g/cm$^3$, still more preferably from 0.900 to 0.915 g/cm$^3$, yet still more preferably from 0.900 to 0.910 g/cm$^3$.

When the density$_B$ is in this range, the polyethylene-based resin composition or its molded product is excellent in the balance between impact strength and stiffness and in the transparency. On the other hand, if the density$_B$ is less than 0.880 g/cm$^3$, the stiffness is reduced and when the product is a molded product having a small thickness, such as film and sheet, as well as various problems in using the product, a problem is disadvantageously brought about in the step of winding up the product or the post-processing step such as surface printing•lamination or when the product is a molded product having a large wall thickness, such as pipe and various containers, since the product is too soft and undergoes deformation, the wall thickness must be disadvantageously designed to be larger than necessary. In addition, the polymer is heavily sticky even at room temperature and difficult to handle in the blending step with the ethylene-based polymer (A), disadvantageously giving rise to product sticking of the polyethylene-based resin composition, and furthermore, the compatibility with the ethylene-based polymer (A) may be reduced to deteriorate the impact strength or transparency due to phase separation. Also, if the density$_B$ exceeds 0.940 g/cm$^3$, the impact strength or transparency is deteriorated and this is not preferred.

In relation to the density$_A$, the density$_B$ preferably satisfies $1.070>density_A/density_B>0.990$ so that the polyethylene-based resin composition of the present invention or its molded product can be enhanced in the mechanical strength such as impact strength, tear strength and tensile strength and in the transparency, and it is necessary to satisfy more preferably $1.059>density_A/density_B>1.000$, still more preferably $1.050>density_A/density_B>1.005$, yet still more preferably $1.035>density_A/density_B>1.010$. Incidentally, density$_B$ indicates a value when measured under the same conditions as in the condition (A-2).

2-3. Condition (B-3)

The ratio ($[Mw/Mn]_B$) between weight average molecular weight (Mw) and number average molecular weight (Mn) of the component (B) in the present invention is from 2.0 to 10.0, preferably from 2.0 to 6.0, more preferably from 2.5 to 5.6, still more preferably from 2.9 to 4.5, yet still more preferably from 3.2 to 4.0.

If $[Mw/Mn]_B$ is less than 2.0, the polymer may be difficult to mix with the ethylene-based polymer (A) and therefore, this should be avoided. If $[Mw/Mn]_B$ exceeds 10.0, the effect of improving the impact strength of the polyethylene-based resin composition or its molded product may be insufficient or deterioration of the transparency or susceptibility to sticking may result, and this is not preferred. Incidentally, $[Mw/Mn]_B$ indicates a value when measured under the same conditions as in the condition (A-3).

2-4. Condition (B-4)

The degree of strain hardening $[\lambda max(2.0)]_B$ of the component (B) in the present invention is from 1.2 to 20.0, preferably from 1.2 to 10.0, more preferably from 1.7 to 8.0, still more preferably from 2.4 to 6.0, yet still more preferably 3.0 to 5.0.

If $[\lambda max(2.0)]_B$ is less than 1.2, the ethylene-based polymer, polyethylene-based resin composition or its molded product may lack the flowability or melt tension and be deteriorated in the molding characteristics. If $[\lambda max(2.0)]_B$ exceeds 20.0, the flowability and melt tension may be excellent, but the polyethylene-based resin composition or its molded product may be disadvantageously reduced in the impact strength or transparency. Incidentally, $[\lambda max(2.0)]_B$ indicates a value when measured under the same conditions as in the condition (A-4). Furthermore, as to the relationship of $[\lambda max(2.0)]_B$ and $[\lambda max(2.0)]_A$, when the ratio therebetween satisfies $20>[\lambda max(2.0)]_B/[\lambda max(2.0)]_A>1.0$, the polyethylene-based resin composition of the present invention enhanced particularly in the balance between moldability and mechanical property, and this is preferred. If the ratio above is 20 or more, the moldability of the resin composition may be improved, but disadvantageously, the mechanical strength or transparency may be reduced, or uniform mixing of the ethylene-based polymer (A) and the ethylene-based polymer (B) may be difficult, leading to deterioration of the outer appearance. Also, if the ratio is 1.0 or less, the improvement of moldability of the resin composition may not be sufficiently exerted, and this is not preferred. The ratio is preferably $10>[\lambda max(2.0)]_B/[\lambda max(2.0)]_A>1.1$, more preferably $5.0>[\lambda max(2.0)]_B/[\lambda max(2.0)]_A>1.5$, still more preferably $4.0>[\lambda max(2.0)]_B/[\lambda max(2.0)]_A>1.8$.

The effect of the elongational flow characteristics of the polyethylene on its moldability or mechanical properties of the molded product is as already described in general terms in the condition (A-4). As a result of intensive studies on a polyethylene-based resin composition with an attempt to improve the molding process bound up with the elongational flow characteristics of a polyethylene and overcome the problem in mechanical properties of a molded product by designing the long-chain branched structure as a main factor governing the elongational viscosity characteristics, it has been found that when an ethylene-based polymer (A) having a small amount of long-chain branched structure is used as a high MFR main component of the resin composition, that is, as a main component on the low molecular weight side and an ethylene-based polymer (B) having a large amount of long-chain branched structure represented by the degree of elongational strain hardening $[\lambda max(2.0)]_B$ defined in the condition (B-4) is used as a low MFR main component of the resin composition, that is, as a main component on the high molecular weight side, it has been found that as well as enhancement of the molding characteristics, the polyethylene resin composition is excellent in the mechanical properties, particularly stiffness and impact strength, and furthermore, excellent in the transparency. In addition, when the long-chain branched structure of the ethylene-based polymer (B) has characteristics represented by the following condition (B-5) where the strain rate dependency of the degree of elongational strain hardening is different from that used conventionally, it has been found that the improving effect is very excellent in all of molding characteristics, mechanical properties and transparency of the polyethylene-based resin composition.

2-5. Condition (B-5)

As regards the component (B) in the present invention, the ratio $[\lambda max(2.0)]_B/[\lambda max(0.1)]_B$ of $[\lambda max(2.0)]_B$ defined in the condition (B-4) and $[\lambda max(0.1)]_B$ measured similarly by setting the elongational strain rate to 0.1 (unit: 1/sec) is from 1.2 to 10.0, preferably from 1.3 to 5.0, more preferably from 1.4 to 4.0, still more preferably from 1.5 to 3.0.

If $[\lambda max(2.0)]_B/[\lambda max(0.1)]_B$ is less than 1.2, non-uniform molten state of the ethylene-based polymer, polyethylene-based resin composition or its molded product or thermally unstable structure may result or reduction in the impact strength or deterioration of the transparency may be caused due to strength anisotropy that is attributable to the presence of a significantly elongated long-chain branched structure, and this is not preferred. If $[\lambda\max(2.0)]_B/[\lambda\max(0.1)]_B$ exceeds 10.0, the melt tension and flowability during molding may be excellent, but the polyethylene-based resin composition or its molded product may be disadvantageously reduced in the impact strength or transparency.

2-6. Condition (B-6)

The component (B) in the present invention is a polymer produced by a polymerization reaction using a transition metal-containing catalyst, preferably a polymer produced by an ethylene polymerization reaction using a transition metal-containing catalyst described in detail later in 2-10. Production Method of Ethylene-Based Polymer (B) or in [V] Production Method of Ethylene-Based Polymer of the present invention, more preferably a polymer produced by a coordination anionic polymerization reaction of ethylene using a transition metal-containing catalyst.

At present, various radical polymerization initiators are well known as the ethylene polymerization catalyst not containing a transition metal, and specific examples thereof include a peroxide such as dialkyl peroxide compound, alkyl hydroperoxide compound, benzoyl peroxide and hydrogen peroxide, and an azo compound such as azobisisobutyronitrile and azobiscyclohexanecarbonitrile. An ethylene-based polymer produced by a radial polymerization reaction using such a radical polymerization initiator contains a large amount of long-chain branched structure and when used as a component of a polyethylene-based resin composition, the polymer may exert an effect of enhancing the molding characteristics or transparency, but the amount of long-chain branched structure becomes too large to disadvantageously reduce the strength of the composition or its molded product. In addition, realization of enough reducing of the MFR and the density of the ethylene-based polymer (B) or copolymerizing with a preferred α-olefin may be impossible and in turn, the strength of the composition or its molded product cannot be sufficiently increased, which is not preferred. Incidentally, even if the catalyst contains a transition metal, when the polymerization reaction proceeds substantially by radical polymerization as in a so-called redox system such as hydrogen peroxide/ferrous chloride or cerium salt/alcohol, the catalyst is not regarded as the transition metal-containing catalyst of the present invention.

2-7. Condition (B-7)

As regards the component (B) in the present invention, in addition to the conditions (B-1) to (B-6), furthermore, the branching index ($g_C'$) at a molecular weight of 1,000,000 as measured by a GPC measurement instrument with a differential refractometer, a viscosity detector and a light scattering detector is preferably from 0.30 to 0.70. The $g_C'$ value is more preferably from 0.30 to 0.59, still more preferably from 0.35 to 0.55, yet still more preferably from 0.35 to 0.50. If the $g_C'$ value exceeds 0.70, the moldability of the polyethylene-based resin composition may be insufficient, or the resin composition or its molded product may lack the transparency, and this is not preferred. If the $g_C'$ value is less than 0.30, the moldability of the polyethylene-based resin composition may be improved, but reduction of the impact strength of the molded product or deterioration of the transparency may disadvantageously result. Incidentally, in the present invention, the $g_C'$ value of the ethylene-based polymer or the $W_C$ value in the next paragraph is an evaluation technique for the amount of long-chain branch, using the molecular weight distribution curve or branching index (g') calculated from the GPC-VIS measurement described below.

2-8. Condition (B-8)

As regards the component (B) in the present invention, in addition to the conditions (B-1) to (B-7), furthermore, the content ($W_C$) of components having a molecular weight of 1,000,000 or more as measured by a GPC measurement instrument with a differential refractometer, a viscosity detector and a light scattering detector is preferably from 0.01 to 30.0%. The $W_C$ value is more preferably from 0.01 to 10.0%, still more preferably from 0.02 to 8.0%, yet still more preferably from 0.05 to 6.0%, and most preferably from 0.09 to 4.0%.

If the $W_C$ value is less than 0.01%, the polyethylene-based resin composition may be inferior in the moldability or the resin composition or its molded product may lack the transparency, and this is not preferred. If the $W_C$ value exceeds 30.0%, the polyethylene-based resin composition may be enhanced in the melt tension out of the moldability, but the melt flowability may be excessively reduced to disadvantageously cause a problem in the production or molding of the resin composition. Furthermore, the impact strength or the transparency of the molded product may be deteriorated, and this is not preferred.

[Branched Structure Analysis by GPC-VIS]

As the GPC instrument having a differential refractometer (RI) and a viscosity detector (Viscometer), Alliance GPC V2000 manufactured by Waters was used. Also, as the light scattering detector, a multi-angle laser light scattering photometer (MALLS), DAWN-E, manufactured by Wyatt Technology was used. The detectors were connected in order of MALLS, RI and Viscometer. The mobile phase solvent was 1,2,4-trichlorobenzene (Irganox 1076 as an antioxidant was added at a concentration of 0.5 mg/mL). The flow rate was 1 mL/min. Two columns of GMHHR-H(S) HT manufactured by Tosoh Corporation were connected and used. The temperature of each of detectors in the column and the sample injection part was 140° C. The sample concentration was set to 1 mg/mL. The injection amount (sample loop volume) was 0.2175 mL. In determining the absolute molecular weight (M) obtained from MALLS, the square radius of gyration ($R_g$) and the intrinsic viscosity ($[\eta]$) obtained from Viscometer, the data processing software ASTRA (version 4.73.04) attached to MALLS was utilized, and computation was performed by referring to the following literatures.

REFERENCE LITERATURE

1. *Developments in polymer characterization*, vol. 4. Essex: Applied Science; 1984. Chapter 1.
2. *Polymer*, 45, 6495-6505 (2004)
3. *Macromolecules*, 33, 2424-2436 (2000)
4. *Macromolecules*, 33, 6945-6952 (2000)

[Calculation of Branching Index ($g_C'$), etc.]

The branching index (g') is calculated as a ratio (ηbranch/ηlin) between the intrinsic viscosity (ηbranch) obtained by measuring the sample by Viscometer and the intrinsic viscosity (ηlin) obtained by separately measuring a linear polymer.

When a long-chain branch is introduced into a polymer molecule, the radius of gyration becomes small as compared with a molecule of a linear polymer having the same molecular weight, and when the radius of gyration becomes small, the intrinsic viscosity decreases. Therefore, along with introduction of a long-chain branch, the ratio (ηbranch/ηlin) of the intrinsic viscosity (ηbranch) of a branched polymer to the intrinsic viscosity (ηlin) of a linear polymer having the same molecular weight becomes small. Accordingly, it is meant that when the branching index (g'=ηbranch/ηlin) takes a value smaller than 1, a branch is introduced and as the value becomes smaller, the amount of long-chain branch introduced is increased. Particularly, in the present invention, the content percentage (%) of components having a molecular weight of 1,000,000 or more in terms of the absolute molecular weight obtained from MALLS to the amount of all components measured by RI is calculated as the content ($W_C$) of components having a molecular weight of 1,000,000 or more, and the above-described g' at a molecular weight of 1,000,000 in terms of the absolute molecular weight obtained from MALLS is calculated as $g_C'$.

Figure 4:
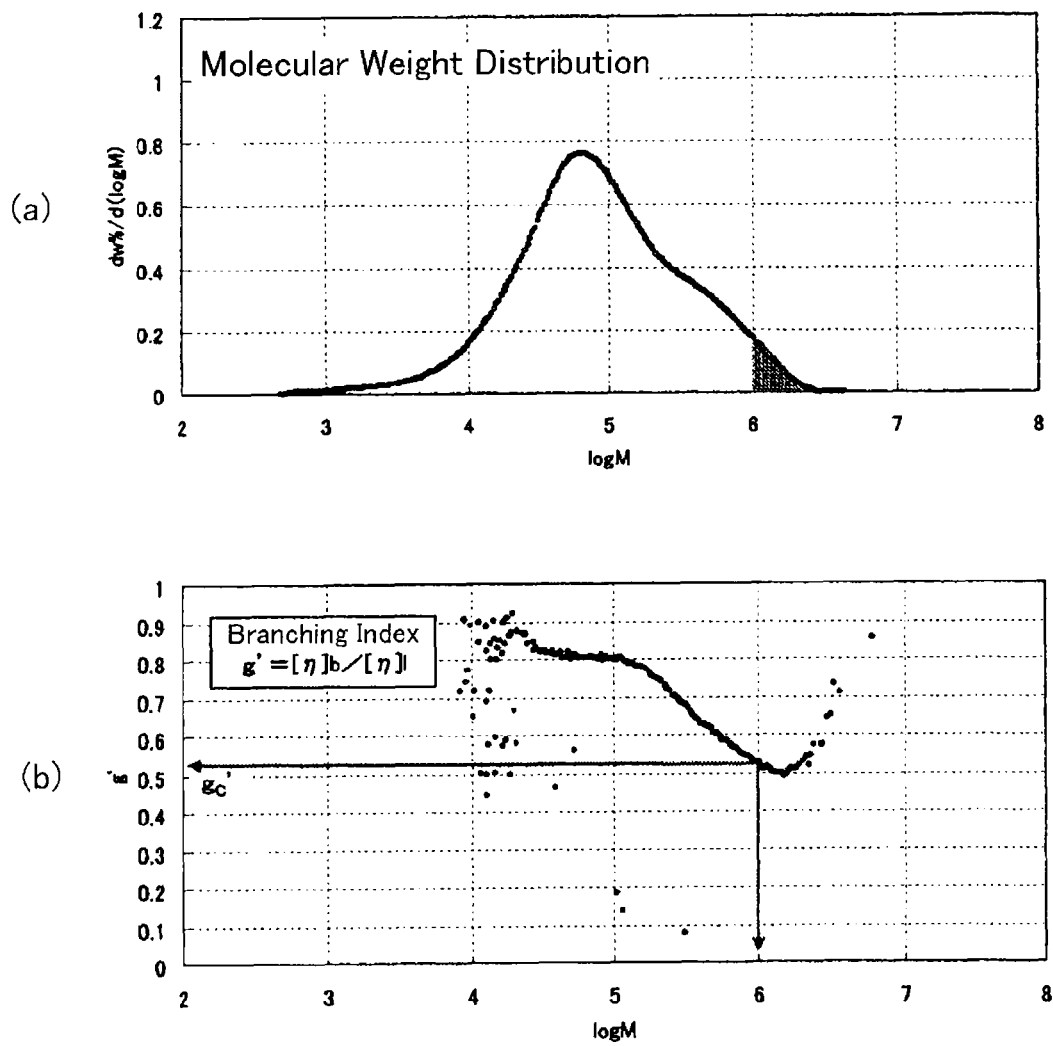
FIG. 4(a) is a molecular weight distribution curve calculated from the GPC-VIS measurement (branched structure analysis)
FIG. 4(b) is a graph showing the relationship between the branching index (g') and the molecular weight (M).

FIG. 4(a) and FIG. 4(b) shown an example of the analysis results by GPC-VIS above. FIG. 4(a) shows a molecular weight distribution curve measured based on the molecular weight (M) obtained from MALLS and the concentration obtained from RI, and FIG. 4(b) shows a branching index (g') at the molecular weight (M). Here, as the linear polymer, a linear polyethylene, Standard Reference Material 1475a (National Institute of Standards & Technology), was used.

2-9. Composition of Ethylene-Based Polymer (B)

As for the composition of the component (B) in the present invention, the description in 1-5. Composition of Ethylene-Based Polymer (A) above can apply as-is except for the ratio between ethylene and α-olefin, and with respect to the same portions, description is omitted.

The ethylene-based polymer (B) of the present invention is preferably a copolymer of ethylene and the α-olefin described above in 1-5. and most preferably a copolymer with hexene-1 and octene-1. The ratio of ethylene and the α-olefin in the ethylene-based polymer (B) of the present invention is from about 75 to 99.5 wt % of ethylene and from about 0.5 to 25 wt % of α-olefin, preferably from about 78 to 97 wt % of ethylene and from about 3 to 22 wt % of α-olefin, more preferably from about 80 to 96 wt % of ethylene and from about 4 to 20 wt % of α-olefin, still more preferably from about 82 to 95 wt % of ethylene and from about 5 to 18 wt % of α-olefin. When the ethylene content is in this range, the polyethylene-based resin composition or its molded product has good balance between stiffness and impact strength and is excellent also in the transparency. In the case of using the above-described dienes, the dienes must be of course used in the range where the long-chain branched structure satisfies the conditions (B-4) and (B-5).

2-10. Production Method of Ethylene-Based Polymer (B)

As for the production method of the ethylene-based polymer (B) in the present invention, the description in 1-6. Production Method of Ethylene-Based Polymer (A) above can apply as-is except that selection of an olefin polymerization catalyst appropriate to provide for a long-chain branched structure corresponding to the conditions (B-4) and (B-5) to the ethylene-based polymer (B) must be taken care of, and with respect to the same portions, description is omitted.

The transition metal-containing olefin polymerization catalyst suitable for the production of the ethylene-based polymer (B) in the present invention and satisfying the profitability at the industrial level is, similarly to the ethylene-based polymer(A), appropriately selected from the above-described (i) Ziegler catalyst, (ii) metallocene catalyst, (iii) Phillips catalyst and (iv) post-metallocene catalyst and used.

The catalyst used for the production of the ethylene-based polymer (B) in the present invention is more suitably (i) a Ziegler catalyst, (ii) a metallocene catalyst or (iv) a post-metallocene catalyst, still more suitably (i) a Ziegler catalyst or (ii) a metallocene catalyst. Among others, (ii) a metallocene catalyst produces an ethylene-based polymer having a narrow molecular weight distribution or a narrow copolymerization composition distribution as compared with other catalysts and therefore, is preferred from the standpoint of enhancing the mechanical properties, transparency, anti-sticking performance, heat seal performance and the like of the polyethylene-based resin composition or its molded product. Of course, in the case of selecting (iv) a post-metallocene catalyst capable of exerting the same performances from the standpoint above, use of the catalyst is preferred.

Out of the characteristics which the ethylene-based polymer (B) in the present invention must satisfy, the particularly important characteristics represented by the condition (B-4) and the condition (B-5), preferably the condition (B-4), the condition (B-5) and the condition (B-7), are considered to be attributable to a characteristic long-chain branched structure that is understood to contain a fairly large amount of a shortish branch structure sufficiently developed to an extent of enabling branches to intertwine with each other at a level where an elongational strain hardening behavior is observed.

In general, an ethylene-based polymer having a long-chain branch is an ethylene-based polymer having a long branching structure (long-chain branch) in the polyethylene molecule and is contrasted with an ethylene homopolymer or ethylene.α-olefin copolymer having a normal short-chain branch (sometimes referred to as straight chain polyethylene). For producing such an ethylene-based polymer having a long-chain branch, various methods have been heretofore attempted, and examples thereof include a method of directly copolymerizing ethylene and an α-olefin by using a recent Ziegler catalyst or metallocene catalyst, and a method of copolymerizing ethylene and a previously produced macromonomer to introduce a long-chain branch. Also, an ethylene-based polymer producing using a catalyst called a Phillips catalyst where the center metal is a hexavalent chromium element, is supposed to contain a small amount of a long-chain branched structure. As for the literature specifically describing the production of an ethylene-based polymer having a long-chain branched structure, the method using a recent Ziegler catalyst is described, for example, in JP-A-60-090203 and JP-10-298234. In these methods, the long-chain branched structure of the ethylene-based polymer can be adjusted by appropriately selecting the kind and amount of the organoaluminum compound, the kind of the catalyst or the polymerization conditions so as to control the quality and amount of the long-chain branch. As for the production using a metallocene-based catalyst, the method using a complex having a bridged biscyclopentadienyl ligand is described, for example, in JP-A-2002-544296 and JP-A-2005-507961; the method using a complex having an indenyl ligand is described, for example, in JP-A-2-276807, JP-A-2002-308933, JP-A-2004-292772, JP-A-8-311121, JP-A-8-311260 and JP-A-8-48711; the method using a catalyst obtained by combining a non-MAO-modified particle with a complex having a bridged bisindenyl ligand is described, for example, in JP-A-2004-292772; the method using a constrained geometry complex catalyst is described, for example, in JP-A-6-306121; and the method using a combination of a benzindenyl ligand-containing complex with another low-molecular-weight polyethylene-producing complex is described, for example, in JP-A-2006-2098.

In these methods, the quality and amount of the long-chain branch can be controlled by appropriately selecting the kind of the complex, the catalyst preparation conditions or the polymerization conditions. Also, a method of introducing a long-chain branch into a polyethylene chain by using dienes as a comonomer and copolymerizing it with ethylene is disclosed, for example, in JP-A-10-512600, and a method of introducing a long-chain branch into a polyethylene chain by utilizing a chain transfer reagent as T-reagent is disclosed, for example, in JP-T-2008-505222. In these methods, the quality and amount of the long-chain branch can be controlled by controlling the kind or amount of the dienes or chain transfer agent or appropriately selecting the kind of the catalyst or the polymerization conditions. Furthermore, a method where a macromonomer is previously produced by using a specific metallocene-based catalyst and then the macromonomer is copolymerized with ethylene, thereby introducing a long-chain branch into a polyethylene chain, is disclosed, for example, in JP-A-7-252311, JP-A-8-502303, International Publication No. 95-11931, JP-T-2001-511215 and JP-A-2006-321991. In these methods, the quality and amount of the long-chain branch can be controlled by appropriately selecting the kind of the complex, the catalyst preparation conditions, the polymerization conditions, or the amount or molecular weight of the macromonomer. The index indicative of such an ethylene-based polymer having a long-chain branch is generally expressed by various measurement techniques and the like, for example, by the melt flow rate ratio (MFR ratio; see, for example, Japanese Patent 2,571,280), the melt tension (MT; see, for example, Japanese Patent 3,425,719), the presence or absence of rising of elongational viscosity (strain hardening) (see, for example, Japanese Patent 4,190,638), and the activation energy (see, for example, JP-A-7-062031). The resin that is commercially available in practice includes, for example, trade name: AFFINITY (registered trademark) FM1570 (produced by Dow Chemical), and trade name: Excellen GMH (registered trademark) (produced by Sumitomo Chemical Co., Ltd.).

However, not all of ethylene-based polymers having a long-chain branched structure produce by these methods are suited for the ethylene-based polymer (B) as a constituent component of the polyethylene-based resin composition of the present invention. The present inventors have found that selection of the specific ethylene-based polymer (B) leads to greatly different results in the molding characteristics, mechanical strength and transparency of the polyethylene-based composition or a molded product of the composition, and in addition to the selection of a long-chain branched structure suitable for the present invention, only when an ethylene-based polymer (B) of which MFR, density and molecular weight distribution conditions are suitably designed as described above is used as a constituent component of the polyethylene-based composition, the present invention has been accomplished.

The ethylene-based polymer having a long-chain branched structure, which can be produced by the conventional technique, includes, as described above, a polymer produced using a Ziegler catalyst, a polymer produced using a complex having a bridged biscyclopentadienyl ligand, a polymer produced using a bridged bisindenyl ligand, a polymer produced using a catalyst obtained by combining a bridged bisindenyl ligand-containing complex with a non-MAO-modified particle, a polymer produced using a constrained geometry complex catalyst, a polymer produced using a combination of a benzindenyl ligand-containing complex with another low-molecular-weight polyethylene-producing complex, a polymer in which a long-chain branch is introduced into a polyethylene chain by using dienes as a comonomer and copolymerizing it with ethylene, a polymer in which a long-chain branch is introduced into a polyethylene chain by utilizing a chain transfer reagent as T-reagent, and a polymer produced by a method where a macromonomer is previously produced by using a specific metallocene-based catalyst and then the macromonomer is copolymerized with ethylene, thereby introducing a long-chain branch into a polyethylene chain.

However, when the ethylene-based copolymer produced using a Ziegler catalyst is used as the ethylene-based polymer (B) in the present invention, the molecular weight distribution or copolymerization composition distribution may be broadened to make the polyethylene-based resin composition or its molded product be insufficient in the impact strength or transparency, or the polymer may be heavily sticky due to a large amount of low crystalline components, and therefore, this is not preferred. In addition, with the catalyst above, only a small amount of an elongated long-chain branched structure can be produced, failing in sufficiently enhancing the impact strength or transparency. When an ethylene-based copolymer produced using a bridged biscyclopentadienyl ligand-containing complex or a bridged bisindenyl ligand-containing complex is used, the molecular weight distribution tends to be broadened, making the polyethylene-based resin composition or its molded product be insufficient in the impact strength or transparency, or the chain length of the long-chain branch tends to become long, failing in sufficiently enhancing the impact resistance or transparency. When an ethylene-based copolymer produced using a catalyst obtained by combining a bridged bisindenyl ligand-containing complex with a non-MAO-modified particle is used, the molecular weight distribution tends to be more broadened than in the case of using an MAO promoter and in turn, the polyethylene-based resin composition or its molded product may be insufficient in the impact strength or transparency. For example, Excellen GMH that is a commercial product produced using the catalyst above in practice has a wide molecular weight distribution and an elongated long-chain branch and lacks in the number of branches, as a result, the effect of improving the moldability may be low or the impact strength or transparency may not be sufficiently enhanced. When an ethylene-based copolymer produced using a constrained geometry complex catalyst is used, for example, AFFINITY (for example, FM1570) that is a commercial product produced using the catalyst above in practice has a long chain length of the long-chain branch and lacks in the number of branches, as a result, the effect of improving the moldability may be low or the impact strength or transparency may not be sufficiently enhanced. As the case now stands, none of these methods are preferred as the production method of the ethylene-based polymer (B) in the present invention.

The ethylene-based copolymer produced using a combination of a benzindenyl ligand-containing complex with another low-molecular-weight polyethylene-producing complex is thought to have some possibility of realizing a long-chain branched structure required of the ethylene-based polymer (B) in the present invention, but for the production of a long-chain branched structure, the polymerization conditions may be limited to a low hydrogen concentration, the catalyst conditions such as proportion of a complex used or the polymerization conditions must be further studied so as to avoid broadening of the molecular weight, or studies on the setting of MFR or density of the ethylene-based polymer (B) or the ethylene-based polymer (A) combined are required. Furthermore, in order to realize a long-chain branched structure appropriate as the ethylene-based polymer (B) in the present invention by the method of copolymerizing dienes or the method utilizing a chain transfer reagent, the kind of the dienes, chain transfer agent or polymerization catalyst used or the polymerization conditions must be further studied. In addition, it is considered that problems such as contamination (odor, coloring, deterioration) of the polymer by the residual diene or residual chain transfer agent must be solved. Also, in order to realize a long-chain branched structure appropriate as the ethylene-based polymer (B) in the present invention by the method of producing a macromonomer and copolymerizing it with ethylene to thereby introduce a long-chain branch into the polyethylene chain, for example, the kind of the polymerization catalyst used, the polymerization conditions, and the control of molecular weight, density and copolymerization ratio of the produced macromer must be further studied and in addition, since a residual macromer remains as a low-molecular-weight polymer in the polymer or in the polyethylene-based resin composition containing the polymer as one component, the molecular weight distribution or the copolymerization composition distribution tends to be broadened, leaving high possibility that the impact strength or transparency of the polyethylene-based resin composition or its molded product becomes insufficient, which reveals that the polymer is not preferred enough. For these reasons, the ethylene-based polymer (B) tends to have a longish chain length of the long-chain branch and in turn, the impact strength and transparency may not be sufficiently enhanced. Also, it is considered that problems such as contamination (odor, coloring, deterioration) of the polymer must be solved.

That is, as a result of intensive studies to attain the object of the present invention, with respect to the olefin polymerization catalyst capable of producing a long-chain branched structure suitable as the ethylene-based polymer (B) of the present invention, the present inventors have reached, as an example, a method where a complex having a bridged (cyclopentadienyl)(indenyl) ligand or the like that has been discovered recently is used as an essential catalyst component (for example, JP-A-2011-137146 and [V] Production Method of Ethylene-Based Polymer of the Present Invention in this description); as another example, a method where a complex having a benzindenyl ligand or the like is used as a catalyst component (for example, JP-A-2006-2098); and, as still another example, a method where a catalyst using a mixture of a metallocene complex, i.e., a complex having a bridged bis(indenyl) ligand, a bridged bis(azulenyl) ligand or a bridged bis(cyclopentadienyl) ligand, and a borane or borate compound as a compound for producing a cationic metallocene compound together with an organoaluminum oxy compound, is used.

The olefin polymerization catalyst containing, as an essential component, a complex having a bridged (cyclopentadienyl)(indenyl) ligand or the like capable of producing a long-chain branched structure suitable as the ethylene-based polymer (B) of the present invention contains the following component (a-1) and component (b) and, if desired, further contains the component (c):

component (a-1): a metallocene compound represented by formula (a-1-1), component (b): a compound capable of reacting with the metallocene compound of the component (a-1) to produce a cationic metallocene compound, and component (c): a microparticle support.

i) Component (a-1)

The component (a-1) is a metallocene compound represented by the following formula (a-1-1):

[Chem. 7]

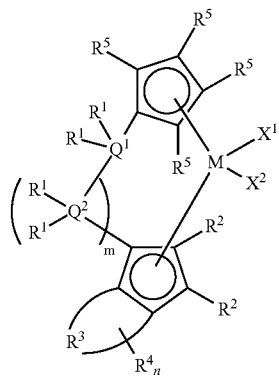

(a-1-1)

[in formula (a-1-1), M represents any one transition metal of Ti, Zr and Hf; each of $X^1$ and $X^2$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^1$ and $Q^2$ independently represents a carbon atom, a silicon atom or a germanium atom; each $R^1$ independently represents a hydrogen atom or a hydrocarbon group having a carbon number of 1 to 10 and at least two members out of four $R^1$ may combine to form a ring together with $Q^1$ and $Q^2$; m is 0 or 1 and when m is 0, $Q^1$ is bonded directly to the conjugated 5-membered ring including $R^2$ and $R^3$; each $R^2$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20 and even when the plurality of $R^2$ are a hydrocarbon group or the like, unlike $R^4$, these $R^2$ do not form a ring together with the carbon atoms to which $R^2$ are bonded; $R^3$ represents a saturated or unsaturated divalent hydrocarbon group having a carbon number of 4 or 5 for forming a condensed ring with the 5-membered ring to which $R^3$ is bonded; $R^4$ is an atom or a group bonded to a carbon atom of $R^3$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, or a hydrocarbon group-substituted silyl group having a carbon number of 1 to 20; n represents an integer of 0 to 10 and when n is 2 or more, at least two $R^4$ may form a ring together with the carbon atoms to which $R^4$ are bonded; and each $R^5$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen atom-containing hydrocarbon group having a carbon number of 1 to 20, a hydrocarbon group containing an oxygen atom and having a carbon number of 1 to 20, or a hydrocarbon group-substituted silyl group having a carbon number of 1 to 20 and even when the plurality of $R^5$ are a hydrocarbon group or the like, unlike $R^4$, these $R^5$ do not form a ring together with the carbon atoms to which $R^5$ are bonded].

In formula (a-1-1), M of the metallocene compound represents Ti, Zr or Hf. M is preferably Zr or Hf and from the standpoint that the polymerization activity is high, M is more preferably Zr. In the present invention, this preference order of center metal species applies in all descriptions of metallocene complexes below.

Each of $X^1$ and $X^2$ independently includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a methoxymethyl group, an ethoxymethyl group, an n-propoxymethyl group, an i-propoxymethyl group, an n-butoxymethyl group, an i-butoxymethyl group, a tert-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, an ethoxy group, an n-propoxy group, an i-propoxy group, an n-butoxy group, an i-butoxy group, a tert-butoxy group, a phenoxy group, a dimethylamino group, a diethylamino group, a di-n-propylamino group, a di-i-propylamino group, a di-n-butylamino group, a di-i-butylamino group, a di-tert-butylamino group, and a diphenylamino group.

Specific preferred examples of $X^1$ and $X^2$ include a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Among these specific examples, a chlorine atom, a methyl group and a dimethylamino group are more preferred.

Each of $Q^1$ and $Q^2$ independently represents a carbon atom, a silicon atom or a germanium atom and is preferably a carbon atom or a silicon atom.

Each $R^1$ independently includes, for example, a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, and a phenyl group. In the case where $R^1$ forms a ring together with $Q^1$ and $Q^2$, examples include a cyclobutylidene group, a cyclopentylidene group, a cyclohexylidene group, a silacyclobutyl group, a silacyclopentyl group, and a silacyclohexyl group.

When $Q^1$ or/and $Q^2$ are a carbon atom, specific preferred examples of $R^1$ include a hydrogen atom, a methyl group, an ethyl group, a phenyl group and a cyclobutylidene group, and when $Q^1$ or/and $Q^2$ are a silicon atom, specific preferred examples include a methyl group, an ethyl group, a phenyl group and a silacyclobutyl group.

Each $R^2$ independently includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group.

Out of two $R^2$, at least one is preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, because the polymerization activity becomes high in particular. Also, $R^2$ on the 2-position is preferably a hydrogen atom, because the characteristics of the long-chain branched structure are particularly improved and in turn, the moldability is excellent.

Specific preferred examples of $R^2$, each independently, include a hydrogen atom, a methyl group, an ethyl group, an n-propyl group, an i-propyl group, an n-butyl group, a tert-butyl group, an n-pentyl group, an n-hexyl group, a cyclohexyl group, a phenyl group, a 2-methylfuryl group, and a trimethylsilyl group.

Among these specific examples, a hydrogen atom, a methyl group, an n-butyl group, a tert-butyl group, a phenyl group and a trimethylsilyl group are more preferred, and a hydrogen atom, a methyl group and a phenyl group are still more preferred.

Specific examples of the condensed cyclopentadienyl structure formed by $R^3$ and a cyclopentadienyl moiety to which $R^3$ is bonded, include the following partial structures (I) to (VI).

Among these specific examples, (I), (III) and (VI) are preferred. Also, $R^4$ may be substituted on these partial structures (I) to (VI).

[Chem. 8]

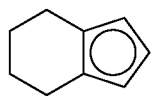
(I)

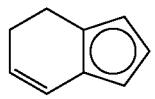
(II)

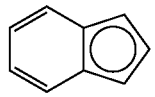
(III)

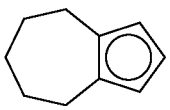
(IV)

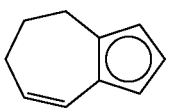
(V)

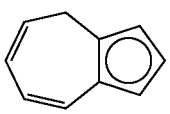
(VI)

The substituent $R^4$ includes, in addition to a hydrogen atom, for example, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 4-tert-butylphenyl group, a 3,5-dimethylphenyl group, a 3,5-di-tert-butylphenyl group, a naphthyl group, an anthracenyl group, a bis(trimethylsilyl) methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 2,6-dichloro-4-trimethylsilylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group.

In the case where two or more $R^4$ form a ring together with the carbon atoms to which $R^4$ are bonded, examples include a benz[e]indenyl group, a benz[f]indenyl group, a 6,7-dihydroindacenyl group, a 5,5,7,7-tetramethyl-6,7-dihydroindacenyl group, a 5,6,7,8-tetrahydro-benz[f]indenyl group, and a 5,6,7,8-tetrahydro-5,5,8,8-tetramethyl-benz[f]indenyl group.

Specific preferred examples of $R^4$ include a methyl group, an ethyl group, an n-propyl group, an i-propyl group, an n-butyl group, a tert-butyl group, an n-pentyl group, an n-hexyl group, a cyclohexyl group, a phenyl group, a naphthyl group, and a trimethylsilyl group.

Each $R^5$ independently includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group.

Out of four $R^5$, at least one is preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, because the polymerization activity is particularly increased. Also, $R^5$ on the 2-position and 5-position are preferably a hydrogen atom, because the characteristics of the long-chain branched structure are particularly improved and in turn, the moldability is excellent.

Specific preferred examples of $R^5$ include a hydrogen atom, a methyl group, an ethyl group, an n-propyl group, an i-propyl group, an n-butyl group, a tert-butyl group, an n-pentyl group, an n-hexyl group, a cyclohexyl group, a phenyl group, a 2-methylfuryl group, and a trimethylsilyl group.

Among these specific examples, a hydrogen atom, a methyl group, an n-butyl group, a tert-butyl group, a phenyl group and a trimethylsilyl group are more preferred, and a hydrogen atom, a methyl group, a tert-butyl group and a phenyl group are still more preferred.

In formula (a-1-1), m is 0 or 1 and when m is 0, $Q^1$ is bonded directly to the conjugated 5-membered ring including $R^2$ and $R^3$. Furthermore, n represents an integer of 0 to 10 and when n is 2 or more, at least two $R^4$ may form a ring together with the carbon atoms to which $R^4$ are bonded.

The metallocene compound of the component (a-1) is preferably a compound represented by the following formula (a-1-2), more preferably a compound represented by the following formula (a-1-3):

[Chem. 9]

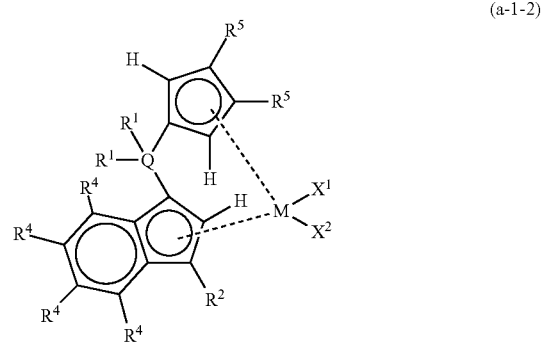

(a-1-2)

-continued

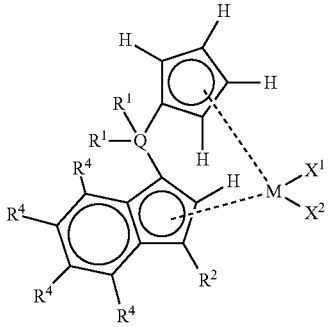

(a-1-3)

In the metallocene compounds represented by formulae (a-1-2) and (a-1-3), for $X^1$, $X^2$, Q, $R^1$, $R^2$, $R^4$ and $R^5$, the same structures as the atoms and groups described in the metallocene compound represented by formula (a-1-1) may be selected.

Specific examples of the metallocene compound of the component (a-1) are shown in Tables a-1 to a-4 below, but the present invention is not limited thereto. In Tables a-1 to a-4, Cp stands for a cyclopentadienyl group, Ind stands for an indenyl group, Me stands for a methyl group, Ph stands for a phenyl group, Et stands for an ethyl group, nPr stands for an n-propyl group, nBu stands for an n-butyl group, nC5 stands for an n-pentyl group, nC6 stands for an n-hexyl group, Bz stands for a benzyl group, and Azu stands or an azulenyl group.

TABLE a-1

(i) Bridged Cp(Ind)Zr Type

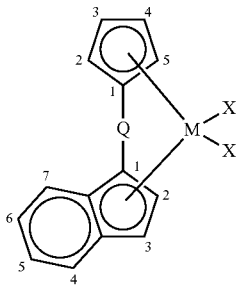

| No. | Q | Cp Substituent | Ind Substituent | X |
|---|---|---|---|---|
| 1a | Me2Si | — | — | Cl |
| 2a | Me2Si | — | — | Me |
| 3a | Me2Si | — | — | Ph |
| 4a | Me2C | — | — | Cl |
| 5a | silacyclobutyl | — | — | Cl |
| 6a | silacyclopentyl | — | — | Cl |
| 7a | silacyclohexyl | — | — | Cl |
| 8a | cyclobutylidene | — | — | Cl |
| 9a | cyclopentylidene | — | — | Cl |
| 10a | cyclohexylidene | — | — | Cl |

TABLE a-2

(ii) Bridged Cp(3-substituted Ind)Zr Type

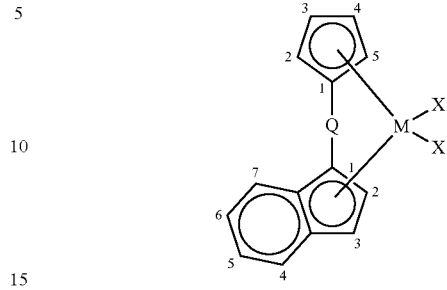

| No. | Q | Cp Substituent | Ind Substituent | X |
|---|---|---|---|---|
| 11a | Me2Si | — | 3-Me | Cl |
| 12a | Me2Si | — | 3-Me | Me |
| 13a | Me2C | — | 3-Me | Cl |
| 14a | Me2Si | — | 3-Et | Cl |
| 15a | Me2C | — | 3-Et | Cl |
| 16a | Me2Si | — | 3-nPr | Cl |
| 17a | Me2C | — | 3-nPr | Cl |
| 18a | Me2Si | — | 3-iPr | Cl |
| 19a | Me2C | — | 3-iPr | Cl |
| 20a | Me2Si | — | 3-nBu | Cl |
| 21a | Me2C | — | 3-nBu | Cl |
| 22a | Me2Si | — | 3-tBu | Cl |
| 23a | cyclobutylidene | — | 3-tBu | Cl |
| 24a | Me2Si | — | 3-tBu | Me |
| 25a | Me2C | — | 3-tBu | Cl |
| 26a | Me2Si | — | 3-nC5 | Cl |
| 27a | Me2Si | — | 3-nC6 | Cl |
| 28a | Me2Si | — | 3-cycC6 | Cl |
| 29a | Me2Si | — | 3-Ph | Cl |
| 30a | Me2Si | — | 3-Bz | Cl |
| 31a | Me2Si | — | 3-tolyl | Cl |
| 32a | Me2Si | — | 3-TMS | Cl |
| 33a | Me2Si | — | 3-ClPh | Cl |
| 34a | Me2Si | — | 3-FPh | Cl |
| 35a | Me2Si | — | 4-Me | Cl |
| 36a | Me2Si | — | 5-Me | Cl |
| 37a | Me2Si | — | 6-Me | Cl |
| 38a | Me2Si | — | 3,4-Me2 | Cl |
| 39a | Me2Si | — | 3-tBu-4-Me | Cl |
| 40a | Me2Si | — | 4-Ph | Cl |

TABLE a-3

(ii) Bridged Cp (3-Substituted Ind)Zr Type (continued)

| No. | Q | Cp Substituent | Ind Substituent | X |
|---|---|---|---|---|
| 41a | Me2Ge | — | — | Cl |
| 42a | Me2Ge | — | 3-Me | Cl |
| 43a | Me2Ge | — | 3-Et | Cl |
| 44a | Me2Ge | — | 3-iPr | Cl |
| 45a | Me2Ge | — | 3-nBu | Cl |
| 46a | Me2Ge | — | 3-tBu | Cl |
| 47a | Et2Si | — | — | Cl |
| 48a | Et2Si | — | 3-Me | Cl |
| 49a | Et2Si | — | 3-Et | Cl |
| 50a | Et2Si | — | 3-iPr | Cl |
| 51a | Et2Si | — | 3-nBu | Cl |
| 52a | Et2Si | — | 3-tBu | Cl |
| 53a | nBu2Si | — | — | Cl |
| 54a | nBu2Si | — | 3-Me | Cl |
| 55a | nBu2Si | — | 3-Et | Cl |
| 56a | nBu2Si | — | 3-iPr | Cl |
| 57a | nBu2Si | — | 3-nBu | Cl |
| 58a | nBu2Si | — | 3-tBu | Cl |
| 59a | Ph2Si | — | — | Cl |
| 60a | Ph2C | — | — | Cl |

TABLE a-3-continued (ii) Bridged Cp (3-Substituted Ind)Zr Type (continued)

| No. | Q | Cp Substituent | Ind Substituent | X |
|---|---|---|---|---|
| 61a | Ph2Si | — | 3-Me | Cl |
| 62a | Ph2Si | — | 3-Et | Cl |
| 63a | Ph2Si | — | 3-iPr | Cl |
| 64a | Ph2Si | — | 3-nBu | Cl |
| 65a | Ph2Si | — | 3-tBu | Cl |
| 66a | Me2Si | — | benz[e] | Cl |
| 67a | Me2Si | — | dibenzo | Cl |
| 68a | Me2Si | — | azulenyl | Cl |
| 69a | Me2Si | — | 4-Me-Azu | Cl |
| 70a | Me2Si | — | 4-Ph-Azu | Cl |
| 71a | Me2Si | — | 5,6-Me2 | Cl |
| 72a | Me2Si | — | benz[f] | Cl |
| 73a | Me2Si | — | 6,7-dihydroindacenyl | Cl |
| 74a | Me2Si | — | 5,5,7,7-Me4-6,7-dihydroindacenyl | Cl |
| 75a | Me2Si | — | 5,6,7,8-H4-benz[f] | Cl |
| 76a | Me2Si | — | 5,6,7,8-H4-5,5,8,8-Me4-benz[f] | Cl |

TABLE a-4

(iv) Bridged(4-Substituted Cp)(3-Substituted Ind)Zr Type

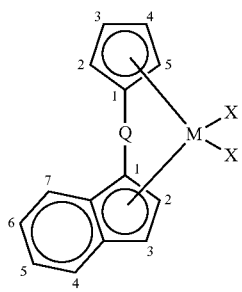

| No. | Q | Cp Substituent | Ind Substituent | X |
|---|---|---|---|---|
| 77a | Me2Si | 4-tBu | 3-Me | Cl |
| 78a | Me2Si | 4-tBu | 3-tBu | Cl |
| 79a | Me2Si | 4-tBu | 3-tBu | Me |
| 80a | Me2Si | 4-tBu | 2-Me | Cl |
| 81a | Me2Si | 4-tBu | 2-Me-4Ph | Cl |
| 82a | Me2C | 2-Me | 3-tBu | Cl |
| 83a | Me2Si | 4-tBu | — | Cl |
| 84a | Me2Si | 2,3-Me2 | 3-tBu | Cl |
| 85a | Me2Si | 2,3,4-Me3 | — | Cl |
| 86a | Me2Si | 2,3,4,5-Me4 | — | Cl |
| 87a | Me2Si | 4-tBu | — | Me |
| 88a | Me2Si | 4-tBu | 4,5,6,7-H4 | Cl |
| 89a | Me2Si | 4-tBu | Azu | Cl |
| 90a | Me2Si | 4-tBu | 2-(2-Me-Furyl) | Cl |
| 91a | Me2Si | 2-(2-Me-Furyl) | 3-Me | Cl |
| 92a | Me2Si | 4-TMS | — | Cl |
| 93a | Me2Si | 4-(2-Br—Et) | — | Cl |

The metallocene compound also includes, for example, compounds where zirconium of the compounds above is replaced by titanium or hafnium.

Furthermore, in using these metallocene compounds as the component (a-1), two or more thereof may be also used.

Among specific compounds exemplified above, preferred metallocene compounds as the component (a-1) include the followings.

That is, preferred examples include dimethylsilylene-(cyclopentadienyl)(indenyl)zirconium dichloride, dimethylsilylene(cyclopentadienyl)(indenyl)zirconium dimethyl, isopropylidene(cyclopentadienyl)(indenyl)zirconium dichloride, dimethylsilylene(cyclopentadienyl)(3-methylindenyl)zirconium dichloride, dimethylsilylene(cyclopentadienyl)(3-methylindenyl)zirconium dimethyl, isopropylidene(cyclopentadienyl)(3-methylindenyl)zirconium dichloride, dimethylsilylene(cyclopentadienyl)(3-n-butylindenyl)zirconium dichloride, dimethylsilylene(cyclopentadienyl)(3-phenylindenyl)zirconium dichloride, isopropylidene(cyclopentadienyl)(3-n-butylindenyl)zirconium dichloride, dimethylsilylene(cyclopentadienyl)(3-tert-butylindenyl)zirconium dichloride, dimethylsilylene(cyclopentadienyl)(3-tert-butylindenyl)zirconium dimethyl, dimethylsilylene(cyclopentadienyl)(4-phenylindenyl)zirconium dichloride, dimethylsilylene(cyclopentadienyl)(benz[e]indenyl)zirconium dichloride, isopropylidene(cyclopentadienyl)(3-tert-butylindenyl)zirconium dichloride, cyclobutylidene(cyclopentadienyl)(3-tert-butylindenyl)zirconium dichloride, dimethylgermirene(cyclopentadienyl)(indenyl)zirconium dichloride, diphenylsilylene-(cyclopentadienyl)(indenyl)zirconium dichloride, diphenylmethylene(cyclopentadienyl)(indenyl)zirconium dichloride, dimethylsilylene(cyclopentadienyl)(azulenyl)zirconium dichloride, dimethylsilylene(4-tert-butylcyclopentadienyl)(3-methylindenyl)zirconium dichloride, dimethylsilylene(4-tert-butylcyclopentadienyl)(3-tert-butylindenyl)zirconium dichloride, dimethylsilylene(4-tert-butylcyclopentadienyl)(3-tert-butylindenyl)zirconium dimethyl, dimethylsilylene(4-tert-butylcyclopentadienyl)(4-phenylindenyl)zirconium dichloride, dimethylsilylene(4-tert-butylcyclopentadienyl)(indenyl)zirconium dichloride, dimethylsilylene(4-tert-butylcyclopentadienyl)(indenyl)zirconium dimethyl, dimethylsilylene(4-tert-butylcyclopentadienyl)(4,5,6,7-tetrahydroindenyl)zirconium dichloride, dimethylsilylene(4-tert-butylcyclopentadienyl)(azulenyl)zirconium dichloride, and compounds where zirconium of the compounds above is replaced by titanium or hafnium.

Among specific examples exemplified above, more preferred examples of the metallocene compound as the component (a-1) include the followings:
dimethylsilylene(cyclopentadienyl)(indenyl)zirconium dichloride, isopropylidene(cyclopentadienyl)(indenyl)zirconium dichloride, dimethylsilylene(cyclopentadienyl)(3-methylindenyl)zirconium dichloride, dimethylsilylene(cyclopentadienyl)(3-phenylindenyl)zirconium dichloride, dimethylsilylene(cyclopentadienyl)(4-phenylindenyl)zirconium dichloride, dimethylsilylene(cyclopentadienyl)(benz[e]indenyl)zirconium dichloride, isopropylidene(cyclopentadienyl)(3-methylindenyl)zirconium dichloride, dimethylsilylene(cyclopentadienyl)(3-tert-butylindenyl)zirconium dichloride, isopropylidene(cyclopentadienyl)(3-tert-butylindenyl)zirconium dichloride, dimethylgremirene(cyclopentadienyl)(indenyl)zirconium dichloride, cyclobutylidene(cyclopentadienyl)(3-tert-butylindenyl)zirconium dichloride, dimethylsilylene(cyclopentadienyl)(indenyl)hafnium dichloride, dimethylsilylene(cyclopentadienyl)(3-methylindenyl)hafnium dichloride, dimethylsilylene(cyclopentadienyl)(3-tert-butylindenyl)hafnium dichloride, dimethylsilylene(4-tert-butylcyclopentadienyl)(indenyl)zirconium dichloride, dimethylsilylene(4-tert-butylcyclopentadienyl)(indenyl)zirconium dichloride, and dimethylsilylene (4-tert-butylcyclopentadienyl)(indenyl)zirconium dimethyl.

ii) Component (b)

The olefin polymerization catalyst recited as an example of the olefin polymerization catalyst containing, as an essential component, a complex having a bridged (cyclopentadienyl)(indenyl) ligand or the like capable of producing a long-chain branched structure suitable as the ethylene-based polymer (B) of the present invention contains, in addition to the component (a-1), a compound capable of reacting with the metallocene compound of the component (a-1) (component (a-1); hereinafter, sometimes simply referred to as "a") to produce a cationic metallocene compound (component (b); hereinafter, sometimes simply referred to as "b").

One of the compound (b) capable of reacting with the metallocene compound (a) to produce a cationic metallocene compound is an organoaluminum oxy compound.

The organoaluminum oxy compound has an Al—O—Al bond in the molecule, and the number of bonds is usually from 1 to 100, preferably from 1 to 50. Such an organoaluminum oxy compound is a product obtained usually by reacting an organoaluminum compound and water.

Incidentally, out of the organoaluminum oxy compounds, the compound obtained by reacting an alkyl aluminum and water is usually called an aluminoxane, and methylaluminoxane (encompasses those substantially composed of methylaluminoxane (MAO)) is particularly suitable as the organoaluminum oxy compound.

Other specific examples of the compound (b) capable of reacting with the metallocene compound (a) to form a cationic metallocene compound include a borane compound and a borate compound.

Specific examples of the borane compound include triphenylborane, tri(o-tolyl)borane, tri(p-tolyl)borane, tri(m-tolyl)borane, tri(o-fluorophenyl)borane, tris(p-fluorophenyl)borane, tris(m-fluorophenyl)borane, tris(2,5-difluorophenyl)borane, tris(3,5-difluorophenyl)borane, tris(4-trifluoromethylphenyl)borane, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl), tris(perfluoroanthryl)borane, and tris(perfluorobinaphthyl)borane.

Also, the borate compound is specifically, as a first example, a compound represented by the following formula (b-1):

$[L^1\text{-}H]^+[BR^6R^7X^4X^5]^-$          formula (b-1)

In formula (b-1), $L^1$ is a neutral Lewis base, H is a hydrogen atom, and $[L^1\text{-}H]$ is a Broensted acid such as ammonium, anilinium and phosphonium.

Examples of the ammonium include a trialkyl-substituted ammonium such as trimethylammonium, triethylammonium, tripropylammonium, tributylammonium and tri(n-butyl)ammonium, and a dialkylammonium such as di(n-propyl)ammonium and dicyclohexylammonium.

Examples of the anilinium include an N,N-dialkyl anilinium such as N,N-dimethylanilinium, N,N-diethylanilinium and N,N-2,4,6-pentamethylanilinium.

Furthermore, the phosphonium includes a triarylphosphonium and a trialkylarylphosphonium, such as triphenylphosphonium, tributylphosphonium, tri(methylphenyl)phosphonium and tri(dimethylphenyl)phosphonium.

In formula (b-1), $R^6$ and $R^7$ are, each independently, the same or different aromatic or substituted aromatic hydrocarbon group having a carbon number of 6 to 20, preferably from 6 to 16, and may be connected to each other by a bridging group. The substituent of the substituted aromatic hydrocarbon group is preferably an alkyl group typified, for example, by a methyl group, an ethyl group, a propyl group and an isopropyl group, or a halogen atom such as fluorine, chlorine, bromine and iodine.

Each of $X^4$ and $X^5$ is independently a hydride group, a halide group, a hydrocarbon group having from 1 to 20 carbon atoms, or a substituted hydrocarbon group having from 1 to 20 carbon atoms, in which one or more hydrogen atoms are substituted for by a halogen atom.

Specific examples of the compound represented by formula (b-1) include tributylammoniumtetra(pentafluorophenyl)borate, tributylammoniumtetra(2,6-ditrifluoromethylphenyl)borate, tributylammoniumtetra(3,5-ditrifluoromethylphenyl)borate, tributylammoniumtetra(2,6-difluorophenyl)borate, tributylammoniumtetra(perfluoronaphthyl)borate, dimethylaniliniumtetra(pentafluorophenyl)borate, dimethylaniliniumtetra(2,6-ditrifluoromethylphenyl)borate, dimethylaniliniumtetra(3,5-ditrifluoromethylphenyl)borate, dimethylaniliniumtetra(2,6-difluorophenyl)borate, dimethylaniliniumtetra(perfluoronaphthyl)borate, triphenylphosphoniumtetra(pentafluorophenyl)borate, triphenylphosphoniumtetra(2,6-ditrifluoromethylphenyl)borate, triphenylphosphoniumtetra(3,5-ditrifluoromethylphenyl)borate, triphenylphosphoniumtetra(2,6-difluorophenyl)borate, triphenylphosphoniumtetra(perfluoronaphthyl)borate, trimethylammoniumtetra(2,6-ditrifluoromethylphenyl)borate, triethylammoniumtetra(pentafluorophenyl)borate, triethylammoniumtetra(2,6-ditrifluoromethylphenyl)borate, triethylammoniumtetra(perfluoronaphthyl)borate, tripropylammoniumtetra(pentafluorophenyl)borate, tripropylammoniumtetra(2,6-ditrifluoromethylphenyl)borate, tripropylammoniumtetra(perfluoronaphthyl)borate, di(1-propyl)ammoniumtetra(pentafluorophenyl)borate, and dicyclohexylammoniumtetraphenylborate.

Among these, preferred are tributylammoniumtetra(pentafluorophenyl)borate, tributylammoniumtetra(2,6-ditrifluoromethylphenyl)borate, tributylammoniumtetra(3,5-ditrifluoromethylphenyl)borate, tributylammoniumtetra(perfluoronaphthyl)borate, dimethylaniliniumtetra(pentafluorophenyl)borate, dimethylanilinumtetra(2,6-ditrifluoromethylphenyl)borate, dimethylaniliniumtetra(3,5-ditrifluoromethylphenyl)borate and dimethylaniliniumtetra(perfluoronaphthyl)borate.

A second example of the borate compound is represented by the following formula (b-2):

$[L^2]^+[BR^6R^7X^4X^5]^-$          formula (b-2)

In formula (b-2), $L^2$ includes, for example, a carbo-cation, a methyl cation, an ethyl cation, a propyl cation, an isopropyl cation, a butyl cation, an isobutyl cation, a tert-butyl cation, a pentyl cation, a tropinium cation, a benzyl cation, a trityl cation, a sodium cation, and a proton.

$R^6$, $R^7$, $X^4$ and $X^s$ have the same definitions as those in formula (b-1).

Specific examples of the compound above include trityltetraphenylborate, trityltetra(o-tolyl)borate, trityltetra(p-tolyl)borate, trityltetra(m-tolyl)borate, trityltetra(o-fluorophenyl)borate, trityltetra(p-fluorophenyl)borate, trityltetra(m-fluorophenyl)borate, trityltetra(3,5-difluorophenyl)borate, trityltetra(pentafluorophenyl)borate, trityltetra(2,6-ditrifluoromethylphenyl)borate, trityltetra(3,5-ditrifluoromethylphenyl)borate, trityltetra(perfluoronaphthyl)borate, tropiniumtetraphenylborate, tropiniumtetra(o-tolyl)borate, tropiniumtetra(p-tolyl)borate, tropiniumtetra(m-tolyl)borate, tropiniumtetra(o-fluorophenyl)borate, tropiniumtetra(p-fluorophenyl)borate, tropiniumtetra(m-fluorophenyl)borate, tropiniumtetra(3,5-difluorophenyl)borate, tropiniumtetra(pentafluorophenyl)borate, tropiniumtetra(2,6-ditrifluoromethylphenyl)borate, tropiniumtetra(3,5-ditrifluoromethylphenyl)borate, tropiniumtetra(perfluoronaphthyl)borate, $NaBPh_4$, $NaB(o\text{-}CH_3\text{-}Ph)_4$, $NaB(p\text{-}CH_3\text{-}Ph)_4$, $NaB(m\text{-}CH_3\text{-}Ph)_4$, $NaB(o\text{-}F\text{-}Ph)_4$, $NaB(p\text{-}F\text{-}Ph)_4$, $NaB(m\text{-}F\text{-}Ph)_4$, $NaB(3,5\text{-}F_2\text{-}Ph)_4$, $NaB(C_6F_5)_4$, $NaB(2,6\text{-}(CF_3)_2\text{-}Ph)_4$, $NaB(3,5\text{-}(CF_3)_2\text{-}Ph)_4$, $NaB(C_{10}F_7)_4$, $H^+BPh_4$·2-diethyl ether, $H^+B(3,5\text{-}F_2\text{-}Ph)_4$·2-diethyl ether, $H^+B(C_6F_5)_4^-$·2-diethyl ether, $H^+B(2,6\text{-}(CF_3)_2\text{-}Ph)_4$·2-diethyl ether, $H^+B(3,5\text{-}(CF_3)_2\text{-}Ph)_4$·2-diethyl ether, and $H^+B(C_{10}H_7)_4$·2-diethyl ether.

Among these, preferred are trityltetra(pentafluorophenyl)borate, trityltetra(2,6-ditrifluoromethylphenyl)borate, trityltetra(3,5-ditrifluoromethylphenyl)borate, trityltetra(perfluoronaphthyl)borate, tropiniumtetra(pentafluorophenyl) borate, tropiniumtetra(2,6-ditrifluoromethylphenyl)borate, tropiniumtetra(3,5-ditrifluoromethylphenyl)borate, tropiniumtetra(perfluoronaphthyl)borate, NaB($C_6F_5$)$_4$, NaB(2,6-($CF_3$)$_2$-Ph)$_4$, NaB(3,5-($CF_3$)$_2$-Ph)$_4$, NaB($C_{10}F_7$)$_4$, $H^+$B($C_6F_5$)$_4^-$.2-diethyl ether, $H^+$B(2,6-($CF_3$)$_2$-Ph)$_4$.2-diethyl ether, $H^+$B(3,5-($CF_3$)$_2$-Ph)$_4$.2-diethyl ether and $H^+$B($C_{10}H_7$)$_4$.2-diethyl ether.

Among these, more preferred are tritryltetra(pentafluorophenyl)borate, tritryltetra(2,6-ditrifluoromethylphenyl)borate, tropiniumtetra(pentafluorophenyl)borate, tropiniumtetra(2,6-ditrifluoromethylphenyl)borate, NaB($C_6F_5$)$_4$, NaB(2,6-($CF_3$)$_2$-Ph)$_4$, $H^+$B($C_6F_5$)$_4^-$.2-diethyl ether, $H^+$B(2,6-($CF_3$)$_2$-Ph)$_4$.2-diethyl ether, $H^+$B(3,5-($CF_3$)$_2$-Ph)$_4$.2-diethyl ether and $H^+$B($C_{10}H_7$)$_4$.2-diethyl ether.

When a borane compound or a borate compound is used as the catalyst component (b), the polymerization activity or copolymerizability increases and therefore, productivity of an ethylene-based polymer having a long-chain branch is enhanced.

Other specific examples of the compound (b) capable of reacting with a metallocene compound (a) to produce a cationic metallocene compound include a clay mineral, a layered silicate compound, and a chemically treated solid oxide.

In addition, a mixture of the above-described organoaluminum oxy compound and the above-described borane compound or borate compound may be also used as the component (b), and in order to more enhance the long-chain branched structure required of the ethylene-based polymer (B) in the present invention, it is preferred to use the borane compound or borate compound in combination with the organoaluminum oxy compound. Furthermore, as for the borane compound or borate compound, two or more compounds may be mixed and used.

iii) Component (c)

The olefin polymerization catalyst recited as an example of the olefin polymerization catalyst containing, as an essential component, a complex having a bridged (cyclopentadienyl)(indenyl) ligand or the like capable of producing a long-chain branched structure suitable as the ethylene-based polymer (B) of the present invention preferably contains a microparticle support (component (c); hereinafter, sometimes simply referred to as "c").

The microparticle support as the component (c) includes an inorganic support, a particulate polymer support, and a mixture thereof. As the inorganic support, a metal, a metallic oxide, a metallic chloride, a metallic carbonate, a carbonaceous substance, or a mixture thereof can be used.

Preferred examples of the metal that can be used for the inorganic support include iron, aluminum, and nickel.

The metallic oxide includes a single oxide or a composite oxide of elements belonging to Groups 1 to 14 of the periodic table, and examples thereof include various natural or synthetic, single or composite oxides such as $SiO_2$, $Al_2O_3$, MgO, CaO, $B_2O_3$, $TiO_2$, $ZrO_2$, $Fe_2O_3$, $Al_2O_3$.MgO, $Al_2O_3$.CaO, $Al_2O_3$.$SiO_2$, $Al_2O_3$.MgO.CaO, $Al_2O_3$.MgO.$SiO_2$, $Al_2O_3$.CuO, $Al_2O_3$.$Fe_2O_3$, $Al_2O_3$.NiO and $SiO_2$.MgO.

Incidentally, these formulae are not a molecular formula but indicate only a composition, and the structure and component ratio of the composite oxide for use in the present invention are not particularly limited.

Also, the metallic oxide for use in the present invention may have absorbed a small amount of water or may contain a small amount of impurities.

As the metallic chloride, for example, a chloride of an alkali metal or an alkaline earth metal is preferred, and specifically, $MgCl_2$, $CaCl_2$ and the like are suited in particular.

As the metallic carbonate, a carbonate of an alkali metal or an alkaline earth metal is preferred, and specific examples thereof include magnesium carbonate, calcium carbonate, and barium carbonate.

The carbonaceous substance includes, for example, carbon black and activated carbon.

All of these inorganic supports can be suitably used in the present invention, but among others, use of a metallic oxide, silica, alumina or the like is preferred.

A specific example of the olefin polymerization catalyst containing, as an essential component, a benzindenyl ligand or the like capable of producing a long-chain branched structure suitable as the ethylene-based polymer (B) of the present invention is an olefin polymerization catalyst comprising the following component (a-2), the component (b), and the preferred component (c).

iv) Component (a-2)

The component (a-2) is a metallocene compound having one or more, preferably two or more, more preferably three, benzindenyl ligands are represented by the following formula (a-2-1):

[Chem. 10]

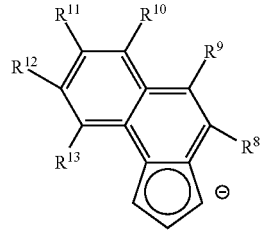

(a-2-1)

Here, each of the substituents $R^8$ to $R^{13}$ is independently a hydrocarbon group having a carbon number of 1 to 30, or a trialkyl silicon group having a hydrocarbon substituent with a carbon number of 1 to 30. Specific examples of the hydrocarbon group include an alkyl group such as methyl group, ethyl group, propyl group, butyl group, pentyl group, hexyl group and cyclohexyl group; an alkenyl group such as vinyl group and allyl group; an aryl group such as phenyl group, dimethylphenyl group, diethylphenyl group, dipropylphenyl group, dibutylphenyl group, trimethylphenyl group, triethylphenyl group, tripropylphenyl group, tributylphenyl group, biphenyl group, naphthyl group and anthryl group; an arylalkyl group such as trityl group, phenethyl group, benzhydryl group, phenylpropyl group, phenylbutyl group and neophyl group; and an arylalkenyl group such as styryl group. These groups may have a branch. Also, out of the substituents $R^8$ to $R^{13}$, adjacent two substituents may form a ring together with the carbon atoms to which the substituents are bonded. In addition, when the component (a-2) has three cyclopentadienyl skeleton-containing ligands including the benzindenyl ligand, a metallocene complex where two or more members of those ligands are bridged, for example, by the same ethylene bridging group or dimethylsilylene groups as the bridging group composed of $Q^1$, $Q^2$ and $R^1$ defined in formula (a-1-1), such as hydrocarbon group, silylene group and substituted silylene group, is also effective. Incidentally, the center transition metal and the group (auxiliary ligand) except for a cyclopentadienyl skeleton-containing ligand bonded to the center transition metal are the same as those of M, $X^1$ and $X^2$ defined in formula (a-1-1), such as hydrocarbon group, alkoxyl group, halogen atom and hydrogen atom.

Specific examples of the component (a-2) where, for example, the center transition metal is Zr, are shown in Tables a-5 and a-6 below. In Tables a-5 and a-6, Cp stands for a cyclopentadienyl group, Ind stands for an indenyl group, Bzind stands for a benzindenyl group, Dbi stands for a dibenzindenyl group, Me stands for a methyl group, and Bu stands for a butyl group.

TABLE a-5

| | ABCDZr | | | |
|---|---|---|---|---|
| No. | A | B | C | D |
| 95a | BzInd | BzInd | Cl | Cl |
| 96a | BzInd | BzInd | Br | Br |
| 97a | BzInd | BzInd | Me | Me |
| 98a | Dbi | Dbi | Cl | Cl |
| 99a | Dbi | Dbi | Br | Br |
| 100a | Dbi | Dbi | Me | Me |
| 101a | BzInd | BzInd | BzInd | H |
| 102a | Dbi | Dbi | Dbi | H |
| 103a | BzInd | BzInd | Cp | H |
| 104a | BzInd | BzInd | 1,3-Me2-Cp | H |
| 105a | BzInd | BzInd | 1-Bu-3-Me-Cp | H |
| 106a | BzInd | BzInd | Ind | H |
| 107a | BzInd | Ind | Ind | H |
| 108a | Dbi | Dbi | Cp | H |
| 109a | Dbi | Cp | Cp | H |
| 110a | Dbi | Dbi | Ind | H |
| 111a | Dbi | Ind | Ind | H |
| 112a | BzInd | BzInd | Dbi | H |
| 113a | BzInd | Dbi | Dbi | H |
| 114a | BzInd | Dbi | Cp | H |
| 115a | BzInd | Dbi | Ind | H |

TABLE a-6

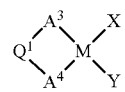

| No. | A1 | A2 | A3 | A4 | A5 |
|---|---|---|---|---|---|
| 116a | Et | Ind | Ind | BzInd | H |
| 117a | Et | Ind | Ind | Dbi | H |
| 118a | Me2Si | Cp | Cp | BzInd | H |
| 119a | Me2Si | Cp | Cp | DBi | H |
| 120a | Me2Si | Cp | Ind | Dbi | H |
| 121a | Et | BzInd | BzInd | Cp | H |
| 122a | Et | BzInd | BzInd | Ind | H |

Specific preferred examples of the component (a-2) are Bzind$_3$ZrH, Dbi$_3$ZrH, Bzind$_2$ CpZrH, Bzind$_2$(1,3-Me$_2$Cp) ZrH, Bzind$_2$(1-Bu-3-MeCp)ZrH, Bzind$_2$IndZrH, BzindInd$_2$ZrH, Dbi$_2$ CpZrH, DbiCp$_2$ZrH, Dbi$_2$IndZrH, DbiInd$_2$ZrH, Bzind$_2$ DbiZrH, BzindDbi$_2$ZrH, Bzind-DbiCpZrH, BzindDbiIndZrH, Et(Ind)$_2$BzindZrH, Et(Ind)$_2$DbiZrH, Me$_2$SiCp$_2$BzindZrH, Me$_2$SiCp$_2$ DbiZrH, Me$_2$Si (Cp)(Ind)DbiZrH, Et(Bzind)$_2$ CpZrH and Et(Bzind)$_2$IndZrH, and more preferred specific examples are Bzind$_3$ZrH, Dbi$_3$ZrH, Bzind$_2$ CpZrH, Bzind$_2$(1,3-Me$_2$Cp)ZrH, Bzind$_2$ (1-Bu-3-MeCp)ZrH, Bzind$_2$IndZrH, BzindInd$_2$ZrH, Dbi$_2$ CpZrH, DbiCp$_2$ZrH, Dbi$_2$IndZrH, DbiInd$_2$ZrH, Bzind$_2$ Dbi-ZrH, BzindDbi$_2$ZrH, BzindDbiCpZrH and BzindDbi-IndZrH.

As described above, together with the component (a-2), the organoaluminum oxy compound above or the like is used as the component (b), and also in this case, the borane compound or borate compound is preferably used in combination with the organoaluminum oxy compound so as to more enhance the characteristics of the long-chain branched structure required of the ethylene-based polymer (B) in the present invention. Similarly, it is also preferred to contain the component (c) in addition to the component (a-2) and the component (b).

A specific example of the olefin polymerization catalyst containing, as an essential component, a mixture of a complex having a bridged bis(indenyl), bridged bis(azulenyl) or bridged bis(cyclopentadienyl) ligand capable of producing a long-chain branched structure as the ethylene-based polymer (B) of the present invention and a borane or borate compound as a compound for producing a cationic metallocene compound together with an organoaluminum oxy compound is an olefin polymerization catalyst comprising the following component (a-3), a mixture of an organoaluminum oxy compound and a borane or borate compound described in the component (b), and the preferred component (c).

Here, the complex having a bridged bis(indenyl) ligand, a bridged bis(azulenyl) ligand or a bridged bis(cyclopentadienyl) ligand (referred to as components (a-3-1), (a-3-2) and (a-3-3), respectively) indicates a complex having a basic skeleton where same or different two cyclopentadienyl rings or same or different two indenyl rings as represented by formula [2] in the classification of metallocene compounds described above in the paragraph of 1-6. (ii) Metallocene Catalyst are bridged by a bridging group $Q^1$. The substituent which can be substituted on the cyclopentadienyl ring, indenyl ring, azulenyl ring or bridging group $Q^1$ has a high degree of freedom as long as it does not inhibit the basic skeleton structure, and a metallocene complex or the like having a heteroatom-containing monocyclic or polycyclic heteroaromatic group as a substituent on a ligand of a conjugated 5-membered ring structure described, for example, in JP-T-2002-535339 may be also suitably used.

[Chem. 11]

$$Q^1 \diagdown \begin{matrix} A^3 \\ A^4 \end{matrix} \diagup M \diagdown \begin{matrix} X \\ Y \end{matrix}$$ [2]

[wherein each of $A^3$ and $A^4$ represents a ligand having a conjugated 5-membered ring structure ($A^3$ and $A^4$ may be the same or different in the same compound), $Q^1$ represents a bonding group for bridging two conjugated 5-membered ring ligands at arbitrary positions, M represents a metal atom selected from Group 4 of the periodic table, and each of X and Y independently represents a hydrogen atom, a halogen atom, a hydrocarbon group, an alkoxy group, an amino group, a phosphorus-containing hydrocarbon group or a silicon-containing hydrocarbon group, which is bonded to M].

As specific examples of the complex having a bridged bis(indenyl) ligand of the component (a-3-1), when the center transition is Zr:

(I) out of the compounds represented by formula [2], compounds where the bonding group Q has, for example, a structure recited below, are shown in Tables a-7 to a-9. In Tables a-7 to a-9, Ind stands for an indenyl group, and TMS stands for a trimethylsilyl group.

(I-1) When $Q^1$ is an alkylene group, the complex includes, for example, the compounds shown in Table a-7 below.

TABLE a-7

| | $Q^1$ = alkylene group | | | | |
|---|---|---|---|---|---|
| No. | Q1 | A3 | A4 | X | Y |
| 123a | CH2 | Ind | Ind | Cl | Cl |
| 124a | Et | Ind | Ind | Cl | Cl |
| 125a | Et | Ind | Ind | Cl | H |
| 126a | Et | Ind | Ind | Cl | Me |
| 127a | Et | Ind | Ind | Cl | OMe |
| 128a | Et | Ind | Ind | OEt | OEt |
| 129a | Et | Ind | Ind | Me | Me |
| 130a | Et | H4Ind | H4Ind | Cl | Cl |
| 131a | Et | 2-Me-Ind | 2-Me-Ind | Cl | Cl |
| 132a | Et | 2-Et-Ind | 2-Et-Ind | Cl | Cl |

TABLE a-7-continued

Q¹ = alkylene group

| No. | Q1 | A3 | A4 | X | Y |
|---|---|---|---|---|---|
| 133a | Et | 2,4-Me2-Ind | 2,4-Me2-Ind | Cl | Cl |
| 134a | Et | 4-Ind | 4-Ind | Cl | Cl |
| 135a | Et | 2-(2-(5-MeFuryl))Ind | 2-(2-(5-MeFuryl))Ind | Cl | Cl |
| 136a | Et | 2-(2-(5-MeFuryl))-4-Ph-Ind | 2-(2-(5-MeFuryl))-4-Ph-Ind | Cl | Cl |
| 137a | Et | 4-(2,7-Me2-Ind) | 4-(2,7-Me2-Ind) | Cl | Cl |
| 138a | Et | 2-(2-(5-tBuFuryl)-4-Ph-Ind) | 2-(2-(5-tBuFuryl)-4-Ph-Ind) | Cl | Cl |
| 139a | Et | 2-(2-(5-tBuFuryl)-4-Ph-Ind) | Ind | Cl | Cl |
| 140a | Et | 4-Ph-Ind | 4-Ph-Ind | Cl | Cl |
| 141a | Me2C | Ind | Ind | Cl | Cl |
| 142a | Et | Ind | Ind | Cl | H |

(I-2) When Q¹ is a silylene group, the complex includes, for example, the compounds shown in Table a-8 below. In Table a-8, Ind stands for an indenyl group, BenInd stands for a benzindenyl group, PhInd stands for a phenylindenyl group, and TMSPh stands for a trimethylsilylphenyl group.

TABLE 8 a-8
Q¹ = silylene group

| No. | Q1 | A3 | A4 | X | Y |
|---|---|---|---|---|---|
| 143a | Me2Si | Ind | Ind | Cl | Cl |
| 144a | Me2Si | 4,5,6,7-H4Ind | 4,5,6,7-H4Ind | Cl | Cl |
| 145a | Me2Si | 2-Me-Ind | 2-Me-Ind | Cl | Cl |
| 146a | Me2Si | 2,4-Me2-Ind | 2,4-Me2-Ind | Cl | Cl |
| 147a | Me2Si | 2-Me-4,5,6,7-H4Ind | 2-Me-4,5,6,7-H4Ind | Cl | Cl |
| 148a | Me2Si | 2-Me-4,5-BenInd | 2-Me-4,5-BenInd | Cl | Cl |
| 149a | Me2Si | 2-Me-4-Ph-Ind | 2-Me-4-Ph-Ind | Cl | Cl |
| 150a | Me2Si | 2-Me-4,4-Me2-4,5,6,7-H4-4-silaindenyl | 2-Me-4,4-Me2-4,5,6,7-H4-4-silaindenyl | Cl | Cl |
| 151a | Me2Si | 4-(2-Ph-Ind) | 4-(2-Ph-Ind) | Cl | Cl |
| 152a | Me2Si | 4-(2-tBuInd) | 4-(2-tBuInd) | Cl | Cl |
| 153a | Me2Si | 4-(2-Ph-3-MeInd) | 4-(2-Ph-3-MeInd) | Cl | Cl |
| 154a | PhMeSi | Ind | Ind | Cl | Cl |
| 155a | PhMeSi | 4,5,6,7-H4Ind | 4,5,6,7-H4Ind | Cl | Cl |
| 156a | Ph2Si | Ind | Ind | Cl | Cl |
| 157a | tetramethyl-disilylene | Ind | Ind | Cl | Cl |
| 158a | Me2Si | 2-(2-(5-MeFuryl))-4-PhInd | 2-(2-(5-MeFuryl))-4-PhInd | Cl | Cl |
| 159a | Me2Si | 2-(2-(5-TMSFuryl))-4-PhInd | 2-(2-(5-TMSFuryl))-4-PhInd | Cl | Cl |
| 160a | Me2Si | 2-(2-(5-PhFuryl)-4-PhInd) | 2-(2-(5-PhFuryl)-4-PhInd) | Cl | Cl |
| 161a | Me2Si | 2-(2-(5-Methienyl))-4-PhInd | 2-(2-(5-Methienyl))-4-PhInd | Cl | Cl |
| 162a | Me2Si | 2-(2-(4,5-Me2Furyl))-4-PhInd | 2-(2-(4,5-Me2Furyl))-4-PhInd | Cl | Cl |
| 163a | Me2Si | 2-(2-BenFuryl)-4-PhInd | 2-(2-BenFuryl)-4-PhInd | Cl | Cl |
| 164a | Me2Si | 2-(2-BenThienyl)-4-(4-TMSPh)-Ind | 2-(2-BenThienyl)-4-(4-TMSPh)-Ind | Cl | Cl |
| 165a | Me2Si | 2-(2-(5-TMSFuryl))-4-(2-Naph)-Ind | 2-(2-(5-TMSFuryl))-4-(2-Naph)-Ind | Cl | Cl |
| 166a | PhMeSi | 2-(2-(5-MeFuryl))-4-PhInd | 2-(2-(5-MeFuryl))-4-PhInd | Cl | Cl |
| 167a | Me2Si | 2-(2-(5-MeFuryl))-4-PhInd | 2-(2-(5-MeFuryl))-4-(4-tBuPh)-Ind | Cl | Cl |
| 168a | Me2Si | 2-(2-(5-MeFuryl))-4-PhInd | 2-(2-(5-MeFuryl))-4-(4-TMSPh)-Ind | Cl | Cl |
| 169a | Me2Si | 2-(2-(5-MeFuryl))-4-(4-tBuPh)-Ind | 2-(2-(5-MeFuryl))-4-(4-TMSPh)-Ind | Cl | Cl |

(I-3) When Q¹ is a hydrocarbon group containing germanium, phosphorus, nitrogen, boron or aluminum, the complex includes, for example, the compounds shown in Table a-9 below. In Table a-9, Ind stands for an indenyl group, PhInd stands for a phenylindenyl group, and TMSPh stands for a trimethylsilylphenyl group.

TABLE a-9

| No. | Q1 | A3 | A4 | X | Y |
|---|---|---|---|---|---|
| 170a | Me2Ge | Ind | Ind | Cl | Cl |
| 171a | MeAl | Ind | Ind | Cl | Cl |
| 172a | PhAl | Ind | Ind | Cl | Cl |
| 173a | PhP | Ind | Ind | Cl | Cl |
| 174a | EtB | Ind | Ind | Cl | Cl |
| 175a | PhN | Ind | Ind | Cl | Cl |
| 176a | Me2Ge | 2-(2-(5-MeFuryl))-4-PhInd | 2-(2-(5-MeFuryl))-4-PhInd | Cl | Cl |
| 177a | MeB | 2-(2-(5-MeFuryl))-4-(4-TMSPh)-Ind | 2-(2-(5-MeFuryl))-4-(4-TMSPh)-Ind | Cl | Cl |

As specific examples of the complex having a bridged bis(azulenyl) ligand of the component (a-3-2), when the center transition is Zr:

(II) out of the compounds represented by formula [2], compounds where the bonding group Q¹ has, for example, a structure recited below, are shown in Tables a-10 to a-12.

(II-1) When Q¹ is an alkylene group, the complex includes, for example, the compounds shown in Table a-10 below. In Tables a-10 to a-12, tBuPh stands for tributylphenyl group, TMSPh stands for a trimethylsilylphenyl group, NaPh stands for a naphthyl group, BiPh stands for a biphenyl group, Azu stands for an azulenyl group, and ClPh stands for a chlorophenyl group.

TABLE a-10

Q$^1$ = alkylene group

| No. | Q1 | A3 | A4 | X | Y |
|---|---|---|---|---|---|
| 178a | CH2 | 2-Et-4-(3-Cl-4-tBuPh)-4-HAzu | 2-Et-4-(3-Cl-4-tBuPh)-4-HAzu | Cl | Cl |
| 179a | Et | 2-Me-4-(3-Me-4-tBuPh)-4-HAzu | 2-Me-4-(3-Me-4-tBuPh)-4-HAzu | Cl | Cl |
| 180a | Et | 2-Me-4-(3-Cl-4-TMSPh)-4-HAzu | 2-Me-4-(3-Cl-4-TMSPh)-4-HAzu | Cl | H |
| 181a | Et | 2-Me-4-(2-Naph)-4-HAzu | 2-Me-4-(2-Naph)-4-HAzu | Cl | Me |
| 182a | Et | 2-Me-4-(2-F-4-BiPh)-4-HAzu | 2-Me-4-(2-F-4-BiPh)-4-HAzu | Cl | OMe |
| 183a | Et | 2-Me-4-(2-Cl-4-BiPh)-4-HAzu | 2-Me-4-(2-Cl-4-BiPh)-4-HAzu | OEt | OEt |
| 184a | Et | 2-Me-4-(9-phenanthryl)-4-HAzu | 2-Me-4-(9-phenanthryl)-4-HAzu | Me | Me |

(II-2) When Q$^1$ is a silylene group, the complex includes, for example, the compounds shown in Table a-11 below.

TABLE a-11

Q$^1$ = silylene group

| No. | Q1 | A3 | A4 | X | Y |
|---|---|---|---|---|---|
| 185a | Me2Si | 2-Me-4-Ph-4-HAzu | 2-Me-4-Ph-4-HAzu | Cl | Cl |
| 186a | Me2Si | 2-Me-4-(4-ClPh)-4-HAzu | 2-Me-4-(4-ClPh)-4-HAzu | Cl | Cl |
| 187a | Me2Si | 2-Me-4-(4-tBuPh)-4-HAzu | 2-Me-4-(4-tBuPh)-4-HAzu | Cl | Cl |
| 188a | Me2Si | 2-Me-4-(4-TMSPh)-4-HAzu | 2-Me-4-(4-TMSPh)-4-HAzu | Cl | Cl |
| 189a | Me2Si | 2-Me-4-(3-Cl-4-tBuPh)-4-HAzu | 2-Me-4-(3-Cl-4-tBuPh)-4-HAzu | Cl | Cl |
| 190a | Me2Si | 2-Me-4-(3-Me-4-TMSPh)-4-HAzu | 2-Me-4-(3-Me-4-TMSPh)-4-HAzu | Cl | Cl |
| 191a | Me2Si | 2-Me-4-(1-Naph)-4-HAzu | 2-Me-4-(1-Naph)-4-HAzu | Cl | Cl |
| 192a | Me2Si | 2-Et-4-(4-ClPh)-4-HAzu | 2-Et-4-(4-ClPh)-4-HAzu | Cl | Cl |
| 193a | Me2Si | 2-Me-4-(4-Cl-2-Naph)-4-HAzu | 2-Me-4-(4-Cl-2-Naph)-4-HAzu | Cl | Cl |
| 194a | Me2Si | 2-nPr-4-(3-Cl-4-TMSPh)-4-HAzu | 2-nPr-4-(3-Cl-4-TMSPh)-4-HAzu | Cl | Cl |

(II-3) When Q$^1$ is a hydrocarbon group containing germanium, phosphorus, nitrogen, boron or aluminum, the complex includes, for example, the compounds shown in Table a-12 below.

TABLE a-12

| No. | Q1 | A3 | A4 | X | Y |
|---|---|---|---|---|---|
| 195a | Me2Ge | 2-Me-4-(2-F-4-BiPh)-4-HAzu | 2-Me-4-(2-F-4-BiPh)-4-HAzu | Cl | Cl |
| 196a | PhAl | 2-Me-4-(2-F-4-BiPh)-4-HAzu | 2-Me-4-(2-F-4-BiPh)-4-HAzu | Cl | Cl |
| 197a | Me2Ge | 2-Me-4-(4-tBuPh)-4-HAzu | 2-Me-4-(4-tBuPh)-4-HAzu | Cl | Cl |

As specific examples of the complex having a bridged bis(cyclopentadienyl) ligand of the component (a-3-3), when the center transition is Zr:

(III) out of the compounds represented by formula [2], compounds where the bonding group Q$^1$ has, for example, a structure recited below, are shown in Tables a-13 to a-16. In Tables a-13 to a-16, Cp stands for a cyclopentadienyl group, TMS stands for trimethylsilyl, and Flu stands for fluorenyl.

(III-1) When Q$^1$ is an alkylene group, the complex includes, for example, the compounds shown in Table a-13 below.

TABLE a-13

Q$^1$ = alkylene group

| No. | Q1 | A3 | A4 | X | Y |
|---|---|---|---|---|---|
| 198a | Et | 2,4-Me2Cp | 3',5'-MeCp | Cl | Cl |
| 199a | Et | 2-Me-4-tBuCp | 3'-tBu-5'-MeCp | Cl | Cl |
| 200a | Et | 2,3,5-Me3Cp | 2',4',5'-Me3Cp | Cl | Cl |
| 201a | Me2C | 2,4-Me2Cp | 3',5'-Me2Cp | Cl | Cl |
| 202a | CH2 | Cp | 3,4-Me2Cp | Cl | Cl |
| 203a | CH2 | Cp | 3,4-Me2Cp | Cl | H |
| 204a | CH2 | Cp | 3,4-Me2Cp | Me | Me |
| 205a | CH2 | Cp | 3,4-Me2Cp | Ph | Ph |
| 206a | CH2 | Cp | TMSCp | Cl | Cl |
| 207a | CH2 | Cp | Me4Cp | Cl | Cl |
| 208a | Me2C | Cp | 3,4-Me2Cp | Cl | Cl |
| 209a | Me2C | Cp | Me4Cp | Cl | Cl |
| 210a | Me2C | Cp | Flu | Cl | Cl |
| 211a | Me2C | 2-MeCp | Flu | Cl | Cl |
| 212a | Me2C | 3-tBuCp | Flu | Cl | Cl |
| 213a | Me2C | 2,5-Me2Cp | 3',4'-Me2Cp | Cl | Cl |
| 214a | Me2C | 2,5-Me2Cp | Flu | Cl | Cl |
| 215a | Et | Cp | 3,5-Me2Cp | Cl | Cl |
| 216a | Et | Cp | Flu | Cl | Cl |
| 217a | Et | 2,5-Me2Cp | Flu | Cl | Cl |
| 218a | Et | 2,5-Et2Cp | Flu | Cl | Cl |
| 219a | Ph2C | Cp | 3,4-Et2Cp | Cl | Cl |
| 220a | cyclohexylidene | Cp | Flu | Cl | Cl |
| 221a | cyclohexylidene | 2,5-Me2Cp | 3',4'-Me2Cp | Cl | Cl |
| 222a | Et | 2-(2-(5-MeFuryl))Cp | 2-(2-(5-MeFuryl))Cp | Cl | Cl |
| 223a | Et | 2-(2-(5-MeFuryl))-4-PhCp | 2-(2-(5-MeFuryl))-4-PhCp | Cl | Cl |

TABLE a-13-continued

| | | $Q^1$ = alkylene group | | | |
|---|---|---|---|---|---|
| No. | Q1 | A3 | A4 | X | Y |
| 224a | Et | 2-(2-(5-tBuFuryl))Cp | 2-(2-(5-tBuFuryl))Cp | Cl | Cl |
| 225a | Et | 2-(2-(5-tBuFuryl))-4-PhCp | Cp | Cl | Cl |

(III-2) When $Q^1$ is a silylene group, the complex includes, for example, the compounds shown in Tables a-14 and a-15 below.

TABLE a-14

| | | $Q^1$ = silylene group | | | |
|---|---|---|---|---|---|
| No. | Q | A3 | A4 | X | Y |
| 227a | Me2Si | 2,4-Me2Cp | 3',5'-MeCp | Cl | Cl |
| 228a | PhMeSi | 2,4-Me2Cp | 3',5'-MeCp | Cl | Cl |
| 229a | PhMeSi | 2,3,5-Me3Cp | 2',4',5'-Me3Cp | Cl | Cl |
| 230a | PhMeSi | Me4Cp | Me4Cp | Cl | Cl |
| 231a | tetramethyl-disilylene | Cp | Cp | Cl | Cl |
| 232a | Me2Si | Cp | 3,4-Me2Cp | Cl | Cl |
| 233a | Me2Si | Cp | Me3Cp | Cl | Cl |
| 234a | Me2Si | Cp | Me4Cp | Cl | Cl |
| 235a | Me2Si | Cp | 3,4-Et2Cp | Cl | Cl |
| 236a | Me2Si | Cp | Et3Cp | Cl | Cl |
| 237a | Me2Si | Cp | Me4Cp | Cl | Cl |
| 238a | Me2Si | Cp | Flu | Cl | Cl |
| 239a | Me2Si | 3-tBuCp | Flu | Cl | Cl |
| 240a | Me2Si | Cp | 2,7-tBu2Flu | Cl | Cl |
| 241a | Me2Si | Cp | H8Flu | Cl | Cl |
| 242a | Me2Si | 2-MeCp | Flu | Cl | Cl |
| 243a | Me2Si | 2,5-Me2Cp | Flu | Cl | Cl |
| 244a | Me2Si | 2-EtCp | Flu | Cl | Cl |
| 245a | Me2Si | 2,5-Et2Cp | Flu | Cl | Cl |
| 246a | Et2Si | 2-MeCp | 2',7'-tBu2Flu | Cl | Cl |
| 247a | Me2Si | 2,5-Me2Cp | 2',7'-tBu2Flu | Cl | Cl |
| 248a | Me2Si | 2-EtCp | 2',7'-tBu2Flu | Cl | Cl |
| 249a | Me2Si | Et2Cp | 2',7'-tBu2Flu | Cl | Cl |
| 250a | Me2Si | Et2Cp | H8Flu | Cl | Cl |
| 251a | Me2Si | Me2Cp | H8Flu | Cl | Cl |
| 252a | Me2Si | EtCp | H8Flu | Cl | Cl |
| 253a | Me2Si | Et2Cp | H8Flu | Cl | Cl |

TABLE a-15

| | | $Q^1$ = silylene group (continued) | | | |
|---|---|---|---|---|---|
| No. | Q | A3 | A4 | X | Y |
| 254a | Me2Si | 2-(2-(5-tBuFuryl))Cp | 2-(2-(5-tBuFuryl))Cp | Cl | Cl |
| 255a | Me2Si | 2-(2-(5-TMSFuryl))Cp | 2-(2-(5-TMSFuryl))Cp | Cl | Cl |
| 256a | Me2Si | 2-(2-(5-PhFuryl))Cp | 2-(2-(5-PhFuryl))Cp | Cl | Cl |
| 257a | Me2Si | 2-(2-(5-MeThienyl))Cp | 2-(2-(5-MeThienyl))Cp | Cl | Cl |
| 258a | Me2Si | 2-(2-(4,5-Me2Furyl))Cp | 2-(2-(4,5-Me2Furyl))Cp | Cl | Cl |
| 259a | Me2Si | 2-(2-BenFuryl)Cp | 2-(2-BenFuryl)Cp | Cl | Cl |
| 260a | Me2Si | 2-(2-BenThienyl)-4-(4-TMSPh)Cp | 2-(2-BenThienyl)-4-(4-TMSPh)Cp | Cl | Cl |
| 261a | Me2Si | 2-(2-(5-TMSFuryl))Cp | 2-(2-(5-TMSFuryl))Cp | Cl | Cl |
| 262a | PhMeSi | 2-(2-(5-MeFuryl))Cp | 2-(2-(5-MeFuryl))Cp | Cl | Cl |
| 263a | Me2Si | 2-(2-(5-MeFuryl))Cp | Cp | Cl | Cl |
| 264a | Me2Si | 2-(2-(5-MeFuryl))-4-PhCp | 2-(2-(5-MeFuryl))Cp | Cl | Cl |
| 265a | Me2Si | 2-(2-(5-MeFuryl))Cp | 3-MeCp | Cl | Cl |

(III-3) When $Q^1$ is a hydrocarbon group containing germanium, phosphorus, nitrogen, boron or aluminum, the complex includes, for example, the compounds shown in Table a-16 below.

TABLE a-16

| No. | Q1 | A3 | A4 | X | Y |
|---|---|---|---|---|---|
| 266a | Me2Ge | Cp | Flu | Cl | Cl |
| 267a | PhN | Cp | Flu | Cl | Cl |
| 268a | Me2Ge | 2-(2-(5-MeFuryl))Cp | 2-(2-(5-MeFuryl))Cp | Cl | Cl |
| 269a | MeB | 2-(2-(5-MeFuryl))-4-TMSCp | 2-(2-(5-MeFuryl))-4-TMSCp | Cl | Cl |

Thanks to a catalyst where a mixture of an organoaluminum oxy compound and a borane compound or the like is combined with a complex having a bridged bis(indenyl) ligand, a bridged bis(azulenyl) ligand or a bridged bis(cyclopentadienyl) ligand, which is defined by the compounds above, a long-chain branched structure suitable as the ethylene-based polymer (B) of the present invention is imparted to an ethylene-based polymer (B).

In the foregoing pages, three catalyst systems, that is, a catalyst system containing, as an essential component, a complex having a bridged (cyclopentadienyl)(indenyl) ligand or the like, a catalyst system containing, as an essential component, a complex having a benzindenyl ligand or the like, and a catalyst system using a mixture of a complex having a bridged bis(indenyl) ligand or a bridged bis(cyclopentadienyl) ligand, which is a metallocene complex, and a borane or borate compound that is a compound capable of producing a cationic metallocene compound together with an organoaluminum oxy compound, are described as specific preferred examples of the olefin polymerization catalyst for producing a long-chain branched structure suitable as the ethylene-based polymer (B) of the present invention. Among these, a catalyst system containing, as an essential component, a complex having a bridge (cyclopentadienyl)(indenyl) ligand or the like and a catalyst system using a mixture of a complex having a bridged bis(indenyl) ligand or a bridged bis(cyclopentadienyl) ligand, which is a metallocene complex, and a borane or borate compound that is a compound capable of producing a cationic metallocene compound together with an organoaluminum oxy compound, are more preferred, and a catalyst system containing, as an essential component, a complex having a bridged (cyclopentadienyl)(indenyl) ligand or the like is still more preferred.

In the present invention, the production of the ethylene-based polymer (B) is performed by contacting ethylene with the olefin polymerization catalyst (i) to (iv), more preferably (i), (ii) or (iv), still more preferably (i) or (ii), yet still more preferably (ii) the metallocene catalyst, thereby polymerizing or copolymerizing the ethylene. As the olefin polymerization catalyst, a plurality of kinds of catalyst may be selected from (i) to (iv) and used. At the time of performing polymerization or copolymerization of ethylene, all descriptions of the polymerization method, ethylene raw material, polymerization medium, polymerization temperature and the like, polymerization process and the like, and scavenger in the paragraph of Production Method of Ethylene-Based Polymer (A) above may be referred to. However, it is needless to say that these various conditions must be optimally set by taking into account various characteristics required of the ethylene-based polymer (B) and the characteristics of the olefin polymerization catalyst used. For example, in the case of desiring for an ethylene-based polymer (B) having a lower MFR and a lower density, the chain transfer agent concentration is set relatively low, the α-olefin concentration is set relatively high, in order to prevent a polymer in the production process from a trouble such as fixing•blocking, various operation temperatures are set on the low temperature side as appropriate for the melting temperature or the like of the polymer, a low-molecular-weight hydrocarbon solvent hardly causing dissolution of the polymer such as propane and butane, is selected in the slurry polymerization, a gas phase polymerization not using a solvent is selected, or solution polymerization treating the polymer in the molten state is selected. Also, in the case of intending to impart distinctive long-chain branch characteristics, it is preferred to aggressively select a low monomer concentration condition, a high polymer concentration condition, a low scavenger concentration condition, a high temperature polymerization condition, a long time polymerization condition or the like so that the chain transfer reaction except for hydrogen can be accelerated.

(3) Other Components (C)

In the polyethylene-based resin composition of the present invention, as long as the purpose of the present invention is not impaired, the following substances can be blended as an optional component, in addition to the ethylene-based polymer (A) and the ethylene-based polymer (B), which are essential components.

3-1. Other Ethylene-Based Polymers

In addition to the ethylene-based polymer (A) and the ethylene-based polymer (B), various ethylene-based polymers and modification products thereof, such as high-density polyethylene, low-density polyethylene, high-pressure polyethylene, polar monomer graft-modified polyethylene, ethylene-based wax, ultrahigh molecular weight polyethylene and ethylene-based elastomer, can be used. Addition of a high-density polyethylene is preferred for enhancing the stiffness, heat resistance, impact strength and the like. Addition of a low-density polyethylene is preferred for enhancing the flexibility, impact strength, easy adhesiveness, transparency, low-temperature strength and the like. Addition of a high-pressure polyethylene is preferred for enhancing the flexibility, easy adhesiveness, transparency, low-temperature strength, moldability and the like. Addition of a polar monomer graft-modified polyethylene such as maleic acid-modified polyethylene, ethylene.acrylic acid derivative copolymer and ethylene-vinyl acetate copolymer is preferred for enhancing the flexibility, easy adhesiveness, colorability, affinity for various materials, gas barrier property and the like. Addition of an ethylene-based wax is preferred for enhancing the colorability, affinity for various materials, moldability and the like. Addition of an ultrahigh molecular weight polyethylene is preferred for enhancing the mechanical strength, abrasion resistance and the like. Addition of an ethylene-based elastomer is preferred for enhancing the flexibility, mechanical strength, impact strength and the like.

3-2. Other Olefin-Based Polymer

As an olefin-based polymer other than an ethylene-based polymer, for example, a polypropylene-based resin, a higher olefin-based resin such as polybutene, polyisobutene and polyhexene, an olefin-based rubber, a polybutadiene-based resin such as butadiene, isoprene and chloroprene, a polystyrene-based resin such as polystyrene and poly-α-methylstyrene, various cyclic olefin-based resin, and modification products thereof can be used.

3-3. Other Resins

Various resins containing, as a main component, a polymer except for the above-described ethylene-based polymer or other olefin-based polymers can be used. Specific examples thereof include various nylon resins, various polyamides, polyethylene terephthalate (PET), polybutylene terephthalate (PBT), various polyesters, a polycarbonate resin, EVOH, EVA, PMMA, PMA, various engineering plastics, polylactic acid, celluloses, natural rubbers, polyurethane, vinyl chloride, fluororesin such as Teflon (registered trademark), and an inorganic polymer such as silicon resin.

3-4. Additive

All additives may be appropriately used individually or in combination of two or more thereof. Specifically, for example, an antioxidant (e.g., phenol type, phosphorus type, sulfur type), an ultraviolet absorber•ultraviolet inhibitor, a light stabilizer-weatherproofing agent, a lubricant, an antistatic agent, an antifogging agent, an antiblocking agent, a processing aid such as dispersant, a color pigment (organic or inorganic pigment), a pearl pigment, a polarizing pearl pigment, a crosslinking agent, a blowing agent, a neutralizer, a heat stabilizer, a crystallization nucleating agent, an inorganic or organic bulking agent•filler [such as calcium carbonate, talc, metal powder (e.g., aluminum, copper, iron, lead), silica dust, diatomaceous earth, alumina, gypsum, mica, clay, asbestos, graphite, carbon black and titanium oxide], and a flame retardant can be used.

(4) Mixing of Respective Components Constituting Polyethylene-Based Resin Composition of the Present Invention The polyethylene-based resin composition of the present invention is produced by mixing the ethylene-based polymer (A), the ethylene-based polymer (B), which are essential components, and the substance (C) as an optional component.

The blending ratio of respective components is from 41 to 99 wt % of the ethylene-based polymer (A) and from 1 to 59 wt % of the ethylene-based polymer (B), preferably from 61 to 96 wt % of the ethylene-based polymer (A) and from 4 to 39 wt % of the ethylene-based polymer (B), more preferably from 69 to 96 wt % of the ethylene-based polymer (A) and from 4 to 31 wt % of the ethylene-based polymer (B), still more preferably from 69 to 91 wt % of the ethylene-based polymer (A) and from 9 to 31 wt % of the ethylene-based polymer (B), yet still more preferably from 75 to 89 wt % of the ethylene-based polymer (A) and from 11 to 25 wt % of the ethylene-based polymer (B). If the proportion of the ethylene-based polymer (A) is too large, the polyethylene-based resin composition or its molded product may be reduced in the impact resistance or transparency and out of the moldability, the melt tension decreases, whereas if the proportion is small, the stiffness may be deteriorated and out of the moldability, the melt extrudability becomes bad. If the proportion of the ethylene-based polymer (B) is too large, the polyethylene-based resin composition or its molded product may be reduced in the stiffness or transparency and out of the moldability, the melt extrudability becomes bad, whereas if the proportion is small, the tear strength, impact strength and transparency may not be improved and out of the moldability, the melt tension decreases. Incidentally, the proportion of the substance (C) as an optional component is appropriately set as long as the purpose of the present invention is not impaired, but the proportion is usually from 0 to 49 wt % and particularly, in using various additives recited in Item 3-4 above, all existing examples related to application to known polyethylene-based resins, polyethylene-based resin compositions and their molded product may be referred to.

In producing the polyethylene-based resin composition of the present invention by mixing the ethylene-based polymer (A), the ethylene-based polymer (B), which are essential components, and the substance (C) as an optional component, the mixing method therefor or the apparatus used is not particularly limited, but usually, these components are mixed using a Henschel mixer, a super-mixer, a tumbler-type mixer or the like, kneaded under heating, for example, in a mixing extruder such as single- or twin-screw extruder, kneader and plunger extruder, or in a Banbury mixer, and then pelletized. The kneading under heating can be performed in the presence or absence of a liquid, a solvent or a gas. The order of mixing those components is also not particularly limited, and, for example, the following methods (D-1) to (D-4) may be recited:

(D-1) a method where the ethylene-based polymer (A), the ethylene-based polymer (B) and the optional substance (C) all in the solid state, preferably all in the powder, particle or pellet state, are previously contacted and mixed with each other, and the mixture is put into a more uniform state by kneading under heating;

(D-2) a method where any one or more components of the ethylene-based polymer (A), the ethylene-based polymer (B) and the optional substance (C) are put into a molten state, a dissolved state or a liquid state and then contacted and mixed with other components, and the mixture is furthermore put into a more uniform state by kneading under heating;

(D-3) a method where any two components of the ethylene-based polymer (A), the ethylene-based polymer (B) and the optional substance (C) are previously kneaded under heating by, for example, the method (D-1) or (D-2) above, and the mixture obtained by the kneading under heating is further kneaded under heating with the remaining one component and thereby put into a more uniform state; and (D-4) a method where any one component of the ethylene-based polymer (A), the ethylene-based polymer (B) and the optional substance (C) is previously kneaded under heating with, individually and separately, both of the remaining two components, for example, by the method (D-1) or (D-2), and the mixtures obtained by the kneading under heating is further kneaded under heating and thereby put into a more uniform state.

(5) Physical Properties of Polyethylene-Based Resin Composition of the Present Invention The polyethylene-based resin composition of the present invention is produced by mixing the ethylene-based polymer (A), the ethylene-based polymer (B), which are essential components, and the substance (C) as an optional component, for example, by the mixing method of (D-1) to (D-4) above, and as for the physical properties, the composition as a whole must satisfy the ranges of MFR and density described below.

5-1. MFR

The melt flow rate (MFR) of the polyethylene-based resin composition of the present invention is from 0.05 to 50 g/10 min, preferably from 0.1 to 20 g/10 min, more preferably from 0.3 to 10 g/10 min, still more preferably from 0.4 to 5.0 g/10 min, yet still more preferably from 0.5 to 3.0 g/10 min. If MFR is less than 0.05 g/10 min, the flowability of the polyethylene-based resin composition is bad, and this may disadvantageously require a too high motor load of the extruder or lead to poor spreadability. If MFR exceeds 50 g/10 min, the polyethylene-based resin composition or its molded product becomes inferior in the mechanical strength such as impact strength, tear strength and tensile strength or in the moldability, and this is not preferred. Incidentally, MFR indicates a value when measured under the same conditions as the condition (A-1) above.

5-2. Density

The density of the polyethylene resin composition of the present invention is from 0.910 to 0.960 $g/cm^3$, preferably from 0.910 to 0.950 $g/cm^3$, more preferably from 0.916 to 0.940 $g/cm^3$, still more preferably from 0.919 to 0.938 $g/cm^3$, yet still more preferably from 0.920 to 0.936 $g/cm^3$, and most preferably from 0.921 to 0.934 $g/cm^3$.

If the density of the polyethylene resin composition is less than 0.910 $g/cm^3$, the polyethylene-based resin composition or its molded product may be reduced in the stiffness or become sticky and when the product is a molded product having a small thickness, such as film and sheet, as well as various problems in using the product, a problem is disadvantageously brought about in the step of winding up the product or the post-processing step such as surface printing•lamination, leading to poor suitability for automatic bag machine, or when the product is a molded product having a large wall thickness, such as pipe and various containers, since the product is too soft and undergoes deformation, the wall thickness must be disadvantageously designed to be larger than necessary. Also, if the density of the polyethylene resin composition exceeds 0.960 $g/cm^3$, the impact strength of the polyethylene-based resin composition or its molded product may be reduced and the transparency may also become bad. Incidentally, the density indicates a value when measured under the same conditions as the condition (A-2) above.

[II] Molded Product and Use of Polyethylene-Based Resin Composition of the Present Invention The molded product of the polyethylene-based resin composition of the present invention is produced by molding the polyethylene-based resin composition of the present invention described in [I] above, and as for the molding method, all of molding methods for a polyolefin-based resin or a polyolefin-based resin composition, such as injection molding, compression-injection molding, rotational molding, extrusion molding, hollow molding and blow molding, which are conventionally known, may be referred to.

The molded product as used in the present invention indicates a processed article or a shaped article obtained by processing or shaping the polyethylene-based resin composition into an appropriate form according to the intended use, and specific examples thereof include a film, a bag, a sheet, a coating, a fiber, a yarn, a container, a tube, a pipe, a covering material, a lid, a cap, a box, sundry articles, toys, medical device parts, a bead, a fine particle, and a foamed product. These articles may have a multilayer structure or may be a composite article with other members. As for these molded articles of the polyethylene-based resin composition of the present invention, specific examples of use thereof include a standardized bag mandated by the dimensional standard, such as bag-in-paper bag and garbage bag, a heavy duty sack, a wrapping film, a sugar bag, a rice bag, an oily substance packaging bag, a food packaging film in a bag for packaging a watery material such as pickles, an agricultural film, a laminate with various substrates such as nylon, polyester, metal foil and saponified ethylene-vinyl acetate copolymer, a foamed body, and a molded product thereof, and applications of a molded product of known polyethylene-based resins and polyethylene-based resin compositions, such as bag-in-box, detergent container, edible oil container, retort container, medical container, chemical container, solvent container, agricultural container, various plastic bottle products, hollow container (e.g., kerosene can, drum, fuel tank), infusion bag, various tubes, pipe (e.g., water pipe, gas pipe), Tupperware container cover, bottle cap and container, may be referred to.

The molding method for the molded product of the present invention is not particularly limited as long as it is a method capable of effectively utilizing excellent molding characteristics, various mechanical properties and transparency of the polyethylene-based resin composition of the present invention, but in the case of a film, bag or sheet as an example of the application in which the polyethylene-based resin composition of the present invention is intended to be mainly used, preferred examples of the molding method, molding conditions and use include, specifically, various inflation molding methods, T-die film molding methods, calender molding methods, multilayer film molding methods using a multilayer coextrusion molding machine or lamination processing, and various applications, which are described in detail, for example, in JP-A-2007-197722, JP-A-2007-177168, JP-A-2007-177187 and JP-A-2010-31270. Of course, a gas other than air, or a liquid can be used as a cooling medium in the inflation molding and may be also used in special inflation such as stretch (inflation simultaneous biaxial stretching) molding and multi-stage blow-molding.

The thus-obtained film (or sheet) product is not particularly limited in its sheet, and the suitable thickness differs depending on the molding method•conditions. For example, in the case of inflation molding, the thickness is approximately from 5 to 300 μm, and in the case of T-die molding, a film (or sheet) having a thickness of approximately from 5 μm to 5 mm can be obtained. Similarly, in the case of hollow containers as an example of the application in which the polyethylene-based resin composition of the present invention is intended to be mainly used, preferred examples of the molding method, molding conditions and used include, specifically, various hollow molding methods and blow molding methods and various applications, which are described in detail, for example, in JP-A-2004-18812, JP-A-2009-143079 and JP-A-2009-173889. Similarly, in the case of a pipe, a covering material, a cover, caps, a box and sundries as an example of the application of the polyethylene-based resin composition of the present invention, preferred examples of the molding method, molding conditions and used include, specifically, various molding methods and various applications, which are described in detail, for example, in JP-A-2007-2235, JP-A-2007-177183 and JP-A-2002-60559. Furthermore, as other applications, the polyethylene-based resin composition may be used as a modifier, for example, to enhance the moldability, enhance the mechanical strength, impart low-temperature resistance or impart low-temperature adhesiveness, by blending a small amount of the composition with another polyethylene-based resin or polyethylene-based resin composition or with a polyolefin-based resin such as polypropylene-based resin.

[III] Ethylene-Based Polymer

A second aspect of the present invention relates to an ethylene-based polymer having a developed long-chain branched structure and exhibiting excellent moldability. The second aspect of the present invention is described below item by item.

The ethylene-based polymer of the present invention satisfies all of the conditions (B-1') to (B-8) described below.

III-1. Condition (B-1')

$MFR_B$ of the ethylene-based polymer in the present invention is from 0.001 to 200 g/10 min, preferably from 0.01 to 100 g/10 min, more preferably from 0.05 to 50 g/10 min, still more preferably from 0.1 to 50 g/10 min, and most preferably from 0.1 to 10 g/10 min. If $MFR_B$ is less than 0.001 g/10 min, the ethylene-based polymer may be inferior in the moldability, particularly in the melt flowability and spreadability, and uniform mixing with another resin may become difficult, disadvantageously giving rise to production of an appearance failure such as gel, grain and fisheye or reduction in the impact strength or transparency. If $MFR_B$ exceeds 200 g/10 min, the ethylene-based polymer or a composition obtained by mixing the polymer with another resin may be reduced in the mechanical strength such as impact strength, tear strength and tensile strength and this is not preferred. Incidentally, MFR indicates a value when measured under the same conditions as in the condition (A-1).

III-2. Condition (B-2")

The $density_B$ of the ethylene-based polymer in the present invention is from 0.880 to 0.970 g/cm$^3$, preferably from 0.891 to 0.960 g/cm$^3$, more preferably from 0.895 to 0.950 g/cm$^3$, still more preferably from 0.900 to 0.934 g/cm$^3$, and most preferably from 0.900 to 0.925 g/cm$^3$. When the $density_B$ is in this range, the ethylene-based polymer or its molded product is excellent in the balance between impact strength and stiffness and in the transparency. On the other hand, if the $density_B$ is less than 0.880 g/cm$^3$, the stiffness is reduced and when the product is a molded product having a small thickness, such as film and sheet, as well as various problems in using the product, a problem is disadvantageously brought about in the step of winding up the product or the post-processing step such as surface printing•lamination or when the product is a molded product having a large wall thickness, such as pipe and various containers, since the product is too soft and undergoes deformation, the wall thickness must be disadvantageously designed to be larger than necessary. In addition, the polymer is heavily sticky even at room temperature and difficult to handle in the blending step with another resin, disadvantageously giving rise to product sticking of the resin composition, and furthermore, the compatibility with the another resin may be reduced to deteriorate the impact strength or transparency due to phase separation. Also, if the $density_B$ exceeds 0.970 g/cm$^3$, the impact strength or transparency is deteriorated and this is not preferred. In the case of using the polymer as a modifier to enhance the strength of another resin, the density of the ethylene-based polymer in the present invention is preferably from 0.900 to 0.910 g/cm$^3$. Incidentally, the density indicates a value when measured under the same conditions as the condition (A-2) above.

III-3. Condition (B-3)

The $[Mw/Mn]_B$ of the ethylene-based polymer in the present invention is from 2.0 to 10.0, preferably from 2.0 to 6.0, more preferably from 2.5 to 5.6, still more preferably from 2.9 to 4.5, yet still more preferably from 3.2 to 4.0. If $[Mw/Mn]_B$ is less than 2.0, the polymer may be reduced in the molding characteristics or may be difficult to mix with another resin and therefore, this should be avoided. If $[Mw/Mn]_B$ exceeds 10.0, the ethylene-based polymer, the mixed resin composition with another resin or the molded product may lack the impact strength, be deteriorated in the transparency or become sticky, and this is not preferred. Incidentally, Mw/Mn indicates a value measured under the same conditions as the condition (A-3) above.

III-4. Condition (B-4')

The $[\lambda\max(2.0)]_B$ of the ethylene-based polymer in the present invention is from 1.2 to 30.0, preferably from 1.5 to 20.0, more preferably from 2.0 to 10.0, still more preferably from 2.4 to 6.0, yet still more preferably from 3.0 to 5.0. If $[\lambda\max(2.0)]_B$ is less than 1.2, the ethylene-based polymer, the mixed resin composition with another resin or the molded product may lack the flowability or melt tension and be deteriorated in the molding characteristics. If $[\lambda\max(2.0)]_B$ exceeds 30.0, the flowability and melt tension may be excellent, but the ethylene-based polymer or the like may be disadvantageously reduced in the impact strength or transparency. Incidentally, h$\lambda$max(2.0) indicates a value when measured under the same conditions as the condition (A-4) above. The effect of the elongational flow characteristics of the polyethylene on its moldability or mechanical properties of the molded product is as already described above in the condition (A-4) or condition (B-4).

III-5. Condition (B-5)

As regards the ethylene-based polymer in the present invention, the $[\lambda\max(2.0)]_B/[\lambda\max(0.1)]_B$ defined in the condition (B-5) of Item 2.5 above is from 1.2 to 10.0, preferably from 1.3 to 5.0, more preferably from 1.4 to 4.0, still more preferably from 1.5 to 3.0. If $[\lambda\max(2.0)]_B/[\lambda\max(0.1)]_B$ is less than 1.2, the ethylene-based polymer, the mixed resin composition with another resin or the molded product may be in a non-uniform molten state or may have a thermally unstable structure, or reduction in the impact strength or deterioration of the transparency may be caused due to strength anisotropy of the molded product, which is attributable to the presence of a significantly elongated long-chain branched structure, and this is not preferred. If $[\lambda\max(2.0)]_B/[\lambda\max(0.1)]_B$ exceeds 10.0, the melt tension and flowability during molding may be excellent, but the ethylene-based polymer, the mixed resin composition with another resin or the molded product may be disadvantageously reduced in the impact strength or transparency.

III-6. Condition (B-6)

The ethylene-based polymer of the present invention is a polymer produced by an ethylene polymerization reaction using a catalyst containing a transition metal, and all of the matters described in the condition (B-6) of Item 2.6 apply.

III-7. Condition (B-7)

As regards the ethylene-based polymer in the present invention, the above-described $g_C'$ is from 0.30 to 0.70, and all of the matters described in the condition (B-7) of Item 2.7 above apply. The $g_C'$ value is preferably from 0.30 to 0.59, more preferably from 0.35 to 0.55, still more preferably from 0.35 to 0.50, yet still more preferably from 0.35 to 0.45. If the $g_C'$ value exceeds 0.70, the ethylene-based polymer, the mixed resin composition with another resin or the molded product may disadvantageously lack the moldability or transparency. If the $g_C'$ value is less than 0.30, the moldability of the ethylene-based polymer or the like may be improved, but the impact strength of the molded product may be reduced or the transparency may be deteriorated, and this is not preferred. Incidentally, the $g_C'$ value or the $W_C$ value in the next paragraph indicates a value when measured under the same conditions as the condition (B-7) of Item 2.7 or the condition (B-8) of Item 2.8 above.

III-8. Condition (B-8)

As regards the ethylene-based polymer in the present invention, the above-described $W_C$ is from 0.01 to 30.0%, and all of the matters described in the condition (B-8) of Item 2.8 above apply. The $W_C$ value is more preferably from 0.02 to 10.0%, still more preferably from 0.05 to 8.0%, yet still more preferably from 0.10 to 6.0%, and most preferably from 0.11 to 4.0%. If the $W_C$ value is less than 0.01%, the ethylene-based polymer or the mixed resin composition with another resin may be inferior in the moldability or the ethylene-based polymer or the like may lack the transparency, and this is not preferred. If the $W_C$ value exceeds 30.0%, the ethylene-based polymer or the like may be enhanced in the melt tension out of the moldability, but the melt flowability may be excessively reduced to disadvantageously cause a problem in the production or molding of the ethylene-based polymer or the like. Furthermore, the impact strength or the transparency of the molded product may be deteriorated, and this is not preferred.

III-9. Condition (B-9)

The ethylene-based polymer in the present invention preferably further satisfies the following condition (B-9), in addition to the condition (B-1') to the condition (B-8) defined in Items III-1 to III-8 above.

The condition (B-9) is that in the TREF measurement using an orthodichlorobenzene solvent, the content ($W_{-15}$; unit: wt %) of components eluted at $-15°$ C. is 2.0 wt % or less.

The $W_{-15}$ value is preferably 0.9 wt % or less, more preferably 0.6 wt % or less, still more preferably 0.5 wt %, yet still more preferably 0.4 wt %, and most preferably 0.3 wt %. The lower limit of the $W_{-15}$ value is preferably 0.0 wt %, that is, the components are not detected. If the $W_{-15}$ value exceeds 2.0 wt %, the ethylene-based polymer, the mixed resin composition with another resin or the molded product may lack the impact strength, be deteriorated in the transparency or become sticky, and this is not preferred. Also, the compatibility with another resin may become bad, and this may disadvantageously give rise to deterioration of the impact strength or transparency. In the present invention, the $W_{15}$ value is measured by the following method.

A sample is dissolved in orthodichlorobenzene (containing 0.5 mg/mL BHT) at 140° C. to prepare a solution, and the solution is introduced into a TREF column at 140° C., then cooled to 100° C. at a temperature drop rate of 8° C./min, further cooled to $-15°$ C. at a temperature drop rate of 4° C./min and held for 60 minutes. Thereafter, orthodichlorobenzene (containing 0.5 mg/mL BHT) as a solvent is flowed through the column at a flow rate of 1 mL/min to elute components dissolved in the orthodichlorobenzene at $-15°$ C. in the TREF column for 10 minutes, and then the column temperature is raised linearly to 140° C. at a temperature rise rate of 100° C./hr to obtain an elution curve.

Apparatus:

(TREF Part)

TREF Column: Stainless steel-made column of 4.3 mm$\phi$× 150 mm

Column packing material: Inert glass bead of 100 μm

Heating system: Aluminum heating block

Cooling system: Peltier element (cooling of Peltier element is water cooling)

Temperature distribution: +0.5° C.

Temperature regulator: programmable digital controller, KP 1000, manufactured by Chino Corporation (Valve Part)

Heating system: Air bath oven

Temperature at measurement: 140° C.

Temperature distribution: 1° C.

Valve: Six-way valve, four-way valve (Sample Injection Part)

Injection system: Loop injection system

Injection amount: Loop size, 0.1 ml

Injection port heating system: Aluminum heating block
Temperature at measurement: 140° C.

(Detector Part)

Detector: Wavelength-fixed infrared detector, MIRAN 1A, manufactured by FOXBORO
Detection wavelength: 3.42 μm
High-temperature flow cell: Micro-flowcell for LC-IR, optical path length: 1.5 mm, window shape: oval of 2×4 mm, synthetic sapphire aperture plate
Temperature at measurement: 140° C.

(Pump Part)

Liquid delivery pump: SSC-3461 pump, manufactured by Senshu Kagaku Measurement Conditions:
Solvent: o-Dichlorobenzene (containing 0.5 mg/mL of BHT)
Sample concentration: 5 mg/mL
Sample injection amount: 0.1 mL
Solvent flow velocity: 1 mL/min

[IV] Olefin Polymerization Catalyst Component of the Present Invention

A third aspect of the present invention relates to an olefin polymerization catalyst component containing a metallocene compound having a specific structure, which is useful for producing a metallocene-based polyolefin or metallocene-based polyethylene having a sufficient number of long-chain branches having an appropriate length, and an olefin polymerization catalyst containing the component. The third aspect of the present invention is described below item by item.

The olefin polymerization catalyst component of the present invention is an olefin polymerization catalyst component containing the following component (A-1b) and component (A-2b), or an olefin polymerization catalyst component containing the following component (Ac).

IV-1. Olefin Polymerization Catalyst Component Containing Component (A-1b) and Component (A-2b) of the Present Invention A first embodiment of the olefin polymerization catalyst component of the present invention contains the components (A-1b) and (A-2b) defined below as essential components.

Component (A-1b): a metallocene compound represented by the following formula (1b):

[Chem. 12]

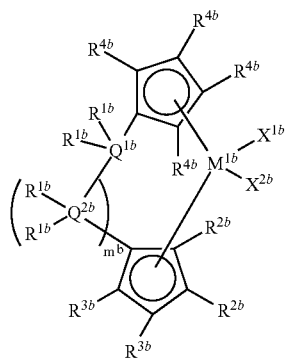

(1b)

[in formula (1b), $M^{1b}$ represents any one transition metal of Ti, Zr and Hf; each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1b}$ and $Q^{2b}$ independently represents a carbon atom, a silicon atom or a germanium atom; each $R^{1b}$ independently represents a hydrogen atom or a hydrocarbon group having a carbon number of 1 to 10 and at least two members out of four $R^{1b}$ may combine to form a ring together with $Q^{1b}$ and $Q^{2b}$; $m^b$ is 0 or 1 and when $m^b$ is 0, $Q^{1b}$ is bonded directly to the conjugated 5-membered ring including $R^{2b}$ and $R^{3b}$; and each of $R^{2b}$, $R^{3b}$ and $R^{4b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40 and out of $R^{2b}$, $R^{3b}$ and $R^{4b}$, only either one pair of adjacent $R^{3b}$ and $R^{3b}$ and adjacent $R^{2b}$ and $R^{3b}$ may form a ring together with the carbon atoms to which the pair is bonded].

Component (A-2b): a metallocene compound represented by the following formula (2b):

[Chem. 13]

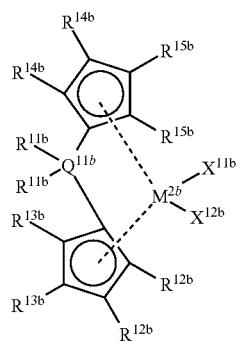

(2b)

[in formula (2b), $M^{2b}$ represents any one transition metal of Ti, Zr and Hf; each of $X^{11b}$ and $X^{12b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{11b}$ represents a carbon atom, a silicon atom or a germanium atom; each $R^{11b}$ independently represents a hydrogen atom or a hydrocarbon group having a carbon number of 1 to 10 and two $R^{11b}$ may combine with each other to form a ring together with $Q^{11b}$; each of $R^{12b}$, $R^{14b}$ and $R^{15b}$ independently represents an atom or a group selected from a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, and a silyl group substituted with a hydrocarbon group having a carbon number of 1 to 40, provided that at least one member is not a hydrogen atom; each $R^{13b}$ independently represents a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40; and out of $R^{12b}$, $R^{13b}$, $R^{14b}$ and $R^{15b}$, any only one pair of adjacent $R^{12b}$ and $R^{12b}$, adjacent $R^{13b}$ and $R^{13b}$ and adjacent $R^{12b}$ and $R^{13b}$ and any only one pair of adjacent $R^{14b}$ and $R^{14b}$, adjacent $R^{15b}$ and $R^{15b}$ and adjacent $R^{14b}$ and $R^{15b}$ may form a ring together with the carbon atoms to which the pair is bonded].

The components (A-1b) and (A-2b) (hereinafter, both are sometimes collectively referred to as component (Ab) or simply as Ab) are specifically described below.

IV-[(1). Component (A-1b)

The olefin polymerization catalyst component of the present invention is characterized by containing a metallocene compound represented by formula (1b) as the component (A-1b).

In formula (1b), $M^{1b}$ of the metallocene compound represents Ti, Zr or Hf, preferably represents Zr or Hf, more preferably represents Zr.

Each of $X^{1b}$ and $X^{2b}$ specifically includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a methoxymethyl group, an ethoxymethyl group, an n-propoxymethyl group, an i-propoxymethyl group, an n-butoxymethyl group, an i-butoxymethyl group, a tert-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, an ethoxy group, an n-propoxy group, an i-propoxy group, an n-butoxy group, an i-butoxy group, a tert-butoxy group, a phenoxy group, a dimethylamino group, a diethylamino group, a di-n-propylamino group, a di-i-propylamino group, a di-n-butylamino group, a di-i-butylamino group, a di-tert-butylamino group, and a diphenylamino group.

Specific preferred examples of $X^{1b}$ and $X^{2b}$ include a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Among these specific examples, a chlorine atom, a methyl group and a dimethylamino group are more preferred.

Each of $Q^b$ and $Q^{2b}$ independently represents a carbon atom, a silicon atom or a germanium atom and is preferably a carbon atom or a silicon atom.

Each $R^{1b}$ independently includes, for example, a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, and a phenyl group. In the case where at least two $R^{1b}$ are combined to form a ring together with $Q^{1b}$ and $Q^{2b}$, examples include a cyclobutylidene group, a cyclopentylidene group, a cyclohexylidene group, a silacyclobutyl group, a silacyclopentyl group, and a silacyclohexyl group.

When $Q^{1b}$ or/and $Q^{2b}$ are a carbon atom, specific preferred examples of $R^{1b}$ include a hydrogen atom, a methyl group, an ethyl group, a phenyl group and a cyclobutylidene group, and when $Q^{1b}$ or/and $Q^{2b}$ are a silicon atom, specific preferred examples include a methyl group, an ethyl group, a phenyl group and a silacyclobutyl group.

Each of $R^{2b}$, $R^{3b}$ and $R^{4b}$ specifically includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group.

Out of $R^{2b}$, $R^{3b}$ and $R^{4b}$, any one or more members are preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, because the polymerization activity is particularly increased.

Specific preferred examples of $R^{2b}$, $R^{3b}$ and $R^{4b}$ include a hydrogen atom, a methyl group, an ethyl group, an n-propyl group, an i-propyl group, an n-butyl group, a tert-butyl group, an n-pentyl group, an n-hexyl group, a cyclohexyl group, a phenyl group, a 2-methylfuryl group, and a trimethylsilyl group. Among these specific examples, a hydrogen atom, a methyl group, an n-butyl group, a tert-butyl group, a phenyl group and a trimethylsilyl group are more preferred, and a hydrogen atom, a methyl group, a tert-butyl group and a phenyl group are still more preferred.

Specific examples of the condensed cyclopentadienyl structure formed by adjacent two $R^{3b}$ and a cyclopentadienyl moiety to which both $R^{3b}$ are bonded, include the following partial structures (I) to (VI), and specific examples of the condensed cyclopentadienyl structure formed by adjacent $R^{3b}$ and $R^{2b}$ and a cyclopentadienyl moiety to which these $R^{3b}$ and $R^{2b}$ are bonded, are the same.

Among these specific examples, (I), (III) and (VI) are preferred. Also, $R^{4b}$ may be substituted on these partial structures (I) to (VI).

[Chem. 14]

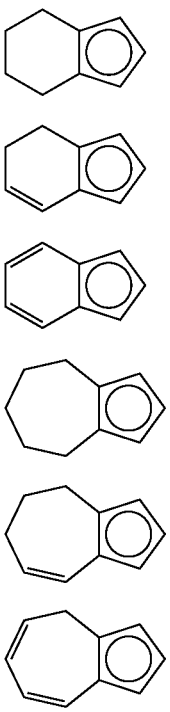

(I)
(II)
(III)
(IV)
(V)
(VI)

In formula (1b), $m^b$ is 0 or 1 and when $m^b$ is 0, $Q^{1b}$ is bonded directly to the conjugated 5-membered ring including $R^{2b}$ and $R^{3b}$.

As the olefin polymerization catalyst component according to the present invention, the metallocene compound of the component (A-1b) is preferably a compound represented by the following formula (3b):

[Chem. 15]

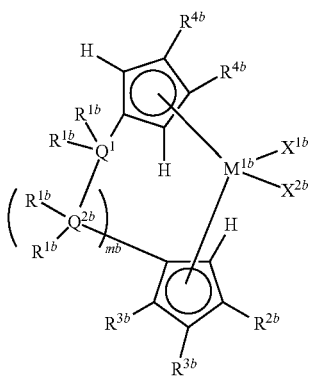

(3b)

[in formula (3b), $M^{1b}$ represents any one transition metal of Ti, Zr and Hf; each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1b}$ and $Q^{2b}$ independently represents a carbon atom, a silicon atom or a germanium atom; each $R^{1b}$ independently represents a hydrogen atom or a hydrocarbon group having a carbon number of 1 to 10 and at least two members out of four $R^{1b}$ may combine to form a ring together with $Q^{1b}$ and $Q^{2b}$; $m^b$ is 0 or 1 and when $m^b$ is 0, $Q^{1b}$ is bonded directly to the conjugated 5-membered ring including $R^{2b}$ and $R^{3b}$; and each of $R^{2b}$, $R^{3b}$ and $R^{4b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40 and out of $R^{2b}$, $R^{3b}$ and $R^{4b}$, only either one pair of adjacent $R^{3b}$ and $R^{3b}$ and adjacent $R^{2b}$ and $R^{3b}$ may form a ring together with the carbon atoms to which the pair is bonded].

In formula (3b), detailed definitions of $M^{1b}$, $X^{1b}$, $X^{2b}$, $Q^{1b}$, $Q^{2b}$, $R^{1b}$, $R^{2b}$, $R^{3b}$ and $R^{4b}$ follow the definitions in the description of formula (1b) above.

In formula (3b), particularly when $R^{3b}$ is a hydrogen atom, $R^{2b}$ is preferably a hydrogen atom or a hydrocarbon group having a carbon number of 1 to 6 and while one of two $R^{4b}$ is a hydrogen atom, the remaining one is preferably a hydrogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40, specifically, the remaining one $R^{4b}$ is preferably a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, a 2-(trimethyl)silylfuryl group or the like; and $R^{2b}$ is more preferably a hydrogen atom and while one of two $R^4$ is a hydrogen atom, the remaining one is more preferably a hydrogen atom, a hydrocarbon group having a carbon number of 1 to 20, or a silicon-containing hydrocarbon group containing from 1 to 6 silicons and having a carbon number of 1 to 18, specifically, the remaining one $R^{4b}$ is more preferably a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group or the like. The remaining one $R^{4b}$ is specifically, still more preferably a hydrogen atom, a methyl group, an ethyl group, an n-propyl group, an i-propyl group, an n-butyl group, an i-butyl group, a tert-butyl group, a phenyl group, a trimethylsilyl group or a triphenylsilyl group, and the remaining one $R^{4b}$ is specifically, yet still more preferably a hydrogen atom, an n-butyl group, an i-butyl group, a tert-butyl group, a phenyl group, a trimethylsilyl group or a triphenylsilyl group.

As the olefin polymerization catalyst component according to the present invention, the metallocene compound of the component (A-1b) is more preferably a compound represented by the following formula (4b):

[Chem. 16]

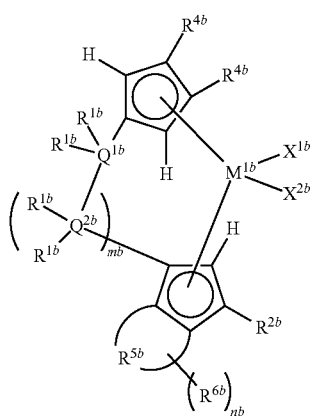

(4b)

[in formula (4b), $M^{1b}$ represents any one transition metal of Ti, Zr and Hf; each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1b}$ and $Q^{2b}$ independently represents a carbon atom, a silicon atom or a germanium atom; each $R^{1b}$ independently represents a hydrogen atom or a hydrocarbon group having a carbon number of 1 to 10 and at least two members out of four $R^{1b}$ may combine to form a ring together with $Q^{1b}$ and $Q^{2b}$; $m^b$ is 0 or 1 and when $m^b$ is 0, $Q^{1b}$ is bonded directly to the conjugated 5-membered ring including $R^{2b}$, $R^{5b}$ and $R^{6b}$; and each of $R^{2b}$ and $R^{4b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40 and $R^{4b}$ does not form a ring together with the carbon atom to which $R^{4b}$ is bonded; $R^{5b}$ represents a saturated or unsaturated divalent hydrocarbon group having a carbon number of 4 or 5 for forming a condensed ring with the 5-membered ring to which $R^{5b}$ is bonded; $R^{6b}$ is an atom or a group bonded to a carbon atom of $R^{5b}$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and $n^b$ represents an integer of 0 to 10 and when $n^b$ is 2 or more, at least two $R^{6b}$ may form a ring together with the carbon atoms to which $R^{6b}$ are bonded].

In formula (4b), detailed definitions of $M^{1b}$, $X^{1b}$, $X^{2b}$, $Q^{1b}$, $Q^{2b}$, $R^{1b}$, $R^{2b}$ and $R^{4b}$ follow the definitions in the description of formula (1b) above. Specific examples of the condensed cyclopentadienyl structure formed by $R^{5b}$ and a cyclopentadienyl moiety to which $R^{5b}$ is bonded, include the partial structures (I) to (VI). Among these specific examples, (I), (III) and (VI) are preferred. Also, $R^{6b}$ may be substituted on these partial structures (I) to (VI).

The substituent $R^{6b}$ includes, in addition to a hydrogen atom, for example, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 4-tert-butylphenyl group, a 3,5-dimethylphenyl group, a 3,5-di-tert-butylphenyl group, a naphthyl group, an anthracenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 2,6-dichloro-4-trimethylsilylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group. $R^{6b}$ may form a ring together with the carbon atom to which $R^{6b}$ is bonded. Also, in formula (4b), particularly when $R^{2b}$ is a hydrogen atom, all of two $R^{4b}$ and $R^{6b}$ are preferably a hydrogen atom or at least any one of two $R^{4b}$ and $R^{6b}$ is preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40, specifically, at least any one is preferably a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, a 2-(trimethyl)silylfuryl group or the like. In another preferred embodiment when $R^{2b}$ in formula (4b) is a hydrogen atom, while either one of two $R^{4b}$ is a hydrogen atom, the remaining one is preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40, specifically, the remaining one $R^{4b}$ is preferably a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, a 2-(trimethyl)silylfuryl group or the like; and while either one of two $R^{4b}$ is a hydrogen atom, the remaining one is more preferably a hydrocarbon group having a carbon number of 1 to 20 or a silicon-containing hydrocarbon group containing from 1 to 6 silicons and having a carbon number of 1 to 18, specifically, the remaining one $R^{4b}$ is preferably a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group or the like. The remaining one $R^{4b}$ is specifically, still more preferably a methyl group, an ethyl group, an n-propyl group, an i-propyl group, an n-butyl group, an i-butyl group, a tert-butyl group, a phenyl group, a trimethylsilyl group or a triphenylsilyl group; and the remaining one $R^{4b}$ is specifically, yet still more preferably an n-butyl group, an i-butyl group, a tert-butyl group, a phenyl group, a trimethylsilyl group or a triphenylsilyl group. Furthermore, in formula (4b), particularly when $R^{4b}$ is a hydrogen atom, each of $R^{2b}$ and $R^{6b}$ is preferably any one of a hydrogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, and a silyl group substituted with a hydrocarbon group having a carbon number of 1 to 40, specifically, each of $R^{2b}$ and $R^{6b}$ is preferably any one of a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, a 2-(trimethyl)silylfuryl group and the like; and each of $R^{2b}$ and $R^{6b}$ is more preferably a hydrogen atom, a hydrocarbon group having a carbon number of 1 to 20, or a silicon-containing hydrocarbon group containing from 1 to 6 silicons and having a carbon number of 1 to 18, specifically, each of $R^{2b}$ and $R^{6b}$ is more preferably a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group or the like. Each of $R^{2b}$ and $R^{6b}$ is specifically, still more preferably a hydrogen atom, a methyl group, an ethyl group, an n-propyl group, an i-propyl group, an n-butyl group, an i-butyl group, a tert-butyl group, a phenyl group, a trimethylsilyl group, or a triphenylsilyl group, and each of $R^{2b}$ and $R^{6b}$ is specifically, yet still more preferably a hydrogen atom, an n-butyl group, an i-butyl group, a tert-butyl group, a phenyl group, a trimethylsilyl group or a triphenylsilyl group.

As the olefin polymerization catalyst component according to the present invention, the metallocene compound of the component (A-1b) is still more preferably a compound represented by the following formula (5b):

[Chem. 17]

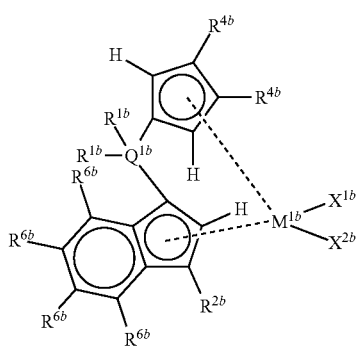

(5b)

[in formula (5b), $M^{1b}$ represents any one transition metal of Ti, Zr and Hf; each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{1b}$ represents a carbon atom, a silicon atom or a germanium atom; each $R^{1b}$ independently represents a hydrogen atom or a hydrocarbon group having a carbon number of 1 to 10 and two $R^{1b}$ may combine with each other to form a ring together with $Q^{1b}$; and each of $R^{2b}$, $R^{4b}$ and $R^{6b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40 and $R^{4b}$ does not form a ring together with the carbon atom to which $R^{4b}$ is bonded; and $R^{6b}$ may form a ring together with the carbon atoms to which $R^{6b}$ is bonded].

In formula (5b), detailed definitions of $M^{1b}$, $X^{b}$, $X^{2b}$, $Q^{1b}$, $R^{1b}$, $R^{2b}$, $R^{4b}$ and $R^{6b}$ follow the definitions in the description of formula (4b) above. The substituent $R^{6b}$ is preferably a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 4-tert-butylphenyl group, a 3,5-dimethylphenyl group, a 3,5-di-tert-butylphenyl group, a bis(trimethylsilyl)methyl group, a bis(tert-butyldimethylsilyl)methyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group or a 2-(trimethyl)silylfuryl group, more preferably a hydrogen atom, a methyl group, an ethyl group, an n-propyl group, an i-propyl group, an n-butyl group, a tert-butyl group, an n-pentyl group, an n-hexyl group, a cyclohexyl group or a phenyl group, still more preferably a hydrogen atom, a methyl group, an n-butyl group, a tert-butyl group, a phenyl group or a trimethylsilyl group, yet still more preferably a hydrogen atom, a methyl group, a tert-butyl group or a phenyl group. In the case where the substituents $R^{6b}$ form a ring together with the carbon atom to which the substituents are bonded, preferably, adjacent two $R^{6b}$ form a 6-membered ring structure together with the carbon atoms to which these substituents are bonded; more preferably, both $R^{6b}$ on the 4-position and the 5-position combine to form a 6-membered ring structure; and still more preferably, a benzindenyl ring structure is formed as a whole together with the indenyl ring to which the substituents are bonded.

In the olefin polymerization catalyst component of the present invention, specific examples of the metallocene compound as the component (A-1b) of the olefin polymerization catalyst component are illustrated below, but the present invention is not limited thereto. Incidentally, the number indicating the position of each substituent on the cyclopentadienyl ring, indenyl ring and azulenyl ring of metallocene compounds recited as specific examples of the component (A-1b) and the later-described (A-2b) is as shown in the following formulae.

[Chem. 18]

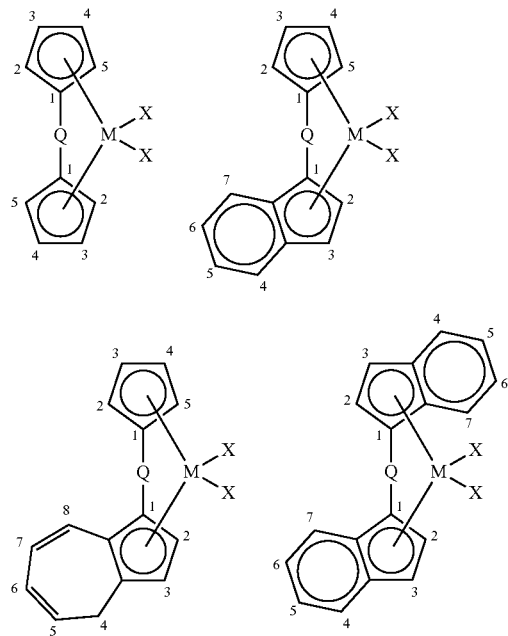

(i) The metallocene compounds classified into a bridged Cp(Ind)Zr type include, for example, those shown in Table b-1 below.

TABLE b-1

(i) Bridged Cp(Ind)Zr Type

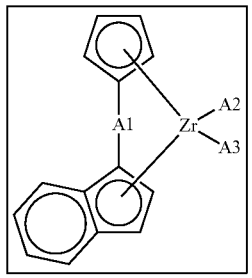

| No. | A1 | A2 | A3 |
|---|---|---|---|
| 1b | dimethylsilylene | Cl | Cl |
| 2b | dimethylsilylene | Me | Me |
| 3b | dimethylsilylene | Ph | Ph |
| 4b | isopropylidene | Cl | Cl |
| 5b | silacyclobutyl | Cl | Cl |
| 6b | silacyclopentyl | Cl | Cl |
| 7b | silacyclohexyl | Cl | Cl |
| 8b | cyclobutylidene | Cl | Cl |

TABLE b-1-continued

(i) Bridged Cp(Ind)Zr Type

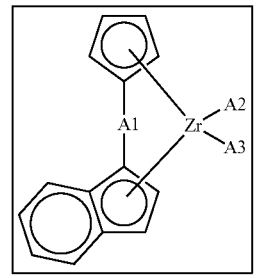

| No. | A1 | A2 | A3 |
|---|---|---|---|
| 9b | cyclopentylidene | Cl | Cl |
| 10b | cyclohexylidene | Cl | Cl |
| 11b | dimethylgermirene | Cl | Cl |

(ii) The metallocene compounds classified into a bridged Cp(3-substituted Ind)Zr type include, for example, those shown in Tables b-2 and b-3 below.

TABLE b-2

(ii) Bridged Cp(3-Substituted Ind)Zr Type

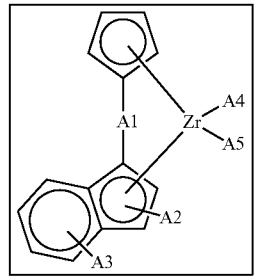

| No. | A1 | A2 | A3 | A4 | A5 | |
|---|---|---|---|---|---|---|
| 12b | dimethylsilylene | 3-methyl | — | chloride | chloride | C |
| 13b | dimethylsilylene | 3-methyl | — | methyl | methyl | C |
| 14b | isopropylidene | 3-methyl | — | chloride | chloride | A |
| 15b | dimethylsilylene | 3-ethyl | — | chloride | chloride | B |
| 16b | isopropylidene | 3-ethyl | — | chloride | chloride | A |
| 17b | dimethylsilylene | 3-n-propyl | — | chloride | chloride | B |
| 18b | isopropylidene | 3-n-propyl | — | chloride | chloride | A |
| 19b | dimethylsilylene | 3-i-propyl | — | chloride | chloride | B |
| 20b | isopropylidene | 3-i-propyl | — | chloride | chloride | A |
| 21b | dimethylsilylene | 3-n-butyl | — | chloride | chloride | |
| 22b | isopropylidene | 3-n-butyl | — | chloride | chloride | |
| 23b | dimethylsilylene | 3-tert-butyl | — | chloride | chloride | |
| 24b | cyclobutylidene | 3-tert-butyl | — | chloride | chloride | |
| 25b | dimethylsilylene | 3-tert-butyl | — | methyl | methyl | |
| 26b | isopropylidene | 3-tert-butyl | — | chloride | chloride | |
| 27b | dimethylsilylene | 3-n-pentyl | — | chloride | chloride | |
| 28b | dimethylsilylene | 3-n-hexyl | — | chloride | chloride | |
| 29b | dimethylsilylene | 3-cyclohexyl | — | chloride | chloride | B |
| 30b | dimethylsilylene | 3-phenyl | — | chloride | chloride | |
| 31b | dimethylsilylene | 3-benzyl | — | chloride | chloride | B |
| 32b | dimethylsilylene | 3-tolyl | — | chloride | chloride | |
| 33b | dimethylsilylene | 3-trimethylsilyl | — | chloride | chloride | A |
| 34b | dimethylsilylene | 3-chlorophenyl | — | chloride | chloride | A |
| 35b | dimethylsilylene | 3-fluorophenyl | — | chloride | chloride | B |
| 36b | dimethylsilylene | 3-(5-methyl-2-furyl) | — | chloride | chloride | C |
| 37b | dimethylsilylene | — | 4-methyl | chloride | chloride | B |
| 38b | dimethylsilylene | — | 5-methyl | chloride | chloride | B |
| 39b | dimethylsilylene | — | 6-methyl | chloride | chloride | C |
| 40b | dimethylsilylene | 3-methyl | 4-methyl | chloride | chloride | |
| 41b | dimethylsilylene | 3-tert-butyl | 4-methyl | chloride | chloride | C |

TABLE b-2-continued (ii) Bridged Cp(3-Substituted Ind)Zr Type

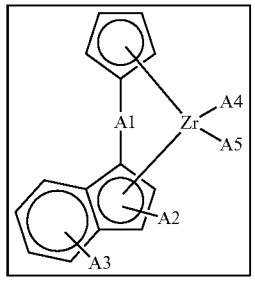

| No. | A1 | A2 | A3 | A4 | A5 | |
|---|---|---|---|---|---|---|
| 42b | dimethylsilylene | — | 4-phenyl | chloride | chloride | C |
| 43b | dimethylsilylene | — | 4-(4-methylphenyl) | chloride | chloride | C |
| 44b | dimethylsilylene | — | 4-(4-tert-butylphenyl) | chloride | chloride | |
| 45b | dimethylgermirene | 3-methyl | — | chloride | chloride | |

TABLE b-3

(ii) Bridged Cp(3-substituted Ind)Zr Type (continued)

| No. | A1 | A2 | A3 | A4 | A5 | |
|---|---|---|---|---|---|---|
| 46b | dimethylgermirene | 3-ethyl | — | chloride | chloride | |
| 47b | dimethylgermirene | 3-i-propyl | — | chloride | chloride | |
| 48b | dimethylgermirene | 3-n-butyl | — | chloride | chloride | |
| 49b | dimethylgermirene | 3-tert-butyl | — | chloride | chloride | |
| 50b | diethylsilylene | — | — | chloride | chloride | C |
| 51b | diethylsilylene | 3-methyl | — | chloride | chloride | B |
| 52b | diethylsilylene | 3-ethyl | — | chloride | chloride | B |
| 53b | diethylsilylene | 3-i-propyl | — | chloride | chloride | |
| 54b | diethylsilylene | 3-n-butyl | — | chloride | chloride | |
| 55b | diethylsilylene | 3-tert-butyl | — | chloride | chloride | |
| 56b | di-n-butylsilylene | — | — | chloride | chloride | C |
| 57b | di-n-butylsilylene | 3-methyl | — | chloride | chloride | B |
| 58b | di-n-butylsilylene | 3-ethyl | — | chloride | chloride | B |
| 59b | di-n-butylsilylene | 3-i-propyl | — | chloride | chloride | |
| 60b | di-n-butylsilylene | 3-n-butyl | — | chloride | chloride | |
| 61b | di-n-butylsilylene | 3-tert-butyl | — | chloride | chloride | |
| 62b | diphenylsilylene | — | — | chloride | chloride | |
| 63b | diphenylmethylene | — | — | chloride | chloride | C |
| 64b | diphenylsilylene | 3-methyl | — | chloride | chloride | B |
| 65b | diphenylsilylene | 3-ethyl | — | chloride | chloride | B |
| 66b | diphenylsilylene | 3-i-propyl | — | chloride | chloride | |
| 67b | diphenylsilylene | 3-n-butyl | — | chloride | chloride | |
| 68b | diphenylsilylene | 3-tert-butyl | — | chloride | chloride | C |
| 69b | dimethylsilylene | — | benz[e] | chloride | chloride | C |
| 70b | dimethylsilylene | — | dibenzo | chloride | chloride | |
| 71b | dimethylsilylene | — | azulenyl | chloride | chloride | C |
| 72b | dimethylsilylene | — | 4-methylazulenyl | chloride | chloride | C |
| 73b | dimethylsilylene | — | 4-phenylazulenyl | chloride | chloride | B |
| 74b | dimethylsilylene | — | 5,6-dimethyl | chloride | chloride | C |
| 75b | dimethylsilylene | — | benz[f] | chloride | chloride | |
| 76b | dimethylsilylene | — | 6,7-dihydroindacenyl | chloride | chloride | |
| 77b | dimethylsilylene | — | 5,5,7,7-tetramethyl-6,7-dihydroindacenyl | chloride | chloride | |
| 78b | dimethylsilylene | — | 5,6,7,8-tetra-hydrobenz[f] | chloride | chloride | |
| 79b | dimethylsilylene | — | 5,6,7,8-tetrahydro-5,5,8,8-tetramethylbenz[f] | chloride | chloride | |

(iii) The metallocene compounds classified into a bridged (3-substituted Cp)(Ind)Zr type include, for example, those shown in Table b-4 below.

TABLE b-4

(iii) Bridged (3-Substituted Cp)(Ind)Zr Type

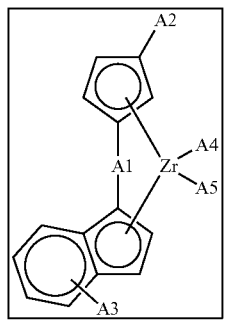

| No. | A1 | A2 | A3 | A4 | A5 | |
|---|---|---|---|---|---|---|
| 80b | dimethylsilylene | 4-methyl | — | chloride | chloride | C |
| 81b | dimethylsilylene | 4-ethyl | — | chloride | chloride | C |
| 82b | dimethylsilylene | 4-i-propyl | — | chloride | chloride | C |
| 83b | dimethylsilylene | 4-n-butyl | — | chloride | chloride | C |
| 84b | dimethylsilylene | 4-i-butyl | — | chloride | chloride | C |
| 85b | dimethylsilylene | 4-tert-butyl | — | chloride | chloride | C |
| 86b | dimethylsilylene | 4-tert-butyl | — | bromide | bromide | C |
| 87b | dimethylsilylene | 4-tert-butyl | — | methyl | methyl | C |
| 88b | dimethylsilylene | 4-tert-butyl | — | phenyl | phenyl | C |
| 89b | dimethylsilylene | 4-tert-butyl | 4,5,6,7-tetrahydro azulenyl | chloride | chloride | C |
| 90b | dimethylsilylene | 4-tert-butyl | | chloride | chloride | C |
| 91b | dimethylsilylene | 4-trimethylsilyl | — | chloride | chloride | C |
| 92b | dimethylsilylene | 4-(2-bromoethyl) | — | chloride | chloride | A |
| 93b | dimethylsilylene | 4-(2-trimethyl-silylfuryl) | — | chloride | chloride | C |
| 94b | dimethylsilylene | 4-phenyl | — | chloride | chloride | C |
| 95b | dimethylsilylene | 4-(4-methylphenyl) | — | chloride | chloride | C |
| 96b | isopropylidene | 4-tert-butyl | — | chloride | chloride | A |
| 97b | dimethylgermirene | 4-tert-butyl | — | chloride | chloride | |

(iv) The metallocene compounds classified into a bridged (4-substituted Cp)(3-substituted Ind)Zr type include, for example, those shown in Table b-5 below.

TABLE b-5

(iv) Bridged (4-Substituted Cp)(3-Substituted Ind)Zr Type

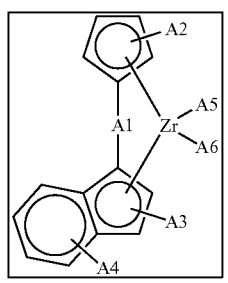

| No. | A1 | A2 | A3 | A4 | A5 | A6 |
|---|---|---|---|---|---|---|
| 98b | dimethylsilylene | 4-tert-butyl | 3-methyl | — | chloride | chloride |
| 99b | dimethylsilylene | 4-tert-butyl | 3-tert-butyl | — | chloride | chloride |
| 100b | dimethylsilylene | 4-tert-butyl | 3-tert-butyl | — | chloride | chloride |
| 101b | dimethylsilylene | 4-tert-butyl | — | 4-phenyl | chloride | chloride |
| 102b | dimethylsilylene | 3,4-dimethyl | 3-tert-butyl | — | chloride | chloride |
| 103b | isopropylidene | 4-tert-butyl | 3-n-butyl | — | chloride | chloride |
| 104b | dimethylsilylene | 4-tert-butyl | — | 4-phenyl-azulenyl | chloride | chloride |

(v) The metallocene compounds classified into a bridged bisCpZr type include, for example, those shown in Table b-6 below.

TABLE b-6

(v) Bridged bisCpZr Type

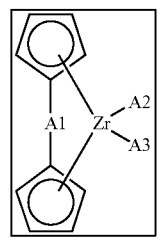

| No. | A1 | A2 | A3 |
|---|---|---|---|
| 105b | dimethylsilylene | chloride | chloride |
| 106b | dimethylsilylene | methyl | methyl |
| 107b | dimethylsilylene | phenyl | phenyl |
| 108b | dimethylsilylene | benzyl | benzyl |
| 109b | isopropylidene | chloride | chloride |
| 110b | silacyclobutyl | chloride | chloride |
| 111b | dimethylgermirene | chloride | chloride |

(vi) The metallocene compounds classified into a bridged Cp(3-substituted Cp)Zr type include, for example, those shown in Table b-7 below.

TABLE b-7

(vi) Bridged Cp(3-substituted Cp)Zr Type

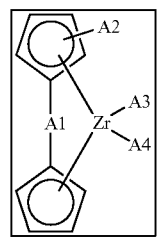

| No. | A1 | A2 | A3 | A4 | |
|---|---|---|---|---|---|
| 112b | dimethylsilylene | 3-n-propyl | chloride | chloride | C |
| 113b | dimethylsilylene | 3-tert-butyl | chloride | chloride | C |
| 114b | dimethylsilylene | 3-cyclohexyl | chloride | chloride | C |
| 115b | dimethylsilylene | 3-biphenyl | chloride | chloride | C |
| 116b | dimethylsilylene | 3-(4-methylphenyl) | chloride | chloride | C |
| 117b | dimethylsilylene | 3-(5-methyl-2-furyl) | chloride | chloride | C |
| 118b | dimethylsilylene | 3-tert-butyl-4-methyl | chloride | chloride | B |
| 119b | dimethylsilylene | 3-tert-butyl-4-ethyl | chloride | chloride | B |
| 120b | isopropylidene | 3-tert-butyl | chloride | chloride | A |
| 121b | dimethylgermirene | 3-tert-butyl | chloride | chloride | |

(vii) The metallocene compounds classified into a bridged bis(3-substituted Cp)Zr type include, for example, those shown in Table b-8 below.

TABLE b-8

(vii) Bridged bis (3-substituted Cp)Zr Type

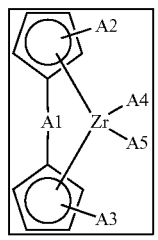

| No. | A1 | A2 | A3 | A4 | A5 |
|---|---|---|---|---|---|
| 122b | dimethylsilylene | 3-tert-butyl | 3-tert-butyl | chloride | chloride |
| 123b | dimethylsilylene | 3-tert-butyl | 3-tert-butyl | methyl | methyl |
| 124b | dimethylsilylene | 3-tert-butyl | 3-tert-butyl | phenyl | phenyl |
| 125b | isopropylidene | 3-tert-butyl | 3-tert-butyl | chloride | chloride |
| 126b | silacyclobutyl | 3-tert-butyl | 3-tert-butyl | chloride | chloride |
| 127b | dimethyl-germirene | 3-tert-butyl | 3-tert-butyl | chloride | chloride |
| 128b | dimethylsilylene | 3-allyl | 3-allyl | chloride | chloride |
| 129b | dimethylsilylene | 3-trimethylsilyl | 3-trimethylsilyl | chloride | chloride |
| 130b | dimethylsilylene | 3-ethyl-4-methyl | 3-ethyl-4-methyl | chloride | chloride |
| 131b | dimethylsilylene | 3-tert-butyl-4-methyl | 3-tert-butyl-4-methyl | chloride | chloride |
| 132b | dimethylsilylene | 3-(2-bromoethyl) | 3-(2-bromoethyl) | chloride | chloride |
| 133b | dimethylsilylene | 3-(4-chlorophenyl) | 3-(4-chlorophenyl) | chloride | chloride |
| 134b | dimethylsilylene | 3-benzyl | 3-benzyl | chloride | chloride |
| 135b | dimethylsilylene | 3-(5-methyl-2-furyl) | 3-(5-methyl-2-furyl) | chloride | chloride |
| 136b | dimethylsilylene | 3-tert-butyl | 3-methyl | chloride | chloride |
| 137b | dimethylsilylene | 3-tert-butyl | 4-tert-butyl | chloride | chloride |
| 138b | dimethylsilylene | 3-methyl | 4-phenyl | chloride | chloride |
| 139b | dimethylsilylene | 3,4-dimethyl | 3-tert-butyl | chloride | chloride |
| 140b | dimethylsilylene | 3,4-dimethyl | 3-(2-methylfuryl) | chloride | chloride |
| 141b | dimethylsilylene | 3-methyl-4-phenyl | 3-tert-butyl-4-ethyl | chloride | chloride |

The metallocene compound also includes, for example, compounds where zirconium of the compounds above is replaced by titanium or hafnium.

Furthermore, in using these metallocene compounds as the component (A-1b), two or more thereof may be also used.

In specific compounds exemplified above, in terms of excellent performance in both polymerization activity and moldability, preferred metallocene compounds as the component (A-1b) are denoted by "A", more preferred compounds are denoted by "B", and still more preferred compounds are denoted by "C".

Synthesis examples for the metallocene compound as the component (A-1b) according to the present invention are described below, but the present invention is not limited to these synthesis methods in particular.

For example, there are a method where an indene compound is lithiated, then reacted with a dichlorosilane compound and subsequently reacted with cyclopentadienyl lithium to obtain a ligand and the obtained ligand is reacted with a tetrakis(alkylamido)zirconium and then with trimethylsilyl chloride, and a method where the obtained ligand is lithiated and subsequently reacted with zirconium tetrachloride.

IV-[(2). Component (A-2b)

The olefin polymerization catalyst component of the present invention is characterized by containing a metallocene compound represented by formula (2b) as the component (A-2b).

In formula (2b), $M^{2b}$ of the metallocene compound represents Ti, Zr or Hf, preferably represents Zr or Hf, more preferably represents Zr.

Each of $X^{11b}$ and $X^{12b}$ specifically includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a methoxymethyl group, an ethoxymethyl group, an n-propoxymethyl group, an i-propoxymethyl group, an n-butoxymethyl group, an i-butoxymethyl group, a tert-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, an ethoxy group, an n-propoxy group, an i-propoxy group, an n-butoxy group, an i-butoxy group, a tert-butoxy group, a phenoxy group, a dimethylamino group, a diethylamino group, a di-n-propylamino group, a di-i-propylamino group, a di-n-butylamino group, a di-i-butylamino group, a di-tert-butylamino group, and a diphenylamino group.

Specific preferred examples of $X^{11b}$ and $X^{12b}$, each independently, include a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Among these specific examples, a chlorine atom, a methyl group and a dimethylamino group are more preferred.

$Q^{11b}$ represents a carbon atom, a silicon atom or a germanium atom and is preferably a carbon atom or a silicon atom.

Each $R^{11b}$ independently includes, for example, a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, and a phenyl group. In the case where $R^{11b}$ forms a ring together with $Q^{11b}$, examples include a cyclobutylidene group, a cyclopentylidene group, a cyclohexylidene group, a silacyclobutyl group, a silacyclopentyl group, and a silacyclohexyl group.

When $Q^{11b}$ is a carbon atom, specific preferred examples of $R^{11b}$ include a hydrogen atom, a methyl group, an ethyl group, a phenyl group and a cyclobutylidene group, and when $Q^{11b}$ is a silicon atom, specific preferred examples include a methyl group, an ethyl group, a phenyl group and a silacyclobutyl group.

Each of $R^{12b}$, $R^{14b}$ and $R^{15b}$ specifically includes an element or a group selected from, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group, provided that at least one member thereof is not a hydrogen atom; specifically, each is preferably an element or a group selected from a hydrogen atom, a methyl group, an ethyl group, an n-propyl group, an i-propyl group, an n-butyl group, an i-butyl group, a tert-butyl group, an n-pentyl group, an n-hexyl group, a cyclohexyl group, a phenyl group, a trimethylsilyl group, a furyl group, a 2-methylfuryl group and a 2-(trimethyl)silyl group, provided that at least one member thereof is not a hydrogen atom; and specifically, each is more preferably an element or a group selected from a hydrogen atom, a methyl group, an n-butyl group, a tert-butyl group, a phenyl group, a trimethylsilyl group, a 2-methylfuryl group and a 2-(trimethyl)silylfuryl group, provided that at least one member thereof is not a hydrogen atom. The member that is not a hydrogen atom is preferably at least one member out of $R^{12b}$ located on the 2-position of the cyclopentadienyl ring, $R^{14b}$ located on the same 2-position and two $R^{15b}$; the member that is not a hydrogen atom is more preferably at least one member out of $R^{12b}$ located on the 2-position of the cyclopentadienyl ring and two $R^{15b}$; and the member that is not a hydrogen atom is still more preferably at least one member out of $R^{12b}$ located on the 2-position of the cyclopentadienyl ring and $R^{15b}$ located on the same 2-position.

Each $R^{13b}$ independently includes, for example, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group; preferably, each is independently a methyl group, an ethyl group, an n-propyl group, an i-propyl group, an n-butyl group, an i-butyl group, a tert-butyl group, an n-pentyl group, an n-hexyl group, a cyclohexyl group, a phenyl group, a trimethylsilyl group, a furyl group, a 2-methylfuryl group or a 2-(trimethyl)silyl group; and more preferably, each is independently an element or a group selected from a methyl group, an n-butyl group, a tert-butyl group, a phenyl group, a trimethylsilyl group, a 2-methylfuryl group and a 2-(trimethyl)silylfuryl group.

In formula (2b), adjacent $R^{12b}$ and $R^{12b}$ may form a condensed cyclopentadienyl structure of the partial structure (I) to (VI) described in the component (A-1b), preferably a condensed cyclopentadienyl structure of (I), (III) or (VI), together with the carbon atom on the cyclopentadienyl ring, to which those members are bonded, but in this case, the ring structure above is not formed between adjacent $R^{13b}$ and $R^{13b}$ and between adjacent $R^{12b}$ and $R^{13b}$. Similarly, adjacent $R^{13b}$ and $R^{13b}$ may form a condensed cyclopentadienyl structure of (I) to (VI), preferably a condensed cyclopentadienyl structure of (I), (III) or (VI), but in this case, the ring structure above is not formed between adjacent $R^{2b}$ and $R^{12b}$ and between adjacent $R^{12b}$ and $R^{13b}$. Also, similarly, adjacent $R^{12b}$ and $R^{13b}$ may form a condensed cyclopentadienyl structure of (I) to (VI), preferably a condensed cyclopentadienyl structure of (I), (III) or (VI), but in this case, the ring structure above is not formed between adjacent $R^{12b}$ and $R^{12b}$ and between adjacent $R^{13b}$ and $R^{13b}$ Furthermore, in formula (2b), adjacent $R^{14b}$ and $R^{14b}$ may form a condensed cyclopentadienyl structure of (I) to (VI), preferably a condensed cyclopentadienyl structure of (I), (III) or (VI), but in this case, the ring structure above is not formed between adjacent $R^{15b}$ and $R^{15b}$ and between adjacent $R^{14b}$ and $R^{15b}$. Similarly, adjacent $R^{15b}$ and $R^{15b}$ may form a condensed cyclopentadienyl structure of (I) to (VI), preferably a condensed cyclopentadienyl structure of (I), (III) or (VI), but in this case, the ring structure above is not formed between adjacent $R^{14b}$ and $R^{14b}$ and between adjacent $R^{14b}$ and $R^{15b}$. Also, similarly, adjacent $R^{14b}$ and $R^{15b}$ may form a condensed cyclopentadienyl structure of (I) to (VI), preferably a condensed cyclopentadienyl structure of (I), (III) or (VI), but in this case, the ring structure above is not formed between adjacent $R^{14b}$ and $R^{14b}$ and between adjacent $R^{15b}$ and $R^{15b}$ As the olefin polymerization catalyst component according to the present invention, the metallocene compound of the component (A-2b) is preferably a compound represented by the following formula (6b):

[Chem. 19]

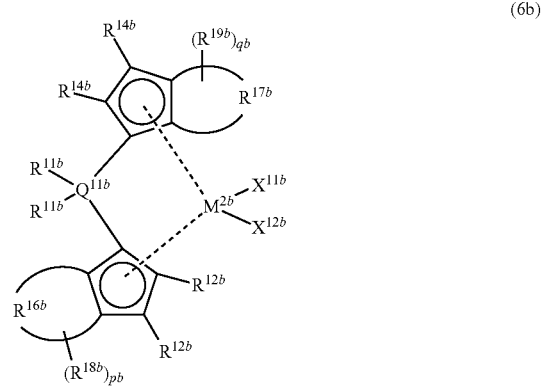

(6b)

[in formula (6b), $M^{2b}$ represents any one transition metal of Ti, Zr and Hf; each of $X^{11b}$ and $X^{12b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{11b}$ represents a carbon atom, a silicon atom or a germanium atom; each $R^{11b}$ independently represents a hydrogen atom or a hydrocarbon group having a carbon number of 1 to 10 and two $R^{11b}$ may combine with each other to form a ring together with $Q^{11b}$ each of $R^{12b}$ and $R^{14b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40, provided that $R^{12b}$ and $R^{14b}$ do not form a ring together with the carbon atoms to which these members are bonded; each of $R^{16b}$ and $R^{17b}$ independently represents a saturated or unsaturated divalent hydrocarbon group having a carbon number of 4 or 5 for forming a condensed ring with the 5-membered ring to which $R^{16b}$ or $R^{17b}$ is bonded; each of $R^{18b}$ and $R^{19b}$ is an atom or a group bonded to a carbon atom of $R^{16b}$ or $R^{17b}$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40; each of $p^b$ and $q^b$ independently represents an integer of 0 to 10 and when each of $p^b$ and $q^b$ is 2 or more, at least two $R^{18b}$ or at least two $R^{19b}$ may form a ring together with the carbon atoms to which these members are bonded].

In formula (6b), detailed definitions of $M^{2b}$, $X^{11b}$, $X^{12b}$, $Q^{11b}$ and $R^{11b}$ follow the definitions in the description of formula (2b) above.

In formula (6b), each of $R^{12b}$ and $R^{14b}$ specifically includes an element or a group selected from, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group; specifically, each is preferably an element or a group selected from a hydrogen atom, a methyl group, an ethyl group, an n-propyl group, an i-propyl group, an n-butyl group, an i-butyl group, a tert-butyl group, an n-pentyl group, an n-hexyl group, a cyclohexyl group, a phenyl group, a trimethylsilyl group, a furyl group, a 2-methylfuryl group and a 2-(trimethyl)silyl group; and specifically, each is more preferably an element or a group selected from a hydrogen atom, a methyl group, an n-butyl group, a tert-butyl group, a phenyl group, a trimethylsilyl group, a 2-methylfuryl group and a 2-(trimethyl)silylfuryl group. Also, at least one member out of $R^{12b}$ located on the 2-position of the cyclopentadienyl ring and $R^{14b}$ located on the same 2-position is more preferably a group selected from a methyl group, an ethyl group, an n-propyl group, an i-propyl group, an n-butyl group, an i-butyl group, a tert-butyl group, an n-pentyl group, an n-hexyl group, a cyclohexyl group, a phenyl group, a trimethylsilyl group, a furyl group, a 2-methylfuryl group and a 2-(trimethyl)silylfuryl group, still more preferably a group selected from a methyl group, an n-butyl group, a tert-butyl group, a phenyl group, a trimethylsilyl group, a 2-methylfuryl group and a 2-(trimethyl)silylfuryl group.

Specific examples of the condensed cyclopentadienyl structure formed by $R^{16b}$ and a cyclopentadienyl moiety to which $R^{16b}$ is bonded, include the partial structures (I) to (VI). Among these specific examples, (I), (III) and (VI) are preferred. Also, $R^{18b}$ may be substituted on these partial structures (I) to (VI).

The substituent $R^{18b}$ includes, in addition to a hydrogen atom, for example, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 4-tert-butylphenyl group, a 3,5-dimethylphenyl group, a 3,5-di-tert-butylphenyl group, a naphthyl group, an anthracenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 2,6-dichloro-4-trimethylsilylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group. $R^{8b}$ may form a ring together with the carbon atom to which $R^{18b}$ is bonded.

In formula (6b), each of $R^{17b}$ and $R^{19b}$ is also independently defined, similarly to $R^{16b}$ and $R^{18b}$.

As the olefin polymerization catalyst component according to the present invention, the metallocene compound of the component (A-2b) is also preferably a compound represented by the following formula (7b):

[Chem. 20]

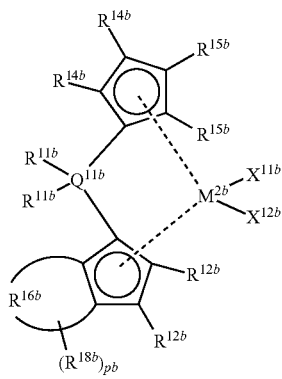

(7b)

[in formula (7b), $M^{2b}$ represents any one transition metal of Ti, Zr and Hf; each of $X^{11b}$ and $X^{12b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{11b}$ represents a carbon atom, a silicon atom or a germanium atom; each $R^{11b}$ independently represents a hydrogen atom or a hydrocarbon group having a carbon number of 1 to 10 and two $R^{11b}$ may combine with each other to form a ring together with $Q^{11b}$; each of $R^{12b}$, $R^{14b}$ and $R^{15b}$ independently represents an atom or a group selected from a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, and a silyl group substituted with a hydrocarbon group having a carbon number of 1 to 40, provided that at least one of $R^{12b}$, $R^{14b}$ and $R^{15b}$ located on the 2-position and 5-position of both cyclopentadienyl rings is not a hydrogen atom and $R^{12b}$, $R^{14b}$ and $R^{15b}$ do not form a ring together with the carbon atoms to which these members are bonded; $R^{16b}$ represents a saturated or unsaturated divalent hydrocarbon group having a carbon number of 4 or 5 for forming a condensed ring with the 5-membered ring to which $R^{16b}$ is bonded; $R^{18b}$ is an atom or a group bonded to a carbon atom of $R^{16b}$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40; $p^b$ represents an integer of 0 to 10 and when $p^b$ is 2 or more, at least two $R^{18b}$ may form a ring together with the carbon atoms to which these members are bonded].

In formula (7b), detailed definitions of $M^{2b}$, $X^{11b}$, $X^{12b}$, $Q^{11b}$, $R^{11b}$, $R^{16b}$ and $R^{18b}$ follow the definitions in the description of formula (6b) above.

In formula (7b), each of $R^{12b}$, $R^{14b}$ and $R^{15b}$ specifically includes an element or a group selected from, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, a phenyldimethylsilyl group, a furyl group, a tetrahydrofuryl group, a 2-methylfuryl group, and a 2-(trimethyl)silylfuryl group, provided that at least one of $R^{12b}$, $R^{14b}$ and $R^{15b}$ located on the 2-position and 5-position of both cyclopentadienyl rings is not a hydrogen atom; specifically, each is preferably an element or a group selected from a hydrogen atom, a methyl group, an ethyl group, an n-propyl group, an i-propyl group, an n-butyl group, an i-butyl group, a tert-butyl group, an n-pentyl group, an n-hexyl group, a cyclohexyl group, a phenyl group, a trimethylsilyl group, a furyl group, a 2-methylfuryl group and a 2-(trimethyl)silyl group, provided that at least one of $R^{12b}$, $R^{14b}$ and $R^{15b}$ located on the 2-position and 5-position of both cyclopentadienyl rings is not a hydrogen atom; and specifically, each is more preferably an element or a group selected from a hydrogen atom, a methyl group, an n-butyl group, a tert-butyl group, a phenyl group, a trimethylsilyl group, a 2-methylfuryl group and a 2-(trimethyl)silylfuryl group, provided that at least one of $R^{12b}$, $R^{14b}$ and $R^{15b}$ located on the 2-position and 5-position of both cyclopentadienyl rings is not a hydrogen atom. In formula (7b), $R^{12b}$ located on the 2-position of the cyclopentadienyl ring is more preferably an atom or a group selected from a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, and a silyl group substituted with a hydrocarbon group having a carbon number of 1 to 40; still more preferably a group selected from a methyl group, an ethyl group, an n-propyl group, an i-propyl group, an n-butyl group, an i-butyl group, a tert-butyl group, an n-pentyl group, an n-hexyl group, a cyclohexyl group, a phenyl group, a trimethylsilyl group, a furyl group, a 2-methylfuryl group and a 2-(trimethyl)silylfuryl group; and most preferably a group selected from a methyl group, an n-butyl group, a tert-butyl group, a phenyl group, a trimethylsilyl group, a 2-methylfuryl group and a 2-(trimethyl)silylfuryl group. In formula (7b), $R^{12b}$, $R^{14b}$ and $R^{15b}$ do not form a ring together with the carbon atoms to which these members are bonded.

As the olefin polymerization catalyst component according to the present invention, the metallocene compound of the component (A-2b) is more preferably a compound represented by the following formula (8b):

[Chem. 21]

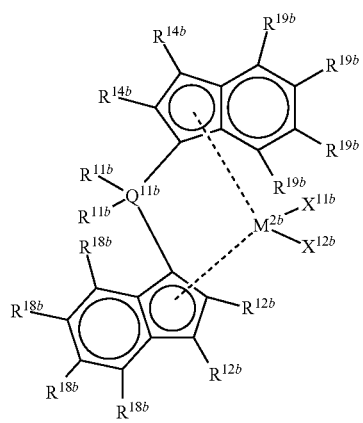

(8b)

[in formula (8b), $M^{2b}$ represents any one transition metal of Ti, Zr and Hf; each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{11b}$ represents a carbon atom, a silicon atom or a germanium atom; each $R^{11b}$ independently represents a hydrogen atom or a hydrocarbon group having a carbon number of 1 to 10 and two $R^{1b}$ may combine with each other to form a ring together with $Q^{11b}$; each of $R^{12b}$, $R^{14b}$, $R^{18b}$ and $R^{19b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40, provided that $R^{12b}$ and $R^{14b}$ do not form a ring together with the carbon atoms to which these members are bonded; and $R^{18b}$ and $R^{19b}$ may form a ring together with the carbon atoms to which these members are bonded].

In formula (8b), detailed definitions of $M^{2b}$, $X^{11b}$, $X^{12b}$, $Q^{11b}$, $R^{11b}$, $R^{12b}$, $R^{14b}$, $R^{18b}$ and $R^{19b}$ follow the definitions in the description of formula (6b) above.

As the olefin polymerization catalyst component according to the present invention, the metallocene compound of the component (A-2b) is also more preferably a compound represented by the following formula (9b):

[Chem. 22]

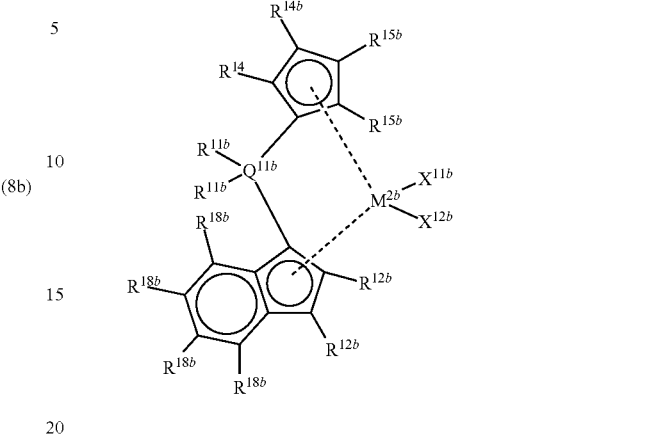

(9b)

[in formula (9b), $M^{2b}$ represents any one transition metal of Ti, Zr and Hf; each of $X^{11b}$ and $X^{12b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; $Q^{11b}$ represents a carbon atom, a silicon atom or a germanium atom; each $R^{11b}$ independently represents a hydrogen atom or a hydrocarbon group having a carbon number of 1 to 10 and two $R^{11b}$ may combine with each other to form a ring together with $Q^{11b}$; each of $R^{12b}$, $R^{14b}$ and $R^{15b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40, provided that at least one of $R^{12b}$ located on the 2-position of the indenyl ring and $R^{14b}$ and $R^{15b}$ located on the 2-position and 5-position of the cyclopentadienyl ring is not a hydrogen atom and $R^{12b}$, $R^{14b}$ and $R^{15b}$ do not form a ring together with the carbon atoms to which these members are bonded; and $R^{18b}$ may form a ring together with the carbon atom to which $R^{18b}$ is bonded].

In formula (9b), detailed definitions of $M^{2b}$, $X^{11b}$, $X^{12b}$, $Q^{11b}$, $R^{11b}$, $R^{12b}$, $R^{14b}$, $R^{15b}$ and $R^{18b}$ follow the definitions in the description of formula (6b) above.

As the olefin polymerization catalyst component according to the present invention, the metallocene compound of the component (A-2b) is, out of the compounds represented by formulae (2b) and (6b) to (9b), preferably a compound where $R^{12b}$ as a substituent on the 2-position of the conjugated 5-membered ring is a halogen atom, an alkyl group having a carbon number of 1 to 6, an alkoxy group having a carbon number of 1 to 6, a phenoxy group having a carbon number of 6 to 12, an alkenyl group having a carbon number of 2 to 8, a halogen-containing alkyl group having a carbon number of 1 to 6, an aryl group having a carbon number of 6 to 18, a halogen-containing aryl group having a carbon number of 6 to 18, an alkyl group having a carbon number of 1 to 3 and containing a trialkylsilyl group with the alkyl group having a carbon number of 1 to 3, a silyl group containing a hydrocarbon group having a carbon number of 1 to 6, an oxygen-containing heterocyclic group or a sulfur-containing heterocyclic group. Such a preferred substituent $R^{12b}$ on the 2-position specifically includes, for example, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group; specifically, is more preferably a methyl group, an ethyl group, an n-propyl group, an i-propyl group, an n-butyl group, an i-butyl group, a tert-butyl group, an n-pentyl group, an n-hexyl group, a cyclohexyl group, a phenyl group or a trimethylsilyl group; and specifically, is still more preferably a methyl group, an n-butyl group, a tert-butyl group, a phenyl group or a trimethylsilyl group.

Other specific examples of the chemical structure for the preferred substituent $R^{12b}$ on the 2-position include an oxygen-containing heterocyclic group and a sulfur-containing heterocyclic group, represented by the following formula (10b):

[Chem. 23]

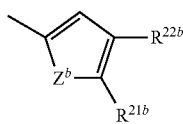

(10b)

In formula (10b), $R^{21b}$ and $R^{22b}$ may be the same as or different from each other and is a hydrogen atom, a halogen atom, an alkyl group having a carbon number of 1 to 6, an alkoxy group having a carbon number of 1 to 6, an alkenyl group having a carbon number of 2 to 8, a halogen-containing alkyl group having a carbon number of 1 to 6, an aryl group having a carbon number of 6 to 18, a halogen-containing aryl group having a carbon number of 6 to 18, an alkyl group having a carbon number of 1 to 3 and containing a trialkylsilyl group with the alkyl group having a carbon number of 1 to 3, or a silyl group containing a hydrocarbon group having a carbon number of 1 to 6. Both of $R^{21b}$ and $R^{22b}$ may together constitute a 6- or 7-membered ring, and the 6- or 7-membered ring may contain an unsaturated bond.

Here, specific examples of the alkyl group having a carbon number of 1 to 6 include a methyl group, an ethyl group, an n-propyl group, an i-propyl group, an n-butyl group, an i-butyl group, a s-butyl group, a tert-butyl group, an n-pentyl group, an n-hexyl group, a cyclopropyl group, a cyclopentyl group, and a cyclohexyl group.

Specific examples of the alkoxy group having a carbon number of 1 to 6 include a methoxy group, an ethoxy group, an n-propoxy group, an i-propoxy group, an n-butoxy group, an i-butoxy group, a tert-butoxy group, and a phenoxy group. The halogen atom includes a chlorine atom, a bromine atom, an iodine atom, and a fluorine atom. Specific examples of the alkenyl group having a carbon number of 2 to 8 include a vinyl group, a propenyl group, an allyl group, a butenyl group, and a cyclohexenyl group. Furthermore, the halogen atom in the halogen-containing alkyl group having a carbon number of 1 to 6 includes a fluorine atom, a chlorine atom, a bromine atom, and an iodine atom. The halogen-containing alkyl group having a carbon number of 1 to 6 is a group where a hydrogen atom on the skeleton of an alkyl group having a carbon number of 1 to 6 is substituted for by a halogen atom, and specific examples thereof include fluoromethyl, difluoromethyl, trifluoromethyl chloromethyl, dichloromethyl, trichloromethyl, bromomethyl, dibromomethyl, tribromomethyl, iodomethyl, 2,2,2-trifluoroethyl, 2,2,1,1-tetrafluoroethyl, pentafluoroethyl, pentachloroethyl, pentafluoropropyl, nonafluorobutyl, 5-chloropentyl, 5,5,5-trichloropentyl, 5-fluoropentyl, 5,5,5-trifluoropentyl, 6-chlorohexyl, 6,6,6-trichlorohexyl, 6-fluorohexyl, and 6,6,6-trifluorohexyl. The aryl group having a carbon number of 6 to 18 may be substituted with a hydrocarbon group having a carbon number of 1 to 6, and specific examples include phenyl, tolyl, dimethylphenyl, ethylphenyl, trimethylphenyl, tert-butylphenyl, biphenyl, 1-naphthyl, 2-naphthyl, acenaphthyl, phenanthryl, and anthryl. Specific examples of the halogen-containing aryl group having a carbon number of 6 to 18 are those where a hydrogen atom of the above-described aryl group having a carbon number of 6 to 18 is substituted for by a halogen atom, and specific examples include a 2-, 3- or 4-substituted fluorophenyl, a 2-, 3- or 4-substituted chlorophenyl, a 2-, 3- or 4-substituted bromophenyl, a 2,4-, 2,5-, 2,6- or 3,5-substituted difluorophenyl, a 2,4-, 2,5-, 2,6- or 3,5-substituted dichlorophenyl, a 2,4,6-, 2,3,4-, 2,4,5- or 3,4,5-substituted trifluorophenyl, a 2,4,6-, 2,3,4-, 2,4,5- or 3,4,5-substituted trichlorophenyl, pentafluorophenyl, pentachlorophenyl, 3,5-dimethyl-4-chlorophenyl, and 3,5-dichloro-4-biphenyl. The alkyl group having a carbon number of 1 to 3 and containing a trialkylsilyl group with the alkyl group having a carbon number of 1 to 3 is a group where a hydrogen atom of an alkyl group having a carbon number of 1 to 3 is substituted for by a trialkylsilyl group containing an alkyl group having a carbon number of 1 to 3, which may be different, and specific examples thereof include a trimethylsilylmethyl and a trimethylsilylethyl. The silyl group containing a hydrocarbon group having a carbon number of 1 to 6 is a substituent where three hydrocarbon group having a carbon number of 1 to 6, which may be different, are substituted on silicon. The hydrocarbon having a carbon number of 1 to 6 includes an alkyl group having a carbon number of 1 to 6, alkoxy group having a carbon number of 1 to 6, an alkenyl group having a carbon number of 2 to 8, a halogen-containing alkyl group having a carbon number of 1 to 6, and a phenyl group, which are described above, and a substituent may be substituted on the phenyl group. The silyl group containing a hydrocarbon group specifically includes trimethylsilyl, triethylsilyl, tri-n-butylsilyl, tert-butyldimethylsilyl, trivinylsilyl, triallylsilyl, and triphenylsilyl.

Each of $R^{21b}$ and $R^{22b}$ is independently, preferably hydrogen atom, a halogen atom, an alkyl group having a carbon number of 1 to 6, an aryl group having a carbon number of 6 to 18, or a silyl group containing a hydrocarbon group having a carbon number of 1 to 6. In the case where $R^{21b}$ is a hydrogen atom, the synthesis yield is low, and $R^{21b}$ is preferably a substituent except for a hydrogen atom. $R^{21b}$ is more preferably an alkyl group having a carbon number of 1 to 6, an aryl group having a carbon number of 6 to 18, or a silyl group containing a hydrocarbon group having a carbon number of 1 to 6. $R^{22b}$ is more preferably a hydrogen atom or an alkyl group having a carbon number of 1 to 6. As for specific preferred substituents, $R^{21b}$ is a methyl group, an ethyl group, a tert-butyl group, a cyclohexyl group, a phenyl group, a trimethylsilyl group or a triphenylsilyl group, and $R^{22b}$ is a hydrogen atom, a methyl group or an ethyl group.

Both of $R^{21b}$ and $R^{22b}$ may together constitute a 6- or 7-membered ring, and the 6- or 7-membered ring may contain an unsaturated bond. As for specific substitution, the substituent on the 2-position of the indene ring includes a benzofuryl group and a benzothienyl group.

In the olefin polymerization catalyst component of the present invention, specific examples of the metallocene compound as the component (A-2b) of the olefin polymerization catalyst component are recited below, but the present invention is not limited thereto.

(i) Examples include: metallocene compounds classified into the bridged $Cp_2Zr$ type; out of compounds recited in the above-described literatures such as JP-A-2-76887, JP-A-3-12406, JP-A-3-12407, JP-A-3-12407, JP-A-11-315089, JP-A-2009-143901 and JP-T-2005-507961, bridged bis(alkyl-substituted cyclopentadienyl)zirconium compounds belonging to formula (2b); and out of zirconium compounds having a cyclopentadienyl ring substituted, for example, with an oxygen-containing hydrocarbon group, a sulfur-containing hydrocarbon group or a hydrocarbon group-substituted silyl group described in JP-T-2002-535339 and the like and belonging to formula (2b), bridged bis(alkyl-substituted cyclopentadienyl)zirconium compounds belonging to formula (2b).

Metallocene compounds classified into the bridged $Cp_2Zr$ type are shown in Table b-9 and Table b-10.

TABLE b-9

(i) Bridged Cp2Zr Type

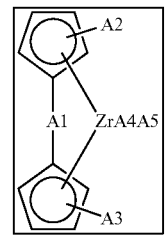

| No. | A1 | A2 | A3 | A4 | A5 | | | |
|---|---|---|---|---|---|---|---|---|
| 142b | Me2Si | 2,3-Me2 | 2-Me | Cl | Cl | A | B | C |
| 143b | Me2Si | 2,3-Me2 | 3-Me | Cl | Cl |   | B |   |
| 144b | Me2Si | 2,3-Me2 | 4-Me | Cl | Cl |   | B |   |
| 145b | Me2Si | 2,3-Me2 | 5-Me | Cl | Cl |   | B | C |
| 146b | Me2Si | 2,3-Me2 | 2-Et | Cl | Cl |   | B | C |
| 147b | Me2Si | 2,3-Me2 | 3-Et | Cl | Cl |   | B |   |
| 148b | Me2Si | 2,3-Me2 | 2-iPr | Cl | Cl |   | B | C |
| 149b | Me2Si | 2,3-Me2 | 3-iPr | Cl | Cl |   | B |   |
| 150b | Me2Si | 2,3-Me2 | 2-nBu | Cl | Cl |   | B | C |
| 151b | Me2Si | 2,3-Me2 | 3-tBu | Cl | Cl |   | B |   |
| 152b | Me2Si | 2,3-Me2 | 3-Ph | Cl | Cl |   | B |   |
| 153b | Me2Si | 2,4,5-Me3 | — | Cl | Cl |   |   |   |
| 154b | Me2Si | 2-Et-4,5-Me2 | — | Cl | Cl |   |   |   |
| 155b | Me2Si | 2-Et-4-Bu-5-Me | — | Cl | Cl |   |   |   |
| 156b | Me2Si | 2,4,5-Me3 | 2-Me | Cl | Cl |   | B | C |
| 157b | Me2Si | 2-Et-4,5-Me2 | 3-tBu | Cl | Cl | A | B |   |
| 158b | Me2Si | 2,3,4,5-Me4 | — | Cl | Cl | A |   |   |
| 159b | Me2Si | 2,3,4,5-Me4 | 2-Me | Cl | Cl | A | B | C |
| 160b | Me2Si | 2,3-Me2 | 2,3-Me2 | Cl | Cl | A | B | C |
| 161b | Me2Si | 2,3,-Me2 | 2,3,-Me2 | Br | Br | A | B | C |
| 162b | Me2Si | 2,3-Me2 | 2,3-Me2 | Me | Me | A | B | C |
| 163b | Me2Si | 2,3,-Me2 | 2,3,-Me2 | Ph | Ph | A | B | C |
| 164b | Me2Si | 2,4,5-Me3 | 2,4,5-Me3 | Cl | Cl | A | B | C |
| 165b | Me2Si | 2-Et-4,5-Me2 | 2-Et-4,5-Me2 | Cl | Cl | A | B | C |

TABLE b-10

(i) Bridged Cp2Zr Type (continued)

| No. | A1 | A2 | A3 | A4 | A5 | | | |
|---|---|---|---|---|---|---|---|---|
| 166b | Me2Si | 2-Et-4-Bu-5-Me | 2-Et-4-Bu-5-Me | Cl | Cl | A | B | C |
| 167b | Me2Si | 2,3,4-Me3 | 2,3,4-Me3 | Cl | Cl | A | B | C |
| 168b | Me2Si | 2-Et-3,5-Me2 | 2-Et-3,5-Me2 | Cl | Cl | A | B | C |
| 169b | Me2Si | 2,3,4,5-Me4 | 2,3,4,5-Me4 | Cl | Cl | A | B | C |
| 170b | Me2Si | 2,3,5-Me3 | 2,3,5-Me3 | Cl | Cl | A | B | C |
| 171b | Me2Si | TMS | 2-Ind | Cl | Cl | A | B |   |
| 172b | Me2Si | 1-Ind | 2-Ind | Cl | Cl | A | B |   |
| 173b | Me2Si | 3-(2-furyl)-2,5-dimethyl | 3-(2-furyl)-2,5-dimethyl | Cl | Cl | A | B | C |
| 174b | Me2Si | 2-(2-furyl)-3,5-dimethyl | 2-(2-furyl)-3,5-dimethyl | Cl | Cl | A | B | C |
| 175b | Me2Si | 2-(2-furyl)-4,5-dimethyl | 2-(2-furyl)-4,5-dimethyl | Cl | Cl | A | B | C |
| 176b | Me2Si | 3-(2-thienyl)-2,5-dimethyl | 3-(2-thienyl)-2,5-dimethyl | Cl | Cl | A | B | C |
| 177b | Me2Si | 2-(2-thienyl)-4,5-dimethyl | 2-(2-thienyl)-4,5-dimethyl | Cl | Cl | A | B | C |
| 178b | Me2Si | 2-(5-methyl-2-furyl)-4,5-dimethyl | 2-(5-methyl-2-furyl)-4,5-dimethyl | Cl | Cl | A | B | C |
| 179b | Me2Si | 2-(5-tert-butyl-2-furyl)-4,5-dimethyl | 2-(5-tert-butyl-2-furyl)-4,5-dimethyl | Cl | Cl | A | B | C |
| 180b | Me2Si | 2-(5-trimethyl-silyl-2-furyl)-4,5-dimethyl | 2-(5-trimethyl-silyl-2-furyl)-4,5-dimethyl | Cl | Cl | A | B | C |
| 181b | Me2Si | 2-(4,5-dimethyl-2-furyl)-4,5-dimethyl | 2-(4,5-dimethyl-2-furyl)-4,5-dimethyl | Cl | Cl | A | B | C |
| 182b | Me2Si | 2-(2-benzofuryl)-4,5-dimethyl | 2-(2-benzofuryl)-4,5-dimethyl | Cl | Cl | A | B | C |
| 183b | Me2C | 2-(2-furyl)-3-methyl | 2-(2-furyl)-3-methyl | Cl | Cl | A | B | C |
| 184b | Me2C | 2-(2-furyl)-3,5-dimethyl | 2-(2-furyl)-3,5-dimethyl | Cl | Cl |   | B | C |
| 185b | Me2C | 2-(2-furyl)-4-ethyl-5-methyl | 2-(2-furyl)-4-ethyl-5-methyl | Cl | Cl |   | B | C |
| 186b | Me2C | 2-(2-furyl)-4-isopropyl-5-methyl | 2-(2-furyl)-4-isopropyl-5-methyl | Cl | Cl |   | B | C |
| 187b | Me2C | 2-(2-furyl)-4-tert-butyl-5-methyl | 2-(2-furyl)-4-tert-butyl-5-methyl | Cl | Cl |   | B | C |
| 188b | Me2C | 2-(2-furyl)-4-phenyl-5-methyl | 2-(2-furyl)-4-phenyl-5-methyl | Cl | Cl |   | B | C |

(ii) Examples include metallocene compounds classified into the bridged Ind₂Zr type; out of compounds recited in the above-described literatures such as JP-A-8-59724, JP-A-10-231314, JP-A-2003-105029 and JP-A-2004-352707, bridged bis(substituted or unsubstituted indenyl)zirconium compounds, bridged bis(substituted or unsubstituted azulenyl)zirconium compounds and bridged (substituted or unsubstituted indenyl)(substituted or unsubstituted azulenyl) zirconium compounds belonging to formula (6b) and formula (8b); and out of compounds recited in the above-described literatures such as JP-T-2002-535339 and JP-A-2004-352707, zirconium compounds having an indenyl or azulenyl ring substituted, for example, with an oxygen-containing hydrocarbon group, a sulfur-containing hydrocarbon group or a hydrocarbon group-substituted silyl group and belonging to formula (6b) and formula (8b).

Metallocene compounds classified into the bridged Ind₂Zr type are shown in Table b-11 and Table b-12.

TABLE b-11

(ii) Bridged Ind2Zr Type

| No. | A1 | A2 | A3 | A4 | | | |
|---|---|---|---|---|---|---|---|
| 189b | Me2Si | Ind | Ind | Cl | A | B | |
| 190b | Me2Si | Ind | Ind | Me | A | B | |
| 191b | Me2Si | Ind | Ind | Ph | A | B | |
| 192b | Me2C | Ind | Ind | Cl | | B | |
| 193b | Me2Si | H4Ind | H4Ind | Cl | A | B | |
| 194b | PhMeSi | H4Ind | H4Ind | Cl | A | B | |
| 195b | Me2Si | 2,4,4-Me3—H4Ind | 2,4,4-Me3—H4Azu | Cl | A | B | C |
| 196b | Me2Si | 2-Me—Ind | 2-Me—Ind | Cl | A | B | C |
| 197b | Me2Si | 2,4-Me2—Ind | 2,4-Me2—Ind | Cl | A | B | C |
| 198b | Me2Si | 2-Me-4-Ph—Ind | 2-Me-4-Ph—Ind | Cl | A | B | C |
| 199b | Me2Si | 2-Me-4,5-BenInd | 2-Me-4,5-BenInd | Cl | A | B | C |
| 200b | Me2Si | 2,4-Me2—H6Azu | 2,4-Me2—H6Azu | Cl | A | B | C |
| 201b | Me2Si | 2,4-Me2—H4Ind | 2,4-Me2—H4Ind | Cl | A | B | C |
| 202b | Me2C | 2-Me-4-(4-BiPh)—Azu | 2-Me-4-(4-BiPh)—Azu | Cl | | B | C |
| 203b | Me2Si | 2-Me-4-Ph—Ind | 2,4-Ph2—Ind | Cl | A | B | C |
| 204b | Me2Si | 2-Me-4-Ph—Ind | 2-iPr-4-Ph | Cl | A | B | C |
| 205b | Me2Si | 2-Me-4-(p-tBu—Ph)—Ind | 2-iPr-4-(p-tBu—Ph)—Ind | Cl | A | B | C |
| 206b | Me2Si | 2-(2-furyl)-indenyl | 2-(2-furyl)-indenyl | Cl | A | B | C |
| 207b | Me2Ge | 2-(2-furyl)-indenyl | 2-(2-furyl)-indenyl | Cl | | | |
| 208b | Me2Si | 2-(2-thienyl)-indenyl | 2-(2-thienyl)-indenyl | Cl | A | B | C |
| 209b | H2C | (2-(2-furyl)-indenyl) | (2-(2-furyl)-indenyl) | Cl | | B | C |
| 210b | Me2C | 2-(2-furyl)-indenyl | 2-(2-furyl)-indenyl | Cl | | B | C |
| 211b | Me2Si | 2-(2-furyl)-4,5,6,7-tetrahydroindenyl | 2-(2-furyl)-4,5,6,7-tetrahydroindenyl | Cl | A | B | C |
| 212b | Me2C | 2-(2-furyl)-7-methyl-indenyl | 2-(2-furyl)-7-methyl-indenyl | Cl | | B | C |
| 213b | Me2C | 2-(2-furyl)-4-methyl-indenyl | 2-(2-furyl)-4-methyl-indenyl | Cl | | B | C |
| 214b | Me2C | 2-(2-furyl)-3-methyl-indenyl | 2-(2-furyl)-3-methyl-indenyl | Cl | | B | C |
| 215b | Me2C | 2-(2-furyl)-3,7-dimethyl-indenyl | 2-(2-furyl)-3,7-dimethyl-indenyl | Cl | | B | C |
| 216b | Me2C | 2-(2-furyl)-4-chloro-indenyl | 2-(2-furyl)-4-chloro-indenyl | Cl | | B | C |
| 217b | Me2C | 2-(2-furyl)-4-phenyl-indenyl | 2-(2-furyl)-4-phenyl-indenyl | Cl | A | B | C |

TABLE b-12

(ii) Bridged Ind2Zr Type (continued)

| No. | A1 | A2 | A3 | A4 | | | |
|---|---|---|---|---|---|---|---|
| 218b | Me2C | 2-(2-furyl)-4-methoxy-indenyl | 2-(2-furyl)-4-methoxy-indenyl | Cl | | B | C |
| 219b | Me2C | 2-(2-furyl)-4-phenoxy-indenyl | 2-(2-furyl)-4-phenoxy-indenyl | Cl | | B | C |
| 220b | Me2C | 2-(2-furyl)-4-trimethylsilyl-indenyl | 2-(2-furyl)-4-trimethylsilyl-indenyl | Cl | | B | C |
| 221b | Me2Si | 2-(2-furyl)-4-phenyl-indenyl | 2-(2-furyl)-4-phenyl-indenyl | Cl | | B | C |
| 222b | Me2Si | 2-(2-furyl)-4-phenyl-indenyl | 2-(2-furyl)-4-phenyl-indenyl | Me | A | B | C |
| 223b | Me2Si | 2-(2-thienyl)-4-phenyl-indenyl | 2-(2-thienyl)-4-phenyl-indenyl | Cl | A | B | C |
| 224b | Me2Si | 2-(3-furyl)-4-phenyl-indenyl | 2-(3-furyl)-4-phenyl-indenyl | Cl | A | B | C |
| 225b | Me2Si | 2-(3-methyl-2-furyl)-indenyl | 2-(3-methyl-2-furyl)-indenyl | Cl | A | B | C |
| 226b | Me2Si | 2-(3-methyl-2-furyl))-4-phenyl-indenyl | 2-(3-methyl-2-furyl))-4-phenyl-indenyl | Cl | A | B | C |
| 227b | Me2Si | 2-(2-furyl)-4-(4-isopropylphenyl)-indenyl | 2-(2-furyl)-4-(4-isopropylphenyl)-indenyl | Cl | A | B | C |
| 228b | Me2Si | 2-(2-furyl)-4,7-diphenyl-indenyl | 2-(2-furyl)-4,7-diphenyl-indenyl | Cl | A | B | C |
| 229b | Me2Si | 2-(2-furyl)-4-phenyl-7-methyl-indenyl | 2-(2-furyl)-4-phenyl-7-methyl-indenyl | Cl | A | B | C |
| 230b | Me2Si | 2-(2-furyl)-4-chloro-indenyl | 2-(2-furyl)-4-chloro-indenyl | Cl | A | B | C |

TABLE b-12-continued (ii) Bridged Ind2Zr Type (continued)

| No. | A1 | A2 | A3 | A4 | | | |
|---|---|---|---|---|---|---|---|
| 231b | Me2Si | 2-(2-furyl)-4-phenyl-indenyl | 2-(2-furyl)-4-phenyl-indenyl | Cl | A | B | C |
| 232b | Me2Si | 2-(2-furyl)-4-methoxy-indenyl | 2-(2-furyl)-4-methoxy-indenyl | Cl | A | B | C |
| 233b | Me2Si | 2,4-di(2-furyl)-indenyl | 2,4-di(2-furyl)-indenyl | Cl | A | B | C |
| 234b | Me2Si | 2-(2-furyl)-4-(2-thienyl)-indenyl | 2-(2-furyl)-4-(2-thienyl)-indenyl | Cl | A | B | C |
| 235b | Me2Si | 2-(2-furyl)-4-(2-benzofuryl)-indenyl | 2-(2-furyl)-4-(2-benzofuryl)-indenyl | Cl | A | B | C |
| 236b | Me2Si | 2-(2-furyl)-benzoindenyl | 2-(2-furyl)-benzoindenyl | Cl | A | B | C |
| 237b | Me2Si | 2-(2-furyl)-5,9-diethyl-benzindenyl | 2-(2-furyl)-5,9-diethyl-benzindenyl | Cl | A | B | C |
| 238b | Me2Si | 2-(2-furyl)-azulenyl | 2-(2-furyl)-azulenyl | Cl | A | B | C |
| 239b | Me2Si | 2-(4,5-dimethyl-2-furyl))-azulenyl | 2-(4,5-dimethyl-2-furyl))-azulenyl | Cl | A | B | C |
| 240b | Me2Si | 2-(5-trimethylsilyl-2-furyl))-azulenyl | 2-(5-trimethylsilyl-2-furyl))-azulenyl | Cl | A | B | C |
| 241b | Me2Si | 2-(2-furyl)-4-phenyl-azulenyl | 2-(2-furyl)-4-phenyl-azulenyl | Cl | A | B | C |
| 242b | Me2Si | 2-methyl-4-phenyl-indenyl | 2-(2-(5-methyl)-furyl)-4-phenyl-indenyl | Cl | A | B | C |
| 243b | Me2Si | 2-methyl-4-phenyl-indenyl | 2-(2-(5-methyl)-furyl)-4-phenyl-indenyl | Cl | A | B | C |
| 244b | Me2Si | 2-methyl-4-(1-naphthyl)indenyl | 2-(2-(5-methylfuryl))-4-(1-naphthyl)indenyl | Cl | A | B | C |
| 245b | Me2Si | 2-methyl-4-phenylindenyl | 2-(2-(5-methylthienyl))-4-phenylindenyl | Cl | A | B | C |

(iii) Examples include metallocene compounds classified into the bridged CpIndZr type; and out of compounds recited in the above-described literatures such as JP-A-6-87922, JP-A-8-92308, JP-A-9-87314, JP-A-7-224079 and JP-A-2005-336092, zirconium compounds belonging to formula (7b) and formula (9b).

Metallocene compounds classified into the bridged CpIndZr type are shown in Table b-13 to Table b-20.

TABLE b-13

(iii) Bridged CpIndZr Type

| No. | A1 | A2 | A3 | A4 | | | |
|---|---|---|---|---|---|---|---|
| 246b | Me2C | 4-methyl-cyclopentadienyl | 3-methyl-indenyl | Cl | A | B | |
| 247b | Me2C | 4-tert-butyl-cyclopentadienyl | 3-methyl-indenyl | Cl | A | B | |
| 248b | Me2C | 4-tert-butyl-cyclopentadienyl | 3-tert-butyl-indenyl | Cl | A | B | |
| 249b | Me2Si | 4-methyl-cyclopentadienyl | 3-methyl-indenyl | Cl | A | B | |
| 250b | Me2Si | 4-tert-butyl-cyclopentadienyl | 3-methyl-indenyl | Cl | A | B | |
| 251b | Me2Si | 4-tert-butyl-cyclopentadienyl | 3-tert-butyl-indenyl | Cl | A | B | |
| 252b | Me2C | 4-methyl-cyclopentadienyl | 3-methyl-indenyl | Me | A | B | |
| 253b | Me2C | 4-tert-butyl-cyclopentadienyl | 3-methyl-indenyl | Me | A | B | |
| 254b | Me2C | 4-tert-butyl-cyclopentadienyl | 3-tert-butyl-indenyl | Me | A | B | |
| 255b | Me2C | 3-tert-butylcyclopentadienyl | 2-methylindenyl | Cl | A | B | C D |
| 256b | Me2Si | 2-methyl-4-phenyl-1-indenyl | 2,3,5-trimethyl-1-cyclopentadienyl | Cl | A | B | C D |
| 257b | Me2Si | 2-methyl-benz[e]indenyl | cyclopentadienyl | Cl | A | B | C D |
| 258b | Me2C | 2-methylindenyl | cyclopentadienyl | Cl | | B | C D |
| 259b | Me2Si | 2-methyl-benz[e]indenyl | 2-methylcyclopentadienyl | Cl | A | B | C D |
| 260b | Me2Si | 2,3,4,5-tetramethyl-cyclopentadienyl | 2-methyl-4-phenyl-4H-1-azulenyl | Cl | A | B | C D |
| 261b | Me2Si | 2,3,4,5-tetramethyl-cyclopentadienyl | 2-methyl-4-phenyl-5,6,7,8-tetrahydro-4H-1-azulenyl | Cl | A | B | C D |
| 262b | Me2Si | 2,3,4,5-tetramethyl-cyclopentadienyl | 2,4-dimethyl-4H-1-azulenyl | Cl | A | B | C D |
| 263b | Me2Si | 2,3,4,5-tetramethyl-cyclopentadienyl | 2,4-dimethyl-5,6,7,8-tetrahydro-4H-1-azulenyl | Cl | A | B | C D |
| 264b | Me2Si | 2,3,4,5-tetramethyl-cyclopentadienyl | 2-ethyl-4-phenyl-4H-1-azulenyl | Cl | A | B | C D |
| 265b | Me2Si | 2,3,4,5-tetramethyl-cyclopentadienyl | 2-ethyl-4-methyl-4H-1-azulenyl | Cl | A | B | C D |
| 266b | Me2Si | cyclopentadienyl | 2-(5-methyl-2-furyl)indenyl | Cl | | B | C D E |
| 267b | Me2Si | 3-methylcyclopentadienyl | 2-(5-methyl-2-furyl)indenyl | Cl | A | B | C D E |

TABLE b-13-continued (iii) Bridged CpIndZr Type

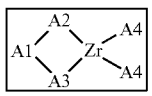

| No. | A1 | A2 | A3 | A4 | | | | |
|---|---|---|---|---|---|---|---|---|
| 268b | Me2Si | 3-ethylcyclopentadienyl | 2-(5-methyl-2-furyl)indenyl | Cl | A | B | C | D | E |
| 269b | Me2Si | 3-phenylcyclopentadienyl | 2-(5-methyl-2-furyl)indenyl | Cl | A | B | C | D | E |
| 270b | Me2Si | 3-tert-butylcyclopentadienyl | 2-(5-methyl-2-furyl)indenyl | Cl | A | B | C | D | E |
| 271b | Me2Si | 3-(trimethylsilyl)-cyclopentadienyl | 2-(5-methyl-2-furyl)indenyl | Cl | A | B | C | D | E |
| 272b | Me2Si | 2,4-dimethylcyclopentadienyl | 2-(5-methyl-2-furyl)indenyl | Cl | A | B | C | D | E |

TABLE b-14

(iii) Bridged CpIndZr Type (continued)

| No. | A1 | A2 | A3 | A4 | | | | |
|---|---|---|---|---|---|---|---|---|
| 273b | Me2Si | 2-methyl-4-phenyl-cyclopentadienyl) | 2-(5-methyl-2-furyl)indenyl | Cl | A | B | C | D | E |
| 274b | Me2Si | 2-methyl-4-(2-naphthyl)-cyclopentadienyl | 2-(5-methyl-2-furyl)indenyl | Cl | A | B | C | D | E |
| 275b | Me2Si | 2-methyl-4-tert-butyl-cyclopentadienyl | 2-(5-methyl-2-furyl)indenyl | Cl | A | B | C | D | E |
| 276b | Me2Si | 2-methyl-4-trimethyl-silylcyclopentadienyl | 2-(5-methyl-2-furyl)indenyl | Cl | A | B | C | D | E |
| 277b | Me2Si | 2-ethyl-4-i-propyl-cyclopentadienyl | 2-(5-methyl-2-furyl)indenyl | Cl | A | B | C | D | E |
| 278b | Me2Si | 2,3,5-trimethyl-cyclopentadienyl | 2-(5-methyl-2-furyl)indenyl | Cl | A | B | C | D | E |
| 279b | Me2Si | 2,5-dimethyl-3-tert-butyl-cyclopentadienyl | 2-(5-methyl-2-furyl)indenyl | Cl | A | B | C | D | E |
| 280b | Me2Si | 2,3,4,5-tetramethyl-cyclopentadienyl | 2-(5-methyl-2-furyl)indenyl | Cl | A | B | C | D | E |
| 281b | Me2Si | cyclopentadienyl | 2-(5-methyl-2-furyl)-4-phenylindenyl | Cl | A | B | C | D | E |
| 282b | Me2Si | 3-methylcyclopentadienyl | 2-(5-methyl-2-furyl)-4-phenylindenyl | Cl | A | B | C | D | E |
| 283b | Me2Si | 3-ethylcyclopentadienyl | 2-(5-methyl-2-furyl)-4-phenylindenyl | Cl | A | B | C | D | E |
| 284b | Me2Si | 3-phenylcyclopentadienyl | 2-(5-methyl-2-furyl)-4-phenylindenyl | Cl | A | B | C | D | E |
| 285b | Me2Si | 3-tert-butylcyclopentadienyl | 2-(5-methyl-2-furyl)-4-phenylindenyl | Cl | A | B | C | D | E |
| 286b | Me2Si | 3-(trimethylsilyl)-cyclopentadienyl | 2-(5-methyl-2-furyl)-4-phenylindenyl | Cl | A | B | C | D | E |
| 287b | Me2Si | 2,4-dimethylcyclopentadienyl | 2-(5-methyl-2-furyl)-4-phenylindenyl | Cl | A | B | C | D | E |
| 288b | Me2Si | 2-methyl-4-phenyl-cyclopentadienyl | 2-(5-methyl-2-furyl)-4-phenylindenyl | Cl | A | B | C | D | E |
| 289b | Me2Si | 2-methyl-4-(2-naphthyl)-cyclopentadienyl | 2-(5-methyl-2-furyl)-4-phenylindenyl | Cl | A | B | C | D | E |
| 290b | Me2Si | 2-methyl-4-tert-butyl-cyclopentadienyl | 2-(5-methyl-2-furyl)-4-phenylindenyl | Cl | A | B | C | D | E |
| 291b | Me2Si | 2-methyl-4-trimethylsilyl-cyclopentadienyl | 2-(5-methyl-2-furyl)-4-phenylindenyl | Cl | A | B | C | D | E |
| 292b | Me2Si | 2-ethyl-4-i-propyl-cyclopentadienyl | 2-(5-methyl-2-furyl)-4-phenylindenyl | Cl | A | B | C | D | E |
| 293b | Me2Si | 2,3,5-trimethyl-cyclopentadienyl | 2-(5-methyl-2-furyl)-4-phenylindenyl | Cl | A | B | C | D | E |
| 294b | Me2Si | 2,5-dimethyl-3-tert-butyl-cyclopentadienyl | 2-(5-methyl-2-furyl)-4-phenylindenyl | Cl | A | B | C | D | E |
| 295b | Me2Si | 2,3,4,5-tetramethyl-cyclopentadienyl | 2-(5-methyl-2-furyl)-4-phenylindenyl | Cl | A | B | C | D | E |

TABLE b-15

(iii) Bridged CpIndZr Type (continued)

| No. | A1 | A2 | A3 | A4 | | | | | |
|---|---|---|---|---|---|---|---|---|---|
| 296b | Me2Si | cyclopentadienyl | 2-(4,5-dimethyl-2-furyl)-4-phenylindenyl | Cl | A | B | C | D | E |
| 297b | Me2Si | 3-methylcyclopentadienyl | 2-(4,5-dimethyl-2-furyl)-4-phenylindenyl | Cl | A | B | C | D | E |
| 298b | Me2Si | 3-phenylcyclopentadienyl | 2-(4,5-dimethyl-2-furyl)-4-phenylindenyl | Cl | A | B | C | D | E |
| 299b | Me2Si | 3-tert-butylcyclopentadienyl | 2-(4,5-dimethyl-2-furyl)-4-phenylindenyl | Cl | A | B | C | D | E |
| 300b | Me2Si | 3-(trimethylsilyl)-cyclopentadienyl | 2-(4,5-dimethyl-2-furyl)-4-phenylindenyl | Cl | A | B | C | D | E |
| 301b | Me2Si | 2,4-dimethylcyclopentadienyl | 2-(4,5-dimethyl-2-furyl)-4-phenylindenyl | Cl | A | B | C | D | E |
| 302b | Me2Si | 2-methyl-4-phenyl-cyclopentadienyl | 2-(4,5-dimethyl-2-furyl)-4-phenylindenyl | Cl | A | B | C | D | E |
| 303b | Me2Si | 2-methyl-4-tert-butyl-cyclopentadienyl | 2-(4,5-dimethyl-2-furyl)-4-phenylindenyl | Cl | A | B | C | D | E |
| 304b | Me2Si | 2,3,5-trimethyl-cyclopentadienyl | 2-(4,5-dimethyl-2-furyl)-4-phenylindenyl | Cl | A | B | C | D | E |
| 305b | Me2Si | 2,3,4,5-tetramethyl-cyclopentadienyl | 2-(4,5-dimethyl-2-furyl)-4-phenylindenyl | Cl | A | B | C | D | E |
| 306b | Me2Si | cyclopentadienyl | 2-(5-tert-butyl-2-furyl)-4-phenylindenyl | Cl | A | B | C | D | E |
| 307b | Me2Si | 3-methylcyclopentadienyl | 2-(5-tert-butyl-2-furyl)-4-phenylindenyl | Cl | A | B | C | D | E |
| 308b | Me2Si | 3-phenylcyclopentadienyl | 2-(5-tert-butyl-2-furyl)-4-phenylindenyl | Cl | A | B | C | D | E |
| 309b | Me2Si | 3-tert-butylcyclopentadienyl | 2-(5-tert-butyl-2-furyl)-4-phenylindenyl | Cl | A | B | C | D | E |
| 310b | Me2Si | 3-(trimethylsilyl)-cyclopentadienyl | 2-(5-tert-butyl-2-furyl)-4-phenylindenyl | Cl | A | B | C | D | E |
| 311b | Me2Si | 2,4-dimethylcyclopentadienyl | 2-(5-tert-butyl-2-furyl)-4-phenylindenyl | Cl | A | B | C | D | E |
| 312b | Me2Si | 2-methyl-4-phenyl-cyclopentadienyl | 2-(5-tert-butyl-2-furyl)-4-phenylindenyl | Cl | A | B | C | D | E |
| 313b | Me2Si | 2-methyl-4-tert-butyl-cyclopentadienyl | 2-(5-tert-butyl-2-furyl)-4-phenylindenyl | Cl | A | B | C | D | E |
| 314b | Me2Si | 2,3,5-trimethyl-cyclopentadienyl | 2-(5-tert-butyl-2-furyl)-4-phenylindenyl | Cl | A | B | C | D | E |
| 315b | Me2Si | 2,3,4,5-tetramethyl-cyclopentadienyl | 2-(5-tert-butyl-2-furyl)-4-phenylindenyl | Cl | A | B | C | D | E |

TABLE b-16

(iii) Bridged CpIndZr Type (continued)

| No. | A1 | A2 | A3 | A4 | | | | | |
|---|---|---|---|---|---|---|---|---|---|
| 316b | Me2Si | cyclopentadienyl | 2-(5-phenyl-2-furyl)-4-phenylindenyl | Cl | A | B | C | D | E |
| 317b | Me2Si | 3-methylcyclopentadienyl | 2-(5-phenyl-2-furyl)-4-phenylindenyl | Cl | A | B | C | D | E |
| 318b | Me2Si | 3-phenylcyclopentadienyl | 2-(5-phenyl-2-furyl)-4-phenylindenyl | Cl | A | B | C | D | E |
| 319b | Me2Si | 3-tert-butylcyclopentadienyl | 2-(5-phenyl-2-furyl)-4-phenylindenyl | Cl | A | B | C | D | E |
| 320b | Me2Si | 3-(trimethylsilyl)-cyclopentadienyl | 2-(5-phenyl-2-furyl)-4-phenylindenyl | Cl | A | B | C | D | E |
| 321b | Me2Si | 2,4-dimethylcyclopentadienyl | 2-(5-phenyl-2-furyl)-4-phenylindenyl | Cl | A | B | C | D | E |
| 322b | Me2Si | 2-methyl-4-phenyl-cyclopentadienyl | 2-(5-phenyl-2-furyl)-4-phenylindenyl | Cl | A | B | C | D | E |
| 323b | Me2Si | 2-methyl-4-tert-butyl-cyclopentadienyl | 2-(5-phenyl-2-furyl)-4-phenylindenyl | Cl | A | B | C | D | E |
| 324b | Me2Si | 2,3,5-trimethyl-cyclopentadienyl | 2-(5-phenyl-2-furyl)-4-phenylindenyl | Cl | A | B | C | D | E |
| 325b | Me2Si | 2,3,4,5-tetramethyl-cyclopentadienyl | 2-(5-phenyl-2-furyl)-4-phenylindenyl | Cl | A | B | C | D | E |
| 326b | Me2Si | cyclopentadienyl | 2-(4,5-benzo-2-furyl)-4-phenylindenyl | Cl | A | B | C | D | E |
| 327b | Me2Si | 3-methylcyclopentadienyl | 2-(4,5-benzo-2-furyl)-4-phenylindenyl | Cl | A | B | C | D | E |
| 328b | Me2Si | 3-phenylcyclopentadienyl | 2-(4,5-benzo-2-furyl)-4-phenylindenyl | Cl | A | B | C | D | E |

TABLE b-16-continued

(iii) Bridged CpIndZr Type (continued)

| No. | A1 | A2 | A3 | A4 | | | | | |
|---|---|---|---|---|---|---|---|---|---|
| 329b | Me2Si | 3-tert-butylcyclopentadienyl | 2-(4,5-benzo-2-furyl)-4-phenylindenyl | Cl | A | B | C | D | E |
| 330b | Me2Si | 3-(trimethylsilyl)-cyclopentadienyl | 2-(4,5-benzo-2-furyl)-4-phenylindenyl | Cl | A | B | C | D | E |
| 331b | Me2Si | 2,4-dimethylcyclopentadienyl | 2-(4,5-benzo-2-furyl)-4-phenylindenyl | Cl | A | B | C | D | E |
| 332b | Me2Si | 2-methyl-4-phenyl-cyclopentadienyl | 2-(4,5-benzo-2-furyl)-4-phenylindenyl | Cl | A | B | C | D | E |
| 333b | Me2Si | 2-methyl-4-tert-butyl-cyclopentadienyl | 2-(4,5-benzo-2-furyl)-4-phenylindenyl | Cl | A | B | C | D | E |
| 334b | Me2Si | 2,3,5-trimethyl-cyclopentadienyl | 2-(4,5-benzo-2-furyl)-4-phenylindenyl | Cl | A | B | C | D | E |
| 335b | Me2Si | 2,3,4,5-tetramethyl-cyclopentadienyl | 2-(4,5-benzo-2-furyl)-4-phenylindenyl | Cl | A | B | C | D | E |

TABLE b-17

(iii) Bridged CpIndZr Type (continued)

| No. | A1 | A2 | A3 | A4 | | | | | |
|---|---|---|---|---|---|---|---|---|---|
| 336b | Me2Si | cyclopentadienyl | 2-(5-methyl-2-furyl)-4-(4-tert-butylphenyl)indenyl | Cl | A | B | C | D | E |
| 337b | Me2Si | 3-methylcyclopentadienyl | 2-(5-methyl-2-furyl)-4-(4-tert-butylphenyl)indenyl | Cl | A | B | C | D | E |
| 338b | Me2Si | 3-phenylcyclopentadienyl | 2-(5-methyl-2-furyl)-4-(4-tert-butylphenyl)indenyl | Cl | A | B | C | D | E |
| 339b | Me2Si | 3-tert-butylcyclopentadienyl | 2-(5-methyl-2-furyl)-4-(4-tert-butylphenyl)indenyl | Cl | A | B | C | D | E |
| 340b | Me2Si | 3-(trimethylsilyl)-cyclopentadienyl | 2-(5-methyl-2-furyl)-4-(4-tert-butylphenyl)indenyl | Cl | A | B | C | D | E |
| 341b | Me2Si | 2,4-dimethylcyclopentadienyl | 2-(5-methyl-2-furyl)-4-(4-tert-butylphenyl)indenyl | Cl | A | B | C | D | E |
| 342b | Me2Si | 2-methyl-4-phenyl-cyclopentadienyl | 2-(5-methyl-2-furyl)-4-(4-tert-butylphenyl)indenyl | Cl | A | B | C | D | E |
| 343b | Me2Si | 2-methyl-4-tert-butyl-cyclopentadienyl | 2-(5-methyl-2-furyl)-4-(4-tert-butylphenyl)indenyl | Cl | A | B | C | D | E |
| 344b | Me2Si | 2,3,5-trimethyl-cyclopentadienyl | 2-(5-methyl-2-furyl)-4-(4-tert-butylphenyl)indenyl | Cl | A | B | C | D | E |
| 345b | Me2Si | 2,3,4,5-tetramethyl-cyclopentadienyl | 2-(5-methyl-2-furyl)-4-(4-tert-butylphenyl)indenyl | Cl | A | B | C | D | E |
| 346b | Me2Si | cyclopentadienyl | 2-(5-methyl-2-furyl)-4-(4-i-propylphenyl)indenyl | Cl | A | B | C | D | E |
| 347b | Me2Si | 3-methylcyclopentadienyl | 2-(5-methyl-2-furyl)-4-(4-i-propylphenyl)indenyl | Cl | A | B | C | D | E |
| 348b | Me2Si | 3-phenylcyclopentadienyl | 2-(5-methyl-2-furyl)-4-(4-i-propylphenyl)indenyl | Cl | A | B | C | D | E |
| 349b | Me2Si | 3-tert-butylcyclopentadienyl | 2-(5-methyl-2-furyl)-4-(4-i-propylphenyl)indenyl | Cl | A | B | C | D | E |
| 350b | Me2Si | 3-(trimethylsilyl)-cyclopentadienyl | 2-(5-methyl-2-furyl)-4-(4-i-propylphenyl)indenyl | Cl | A | B | C | D | E |
| 351b | Me2Si | 2,4-dimethylcyclopentadienyl | 2-(5-methyl-2-furyl)-4-(4-i-propylphenyl)indenyl | Cl | A | B | C | D | E |
| 352b | Me2Si | 2-methyl-4-phenyl-cyclopentadienyl | 2-(5-methyl-2-furyl)-4-(4-i-propylphenyl)indenyl | Cl | A | B | C | D | E |
| 353b | Me2Si | 2-methyl-4-tert-butyl-cyclopentadienyl | 2-(5-methyl-2-furyl)-4-(4-i-propylphenyl)indenyl | Cl | A | B | C | D | E |
| 354b | Me2Si | 2,3,5-trimethyl-cyclopentadienyl | 2-(5-methyl-2-furyl)-4-(4-i-propylphenyl)indenyl | Cl | A | B | C | D | E |
| 355b | Me2Si | 2,3,4,5-tetramethyl-cyclopentadienyl | 2-(5-methyl-2-furyl)-4-(4-i-propylphenyl)indenyl | Cl | A | B | C | D | E |

TABLE b-18

(iii) Bridged CpIndZr Type (continued)

| No. | A1 | A2 | A3 | A4 | | | | | |
|---|---|---|---|---|---|---|---|---|---|
| 356b | Me2Si | cyclopentadienyl | 2-(5-methyl-2-furyl)-4-(4-chlorophenyl)indenyl | Cl | A | B | C | D | E |

TABLE b-18-continued

(iii) Bridged CpIndZr Type (continued)

| No. | A1 | A2 | A3 | A4 | | | | |
|---|---|---|---|---|---|---|---|---|
| 357b | Me2Si | 3-methylcyclopentadienyl | 2-(5-methyl-2-furyl)-4-(4-chlorophenyl)indenyl | Cl | A | B | C | D | E |
| 358b | Me2Si | 3-phenylcyclopentadienyl | 2-(5-methyl-2-furyl)-4-(4-chlorophenyl)indenyl | Cl | A | B | C | D | E |
| 359b | Me2Si | 3-tert-butylcyclopentadienyl | 2-(5-methyl-2-furyl)-4-(4-chlorophenyl)indenyl | Cl | A | B | C | D | E |
| 360b | Me2Si | 3-(trimethylsilyl)-cyclopentadienyl | 2-(5-methyl-2-furyl)-4-(4-chlorophenyl)indenyl | Cl | A | B | C | D | E |
| 361b | Me2Si | 2,4-dimethylcyclopentadienyl | 2-(5-methyl-2-furyl)-4-(4-chlorophenyl)indenyl | Cl | A | B | C | D | E |
| 362b | Me2Si | 2-methyl-4-phenyl-cyclopentadienyl | 2-(5-methyl-2-furyl)-4-(4-chlorophenyl)indenyl | Cl | A | B | C | D | E |
| 363b | Me2Si | 2-methyl-4-tert-butyl-cyclopentadienyl | 2-(5-methyl-2-furyl)-4-(4-chlorophenyl)indenyl | Cl | A | B | C | D | E |
| 364b | Me2Si | 2,3,5-trimethyl-cyclopentadienyl | 2-(5-methyl-2-furyl)-4-(4-chlorophenyl)indenyl | Cl | A | B | C | D | E |
| 365b | Me2Si | 2,3,4,5-tetramethyl-cyclopentadienyl | 2-(5-methyl-2-furyl)-4-(4-chlorophenyl)indenyl | Cl | A | B | C | D | E |
| 366b | Me2Si | cyclopentadienyl | 2-(5-methyl-2-furyl)-4-(3,5-di-tert-butylphenyl)indenyl | Cl | A | B | C | D | E |
| 367b | Me2Si | 3-methylcyclopentadienyl | 2-(5-methyl-2-furyl)-4-(3,5-di-tert-butylphenyl)indenyl | Cl | A | B | C | D | E |
| 368b | Me2Si | 3-phenylcyclopentadienyl | 2-(5-methyl-2-furyl)-4-(3,5-di-tert-butylphenyl)indenyl | Cl | A | B | C | D | E |
| 369b | Me2Si | 3-tert-butylcyclopentadienyl | 2-(5-methyl-2-furyl)-4-(3,5-di-tert-butylphenyl)indenyl | Cl | A | B | C | D | E |
| 370b | Me2Si | 3-(trimethylsilyl)-cyclopentadienyl | 2-(5-methyl-2-furyl)-4-(3,5-di-tert-butylphenyl)indenyl | Cl | A | B | C | D | E |
| 371b | Me2Si | 2,4-dimethylcyclopentadienyl | 2-(5-methyl-2-furyl)-4-(3,5-di-tert-butylphenyl)indenyl | Cl | A | B | C | D | E |
| 372b | Me2Si | 2-methyl-4-phenyl-cyclopentadienyl | 2-(5-methyl-2-furyl)-4-3,5-di-tert-butylphenyl)indenyl | Cl | A | B | C | D | E |
| 373b | Me2Si | 2-methyl-4-tert-butyl-cyclopentadienyl | 2-(5-methyl-2-furyl)-4-(3,5-di-tert-butylphenyl)indenyl | Cl | A | B | C | D | E |
| 374b | Me2Si | 2,3,5-trimethyl-cyclopentadienyl | 2-(5-methyl-2-furyl)-4-(3,5-di-tert-butylphenyl)indenyl | Cl | A | B | C | D | E |
| 375b | Me2Si | 2,3,4,5-tetramethyl-cyclopentadienyl | 2-(5-methyl-2-furyl)-4-(3,5-di-tert-butylphenyl)indenyl | Cl | A | B | C | D | E |

TABLE b-19

(iii) Bridged CpIndZr Type (continued)

| No. | A1 | A2 | A3 | A4 | | | | |
|---|---|---|---|---|---|---|---|---|
| 376b | Me2Si | cyclopentadienyl | 2-(5-methyl-2-furyl)-4-(2-methylphenyl)indenyl | Cl | A | B | C | D | E |
| 377b | Me2Si | 3-methylcyclopentadienyl | 2-(5-methyl-2-furyl)-4-(2-methylphenyl)indenyl | Cl | A | B | C | D | E |
| 378b | Me2Si | 3-phenylcyclopentadienyl | 2-(5-methyl-2-furyl)-4-(2-methylphenyl)indenyl | Cl | A | B | C | D | E |
| 379b | Me2Si | 3-tert-butylcyclopentadienyl | 2-(5-methyl-2-furyl)-4-(2-methylphenyl)indenyl | Cl | A | B | C | D | E |
| 380b | Me2Si | 3-(trimethylsilyl)-cyclopentadienyl | 2-(5-methyl-2-furyl)-4-(2-methylphenyl)indenyl | Cl | A | B | C | D | E |
| 381b | Me2Si | 2,4-dimethylcyclopentadienyl | 2-(5-methyl-2-furyl)-4-(2-methylphenyl)indenyl | Cl | A | B | C | D | E |
| 382b | Me2Si | 2-methyl-4-phenyl-cyclopentadienyl | 2-(5-methyl-2-furyl)-4-(2-methylphenyl)indenyl | Cl | A | B | C | D | E |
| 383b | Me2Si | 2-methyl-4-tert-butyl-cyclopentadienyl | 2-(5-methyl-2-furyl)-4-(2-methylphenyl)indenyl | Cl | A | B | C | D | E |
| 384b | Me2Si | 2,3,5-trimethyl-cyclopentadienyl | 2-(5-methyl-2-furyl)-4-(2-methylphenyl)indenyl | Cl | A | B | C | D | E |
| 385b | Me2Si | 2,3,4,5-tetramethyl-cyclopentadienyl | 2-(5-methyl-2-furyl)-4-(2-methylphenyl)indenyl | Cl | A | B | C | D | E |
| 386b | Me2Si | cyclopentadienyl | 2-(5-methyl-2-furyl)-3-methyl-4-phenylindenyl | Cl | A | B | C | D | E |
| 387b | Me2Si | 3-methylcyclopentadienyl | 2-(5-methyl-2-furyl)-3-methyl-4-phenylindenyl | Cl | A | B | C | D | E |
| 388b | Me2Si | 3-tert-butylcyclopentadienyl | 2-(5-methyl-2-furyl)-3-methyl-4-phenylindenyl | Cl | A | B | C | D | E |
| 389b | Me2Si | 2,4-dimethylcyclopentadienyl | 2-(5-methyl-2-furyl)-3-methyl-4-phenylindenyl | Cl | A | B | C | D | E |

TABLE b-19-continued (iii) Bridged CpIndZr Type (continued)

| No. | A1 | A2 | A3 | A4 | | | | |
|---|---|---|---|---|---|---|---|---|
| 390b | Me2Si | 2-methyl-4-phenyl-cyclopentadienyl | 2-(5-methyl-2-furyl)-3-methyl-4-phenylindenyl | Cl | A | B | C | D | E |
| 391b | Me2Si | 2-methyl-4-tert-butyl-cyclopentadienyl | 2-(5-methyl-2-furyl)-3-methyl-4-phenylindenyl | Cl | A | B | C | D | E |
| 392b | Me2Si | 2,3,5-trimethyl-cyclopentadienyl | 2-(5-methyl-2-furyl)-3-methyl-4-phenylindenyl | Cl | A | B | C | D | E |
| 393b | Me2Si | 2,3,4,5-tetramethyl-cyclopentadienyl | 2-(5-methyl-2-furyl)-3-methyl-4-phenylindenyl | Cl | A | B | C | D | E |
| 394b | Me2Si | cyclopentadienyl | 2-(5-methyl-2-furyl)-3-n-butyl-4-phenylindenyl | Cl | A | B | C | D | E |
| 395b | Me2Si | 3-methylcyclopentadienyl | 2-(5-methyl-2-furyl)-3-n-butyl-4-phenylindenyl | Cl | A | B | C | D | E |

TABLE b-20

(iii) Bridged CpIndZr Type (continued)

| No. | A1 | A2 | A3 | A4 | | | | |
|---|---|---|---|---|---|---|---|---|
| 396b | Me2Si | 3-tert-butylcyclopentadienyl | 2-(5-methyl-2-furyl)-3-n-butyl-4-phenylindenyl | Cl | A | B | C | D | E |
| 397b | Me2Si | 2,4-dimethylcyclopentadienyl | (2-(5-methyl-2-furyl)-3-n-butyl-4-phenylindenyl | Cl | A | B | C | D | E |
| 398b | Me2Si | 2-methyl-4-phenyl-cyclopentadienyl | 2-(5-methyl-2-furyl)-3-n-butyl-4-phenylindenyl | Cl | A | B | C | D | E |
| 399b | Me2Si | 2-methyl-4-tert-butyl-cyclopentadienyl | 2-(5-methyl-2-furyl)-3-n-butyl-4-phenylindenyl | Cl | A | B | C | D | E |
| 400b | Me2Si | 2,3,5-trimethyl-cyclopentadienyl | 2-(5-methyl-2-furyl)-3-n-butyl-4-phenylindenyl | Cl | A | B | C | D | E |
| 401b | Me2Si | 2,3,4,5-tetramethyl-cyclopentadienyl | 2-(5-methyl-2-furyl)-3-n-butyl-4-phenylindenyl | Cl | A | B | C | D | E |
| 402b | Me2Si | cyclopentadienyl | 2-(5-methyl-2-furyl)-3-s-butyl-4-phenylindenyl | Cl | A | B | C | D | E |
| 403b | Me2Si | 3-methylcyclopentadienyl | 2-(5-methyl-2-furyl)-3-s-butyl-4-phenylindenyl | Cl | A | B | C | D | E |
| 404b | Me2Si | 3-tert-butylcyclopentadienyl | 2-(5-methyl-2-furyl)-3-s-butyl-4-phenylindenyl | Cl | A | B | C | D | E |
| 405b | Me2Si | 2,4-dimethylcyclopentadienyl | 2-(5-methyl-2-furyl)-3-s-butyl-4-phenylindenyl | Cl | A | B | C | D | E |
| 406b | Me2Si | 2-methyl-4-phenyl-cyclopentadienyl | 2-(5-methyl-2-furyl)-3-s-butyl-4-phenylindenyl | Cl | A | B | C | D | E |
| 407b | Me2Si | 2-methyl-4-tert-butyl-cyclopentadienyl | 2-(5-methyl-2-furyl)-3-s-butyl-4-phenylindenyl | Cl | A | B | C | D | E |
| 408b | Me2Si | 2,3,5-trimethyl-cyclopentadienyl | 2-(5-methyl-2-furyl)-3-s-butyl-4-phenylindenyl | Cl | A | B | C | D | E |
| 409b | Me2Si | 2,3,4,5-tetramethyl-cyclopentadienyl | 2-(5-methyl-2-furyl)-3-s-butyl-4-phenylindenyl | Cl | A | B | C | D | E |

The metallocene compound also includes, for example, compounds where zirconium in the compounds above is replaced by titanium or hafnium. In the case of using these metallocene compounds as the component (A-2b), two or more thereof may be also used.

In specific compounds exemplified above, preferred metallocene compounds as the component (A-2b) in view of polymerization activity are denoted by "A". Examples of the compound preferred in view of high polymerization activity include: 1-indenyl-2-indenyl-dimethylsilylzirconium dichloride; out of compounds recited in the above-described literatures such as JP-A-2-76887, JP-A-3-12406, JP-A-3-12407, JP-A-3-12407, JP-A-11-315089, JP-A-2009-143901 and JP-T-2005-507961, silicon-bridged bis(alkyl-substituted cyclopentadienyl)zirconium compounds belong to formula (2b), where the total number of alkyl substituents on two cyclopentadienyl rings is 4 or more; out of zirconium compounds having a cyclopentadienyl ring substituted, for example, with an oxygen-containing hydrocarbon group, a sulfur-containing hydrocarbon group or a hydrocarbon group-substituted silyl group described in JP-T-2002-535339 and the like and belonging to formula (2b), compounds having a silicon-bridged bis(substituted cyclopentadienyl) structure, where the total number of substituents on two cyclopentadienyl rings, including the oxygen-containing hydrocarbon group or the like, is 4 or more; out of compounds recited in the above-described literatures such as JP-A-8-59724, JP-A-10-231314, JP-A-2003-105029 and JP-A-2004-352707, silicon-bridged bis(substituted or unsubstituted indenyl)zirconium compounds, silicon-bridged bis(substituted or unsubstituted azulenyl)zirconium compounds and silicon-bridged (substituted or unsubstituted indenyl)(substituted or unsubstituted azulenyl)zirconium compounds belonging to formula (6b) and formula (8b); out of compounds recited in the above-described literatures such as JP-T-2002-535339 and JP-A-2004-352707, silicon-bridged bis(substituted or unsubstituted indenyl)zirconium compounds, silicon-bridged bis (substituted or unsubstituted azulenyl)zirconium compounds and silicon-bridged (substituted or unsubstituted indenyl) (substituted or unsubstituted azulenyl)zirconium compounds, each having an indenyl or azulenyl ring substituted, for example, with an oxygen-containing hydrocarbon group, a sulfur-containing hydrocarbon group or a hydrocarbon group-substituted silyl group and belonging to formula (6b) and formula (8b); and out of compounds recited in the above-described literatures such as JP-A-6-87922, JP-A-8-92308, JP-A-9-87314, JP-A-7-224079 and JP-A-2005-336092, zirconium compounds belonging to formula (7b) and formula (9b), where the total number of substituents which may be the above-described oxygen-containing hydrocarbon group or the like, on cyclopentadienyl rings connected by a bridging group and on a cyclopentadienyl ring having a co-ring is 2 or more.

Similarly, in specific compounds exemplified above, preferred metallocene compounds as the component (A-2b) in view of excellent moldability are denoted by "B". Examples of the compound preferred in view of excellent moldability include: 1-indenyl-2-indenyl-dimethylsilylzirconium dichloride; out of compounds recited in the above-described literatures such as JP-A-2-76887, JP-A-3-12406, JP-A-3-12407, JP-A-3-12407, JP-A-11-315089, JP-A-2009-143901 and JP-T-2005-507961, zirconium compounds having a bridged bis(alkyl-substituted cyclopentadienyl) structure and belonging to formula (2b), where the 2-position of at least one cyclopentadienyl ring is substituted with an alkyl group and an arbitrary position of at least another cyclopentadienyl ring is substituted with an alkyl group; out of zirconium compounds having a cyclopentadienyl ring substituted, for example, with an oxygen-containing hydrocarbon group, a sulfur-containing hydrocarbon group or a hydrocarbon group-substituted silyl group described in JP-T-2002-535339 and the like and belonging to formula (2b), such as dimethylsilylenebis(2-(2-furyl)-3,5-dimethylcyclopentadienyl)zirconium dichloride, zirconium compounds having a bridged bis(substituted cyclopentadienyl) structure, where the 2-position of at least one cyclopentadienyl ring is substituted with the above-described oxygen-containing hydrocarbon group or the like or with an alkyl group and an arbitrary position of at least another cyclopentadienyl ring is substituted with the above-described oxygen-containing hydrocarbon group or the like or with an alkyl group; out of compounds recited in the above-described literatures such as JP-A-8-59724, JP-A-10-231314, JP-A-2003-105029 and JP-A-2004-352707, silicon-bridged or carbon-bridged bis(substituted or unsubstituted indenyl)zirconium compounds, silicon-bridged or carbon-bridged bis(substituted or unsubstituted azulenyl)zirconium compounds and silicon-bridged or carbon-bridged (substituted or unsubstituted indenyl)(substituted or unsubstituted azulenyl)zirconium compounds belonging to formula (6b) and formula (8b); out of compounds recited in the above-described literatures such as JP-T-2002-535339 and JP-A-2004-352707, zirconium compounds having an indenyl or azulenyl ring substituted, for example, with an oxygen-containing hydrocarbon group, a sulfur-containing hydrocarbon group or a hydrocarbon group-substituted silyl group and belonging to formula (6b) and formula (8b), where the rings are bridged by a silicon bridging group or a carbon bridging group; and out of compounds recited in the above-described literatures such as JP-A-6-87922, JP-A-8-92308, JP-A-9-87314, JP-A-7-224079 and JP-A-2005-336092, zirconium compounds belonging to formula (7b) and formula (9b), where at least one or more substituents which may be the above-described oxygen-containing hydrocarbon group or the like are substituted on cyclopentadienyl rings connected by a bridging group and on a cyclopentadienyl ring having a co-ring or the 2-position of at least the cyclopentadienyl ring having a co-ring is substituted with the above-described oxygen-containing hydrocarbon group or the like or with an alkyl group.

Also, in specific compounds exemplified above, more preferred compounds in view of excellent moldability are denoted by "C", and other examples include: out of compounds recited in the above-described literatures such as JP-A-2-76887, JP-A-3-12406, JP-A-3-12407, JP-A-3-12407, JP-A-11-315089, JP-A-2009-143901 and JP-T-2005-507961, zirconium compounds having a bridged bis(alkyl-substituted cyclopentadienyl) structure and belonging to formula (2b), where the 2-position of at least one cyclopentadienyl ring is substituted with an alkyl group and the 2- or 5-position of at least another cyclopentadienyl ring is substituted with an alkyl group; out of zirconium compounds having a cyclopentadienyl ring substituted, for example, with an oxygen-containing hydrocarbon group, a sulfur-containing hydrocarbon group or a hydrocarbon group-substituted silyl group described in JP-T-2002-535339 and the like and belonging to formula (2b), such as dimethylsilylenebis(2-(2-furyl)-3,5-dimethylcyclopentadienyl)zirconium dichloride, zirconium compounds having a bridged bis(substituted cyclopentadienyl) structure, where the 2-position of at least one cyclopentadienyl ring is substituted with the above-described oxygen-containing hydrocarbon group or the like or with an alkyl group and the 2- or 5-position of at least another cyclopentadienyl ring is substituted with the above-described oxygen-containing hydrocarbon group or the like or with an alkyl group; out of compounds recited in the above-described literatures such as JP-A-8-59724, JP-A-10-231314, JP-A-2003-105029 and JP-A-2004-352707, silicon-bridged or carbon-bridged bis(substituted or unsubstituted indenyl)zirconium compounds, silicon-bridged or carbon-bridged bis(substituted or unsubstituted azulenyl)zirconium compounds and silicon-bridged or carbon-bridged (substituted or unsubstituted indenyl)(substituted or unsubstituted azulenyl)zirconium compounds belonging to formula (6b) and formula (8b), where the 2-position of at least one indenyl or azulenyl ring is substituted with an alkyl group; out of compounds recited in the above-described literatures such as JP-T-2002-535339 and JP-A-2004-352707, zirconium compounds having an indenyl or azulenyl ring substituted on the 2-position, for example, with an oxygen-containing hydrocarbon group, a sulfur-containing hydrocarbon group or a hydrocarbon group-substituted silyl group and belonging to formula (6b) and formula (8b), where the rings are bridged by a silicon bridging group or a carbon bridging group; and out of compounds recited in the above-described literatures such as JP-A-6-87922, JP-A-8-92308, JP-A-9-87314, JP-A-7-224079 and JP-A-2005-336092, zirconium compounds belonging to formula (7b) and formula (9b), where the 2-position of at least a cyclopentadienyl ring having a co-ring is substituted with the above-described oxygen-containing hydrocarbon group or the like or with an alkyl group.

Furthermore, in specific compounds exemplified above, still more preferred compounds in view of excellent moldability are denoted by "D", and other examples include: out of compounds recited in the above-described literatures such as JP-A-6-87922, JP-A-8-92308, JP-A-9-87314, JP-A-7-224079 and JP-A-2005-336092, zirconium compounds belonging to formula (7b) and formula (9b), where the 2-position of at least the cyclopentadienyl ring having a co-ring is substituted with the above-described oxygen-containing hydrocarbon group or the like or with an alkyl group.

In addition, in specific compounds exemplified above, yet still more preferred compounds in view of excellent moldability are denoted by "E", and other examples include: out of compounds recited in the above-described literatures such as JP-A-6-87922, JP-A-8-92308, JP-A-9-87314, JP-A-7-224079 and JP-A-2005-336092, zirconium compounds belonging to formula (7b) and formula (9b), where the 2-position of at least the cyclopentadienyl ring having a co-ring is substituted with the above-described oxygen-containing hydrocarbon group or the like.

Synthesis examples of the metallocene compound as the component (A-2b) according to the present invention are described below, but the present invention is not limited to these synthesis methods in particular.

For example, there are a method where an indene compound is lithiated, then reacted with a dichlorosilane compound and subsequently reacted with cyclopentadienyl lithium to obtain a ligand and the obtained ligand is reacted with a tetrakis(alkylamido)zirconium and then with trimethylsilyl chloride, and a method where the obtained ligand is lithiated and subsequently reacted with zirconium tetrachloride.

IV-2. Olefin Polymerization Catalyst Component Containing Component (Ac) of the Present Invention A second embodiment of the olefin polymerization catalyst component of the present invention contains the component (Ac) defined below as an essential component.

Component (Ac): a metallocene compound represented by the following formula (1c), where a cyclopentadienyl ring and an indenyl ring are bridged and a specific substituent is substituted on the 4-position of the indenyl ring:

[Chem. 24]

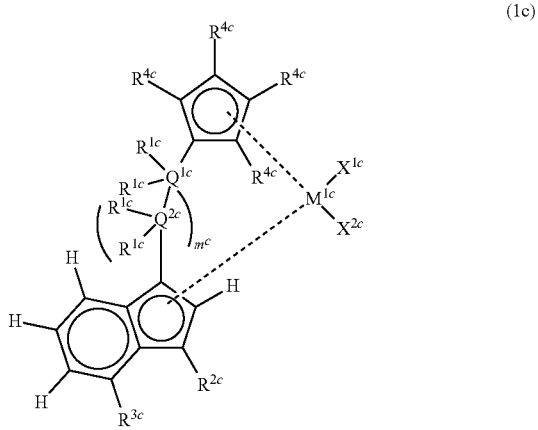

(1c)

[in formula (1c), $M^{1c}$ represents any one transition metal of Ti, Zr and Hf; each of $X^{1c}$ and $X^{2c}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1c}$ and $Q^{2c}$ independently represents a carbon atom, a silicon atom or a germanium atom; each $R^{1c}$ independently represents a hydrogen atom or a hydrocarbon group having a carbon number of 1 to 10 and at least two members out of four $R^{1c}$ may combine to form a ring together with $Q^{1c}$ and $Q^{2c}$; $m^c$ is 0 or 1 and when $m^c$ is 0, $Q^{1c}$ is bonded directly to the conjugated 5-membered ring including $R^{2c}$; each of $R^{2c}$ and $R^{4c}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and $R^{3c}$ represents a substituted aryl group represented by the following formula (1-ac)]:

[Chem. 25]

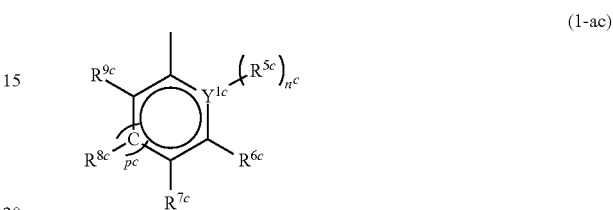

(1-ac)

[in formula (1-ac), $Y^{1c}$ represents an atom of Group 14, Group 15 or Group 16 of the periodic table; each of $R^{5c}$, $R^{6c}$, $R^{7c}$, $R^{8c}$ and $R^{9c}$ independently represents a hydrogen atom, a chlorine atom, a bromine atom, a hydrocarbon group having a carbon number of 1 to 20, a hydrocarbon group containing oxygen or nitrogen and having a carbon number of 1 to 20, a hydrocarbon group-substituted amino group having a carbon number of 1 to 20, an alkoxy group having a carbon number of 1 to 20, a silicon-containing hydrocarbon group containing from 1 to 6 silicons and having a carbon number of 1 to 18, a halogen-containing hydrocarbon group having a carbon number of 1 to 20, or a hydrocarbon group-substituted silyl group having a carbon number of 1 to 20; adjacent groups of $R^{5c}$, $R^{6c}$, $R^{7c}$, $R^{8c}$ and $R^{9c}$ may combine with each other to form a ring together with the atoms bonded to these groups; $n^c$ is 0 or 1 and when $n^c$ is 0, the substituent $R^{5c}$ is not present on $Y^{1c}$; and $p^c$ is 0 or 1 and when $p^c$ is 0, the carbon atom to which $R^{7c}$ is bonded and the carbon atom to which $R^{9c}$ is bonded are bonded directly; provided that when $Y^{1c}$ is a carbon atom, at least one of $R^{5c}$, $R^{6c}$, $R^{7c}$, $R^{8c}$ and $R^{9c}$ is not a hydrogen atom].

In formula (1c), $M^{1c}$ of the metallocene compound represents Ti, Zr or Hf; $M^{1c}$ of the metallocene compound preferably represents Zr or Hf; and $M^{1c}$ of the metallocene compound more preferably represents Zr.

Each of $X^{1c}$ and $X^{2c}$ independently includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a methoxymethyl group, an ethoxymethyl group, an n-propoxymethyl group, an i-propoxymethyl group, an n-butoxymethyl group, an i-butoxymethyl group, a tert-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, an ethoxy group, an n-propoxy group, an i-propoxy group, an n-butoxy group, an i-butoxy group, a tert-butoxy group, a phenoxy group, a dimethylamino group, a diethylamino group, a di-n-propylamino group, a di-i-propylamino group, a di-n-butylamino group, a di-i-butylamino group, a di-tert-butylamino group, and a diphenylamino group.

Specific preferred examples of $X^{1c}$ and $X^{2c}$ include a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Among these specific examples, a chlorine atom, a methyl group, and a dimethylamino group are more preferred.

Each of $Q^{1c}$ and $Q^{2c}$ independently represents a carbon atom, a silicon atom or a germanium atom and is preferably a carbon atom or a silicon atom, more preferably a silicon atom.

Each $R^{1c}$ independently includes, for example, a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, and a phenyl group. In the case where $R^{1c}$ forms a ring together with $Q^{1c}$ and $Q^{2c}$, examples include a cyclobutylidene group, a cyclopentylidene group, a cyclohexylidene group, a silacyclobutyl group, a silacyclopentyl group, and a silacyclohexyl group.

When $Q^{1c}$ or/and $Q^{2c}$ are a carbon atom, specific preferred examples of $R^{1c}$ include a hydrogen atom, a methyl group, an ethyl group, a phenyl group and a cyclobutylidene group, and when $Q^{1c}$ or/and $Q^{2c}$ are a silicon atom, specific preferred examples include a methyl group, an ethyl group, a phenyl group and a silacyclobutyl group.

Each of $R^{2c}$ and $R^{4c}$ includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group.

Each of $R^{2c}$ and $R^{4c}$ is preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, because the polymerization activity becomes high in particular.

Specific preferred examples of $R^{2c}$ and $R^{4c}$ include a hydrogen atom, a methyl group, an ethyl group, an n-propyl group, an i-propyl group, an n-butyl group, a tert-butyl group, an n-pentyl group, an n-hexyl group, a cyclohexyl group, a phenyl group, a 2-methylfuryl group, and a trimethylsilyl group. Among these specific examples, a hydrogen atom, a methyl group, an n-butyl group, a tert-butyl group, a phenyl group and a trimethylsilyl group are more preferred, and a hydrogen atom, a methyl group, a tert-butyl group, a phenyl group and a trimethylsilyl group are still more preferred.

The substituent $R^{3c}$ represents a substituted aryl group having a structure represented by formula (1-ac), preferably a Ph group having a specific substituent, furyl groups, or thienyl groups. Specific examples include a 4-trimethylsilylphenyl group, a 4-(tert-butyldimethylsilyl)phenyl group, a 4-(3,5-bistrimethylsilyl)phenyl group, a 4-chlorophenyl group, a 4-bromophenyl group, a 3,5-dichlorophenyl group, a 2,4,6-trichlorophenyl group, a 4-methoxyphenyl group, a 4-ethoxyphenyl group, a 4-isopropoxyphenyl group, a 4-n-butoxyphenyl group, a 2-furyl group, a 2-(5-methyl)furyl group, a 2-(5-tert-butyl)furyl group, a 2-(5-trimethylsilyl)furyl group, a 2-(2,3-dimethyl)furyl group, a 2-benzofuryl group, a 2-thienyl group, a 2-(5-methyl)thienyl group, a 2-(5-tert-butyl)thienyl group, a 2-(5-trimethylsilyl)thienyl group, and a 2-(2,3-dimethyl)thienyl group.

Also, in formula (1), $m^c$ is 0 or 1 and when $m_c$ is 0, $Q^{1c}$ is bonded directly to the conjugated 5-membered ring including $R^{2c}$.

The metallocene compound of the present invention is preferably a compound represented by the following formula (2c):

[Chem. 26]

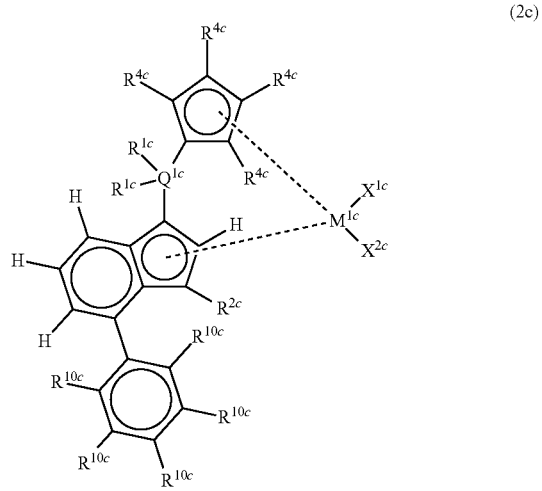

(2c)

In the metallocene compound represented by formula (2c), for $M^{1c}$, $X^1$, $X^{2c}$, $Q^{1c}$, $R^{1c}$, $R^{2c}$ and $R^{4c}$, the same structures as the atom and the group described above in the metallocene compound represented by formula (1c) may be selected. Also, for Roc, the same structure as the atom or group of $R^{5c}$, $R^{6c}$, $R^{7c}$, $R^{8e}$ and $R^{9c}$ described above in the metallocene compound represented by formula (1c) may be selected.

As the metallocene compound of the present invention, a compound represented by the following formula (3c) is also preferred similarly to formula (2c):

[Chem. 27]

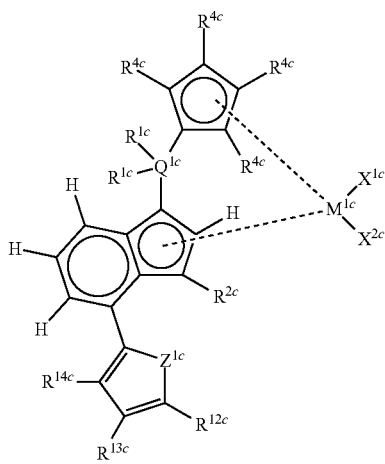

(3c)

In the metallocene compound represented by formula (3c), for $M^{1c}$, $X^{1c}$, $X^{2c}$, $Q^{1c}$, $R^{1c}$, $R^{2c}$ and $R^{4c}$, the same structures as the atom and the group described above in the metallocene compound represented by formula (1c) may be selected. Also, for $R^{12c}$, $R^{13c}$ and $R^{14c}$, the same structures as the atom and the group of $R^{5c}$, $R^{6c}$, $R^{7c}$, $R^{8c}$ and $R^{9c}$ described above in the metallocene compound represented by formula (1c) may be selected. $Z1c$ represents an oxygen atom or a sulfur atom.

Specific examples of the metallocene compound represented by formula (3c) are shown in Tables c-1 to c-5 by using formula (4c), but the present invention is not limited thereto.

[Chem. 28]

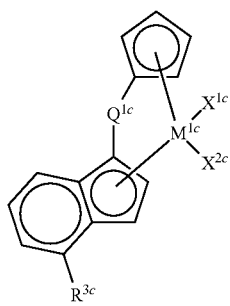

(4c)

TABLE c-1

$R^{3c}$ = Si-Substituted Phenyl Group

| No. | $M^{1c}$ | $X^{1c}$, $X^{2c}$ | $Q^{1c}$ | $R^{3c}$ |
|---|---|---|---|---|
| 1c | Zr | Cl | Me₂Si | 4-(trimethylsilyl)-phenyl |
| 2c | Zr | Br | Me₂Si | 4-(trimethylsilyl)-phenyl |
| 3c | Zr | Me | Me₂Si | 4-(trimethylsilyl)-phenyl |
| 4c | Zr | Ph | Me₂Si | 4-(trimethylsilyl)-phenyl |
| 5c | Zr | Cl | Et₂Si | 4-(trimethylsilyl)-phenyl |
| 6c | Zr | Cl | Ph₂Si | 4-(trimethylsilyl)-phenyl |
| 7c | Zr | Cl | silacy-clobutyl | 4-(trimethylsilyl)-phenyl |
| 8c | Zr | Cl | silacy-clohexyl | 4-(trimethylsilyl)-phenyl |
| 9c | Zr | Cl | Me₂C | 4-(trimethylsilyl)-phenyl |

TABLE c-1-continued $R^{3c}$ = Si-Substituted Phenyl Group

| No. | $M^{1c}$ | $X^{1c}$, $X^{2c}$ | $Q^{1c}$ | $R^{3c}$ |
|---|---|---|---|---|
| 10c | Zr | Cl | Ph₂C | 4-(trimethylsilyl)-phenyl |
| 11c | Zr | Cl | Me₂Ge | 4-(trimethylsilyl)-phenyl |
| 12c | Zr | Cl | Me₂Si | 4-(triethylsilyl)-phenyl |
| 13c | Zr | Cl | Me₂Si | 4-(tri-n-propylsilyl)-phenyl |
| 14c | Zr | Cl | Me₂Si | 4-(tri-i-propylsilyl)-phenyl |
| 15c | Zr | Cl | Me₂Si | 4-(tri-n-butylsilyl)-phenyl |
| 16c | Zr | Cl | Me₂Si | 4-(tri-i-butylsilyl)-phenyl |
| 17c | Zr | Cl | Me₂Si | 4-(tri-n-pentylsilyl)-phenyl |
| 18c | Zr | Cl | Me₂Si | 4-(tri-n-hexylsilyl)-phenyl |
| 19c | Zr | Cl | Me₂Si | 4-(trivinylsilyl)-phenyl |
| 20c | Zr | Cl | Me₂Si | 4-(triphenylsilyl)-phenyl |
| 21c | Zr | Cl | Me₂Si | 4-(tribenzylsilyl)-phenyl |
| 22c | Zr | Cl | Me₂Si | 4-(t-butyldimethylsilyl)-phenyl |
| 23c | Zr | Cl | Me₂Si | 4-(di-tert-butylmethylsilyl)-phenyl |
| 24c | Zr | Cl | Me₂Si | 4-(dimethylethylsilyl)-phenyl |
| 25c | Zr | Cl | Me₂Si | 4-(methyldiethylsilyl)-phenyl |
| 26c | Zr | Cl | Me₂Si | 4-(dimethyl-n-propylsilyl)-phenyl |
| 27c | Zr | Cl | Me₂Si | 4-(methyl-di-n-propylsilyl)-phenyl |
| 28c | Zr | Cl | Me₂Si | 4-(dimethyl-i-propylsilyl)-phenyl |
| 29c | Zr | Cl | Me₂Si | 4-(methyl-di-i-propylsilyl)-phenyl |
| 30c | Zr | Cl | Me₂Si | 4-(dimethyl-n-butylsilyl)-phenyl |

TABLE c-2

$R^{3c}$ = Si-Substituted Phenyl Group (continued)

| No. | $M^{1c}$ | $X^{1c}$, $X^{2c}$ | $Q^{1c}$ | $R^{3c}$ |
|---|---|---|---|---|
| 31c | Zr | Cl | Me₂Si | 4-(methyl-di-n-butylsilyl)-phenyl |
| 32c | Zr | Cl | Me₂Si | 4-(dimethyl-n-pentylsilyl)-phenyl |
| 33c | Zr | Cl | Me₂Si | 4-(methyl-di-n-pentylsilyl)-phenyl |
| 34c | Zr | Cl | Me₂Si | 4-(dimethylbenzylsilyl)-phenyl |
| 35c | Zr | Cl | Me₂Si | 4-(methyldibenzylsilyl)-phenyl |
| 36c | Zr | Cl | Me₂Si | 4-(dimethylvinylsilyl)-phenyl |
| 37c | Zr | Cl | Me₂Si | 4-(methyldivinylsilyl)-phenyl |
| 38c | Zr | Cl | Me₂Si | 4-(dimethylmethoxysilyl)-phenyl |
| 39c | Zr | Cl | Me₂Si | 4-(methyldimethoxysilyl)-phenyl |
| 40c | Zr | Cl | Me₂Si | 4-(trimethoxysilyl)-phenyl |
| 41c | Zr | Cl | Me₂Si | 4-(ethoxydimethylsilyl)-phenyl |
| 42c | Zr | Cl | Me₂Si | 4-(diethoxymethylsilyl)-phenyl |
| 43c | Zr | Cl | Me₂Si | 4-(triethoxysilyl)-phenyl |
| 44c | Zr | Cl | Me₂Si | 4-(dimethylphenylsilyl)-phenyl |
| 45c | Zr | Cl | Me₂Si | 4-(methyldiphenylsilyl)-phenyl |
| 46c | Zr | Cl | Me₂Si | 4-(diethylphenylsilyl)-phenyl |
| 47c | Zr | Cl | Me₂Si | 4-(ethyldiphenylsilyl)-phenyl |
| 48c | Zr | Cl | Me₂Si | 4-(methoxydiphenylsilyl)-phenyl |
| 49c | Zr | Cl | Me₂Si | 4-(dimethoxyphenylsilyl)-phenyl |
| 50c | Zr | Cl | Me₂Si | 4-(ethoxydiphenylsilyl)-phenyl |
| 51c | Zr | Cl | Me₂Si | 4-(diethoxyphenylsilyl)-phenyl |
| 52c | Zr | Cl | Me₂Si | 4-(allyldimethylsilyl)-phenyl |
| 53c | Zr | Cl | Me₂Si | 4-(diallylmethylsilyl)-phenyl |
| 54c | Zr | Cl | Me₂Si | 4-(triallylsilyl)-phenyl |

TABLE c-3

$R^{3c}$ = Furyl or Thienyl Substituent

| No. | $M^{1c}$ | $X^{1c}$, $X^{2c}$ | $Q^{1c}$ | $R^{3c}$ |
|---|---|---|---|---|
| 55c | Zr | Cl | Me₂Si | 2-furyl |
| 56c | Zr | Cl | Me₂Si | 5-methyl-2-furyl |
| 57c | Zr | Br | Me₂Si | 5-methyl-2-furyl |
| 58c | Zr | Me | Me₂Si | 5-methyl-2-furyl |
| 59c | Zr | Ph | Me₂Si | 5-methyl-2-furyl |
| 60c | Zr | Cl | Et₂Si | 5-methyl-2-furyl |
| 61c | Zr | Cl | Ph₂Si | 5-methyl-2-furyl |
| 62c | Zr | Cl | silacy-clobutyl | 5-methyl-2-furyl |

TABLE c-3-continued

R$^{3c}$ = Furyl or Thienyl Substituent

| No. | M$^{1c}$ | X$^{1c}$, X$^{2c}$ | Q$^{1c}$ | R$^{3c}$ |
|---|---|---|---|---|
| 63c | Zr | Cl | silacyclohexyl | 5-methyl-2-furyl |
| 64c | Zr | Cl | Me$_2$C | 5-methyl-2-furyl |
| 65c | Zr | Cl | Ph$_2$C | 5-methyl-2-furyl |
| 66c | Zr | Cl | Me$_2$Ge | 5-methyl-2-furyl |
| 67c | Zr | Cl | Me$_2$Si | 5-ethyl-2-furyl |
| 68c | Zr | Cl | Me$_2$Si | 5-n-propyl-2-furyl |
| 69c | Zr | Cl | Me$_2$Si | 5-i-propyl-2-furyl |
| 70c | Zr | Cl | Me$_2$Si | 5-n-butyl-2-furyl |
| 71c | Zr | Cl | Me$_2$Si | 5-i-butyl-2-furyl |
| 72c | Zr | Cl | Me$_2$Si | 5-tert-butyl-2-furyl |
| 73c | Zr | Cl | Me$_2$Si | 5-trimethylsilyl-2-furyl |
| 74c | Zr | Cl | Me$_2$Si | 5-triethylsilyl-2-furyl |
| 75c | Zr | Cl | Me$_2$Si | 5-phenyl-2-furyl |
| 76c | Zr | Cl | Me$_2$Si | 5-tolyl-2-furyl |
| 77c | Zr | Cl | Me$_2$Si | 5-fluorophenyl-2-furyl |
| 78c | Zr | Cl | Me$_2$Si | 5-chlorophenyl-2-furyl |
| 79c | Zr | Cl | Me$_2$Si | 4,5-dimethyl-2-furyl |
| 80c | Zr | Cl | Me$_2$Si | 2-benzofuryl |
| 81c | Zr | Cl | Me$_2$Si | 2-thienyl |
| 82c | Zr | Cl | Me$_2$Si | 5-methyl-2-thienyl |
| 83c | Zr | Cl | Me$_2$Si | 5-ethyl-2-thienyl |
| 84c | Zr | Cl | Me$_2$Si | 5-n-propyl-2-thienyl |
| 85c | Zr | Cl | Me$_2$Si | 5-i-propyl-2-thienyl |
| 86c | Zr | Cl | Me$_2$Si | 5-tert-butyl-2-thienyl |
| 87c | Zr | Cl | Me$_2$Si | 5-trimethylsilyl-2-thienyl |
| 88c | Zr | Cl | Me$_2$Si | 5-triethylsilyl-2-thienyl |
| 89c | Zr | Cl | Me$_2$Si | 5-phenyl-2-thienyl |
| 90c | Zr | Cl | Me$_2$Si | 5-tolyl-2-thienyl |
| 91c | Zr | Cl | Me$_2$Si | 5-fluorophenyl-2-thienyl |
| 92c | Zr | Cl | Me$_2$Si | 5-chlorophenyl-2-thienyl |
| 93c | Zr | Cl | Me$_2$Si | 4,5-dimethyl-2-thienyl |
| 94c | Zr | Cl | Me$_2$Si | 2-benzothienyl |

TABLE c-4

R$^{3c}$ = Halogen-Substituted Phenyl Group

| No. | M$^{1c}$ | X$^{1c}$, X$^{2c}$ | Q$^{1c}$ | R$^{3c}$ |
|---|---|---|---|---|
| 95c | Zr | Cl | Me$_2$Si | 4-chloro-phenyl |
| 96c | Zr | Br | Me$_2$Si | 4-chloro-phenyl |
| 97c | Zr | Me | Me$_2$Si | 4-chloro-phenyl |
| 98c | Zr | Ph | Me$_2$Si | 4-chloro-phenyl |
| 99c | Zr | Cl | Et$_2$Si | 4-chloro-phenyl |
| 100c | Zr | Cl | Ph$_2$Si | 4-chloro-phenyl |
| 101c | Zr | Cl | silacyclobutyl | 4-chloro-phenyl |
| 102c | Zr | Cl | silacyclohexyl | 4-chloro-phenyl |
| 103c | Zr | Cl | Me$_2$C | 4-chloro-phenyl |
| 104c | Zr | Cl | Ph$_2$C | 4-chloro-phenyl |
| 105c | Zr | Cl | Me$_2$Ge | 4-chloro-phenyl |
| 106c | Zr | Cl | Me$_2$Si | 4-bromo-phenyl |
| 107c | Zr | Cl | Me$_2$Si | 4-iodo-phenyl |
| 108c | Zr | Cl | Me$_2$Si | 3,5-dichloro-phenyl |
| 109c | Zr | Cl | Me$_2$Si | 3,5-dibromo-phenyl |
| 110c | Zr | Cl | Me$_2$Si | 2,6-dichloro-phenyl |
| 111c | Zr | Cl | Me$_2$Si | 2,6-dibromo-phenyl |
| 112c | Zr | Cl | Me$_2$Si | 2,4,6-trichloro-phenyl |
| 113c | Zr | Cl | Me$_2$Si | 2,4,6-tribromo-phenyl |
| 114c | Zr | Cl | Me$_2$Si | 2,3,4,5,6-pentachloro-phenyl |
| 115c | Zr | Cl | Me$_2$Si | 2,3,4,5,6-pentabromo-phenyl |

TABLE c-5

R$^{3c}$ = Alkoxy-Substituted Phenyl Group

| No. | M$^{1c}$ | X$^{1c}$, X$^{2c}$ | Q$^{1c}$ | R$^{3c}$ |
|---|---|---|---|---|
| 116c | Zr | Cl | Me$_2$Si | 4-methoxy-phenyl |
| 117c | Zr | Br | Me$_2$Si | 4-methoxy-phenyl |
| 118c | Zr | Me | Me$_2$Si | 4-methoxy-phenyl |
| 119c | Zr | Ph | Me$_2$Si | 4-methoxy-phenyl |
| 120c | Zr | Cl | Et$_2$Si | 4-methoxy-phenyl |
| 121c | Zr | Cl | Ph$_2$Si | 4-methoxy-phenyl |
| 122c | Zr | Cl | silacyclobutyl | 4-methoxy-phenyl |
| 123c | Zr | Cl | silacyclohexyl | 4-methoxy-phenyl |
| 124c | Zr | Cl | Me$_2$C | 4-methoxy-phenyl |
| 125c | Zr | Cl | Ph$_2$C | 4-methoxy-phenyl |
| 126c | Zr | Cl | Me$_2$Ge | 4-methoxy-phenyl |
| 127c | Zr | Cl | Me$_2$Si | 4-ethoxy-phenyl |
| 128c | Zr | Cl | Me$_2$Si | 4-n-propoxy-phenyl |
| 129c | Zr | Cl | Me$_2$Si | 4-i-propoxy-phenyl |
| 130c | Zr | Cl | Me$_2$Si | 4-n-butoxy-phenyl |
| 131c | Zr | Cl | Me$_2$Si | 4-i-butoxy-phenyl |
| 132c | Zr | Cl | Me$_2$Si | 4-tert-butoxy-phenyl |
| 133c | Zr | Cl | Me$_2$Si | 4-phenoxy-phenyl |
| 134c | Zr | Cl | Me$_2$Si | 4-(2,4,6-trimethylphenoxy)-phenyl |
| 135c | Zr | Cl | Me$_2$Si | 4-(2,6-di-i-propylphenoxy)-phenyl |
| 136c | Zr | Cl | Me$_2$Si | 4-(2,6-di-tert-butylphenoxy)-phenyl |
| 137c | Zr | Cl | Me$_2$Si | 3,5-dimethoxy-phenyl |
| 138c | Zr | Cl | Me$_2$Si | 2,4,6-trimethoxy-phenyl |
| 139c | Zr | Cl | Me$_2$Si | 4-thiomethoxy-phenyl |
| 140c | Zr | Cl | Me$_2$Si | 4-dimethylamino-phenyl |
| 141c | Zr | Cl | Me$_2$Si | 4-diethylamino-phenyl |
| 142c | Zr | Cl | Me$_2$Si | 4-trimethylsilyloxy-phenyl |
| 143c | Zr | Cl | Me$_2$Si | 4-triethylsilyloxy-phenyl |

For example, compounds where zirconium of the compounds above is replaced by titanium or hafnium are also preferred.

Among specific compounds exemplified above, preferred metallocene compounds as the essential component (Ac) are described below. The compounds include, for example, 1c-10c, 12c to 65c, 67c to 80c, and 95c to 143c in Tables c-1 to c-5.

Preferred metallocene compounds also include, for example, compounds where zirconium of the compounds above is replaced by titanium or hafnium.

Among specific compounds exemplified above, more preferred metallocene compounds as the essential component (Ac) are described below. The compounds include, for example, 1c-4c, 7c, 8c, 12c to 38c, 44c to 47c, 52c to 59c, 62c, 63c, 67c to 80c, 116c to 123c, 127c to 136c, 142c, and 143c in Tables c-1 to c-5.

Preferred metallocene compounds also include, for example, compounds where zirconium of the compounds above is replaced by titanium or hafnium.

Furthermore, among specific compounds exemplified above, in terms of high polymerization activity, still more preferred metallocene compounds as the essential component (Ac) are described below. The compounds include, for example, 1c-8c, 12c to 38c, 44c to 47c, 52c to 63c, 67c to 80c, 116c to 123c, 127c to 136c, 142c, and 143c in Tables c-1 to c-5.

Preferred metallocene compounds also include, for example, compounds where zirconium of the compounds above is replaced by titanium or hafnium.

In addition, among specific compounds exemplified above, in terms of excellent moldability, still more preferred metallocene compounds as the essential component (Ac) are described below. The compounds include, for example, 1c-4-c, 7c to 10c, 12c to 59c, 62c to 65c, 67c to 80c, and 95c to 143c in Tables c-1 to c-5.

Preferred metallocene compounds also include, for example, compounds where zirconium of the compounds above is replaced by titanium or hafnium.

In the case of using these metallocene compounds as the component (Ac), two or more thereof may be also used.

Synthesis Method of Metallocene Compound

The metallocene compound of the present invention can be synthesized by an arbitrary method utilizing a form of a substituent or a bond. One example of the representative synthesis route is shown below.

[Chem. 29]

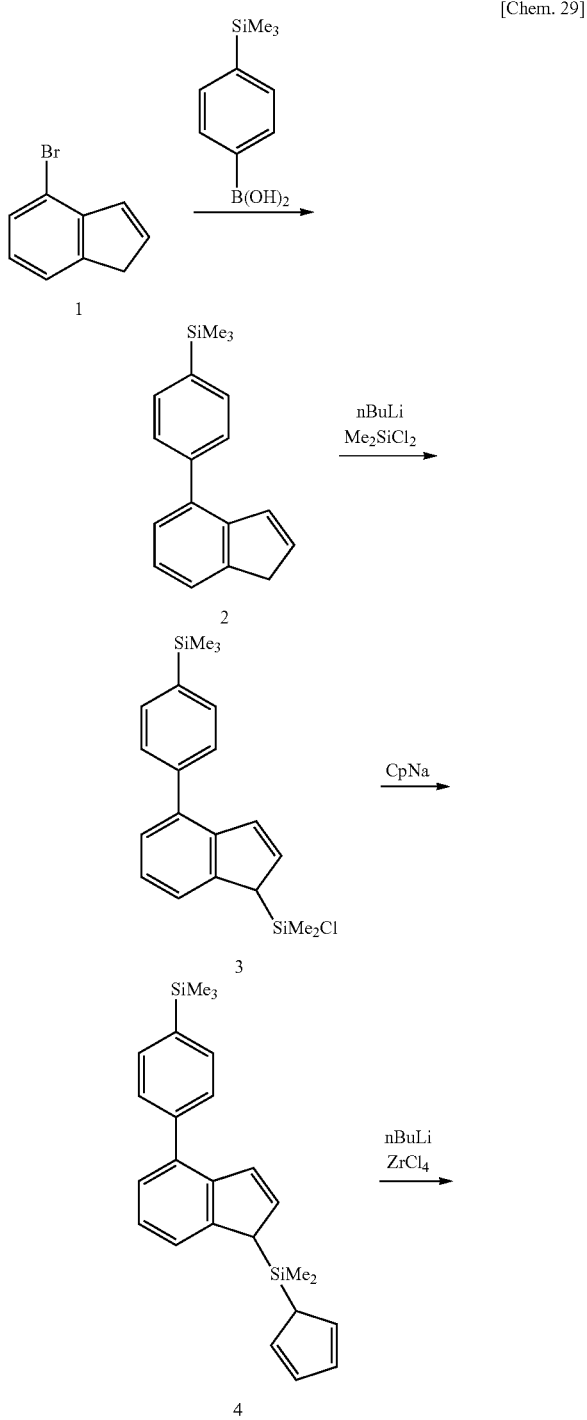

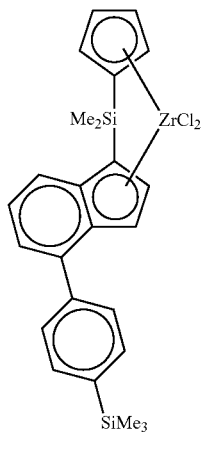

5

In the synthesis route above, a coupling reaction of Compound 1 and a 4-trimethylsilylphenylboronic acid is performed in the presence of a palladium catalyst to obtain Compound 2. Compound 2 is anionized with an equivalent of n-butyllithium or the like and then reacted with an excess amount of dimethyldichlorosilane, and thereafter, unreacted dimethyldichlorosilane is removed by distillation to obtain Compound 3. Compound 3 obtained is reacted with sodium cyclopentadienylide to obtain Compound 4, and Compound 4 is dianionized with 2 equivalents of n-butyllithium or the like and then reacted with zirconium tetrachloride to obtain Compound 5. The metallocene compound having introduced thereinto a substituent can be synthesized by using a corresponding raw material for substitution, and a corresponding substituent can be introduced into the 4-position of the indenyl ring by using a corresponding boronic acid, for example, 4-chlorophenylboronic acid, 4-methoxyphenylboronic acid, 5-methylfuryl-2-boronic acid, 4,5-dimethylfuryl-2-boronic acid or 2-thienylboronic acid, in place of 4-trimethylsilylphenylboronic acid.

IV-3. Olefin Polymerization Catalyst of the Present Invention Containing Olefin Polymerization Catalyst Components (A-1b) and (A-2b) of the Present Invention or Olefin Polymerization Catalyst of the Present Invention Containing Olefin Polymerization Catalyst Component (Ac) of the Present Invention The olefin polymerization catalyst of the present invention comprises the following components (A) and (B) and, if desired, further contains the component (C):

component (A): the olefin polymerization catalyst component of the present invention specified above, component (B): a compound capable of reacting with the component (A) to produce a cationic metallocene compound, and component (C): a microparticle support.

The olefin polymerization catalyst of the present invention is described below item by item (hereinafter, the olefin polymerization catalyst component of the present invention is sometimes referred to as component (A) or simply as A).

IV-3(1). Component (B)

The olefin polymerization catalyst of the present invention contains, as the component (B), a compound capable of reacting with the metallocene compound of the component (A) to produce a cationic metallocene compound (hereinafter, sometimes referred to as component (B) or simply as B) and preferably contains the component (B) and a microparticle support (preferred component (C); hereinafter sometimes simply referred to as C).

One of the compounds (B) capable of reacting with the metallocene compound (A) to produce a cationic metallocene compound is an organoaluminum oxy compound.

The organoaluminum oxy compound has an Al—O—Al bond in the molecule, and the number of bonds is usually from 1 to 100, preferably from 1 to 50. Such an organoaluminum oxy compound is a product obtained usually by reacting an organoaluminum compound and water.

The reaction of an organoaluminum and water is usually performed in an inert hydrocarbon (solvent). As the inert hydrocarbon, an aliphatic hydrocarbon, an alicyclic hydrocarbon and an aromatic hydrocarbon, such as pentane, hexane, heptane, cyclohexane, methylcyclohexane, benzene, toluene and xylene, can be used, but it is preferred to use an aliphatic hydrocarbon or an aromatic hydrocarbon.

As the organoaluminum compound used for preparing the organoaluminum oxy compound, any of compounds represented by the following formula (11b) may be usable, but a trialkylaluminum is preferably used.

$$R^{23b}{}_t AlX^{21b}{}_{3-t}\qquad\text{formula (11b)}$$

(wherein $R^{23b}$ represents a hydrocarbon group having a carbon number of 1 to 18, preferably from 1 to 12, such as alkyl group, alkenyl group, aryl group and aralkyl group, $X^{21b}$ represents a hydrogen atom or a halogen atom, and t represents an integer of $1\le t\le 3$).

The alkyl group of the trialkylaluminum may be any of a methyl group, an ethyl group, a propyl group, an isopropyl group, a butyl group, an isobutyl group, a pentyl group, a hexyl group, an octyl group, a decyl group, a dodecyl group and the like, but among others, is preferably a methyl group.

Two or more of the organoaluminum compounds above can be also mixed and used.

The ratio between water and the organoaluminum compound in the reaction (molar ratio of water/Al) is preferably from 0.25/1 to 1.2/1, more preferably from 0.5/1 to 1/1. The reaction temperature is usually from −70 to 100° C., preferably from −20 to 20° C. The reaction time is selected in the range of usually from 5 minutes to 24 hours, preferably from 10 minutes to 5 hours. As the water required in the reaction, not only mere water but also crystal water contained, for example, in copper sulfate hydrate or aluminum sulfate hydrate or a component capable of producing water in the reaction system can be utilized.

Incidentally, out of the organoaluminum oxy compounds described above, those obtained by reacting an alkylaluminum with water is usually called aluminoxane and among others, methylaluminoxane (encompassing those substantially composed of methylaluminoxane (MAO)) is preferred as the organoaluminum oxy compound.

Of course, as the organoaluminum oxy compound, two or more of the organoaluminum oxy compounds described above may be used in combination. Also, the organoaluminum oxy compound may be used as a solution by dissolving or dispersing it in the above-described inert hydrocarbon solvent.

When an organoaluminum oxy compound is used as the component (B) of the olefin polymerization catalyst component of the present invention, the strain hardening (λmax) of the obtained ethylene-based polymer becomes high or Mz/Mw (where Mz is a Z average molecular weight measured by GPC and Mw is a weight average molecular weight measured by the same method) indicative of the high-molecular-weight component content becomes large and in turn, the moldability is advantageously more improved.

Other specific examples of the compound (B) capable of reacting with the metallocene compound (A) to form a cationic metallocene compound include a borane compound and a borate compound.

More specifically, examples of the borane compound include triphenylborane, tri(o-tolyl)borane, tri(p-tolyl)borane, tri(m-tolyl)borane, tri(o-fluorophenyl)borane, tris(p-fluorophenyl)borane, tris(m-fluorophenyl)borane, tris(2,5-difluorophenyl)borane, tris(3,5-difluorophenyl)borane, tris(4-trifluoromethylphenyl)borane, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl), tris(perfluoroanthryl)borane and tris(perfluorobinaphthyl)borane.

Among these compounds, preferred are tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl)borane, tris(perfluoroanthryl)borane and tris(perfluorobinaphthyl)borane, and more preferred are tris(2,6-ditrifluoromethylphenyl)borane, tris(pentafluorophenyl)borane, tris(perfluoronaphthyl)borane and tris(perfluorobiphenyl)borane.

A first example of the borate compound is specifically a compound represented by the following formula (12b):

$$[L^{1b}\text{-H}]^+[BR^{24b}R^{25b}X^{31b}X^{32b}]^-\qquad\text{formula (12b)}$$

In formula (12b), $L^{1b}$ is a neutral Lewis base, H is a hydrogen atom, and $[L^{1b}\text{-H}]$ is a Broensted acid such as ammonium, anilinium and phosphonium.

Examples of the ammonium include a trialkyl-substituted ammonium such as trimethylammonium, triethylammonium, tripropylammonium, tributylammonium and tri(n-butyl)ammonium, and a dialkylammonium such as di(n-propyl)ammonium and dicyclohexylammonium.

Examples of the anilinium include an N,N-dialkylanilinium such as N,N-dimethylanilinium, N,N-diethylanilinium and N,N-2,4,6-pentamethylanilinium.

Furthermore, examples of the phosphonium include a triarylphosphonium and a trialkylphosphonium, such as triphenylphosphonium, tributylphosphonium, tri(methylphenyl)phosphonium and tri(dimethylphenyl)phosphonium.

In formula (12b), each of $R^{24b}$ and $R^{25b}$ is independently the same or different aromatic or substituted aromatic hydrocarbon group having a carbon number of 6 to 20, preferably from 6 to 16, and these groups may be connected with each other through a bridging group. The substituent of the substituted aromatic hydrocarbon group is preferably an alkyl group typified by a methyl group, an ethyl group, a propyl group and an isopropyl group, or a halogen atom such as fluorine, chlorine, bromine and iodine.

Furthermore, each of $X^{31b}$ and $X^{32}$ is independently a hydride group, a halide group, a hydrocarbon group having a carbon number of 1 to 20, or a substituted hydrocarbon group having a carbon number of 1 to 20, in which one or more hydrogen atoms are substituted for by a halogen atom.

Specific examples of the compound represented by formula (12b) include tributylammoniumtetra(pentafluorophenyl)borate, tributylammoniumtetra(2,6-ditrifluoromethylphenyl)borate, tributylammoniumtetra(3,5-ditrifluoromethylphenyl)borate, tributylammoniumtetra(2,6-difluorophenyl)borate, tributylammoniumtetra(perfluoronaphthyl)borate, dimethylaniliniumtetra(pentafluoronaphthyl)borate, dimethylaniliniumtetra(2,6-ditrifluoromethylphenyl)borate, dimethylaniliniumtetra(3,5-ditrifluoromethylphenyl)borate, dimethylaniliniumtetra(2,6- difluorophenyl)borate, dimethylaniliniumtetra(perfluoronaphthyl)borate, triphenylphosphoniumtetra(pentafluorophenyl)borate, triphenylphosphoniumtetra(2,6-ditrifluoromethylphenyl)borate, triphenylphosphoniumtetra(3,5-ditrifluoromethylphenyl)borate, triphenylphosphoniumtetra(2,6-difluorophenyl)borate, triphenylphosphoniumtetra(perfluoronaphthyl)borate, trimethylammoniumtetra(2,6-ditrifluoromethylphenyl)borate, triethylammoniumtetra(pentafluorophenyl)borate, triethylammoniumtetra(2,6-ditrifluoromethylphenyl)borate, triethylammoniumtetra(perfluoronaphthyl)borate, tripropylammoniumtetra(pentafluorophenyl)borate, tripropylammoniumtetra(2,6-ditrifluoromethylphenyl)borate, tripropylammoniumtetra(perfluoronaphthyl)borate, di(1-propyl)ammoniumtetra(pentafluorophenyl)borate, and dicyclohexylammoniumtetraphenylborate.

Among these, preferred are tributylammoniumtetra(pentafluorophenyl)borate, tributylammoniumtetra(2,6-ditrifluoromethylphenyl)borate, tributylammoniumtetra(3,5-ditrifluoromethylphenyl)borate, tributylammoniumtetra(perfluoronaphthyl)borate, dimethylaniliniumtetra(pentafluorophenyl)borate, dimethylanilinumtetra(2,6-ditrifluoromethylphenyl)borate, dimethylaniliniumtetra(3,5-ditrifluoromethylphenyl)borate and dimethylaniliniumtetra(perfluoronaphthyl)borate.

A second example of the borate compound is represented by the following formula (13b):

formula (13b)

In formula (13b), $L^{2b}$ includes, for example, a carbo-cation, a methyl cation, an ethyl cation, a propyl cation, an isopropyl cation, a butyl cation, an isobutyl cation, a tert-butyl cation, a pentyl cation, a tropinium cation, a benzyl cation, a trityl cation, a sodium cation, and a proton. $R^{26b}$, $R^{27b}$, $X^{41b}$ and $X^{42b}$ have the same definitions as in formula (12b).

Specific examples of the compound above include trityltetraphenylborate, trityltetra(o-tolyl)borate, trityltetra(p-tolyl) borate, trityltetra(m-tolyl)borate, trityltetra(o-fluorophenyl) borate, trityltetra(p-fluorophenyl)borate, trityltetra(m-fluorophenyl)borate, trityltetra(3,5-difluorophenyl)borate, trityltetra(pentafluorophenyl)borate, trityltetra(2,6-ditrifluoromethylphenyl)borate, trityltetra(3,5-ditrifluoromethylphenyl)borate, trityltetra(perfluoronaphthyl)borate, tropinium-tetraphenylborate, tropinium-tetra(o-tolyl)borate, tropinium-tetra(p-tolyl)borate, tropinium-tetra(m-tolyl)borate, tropinium-tetra(o-fluorophenyl)borate, tropinium-tetra(p-fluorophenyl)borate, tropinium-tetra(m-fluorophenyl)borate, tropinium-tetra(3,5-difluorophenyl)borate, tropinium-tetra(pentafluorophenyl)borate, tropinium-tetra(2,6-ditrifluoromethylphenyl)borate, tropinium-tetra(3,5-ditrifluoromethylphenyl)borate, tropinium-tetra(perfluoronaphthyl)borate, $NaBPh_4$, $NaB(o-CH_3-Ph)_4$, $NaB(p-CH_3-Ph)_4$, $NaB(m-CH_3-Ph)_4$, $NaB(o-F-Ph)_4$, $NaB(p-F-Ph)_4$, $NaB(m-F-Ph)_4$, $NaB(3,5-F_2-Ph)_4$, $NaB(C_6F_5)_4$, $NaB(2,6-(CF_3)_2-Ph)_4$, $NaB(3,5-(CF_3)_2-Ph)_4$, $NaB(C_{10}F_7)_4$, $H^+BPh_4$.2-diethyl ether, $H^+B(3,5-F_2-Ph)_4$.2-diethyl ether, $H^+B(C_6F_5)_4^-$.2-diethyl ether, $H^+B(2,6-(CF_3)_2-Ph)_4$.2-diethyl ether, $H^+B(3,5-(CF_3)_2-Ph)_4$.2-diethyl ether, and $H^+B(C_{10}H_7)_4$.2-diethyl ether.

Among these, preferred are trityltetra(pentafluorophenyl) borate, trityltetra(2,6-ditrifluoromethylphenyl)borate, trityltetra(3,5-ditrifluoromethylphenyl)borate, trityltetra(perfluoronaphthyl)borate, tropinium-tetra(pentafluorophenyl) borate, tropinium-tetra(2,6-ditrifluoromethylphenyl)borate, tropinium-tetra(3,5-ditrifluoromethylphenyl)borate, tropinium-tetra(perfluoronaphthyl)borate, $NaB(C_6F_5)_4$, $NaB(2,6-(CF_3)_2-Ph)_4$, $NaB(3,5-(CF_3)_2-Ph)_4$, $NaB(C_{10}F_7)_4$, $H^+B(C_6F_5)_4^-$.2-diethyl ether, $H^+B(2,6-(CF_3)_2-Ph)_4$.2-diethyl ether, $H^+B(3,5-(CF_3)_2-Ph)_4$.2-diethyl ether and $H^+B(C_{10}H_7)_4$.2-diethyl-ether.

Among these, still more preferred are trityltetra(pentafluorophenyl)borate, trityltetra(2,6-ditrifluoromethylphenyl)borate, tropinium-tetra(pentafluorophenyl)borate, tropinium-tetra(2,6-ditrifluoromethylphenyl)borate, $NaB(C_6F_5)_4$, $NaB(2,6-(CF_3)_2-Ph)_4$, $H^+B(C_6F_5)_4^-$.2-diethyl ether, $H^+B(2,6-(CF_3)_2-Ph)_4$.2-diethyl ether, $H^+B(3,5-(CF_3)_2-Ph)_4$.2-diethyl ether and $H^+B(C_{10}H_7)_4$.2-diethyl ether.

When a borane compound or a borate compound is used as the catalyst component (B), the polymerization activity or copolymerizability is increased and therefore, the productivity of an ethylene-based polymer having a long-chain branch is enhanced.

Also, a mixture of the above-described organoaluminum oxy compound and the above-described borane or borate compound may be also used as the component (B) of the olefin polymerization catalyst. Furthermore, two or more of those borane or borate compounds may be mixed and used.

As other specific examples of the compound (B) capable of reacting with the metallocene compound (A) to form a cationic metallocene compound, a compound having the same action as the above-described organoaluminum oxy compound or the above-described borane or borate compound, such as clay, clay mineral, ion-exchanging layered compound and inorganic silicate described, for example, in JP-A-8-127613 and solid oxide compound described, for example, JP-T-2002-515522, may be also used in the same manner.

IV-3(2). Preferred Component (C)

The microparticle support as the preferred component (C) of the olefin polymerization catalyst of the present invention includes an inorganic support, a particulate polymer support, and a mixture thereof. As the inorganic support, a metal, a metallic oxide, a metallic chloride, a metallic carbonate, a carbonaceous substance, or a mixture thereof can be used.

Preferred examples of the metal that can be used for the inorganic support include iron, aluminum, and nickel.

The metallic oxide includes a single oxide or a composite oxide of elements belonging to Groups 1 to 14 of the periodic table, and examples thereof include various natural or synthetic, single or composite oxides such as $SiO_2$, $Al_2O_3$, $MgO$, $CaO$, $B_2O_3$, $TiO_2$, $ZrO_2$, $Fe_2O_3$, $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$ and $SiO_2 \cdot MgO$. Here, these formulae are not a molecular formula but indicate only a composition, and the structure and component ratio of the composite oxide for use in the present invention are not particularly limited.

Also, the metallic oxide for use in the present invention may have absorbed a small amount of water or may contain a small amount of impurities.

As the metallic chloride, for example, a chloride of an alkali metal or an alkaline earth metal is preferred, and specifically, $MgCl_2$, $CaCl_2$ and the like are suited in particular.

As the metallic carbonate, a carbonate of an alkali metal or an alkaline earth metal is preferred, and specific examples thereof include magnesium carbonate, calcium carbonate, and barium carbonate.

The carbonaceous substance includes, for example, carbon black and activated carbon.

All of these inorganic supports can be suitably used in the present invention, but among others, use of a metallic oxide, silica, alumina or the like is preferred.

Such an in organic support is preferably used by burning it in an air or an inert gas such as nitrogen or argon at a temperature of usually from 200 to 800° C., preferably from 400 to 600° C., thereby adjusting the amount of a surface hydroxyl group to be from 0.8 to 1.5 mmol/g.

The property of the inorganic support is not particularly limited, but it is usually preferred to use an inorganic support having an average particle diameter of 5 to 200 μm, preferably from 10 to 150 μm, an average pore diameter of 20 to 1,000 Å, preferably from 50 to 500 Å, a specific surface area of 150 to 1,000 m$^2$/g, preferably from 200 to 700 m$^2$/g, a pore volume of 0.3 to 2.5 cm$^3$/g, preferably from 0.5 to 2.0 cm$^3$/g, and an apparent specific gravity of 0.20 to 0.50 g/cm$^3$, preferably from 0.25 to 0.45 g/cm$^3$.

The inorganic support may be of course used as it is but may be used after applying a preliminary treatment of contacting such a support with an organoaluminum compound such as trimethylaluminum, triethylaluminum, triisobutylaluminum, trihexylaluminum, tripropylaluminum, tributylaluminum, trioctylaluminum, tridecylaluminum and diisobutylaluminum hydride, or an organoaluminum oxy compound containing an Al—O—Al bond.

In addition, a powder of the component (A) or component (B) can be also used as the microparticle support.

IV-3(3). Preparation Method of Olefin Polymerization Catalyst of the Present Invention At the time of obtaining an olefin polymerization catalyst by using an olefin polymerization catalyst component containing (A) a metallocene compound as an essential component of the olefin polymerization catalyst component of the present invention, (B) a compound, as the same essential component, capable of reacting with the metallocene compound (A) to produce a cationic metallocene compound, and (C) a microparticle support as a preferred component, the method for contacting respective components is not particularly limited and, for example, the following methods can be arbitrarily employed.

(I) A method of contacting the metallocene compound (A) with the compound (B) capable of reacting with the metallocene compound (A) to produce a cationic metallocene compound and thereafter, contacting the microparticle support (C).

(II) A method of contacting the metallocene compound (A) with the microparticle support (C) and thereafter, contacting the compound (B) capable of reacting with the metallocene compound (A) to produce a cationic metallocene compound.

(III) A method of contacting the compound (B) capable of reacting with the metallocene compound (A) to produce a cationic metallocene compound with the microparticle support (C) and thereafter, contacting the metallocene compound (A).

Among these contacting methods, the methods of (I) and (III) are preferred, and the method of (I) is most preferred. In the contacting methods above, the essential component (A-1b) and the essential component (A-2b), which are the metallocene compound (A), may be treated after mixing or may be separately treated, and, for example, a method of using the component (A-1b) by the method of (I) among specific examples above and using the component (A-2b) by the method of (III) may be also employed.

In all of these contacting methods, generally, a method of contacting respective components with or without stirring in an inert atmosphere of nitrogen, argon or the like in the presence of a liquid inert hydrocarbon, for example, an aromatic hydrocarbon (usually having a carbon number of 6 to 12) such as benzene, toluene, xylene and ethylbenzene, or an aliphatic or alicyclic hydrocarbon (usually having a carbon number of 5 to 12) such as heptane, hexane, decane, dodecane and cyclohexane, is usually employed.

This contact is preferably performed usually at a temperature of −100 to 200° C., preferably from −50 to 100° C., more preferably from 0 to 50° C., for 5 minutes to 50 hours, preferably from 30 minutes to 24 hours, more preferably from 30 minutes to 12 hours.

Also, at the time of containing the metallocene compound (A), the compound (B) capable of reacting with the metallocene compound (A) to produce a cationic metallocene compound, and the microparticle support (C), as described above, both an aromatic hydrocarbon solvent in which a certain component is soluble or sparingly soluble, and an aliphatic or alicyclic hydrocarbon solvent in which a certain component is insoluble or sparingly soluble, can be used.

In the case of stepwise performing the contact reaction of respective components with each other, the solvent and the like used in the previous stage need not be removed but may be used directly for the solvent in the contact reaction in the latter stage. Also, after the previous-stage contact reaction using a soluble solvent, the desired product may be collected as a solid matter by adding a liquid inert hydrocarbon (for example, an aliphatic hydrocarbon, an alicyclic hydrocarbon or an aromatic hydrocarbon, such as pentane, hexane, decane, dodecane, cyclohexane, benzene and toluene) in which a certain component is insoluble or sparingly soluble, or the desired product may be taken out as a solid matter by once removing a part or the whole of the soluble solvent by means of drying or the like, and thereafter, the latter-stage contact reaction of the desired product may be performed using any of the above-described inert hydrocarbon solvents. In the present invention, the contact reaction of respective components may be performed a plurality of times.

In the present invention, the ratio at which the metallocene compound (A), the compound (B) capable of reacting with the metallocene compound (A) to produce a cationic metallocene compound, and the microparticle support (C) are used is not particularly limited, but the following ranges are preferred.

The ratio between the component (A-1b) and the component (A-2b) that are the metallocene compound (A) is set in an arbitrary range according to the material properties required of the olefin-based polymer as a final product but usually, letting the total of both components be 100, the ratio is from 1:99 to 99.9:0.1, preferably from 5:95 to 99.5:0.5, more preferably from 10:90 to 99.5:0.5, still more preferably from 20:80 to 99.5:0.5, yet still more preferably from 40:60 to 99.2:0.8. If the ratio of the component (A-1b) is less than 1, the moldability of a olefin-based polymer as the product may not be enhanced due to lacking in production of a macromer and insufficient formation of a long-chain branch, or since the component (A-2b) for producing a polymer having a higher molecular weight becomes a main active species, polymerization must be performed under the condition having much hydrogen that is a molecular weight adjusting agent, namely, under the condition disadvantageous for production of a long-chain branch, as a result, the moldability is still not enhanced or a polymer produced from a small amount of the component (A-1b) is more reduced in the molecular weight, making the product sticky, which is not preferred. If the ratio of the component (A-1b) exceeds 99.9, it becomes difficult to sufficiently increase the molecular weight of the produced polymer, or the long-chain branch does not grow to a high enough molecular weight, disadvantageously failing in enhancing the moldability. In this connection, selection of the molar ratio between the component (A-1b) and the component (A-2b) varies depending on whether the olefin polymerization activities of both components greatly differ or are at the same level, and therefore, needless to say, the molar ratio must be consistently optimized according to the material properties of the target olefin-based polymer.

In the case of using an organoaluminum oxy compound as the compound (B) capable of reacting with the metallocene compound (A) to produce a cationic metallocene compound, the atom ratio (Al/M) of aluminum of the organoaluminum oxy compound to the transition metal (M) in the metallocene compound (A) is usually from 1 to 100,000, preferably from 5 to 1,000, more preferably from 50 to 200. In the case of using a borane compound or a borate compound, the atom ratio (B/M) of boron to the transition metal (M) in the metallocene compound is preferably selected in the range of usually from 0.01 to 100, preferably from 0.1 to 50, more preferably from 0.2 to 10.

Furthermore, in the case of using a mixture of an organoaluminum oxy compound and a borane or borate compound as the compound (B) for producing a cationic metallocene compound, each compound in the mixture is preferably used at the same ratio to the transition metal (M) as above.

The amount of the microparticle support (C) used is preferably 1 g for 0.0001 to 5 mmol, preferably for 0.001 to 0.5 mmol, more preferably for 0.01 to 0.1 mmol, of the transition metal in the metallocene compound (A).

The metallocene compound (A), the compound (B) capable of reacting with the metallocene compound (A) to produce a cationic metallocene compound, and the microparticle support (C) are contacted by any one of the contacting methods (I) to (III) above and thereafter, the solvent is removed, whereby the olefin polymerization catalyst can be obtained as a solid catalyst. The removal of the solvent is preferably performed under atmospheric pressure or reduced pressure at 0 to 200° C., preferably at 20 to 150° C., for 1 minute to 50 hours, preferably for 10 minutes to 10 hours.

Incidentally, the olefin polymerization catalyst can be also obtained by the following method.

(IV) The metallocene compound (A) and the microparticle support (C) are contacted and after removing the solvent, the obtained solid catalyst component is brought into contact with an organoaluminum oxy compound, a borane compound, a borate compound or a mixture thereof.

(V) An organoaluminum oxy compound, a borane compound, a borate compound or a mixture thereof is brought into contact with the microparticle support (C) and after removing the solvent, the obtained solid catalyst component is brought into contact with the metallocene compound (A) under polymerization conditions.

Also in these contacting methods of (IV) and (V), the same conditions as above can be used for the component ratio, the contacting conditions and the solvent removing conditions.

The thus-obtained olefin polymerization catalyst may be used after performing preliminary polymerization of a monomer, if desired.

It is also preferred that the olefin polymerization catalyst component or olefin polymerization catalyst of the present invention further contains a component (D): an organoaluminum compound. Examples of the organoaluminum compound used here include an organoaluminum compound described also in formula (11b), such as trimethylaluminum, triethylaluminum, triisobutylaluminum, diethylaluminum chloride and ethylaluminum dichloride; an alkoxide having a carbon number of 1 to 18, preferably from 1 to 12, such as diethylaluminum ethoxide, ethylaluminum diethoxide and dimethylaluminum ethoxide; an organoaluminum compound having an oxygen-containing hydrocarbon group, such as alkenyloxy; the above-described organoaluminum oxy compound; and a modified organoaluminum compound having a branched alkyl group. Among these, trimethylaluminum, triethylaluminum, triisobutylaluminum, diethylaluminum chloride, ethylaluminum dichloride and diethylaluminum ethoxide are preferred, triethylaluminum, triisobutylaluminum and diethylaluminum chloride are more preferred, triethylaluminum and triisobutylaluminum are still more preferred, and triethylaluminum is yet still more preferred.

IV-4. Use of Olefin Polymerization Catalyst of the Present Invention

The olefin polymerization catalyst of the present invention can be used for homopolymerization of an olefin or for copolymerization of an olefin and another olefin.

Here, the olefin includes an olefin having a carbon number of 2 to 30, preferably from 2 to 8, and is preferably ethylene or an α-olefin. Specific examples thereof include ethylene, propylene, 1-butene, 1-hexene, 1-octene, and 4-methyl-1-pentene. Homopolymerization of ethylene or copolymerization of ethylene and the α-olefin above is more preferred, and homopolymerization of ethylene, copolymerization of ethylene.propylene, copolymerization of ethylene.1-butene, copolymerization of ethylene.1-hexene, or copolymerization of ethylene.1-octene is still more preferred.

As the olefin, it is also possible to copolymerize three or more kinds of olefins.

The copolymerization may be any of alternating copolymerization, random copolymerization and block copolymerization. In the case of copolymerizing ethylene with another α-olefin, the amount of the another α-olefin may be arbitrarily selected in the range of 90 mol % or less of all monomers but is generally 40 mol % or less, preferably 30 mol % or less, more preferably 10 mol % or less. Of course, a small amount of a comonomer other than ethylene and an α-olefin may be used, and in this case, the comonomer includes a compound having a polymerizable double bond, for example, styrenes such as styrene, 4-methylstyrene and 4-dimethylaminostyrene, dienes such as 1,4-butadiene, 1,5-hexadiene, 1,4-hexadiene and 1,7-octadiene, a cyclic compound such as norbornene and cyclopentene, and oxygen-containing compounds such as hexenol, hexenoic acid and methyl octenoate.

In the present invention, the polymerization reaction may be performed preferably by slurry polymerization or gas phase polymerization in the presence of the above-described catalyst, preferably a supported catalyst.

In the case of slurry polymerization, ethylene or the like is polymerized, while substantially blocking oxygen, water and the like, in the presence or absence of an inert hydrocarbon solvent selected from an aliphatic hydrocarbon such as isobutane, hexane and heptane, an aromatic hydrocarbon such as benzene, toluene and xylene, and an alicyclic hydrocarbon such as cyclohexane and methylcyclohexane. Needless to say, a liquid monomer such as liquid ethylene and liquid propylene can be also used as the solvent.

In the case of gas phase polymerization, ethylene or the like is polymerized in a reactor in which a gas flow of ethylene or a comonomer is introduced, distributed or circulated.

In the present invention, the polymerization is more preferably gas phase polymerization. The polymerization conditions usually employed are such that the temperature is from 0 to 250° C., preferably from 20 to 110° C., more preferably from 60 to 100° C., the pressure is from atmospheric pressure to 10 MPa, preferably from atmospheric pressure to 4 MPa, more preferably from 0.5 to 2 MPa, and the polymerization time is from 5 minutes to 10 hours, preferably from 5 minutes to 5 hours.

The molecular weight of the produced polymer may be adjusted to a certain extent by changing the polymerization conditions such as polymerization temperature and molar ratio of catalyst, but the molecular weight can be more effectively adjusted by adding hydrogen to the polymerization reaction system.

Also, even when a component aiming at removing water, so-called a scavenger, is added to the reaction system, the polymerization can be performed without causing any trouble.

Examples of the scavenger used here include the organoaluminum compound described also in formula (11b) above, such as trimethylaluminum, triethylaluminum and triisobutylaluminum; the above-described organoaluminum oxy compound; a modified organoaluminum compound having a branched alkyl; an organozinc compound such as diethylzinc and dibutylzinc; an organomagnesium compound such as diethylmagnesium, dibutylmagnesium and ethylbutylmagnesium; and a Grignard compound such as ethylmagnesium chloride and butylmagnesium chloride. Among these, triethylaluminum, triisobutylaluminum and ethylbutylmagnesium are preferred, and triethylaluminum is more preferred.

The present invention can be applied without any trouble also for a multistage polymerization system consisting of two or more stages, in which polymerization conditions such as hydrogen concentration, monomer amount, polymerization pressure and polymerization temperature are different from one another.

[V] Production Method of Ethylene-Base Polymer of the Present Invention

A fourth aspect of the present invention is to provide a metallocene-based polyolefin having a sufficient number of long-chain branches having an appropriate length, preferably a metallocene-based polyethylene having a sufficient number of long-chain branches having an appropriate length. The fourth aspect of the present invention is described below item by item.

V-1. Olefin Polymerization Catalyst

The production method of an olefin-based polymer of the present invention, preferably the production method of an ethylene-based polymer, is performed using an olefin polymerization catalyst containing the following components (A) and (B) and, if desired, containing the component (C).

Component (A): at least any one of the following catalyst components:

(A-i) an olefin polymerization catalyst component containing the components (A-1b) and (A-2b) described in Item IV-1, (A-ii) an olefin polymerization catalyst component containing the component (Ac) described in Item IV-2, and (A-iii) an olefin polymerization catalyst component containing a metallocene compound represented by the following formula (1d):

[Chem. 30]

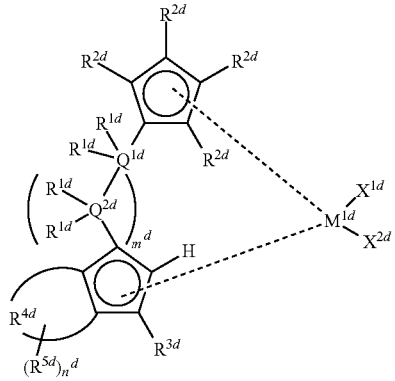

(1d)

[in formula (1d), Mid represents any one transition metal of Ti, Zr and Hf; each of $X^{1d}$ and $X^{2d}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20; each of $Q^{1d}$ and $Q^{2d}$ independently represents a carbon atom, a silicon atom or a germanium atom; each $R^{1d}$ independently represents a hydrogen atom or a hydrocarbon group having a carbon number of 1 to 10 and at least two members out of four $R^{1d}$ may combine to form a ring together with $Q^{1d}$ and $Q^{2d}$; $m^d$ is 0 or 1 and when $m^d$ is 0, $Q^{1d}$ is bonded directly to the conjugated 5-membered ring including $R^{2d}$ and $R^{3d}$; each of $R^{2d}$ and $R^{3d}$ represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, provided that at least one $R^{2d}$ is not a hydrogen atom; $R^{4d}$ represents a saturated or unsaturated divalent hydrocarbon group having a carbon number of 4 or 5 for forming a condensed ring with the 5-membered ring to which $R^{4d}$ is bonded; $R^{5d}$ is an atom or a group bonded to a carbon atom of $R^{4d}$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and $n^d$ represents an integer of 0 to 10 and when $n^d$ is 2 or more, at least two $R^{5d}$ may form a ring together with the carbon atoms to which $R^{5d}$ are bonded], Component (B): a compound capable of reacting with a metallocene compound of the component (A) to produce a cationic metallocene compound, and Component (C): a microparticle support.

The olefin polymerization catalyst used in the production method of an ethylene-based polymer, described as (A-iii) above, is characterized by containing a metallocene compound (Ad) represented by formula (1d) as an essential component.

In formula (1d), $M^{1d}$ of the metallocene compound represents Ti, Zr or Hf. $M^{1d}$ of the metallocene compound preferably represents Zr or Hf, and $M^{1d}$ of the metallocene compound more preferably represents Zr.

Each of $X^{1d}$ and $X^{2d}$ independently includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a methoxymethyl group, an ethoxymethyl group, an n-propoxymethyl group, an i-propoxymethyl group, an n-butoxymethyl group, an i-butoxymethyl group, a tert-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, an ethoxy group, an n-propoxy group, an i-propoxy group, an n-butoxy group, an i-butoxy group, a tert-butoxy group, a phenoxy group, a dimethylamino group, a diethylamino group, a di-n-propylamino group, a di-i-propylamino group, a di-n-butylamino group, a di-i-butylamino group, a di-tert-butylamino group, and a diphenylamino group.

Specific preferred examples of $X^{1d}$ and $X^{2d}$ include a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Among these specific examples, a chlorine atom, a methyl group and a dimethylamino group are more preferred.

Each of $Q^{1d}$ and $Q^{2d}$ independently represents a carbon atom, a silicon atom or a germanium atom and is preferably a carbon atom or a silicon atom, more preferably a silicon atom.

Each $R^{1d}$ independently includes, for example, a hydrogen atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, and a phenyl group. In the case where $R^{1d}$ forms a ring together with $Q^{1d}$ and $Q^{2d}$, examples include a cyclobutylidene group, a cyclopentylidene group, a cyclohexylidene group, a silacyclobutyl group, a silacyclopentyl group, and a silacyclohexyl group.

When $Q^{1d}$ or/and $Q^{2d}$ are a carbon atom, specific preferred examples of $R^{1d}$ include a hydrogen atom, a methyl group, an ethyl group, a phenyl group and a cyclobutylidene group, and when $Q^{1d}$ or/and $Q^{2d}$ are a silicon atom, specific preferred examples include a methyl group, an ethyl group, a phenyl group and a silacyclobutyl group.

Each of $R^{2d}$ and $R^{3d}$ includes, for example, a hydrogen atom, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 3,5-dimethylphenyl group, a 4-tert-butylphenyl group, a 3,5-di-tert-butylphenyl group, a bis(trimethylsilyl)methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, a furyl group, a tetrahydrofuryl group, a 2-methylfuryl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group.

Each of $R^{2d}$ and $R^{3d}$ is preferably a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, because the polymerization activity becomes high in particular. Furthermore, $R^{2d}$ is preferably a hydrocarbon group having a carbon number of 1 to 20, because the moldability of the polyethylene is excellent in particular.

Specific preferred examples of $R^{2d}$ and $R^{3d}$ include a hydrogen atom, a methyl group, an ethyl group, an n-propyl group, an i-propyl group, an n-butyl group, a tert-butyl group, an n-pentyl group, an n-hexyl group, a cyclohexyl group, a phenyl group, a 2-methylfuryl group, and a trimethylsilyl group. Among these specific examples, a hydrogen atom, a methyl group, an n-butyl group, a tert-butyl group, a phenyl group and a trimethylsilyl group are more preferred, and a hydrogen atom, a methyl group, a tert-butyl group, a phenyl group and a trimethylsilyl group are still more preferred.

Specific examples of the condensed cyclopentadienyl structure formed by $R^{4d}$ and a cyclopentadienyl moiety to which $R^{4d}$ is bonded, include the following partial structures (I) to (VI).

Among these specific examples, (I), (III) and (VI) are preferred. Also, $R^{5d}$ may be substituted on these partial structures (I) to (VI).

[Chem. 31]

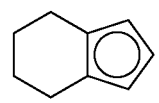

(I)

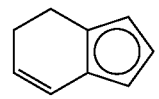

(II)

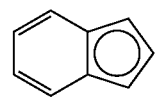

(III)

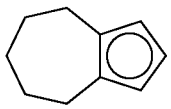
(IV)

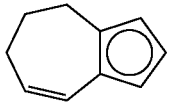
(V)

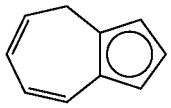
(VI)

The substituent $R^{5d}$ includes, in addition to a hydrogen atom, for example, a chlorine atom, a bromine atom, an iodine atom, a methyl group, an ethyl group, an n-propyl group, an i-propyl group, an n-butyl group, an i-butyl group, a tert-butyl group, an n-pentyl group, a neopentyl group, a cyclopentyl group, an n-hexyl group, a cyclohexyl group, a phenyl group, a benzyl group, a 2-methylphenyl group, a 3-methylphenyl group, a 4-methylphenyl group, a 4-tert-butylphenyl group, a 3,5-dimethylphenyl group, a 3,5-di-tert-butylphenyl group, a naphthyl group, an anthracenyl group, a bis(trimethylsilyl) methyl group, a bis(tert-butyldimethylsilyl)methyl group, a bromomethyl group, a chloromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 2,6-dichloro-4-trimethylsilylphenyl group, a trimethylsilyl group, a tri-tert-butylsilyl group, a di-tert-butylmethylsilyl group, a tert-butyldimethylsilyl group, a triphenylsilyl group, a diphenylmethylsilyl group, and a phenyldimethylsilyl group.

In the case where two or more $R^{5d}$ form a ring together with the carbon atoms to which $R^{5d}$ are bonded, examples include a benz[e]indenyl group, a benz[f]indenyl group, a 6,7-dihydroindacenyl group, a 5,5,7,7-tetramethyl-6,7-dihydroindacenyl group, a 5,6,7,8-tetrahydro-benz[f]indenyl group, and a 5,6,7,8-tetrahydro-5,5,8,8-tetramethyl-benz[f]indenyl group.

Specific preferred examples of $R^{5d}$ include a methyl group, an ethyl group, an n-propyl group, an i-propyl group, an n-butyl group, a tert-butyl group, an n-pentyl group, an n-hexyl group, a cyclohexyl group, a phenyl group, a naphthyl group, and a trimethylsilyl group.

In formula (1d), $m^d$ is 0 or 1 and when $m^d$ is 0, $Q^{1d}$ is bonded directly to the conjugated 5-membered ring including $R^{3d}$. Furthermore, $n^d$ represents an integer of 0 to 10 and when $n^d$ is 2 or more, at least two $R^{5d}$ may form a ring together with the carbon atoms to which $R^{5d}$ are bonded.

As the olefin polymerization catalyst according to the present invention, the metallocene compound of the essential component (Ad) is preferably a compound represented by the following formula (2d):

[Chem. 32]

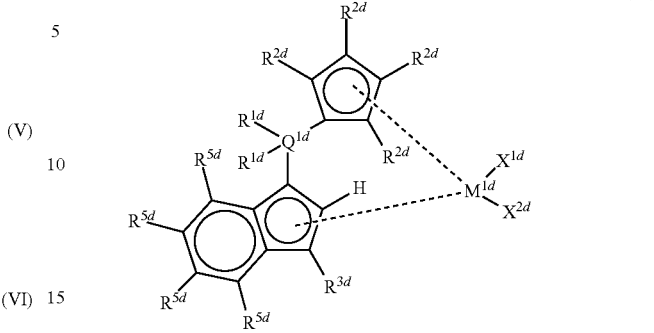
(2d)

In the metallocene compound represented by formula (2d), for $M^{1d}$, $X^{1d}$, $X^{2d}$, $Q^{1d}$, $R^{1d}$, $R^{2d}$, $R^{3d}$, $R^{4d}$ and $R^{5d}$, the same structures as the atoms and groups described in the metallocene compound represented by formula (1d) may be selected.

As the olefin polymerization catalyst according to the present invention, the metallocene compound of the essential component (Ad) is more preferably a compound represented by the following formula (3d):

[Chem. 33]

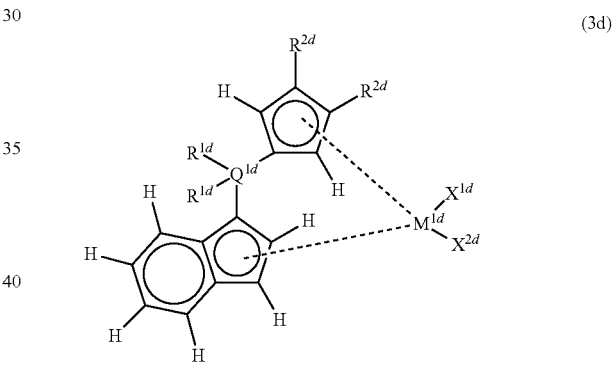
(3d)

In the metallocene compound represented by formula (3d), for $M^{1d}$, $X^{1d}$, $X^{2d}$, $Q^{1d}$, $R^{1d}$ and $R^{2d}$, the same structures as the atoms and groups described in the metallocene compound represented by formula (1d) may be selected.

Specific examples of the metallocene compound as the essential component (Ad) of the olefin polymerization catalyst for use in the production method of an ethylene-based polymer of the present invention are shown by formula (4d) and in Tables d-1 to d-4 below, but the present invention is not limited thereto. In Tables d-1 to d-4, TMS stands for trimethylsilyl, Ind stands for an indenyl group, and Cp stands for a cyclopentadienyl group.

[Chem. 34]

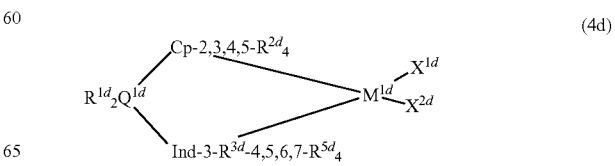
(4d)

Incidentally, the number indicating the position of each substituent on the cyclopentadienyl ring and indenyl ring of metallocene compounds recited as specific examples is as shown in the following formula (5d).

[Chem. 35]

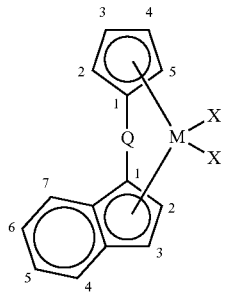

(5d)

TABLE d-1

| No. | $M^{1d}$ | $X^{1d}, X^{2d}$ | $R^{1d}{}_2Q^{1d}$ | Cp-2,3,4,5-$R^{2d}{}_4$ | Ind-3-$R^{3d}$-4,5,6,7-$R^{5d}{}_4$ |
|---|---|---|---|---|---|
| 1d | Zr | Cl | Me$_2$Si | 4-tBu-Cp | Ind |
| 2d | Zr | Cl | Me$_2$Si | 3-tBu-Cp | Ind |
| 3d | Zr | Cl | Me$_2$Si | 4-TMS-Cp | Ind |
| 4d | Zr | Cl | Me$_2$Si | 3-TMSCp | Ind |
| 5d | Zr | Cl | Me$_2$Si | 4-Me-Cp | Ind |
| 6d | Zr | Cl | Me$_2$Si | 3-Me-Cp | Ind |
| 7d | Zr | Cl | Me$_2$Si | 4-Et-Cp | Ind |
| 8d | Zr | Cl | Me$_2$Si | 3-Et-Cp | Ind |
| 9d | Zr | Cl | Me$_2$Si | 4-nPr-Cp | Ind |
| 10d | Zr | Cl | Me$_2$Si | 3-nPr-Cp | Ind |
| 11d | Zr | Cl | Me$_2$Si | 4-iPr-Cp | Ind |
| 12d | Zr | Cl | Me$_2$Si | 3-iPr-Cp | Ind |
| 13d | Zr | Cl | Me$_2$Si | 4-nBu-Cp | Ind |
| 14d | Zr | Cl | Me$_2$Si | 3-nBu-Cp | Ind |
| 15d | Zr | Cl | Me$_2$Si | 4-iBu-Cp | Ind |
| 16d | Zr | Cl | Me$_2$Si | 3-iBu-Cp | Ind |
| 17d | Zr | Cl | Me$_2$Si | 4-Ph-Cp | Ind |
| 18d | Zr | Cl | Me$_2$Si | 3-Ph-Cp | Ind |
| 19d | Zr | Cl | Me$_2$Si | 4-Et$_3$Si-Cp | Ind |
| 20d | Zr | Cl | Me$_2$Si | 3-Et$_3$Si-Cp | Ind |
| 21d | Zr | Cl | Me$_2$Si | 4-nPr$_3$Si-Cp | Ind |
| 22d | Zr | Cl | Me$_2$Si | 3-nPr$_3$Si-Cp | Ind |
| 23d | Zr | Cl | Me$_2$Si | 4-nBu$_3$Si-Cp | Ind |
| 24d | Zr | Cl | Me$_2$Si | 3-nBu$_3$Si-Cp | Ind |
| 25d | Zr | Cl | Me$_2$Si | 4-iBu$_3$Si-Cp | Ind |
| 26d | Zr | Cl | Me$_2$Si | 3-iBu$_3$Si-Cp | Ind |
| 27d | Zr | Cl | Me$_2$Si | 4-tri-n-pentylsilyl-Cp | Ind |
| 28d | Zr | Cl | Me$_2$Si | 3-tri-n-pentylsilyl-Cp | Ind |
| 29d | Zr | Cl | Me$_2$Si | 4-tri-n-hexylsilyl-Cp | Ind |
| 30d | Zr | Cl | Me$_2$Si | 3-tri-n-hexylsilyl-Cp | Ind |
| 31d | Zr | Cl | Me$_2$Si | 4-trivinylsilyl-Cp | Ind |
| 32d | Zr | Cl | Me$_2$Si | 3-trivinylsilyl-Cp | Ind |
| 33d | Zr | Cl | Me$_2$Si | 4-Ph$_3$Si-Cp | Ind |
| 34d | Zr | Cl | Me$_2$Si | 3-Ph$_3$Si-Cp | Ind |

TABLE d-2

(continued)

| No. | $M^{1d}$ | $X^{1d}, X^{2d}$ | $R^{1d}{}_2Q^{1d}$ | Cp-2,3,4,5-$R^{2d}{}_4$ | Ind-3-$R^{3d}$-4,5,6,7-$R^{5d}{}_4$ |
|---|---|---|---|---|---|
| 35d | Zr | Cl | Me$_2$Si | 4-tribenzylsilyl-Cp | Ind |
| 36d | Zr | Cl | Me$_2$Si | 3-tribenzylsilyl-Cp | Ind |
| 37d | Zr | Cl | Me$_2$Si | 4-tBuMe$_2$Si-Cp | Ind |
| 38d | Zr | Cl | Me$_2$Si | 3-tBuMe$_2$Si-Cp | Ind |
| 39d | Zr | Cl | Me$_2$Si | 2,4-Me$_2$-Cp | Ind |
| 40d | Zr | Cl | Me$_2$Si | 3,5-Me$_2$-Cp | Ind |
| 41d | Zr | Cl | Me$_2$Si | 2,4,5-Me$_3$-Cp | Ind |
| 42d | Zr | Cl | Me$_2$Si | 2,3,5-Me$_3$-Cp | Ind |
| 43d | Zr | Cl | Me$_2$Si | 2,3,4,5-Me$_4$-Cp | Ind |
| 44d | Zr | Cl | Me$_2$Si | 2-Me-4-Ph-Cp | Ind |
| 45d | Zr | Cl | Me$_2$Si | 3-Ph-5-Me-Cp | Ind |
| 46d | Zr | Me | Me$_2$Si | 4-tBu-Cp | Ind |
| 47d | Zr | Me | Me$_2$Si | 3-tBu-Cp | Ind |
| 48d | Zr | Me | Me$_2$Si | 4-TMS-Cp | Ind |
| 49d | Zr | Me | Me$_2$Si | 3-TMS-Cp | Ind |
| 50d | Zr | Me | Me$_2$Si | 4-Me-Cp | Ind |
| 51d | Zr | Me | Me$_2$Si | 3-Me-Cp | Ind |
| 52d | Zr | Ph | Me$_2$Si | 4-tBu-Cp | Ind |
| 53d | Zr | Ph | Me$_2$Si | 3-tBu-Cp | Ind |
| 54d | Zr | Ph | Me$_2$Si | 4-TMS-Cp | Ind |
| 55d | Zr | Ph | Me$_2$Si | 3-TMSCp | Ind |
| 56d | Zr | NMe$_2$ | Me$_2$Si | 4-tBu-Cp | Ind |
| 57d | Zr | NMe$_2$ | Me$_2$Si | 3-tBu-Cp | Ind |
| 58d | Zr | NMe$_2$ | Me$_2$Si | 4-TMS-Cp | Ind |
| 59d | Zr | NMe$_2$ | Me$_2$Si | 3-TMSCp | Ind |
| 60d | Zr | Cl | Et$_2$Si | 4-tBu-Cp | Ind |
| 61d | Zr | Cl | Et$_2$Si | 3-tBu-Cp | Ind |
| 62d | Zr | Cl | Et$_2$Si | 4-TMS-Cp | Ind |
| 63d | Zr | Cl | Et$_2$Si | 3-TMSCp | Ind |
| 64d | Zr | Cl | Et$_2$Si | 4-Ph-Cp | Ind |
| 65d | Zr | Cl | Et$_2$Si | 3-Ph-Cp | Ind |
| 66d | Zr | Cl | Ph$_2$Si | 4-tBu-Cp | Ind |
| 67d | Zr | Cl | Ph$_2$Si | 3-tBu-Cp | Ind |
| 68d | Zr | Cl | Ph$_2$Si | 4-TMS-Cp | Ind |
| 69d | Zr | Cl | Ph$_2$Si | 3-TMSCp | Ind |
| 70d | Zr | Cl | Ph$_2$Si | 4-Ph-Cp | Ind |
| 71d | Zr | Cl | Ph$_2$Si | 3-Ph-Cp | Ind |
| 72d | Zr | Cl | silacyclobutyl | 4-tBu-Cp | Ind |
| 73d | Zr | Cl | silacyclobutyl | 3-tBu-Cp | Ind |
| 74d | Zr | Cl | silacyclobutyl | 4-TMS-Cp | Ind |
| 75d | Zr | Cl | silacyclobutyl | 3-TMSCp | Ind |

TABLE d-3

(continued)

| No. | $M^{1d}$ | $X^{1d}, X^{2d}$ | $R^{1d}{}_2Q^{1d}$ | Cp-2,3,4,5-$R^{2d}{}_4$ | Ind-3-$R^{3d}$-4,5,6,7-$R^{5d}{}_4$ |
|---|---|---|---|---|---|
| 76d | Zr | Cl | silacyclobutyl | 4-Ph-Cp | Ind |
| 77d | Zr | Cl | silacyclobutyl | 3-Ph-Cp | Ind |
| 78d | Zr | Cl | H$_2$C | 4-tBu-Cp | Ind |
| 79d | Zr | Cl | H$_2$C | 3-tBu-Cp | Ind |
| 80d | Zr | Cl | H$_2$C | 4-TMS-Cp | Ind |
| 81d | Zr | Cl | H$_2$C | 3-TMSCp | Ind |
| 82d | Zr | Cl | H$_2$C | 4-Ph-Cp | Ind |
| 83d | Zr | Cl | H$_2$C | 3-Ph-Cp | Ind |
| 84d | Zr | Cl | Me$_2$C | 4-tBu-Cp | Ind |
| 85d | Zr | Cl | Me$_2$C | 3-tBu-Cp | Ind |
| 86d | Zr | Cl | Me$_2$C | 4-TMS-Cp | Ind |
| 87d | Zr | Cl | Me$_2$C | 3-TMSCp | Ind |
| 88d | Zr | Cl | Me$_2$C | 4-Ph-Cp | Ind |
| 89d | Zr | Cl | Me$_2$C | 3-Ph-Cp | Ind |
| 90d | Zr | Cl | Ph$_2$C | 4-tBu-Cp | Ind |
| 91d | Zr | Cl | Ph$_2$C | 3-tBu-Cp | Ind |
| 92d | Zr | Cl | Ph$_2$C | 4-TMS-Cp | Ind |
| 93d | Zr | Cl | Ph$_2$C | 3-TMSCp | Ind |
| 94d | Zr | Cl | Ph$_2$C | 4-Ph-Cp | Ind |
| 95d | Zr | Cl | Ph$_2$C | 3-Ph-Cp | Ind |
| 96d | Zr | Cl | cyclobutylidene | 4-tBu-Cp | Ind |

TABLE d-3-continued (continued)

| No. | $M^{1d}$ | $X^{1d}, X^{2d}$ | $R^{1d}_2Q^{1d}$ | Cp-2,3,4,5-$R^{2d}_4$ | Ind-3-$R^{3d}$-4,5,6,7-$R^{5d}_4$ |
|---|---|---|---|---|---|
| 97d | Zr | Cl | cyclobutylidene | 3-tBu-Cp | Ind |
| 98d | Zr | Cl | cyclobutylidene | 4-TMS-Cp | Ind |
| 99d | Zr | Cl | cyclobutylidene | 3-TMSCp | Ind |
| 100d | Zr | Cl | cyclobutylidene | 4-Ph-Cp | Ind |
| 101d | Zr | Cl | cyclobutylidene | 3-Ph-Cp | Ind |
| 102d | Zr | Cl | Et | 4-tBu-Cp | Ind |
| 103d | Zr | Cl | Et | 3-tBu-Cp | Ind |
| 104d | Zr | Cl | Et | 4-TMS-Cp | Ind |
| 105d | Zr | Cl | Et | 3-TMSCp | Ind |
| 106d | Zr | Cl | Et | 4-Ph-Cp | Ind |
| 107d | Zr | Cl | Et | 3-Ph-Cp | Ind |
| 108d | Zr | Cl | Me$_2$Ge | 4-tBu-Cp | Ind |
| 109d | Zr | Cl | Me$_2$Ge | 3-tBu-Cp | Ind |
| 110d | Zr | Cl | Me$_2$Ge | 4-TMS-Cp | Ind |
| 111d | Zr | Cl | Me$_2$Ge | 3-TMSCp | Ind |
| 112d | Zr | Cl | Me$_2$Ge | 4-Ph-Cp | Ind |
| 113d | Zr | Cl | Me$_2$Ge | 3-Ph-Cp | Ind |
| 114d | Zr | Cl | Me$_2$Si | 4-tBu-Cp | 3-Me-Ind |
| 115d | Zr | Cl | Me$_2$Si | 3-tBu-Cp | 3-Me-Ind |

TABLE d-4

(continued)

| No. | $M^{1d}$ | $X^{1d}, X^{2d}$ | $R^{1d}_2Q^{1d}$ | Cp-2,3,4,5-$R^{2d}_4$ | Ind-3-$R^{3d}$-4,5,6,7-$R^{5d}_4$ |
|---|---|---|---|---|---|
| 116d | Zr | Cl | Me$_2$Si | 4-TMS-Cp | 3-Me-Ind |
| 117d | Zr | Cl | Me$_2$Si | 3-TMSCp | 3-Me-Ind |
| 118d | Zr | Cl | Me$_2$Si | 4-tBu-Cp | 3-iPr-Ind |
| 119d | Zr | Cl | Me$_2$Si | 3-tBu-Cp | 3-iPr-Ind |
| 120d | Zr | Cl | Me$_2$Si | 4-TMS-Cp | 3-iPr-Ind |
| 121d | Zr | Cl | Me$_2$Si | 3-TMSCp | 3-iPr-Ind |
| 122d | Zr | Cl | Me$_2$Si | 4-tBu-Cp | 3-tBu-Ind |
| 123d | Zr | Cl | Me$_2$Si | 3-tBu-Cp | 3-tBu-Ind |
| 124d | Zr | Cl | Me$_2$Si | 4-TMS-Cp | 3-tBu-Ind |
| 125d | Zr | Cl | Me$_2$Si | 3-TMSCp | 3-tBu-Ind |
| 126d | Zr | Cl | Me$_2$Si | 4-tBu-Cp | 3-TMS-Ind |
| 127d | Zr | Cl | Me$_2$Si | 3-tBu-Cp | 3-TMS-Ind |
| 128d | Zr | Cl | Me$_2$Si | 4-TMS-Cp | 3-TMS-Ind |
| 129d | Zr | Cl | Me$_2$Si | 3-TMSCp | 3-TMS-Ind |
| 130d | Zr | Cl | Me$_2$Si | 4-tBu-Cp | 3-Ph-Ind |
| 131d | Zr | Cl | Me$_2$Si | 3-tBu-Cp | 3-Ph-Ind |
| 132d | Zr | Cl | Me$_2$Si | 4-TMS-Cp | 3-Ph-Ind |
| 133d | Zr | Cl | Me$_2$Si | 3-TMSCp | 3-Ph-Ind |
| 134d | Zr | Cl | Me$_2$C | 4-tBu-Cp | 3-Me-Ind |
| 135d | Zr | Cl | Me$_2$C | 3-tBu-Cp | 3-Me-Ind |
| 136d | Zr | Cl | Me$_2$C | 4-TMS-Cp | 3-Me-Ind |
| 137d | Zr | Cl | Me$_2$C | 3-TMSCp | 3-Me-Ind |
| 138d | Zr | Cl | Me$_2$C | 4-tBu-Cp | 3-iPr-Ind |
| 139d | Zr | Cl | Me$_2$C | 3-tBu-Cp | 3-iPr-Ind |
| 140d | Zr | Cl | Me$_2$C | 4-TMS-Cp | 3-iPr-Ind |
| 141d | Zr | Cl | Me$_2$C | 3-TMSCp | 3-iPr-Ind |
| 142d | Zr | Cl | Me$_2$C | 4-tBu-Cp | 3-tBu-Ind |
| 143d | Zr | Cl | Me$_2$C | 3-tBu-Cp | 3-tBu-Ind |
| 144d | Zr | Cl | Me$_2$C | 4-TMS-Cp | 3-tBu-Ind |
| 145d | Zr | Cl | Me$_2$C | 3-TMSCp | 3-tBu-Ind |
| 146d | Zr | Cl | Me$_2$C | 4-tBu-Cp | 3-TMS-Ind |
| 147d | Zr | Cl | Me$_2$C | 3-tBu-Cp | 3-TMS-Ind |
| 148d | Zr | Cl | Me$_2$C | 4-TMS-Cp | 3-TMS-Ind |
| 149d | Zr | Cl | Me$_2$C | 3-TMSCp | 3-TMS-Ind |
| 150d | Zr | Cl | Me$_2$C | 4-tBu-Cp | 3-Ph-Ind |
| 151d | Zr | Cl | Me$_2$C | 3-tBu-Cp | 3-Ph-Ind |
| 152d | Zr | Cl | Me$_2$C | 4-TMS-Cp | 3-Ph-Ind |
| 153d | Zr | Cl | Me$_2$C | 3-TMSCp | 3-Ph-Ind |

The metallocene compound also includes, for example, compounds where zirconium of the compounds above is replaced by titanium or hafnium.

Furthermore, in using these metallocene compounds as the essential component (Ad), two or more thereof may be also used.

Among specific compounds exemplified above, preferred metallocene compounds as the essential component (Ad) are described below. The compounds include, for example, 1d-51d, 72d-77d, 84d-89d, 96d-101d, 114d-129d, and 134d-149d in Tables d-1 to d-4.

Preferred metallocene compounds also include, for example, compounds where zirconium of the compounds above is replaced by titanium or hafnium.

Among specific compounds exemplified above, more preferred metallocene compounds as the essential component (Ad) are described below. The compounds include, for example, 1d-6d, 17d, 18d, 46d-49d, 115d, 117d, 118d, 121d, 123d, 125d, 127d, 129d, 135d, 137d, 139d, 141d, 143d, 145d, 147d and 149d in Tables d-1 to d-4.

Preferred metallocene compounds also include, for example, compounds where zirconium of the compounds above is replaced by titanium or hafnium.

Furthermore, among specific compounds exemplified above, in terms of high polymerization activity, still more preferred metallocene compounds as the essential component (Ad) are described below. The compounds include, for example, 1d-51, 114d-129d, and 134d to 149d in Tables d-1 to d-4.

In addition, among specific compounds exemplified above, in terms of excellent mobility, still more preferred metallocene compounds as the essential component (Ad) are described below. The compounds include, for example, 1d-6d, 17d, 18d, 46d-49d, 72d-77d, 84d-89d, 96d-101d, 115d, 117d, 119d, 121d, 123d, 125d, 127d, 129d, 135d, 137d, 139d, 141d, 143d, 145d, 147d and 149d in Tables d-1 to d-4.

Synthesis examples for the metallocene compound as the essential component (Ad) according to the present invention are described below, but the present invention is not limited to these synthesis methods in particular.

For example, there are a method where an indene compound is lithioated, then reacted with a dichlorosilane compound and subsequently reacted with a lithium salt of cyclopentadiene having a substituent to obtain a ligand and the obtained ligand is reacted with a tetrakis(alkylamido)zirconium and then with trimethylsilyl chloride, and a method where the obtained ligand is lithioated and subsequently reacted with zirconium tetrachloride.

V-2. Physical Properties (Characteristics) of Olefin-Based Polymer and Ethylene-Based Polymer By the polymerization method of the present invention, an olefin-based polymer or ethylene-based polymer described below is obtained. Here, physical properties of an ethylene-based polymer are mainly described. In the present invention, an ethylene-based polymer indicates an ethylene homopolymer or an ethylene.α-olefin copolymer produced by the above-described copolymerization.

The ethylene-based polymer produced by the production method of an ethylene-based polymer of the present invention satisfies at least the condition (B-4') out of the conditions defined in the paragraph of Ethylene-Based Polymer of Item [III]. That is, λmax(2.0) of the ethylene-based polymer is from 1.2 to 30.0, preferably from 1.5 to 20.0, more preferably from 2.0 to 10.0, still more preferably from 2.4 to 6.0, yet still more preferably from 3.0 to 5.0. The description of λmax(2.0) that must be satisfied by the ethylene-based polymer is as described above in the paragraph of condition (A-4) or condition (B-4) and is omitted here.

The ethylene-based polymer produced in the present invention is improved in the melting properties as compared with normal ethylene-based polymers and is prominently characterized by having excellent moldability.

In general, a polyethylene is processed into an industrial product by a shaping method involving a molten state, such film molding, blow molding and foam molding, and at this time, it is well known that the elongational flow characteristics greatly affect the ease of molding.

That is, a polyethylene having a narrow molecular weight distribution and having no long-chain branch exhibits bad moldability because of its low melt strength, whereas a polyethylene having an ultrahigh molecular weight component or a long-chain branch component has a property of undergoing strain hardening during melt elongation, that is, abruptly rising in the elongational viscosity on the high strain side, and a polyethylene exhibiting this property outstandingly is said to be excellent in the moldability.

As the method for quantitatively expressing this elongational viscosity property, there is a method where the ratio between the elongational viscosity before strain hardening and the elongational viscosity after strain hardening is calculated as a degree of strain hardening (λmax), and this is useful as an indicator of non-linearity of the elongational viscosity. When the λmax value is high, this has an effect of preventing uneven wall thickness or blown rupture of a product in the film molding or blow molding, enabling high-speed molding, or making it possible to raise the percentage of closed pores at the foam molding and provides for merits such as increase of strength of a molded article, enhancement of design property, reduction in weight, improvement of molding cycle, and elevation of heat insulating property.

The ethylene-based polymer produced in the present invention has quite characteristic elongational viscosity property, molecular weight distribution and intrinsic viscosity property based on its characteristic long-chain branched structure and furthermore, the ethylene-based polymer produced by the production method of an ethylene-based polymer of the present invention, which satisfies, in addition to the condition (B-4'), preferably at least any one or more, more preferably two or more, still more preferably three or more, yet still more preferably five or more, and most preferably all, of the above-described conditions (B-1'), (B-2"), (B-3), (B-5), (B-7), (B-8) and (B-9), is improved particularly in the melt properties and provided with excellent moldability in comparison to normal ethylene-based polymers and at the same time, is excellent also in the mechanical properties such as stiffness, impact strength and transparency.

EXAMPLES

The present invention is described in greater detail below by referring to Examples and Comparative Examples to demonstrate the excellence of the present invention and the advantage in the configuration of the present invention, but the present invention is not limited to these Examples.

Incidentally, the measurement methods used in Examples and Comparative Examples are as follows. In the following, all of the catalyst synthesizing process and the polymerization process were performed in a purified nitrogen atmosphere, and the solvent employed was dehydrated and purified using molecular sieve 4A and then used.

[Method for Measuring Degree of Strain Hardening of Ethylene-Based Polymer]

The degree of strain hardening (λmax) of elongational viscosity was measured using a Rheometer by the method included in the description of the present invention. Incidentally, in advance of preparation of a test specimen, the dissolution•reprecipitation treatment of the polymer was performed according to the following procedure.

Into a 500 ml-volume two-neck flask with a cooling tube, 300 ml of xylene was introduced and after performing nitrogen bubbling at room temperature for 30 minutes, 6.0 g of the polymer and 1.0 g of 2,6-di-tert-butylhydroxytoluene (BTH) were introduced thereinto. In a nitrogen atmosphere, the contents were stirred at 125° C. for 30 minutes to completely dissolve the polymer in xylene, and the xylene solution having dissolved therein the polymer was poured in 2.5 L of ethanol to precipitate the polymer. The polymer was collected by filtration and dried in a vacuum drier at 80° C.

[Measurement of Number of Terminal Double Bonds]

As for the quantitative determination of the terminal double bond, a press film was produced, and after measuring the infrared absorption spectrum (IR) by using an apparatus, FTIR-8300, manufactured by Shimadzu Corporation, the number of terminal double bonds was calculated according to the following formula from the peak absorbance at 910 cm$^{-1}$ Number of terminal double bonds (bonds/1000 carbons)
$$=1.14 \times \Delta A/d/t$$

wherein $\Delta A$ is the peak absorbance at 910 cm$^{-1}$.

[Measurement of Amount of Soluble Matters]

The sample was dissolved in orthodichlorobenzene (containing 0.5 mg/mL BHT) at 140° C. to prepare a solution, and the solution was introduced into a TREF column at 140° C., then cooled to 100° C. at a temperature drop rate of 8° C./min, further cooled to −15° C. at a temperature drop rate of 4° C./min and held for 60 minutes. Thereafter, orthodichlorobenzene (containing 0.5 mg/mL BHT) as a solvent was flowed through the column at a flow velocity of 1 mL/min to elute components dissolved in the orthodichlorobenzene at −15° C. in the TREF column for 10 minutes, and then the column temperature was raised linearly to 140° C. at a temperature rise rate of 100° C./hr to obtain an elution curve.
Apparatus:

(TREF Part)

TREF Column: Stainless steel-made column of 4.3 mmφ× 150 mm
Column packing material: Surface-deactivated glass bead of 100 μm
Heating system: Aluminum heating block
Cooling system: Peltier element (cooling of Peltier element was water cooling)
Temperature distribution: ±0.5° C.
Temperature regulator: programmable digital controller, KP 1000, manufactured by Chino Corporation (Valve Part)

Heating system: Air bath oven
Temperature at measurement: 140° C.
Temperature distribution: ±1° C.
Valve: Six-way valve, four-way valve (Sample Injection Part)

Injection system: Loop injection system
Injection amount: Loop size, 0.1 ml

Injection port heating system: Aluminum heating block
Temperature at measurement: 140° C.

(Detector Part)

Detector: Wavelength-fixed infrared detector, MIRAN 1A, manufactured by FOXBORO
Detection wavelength: 3.42 μm
High-temperature flow cell: Micro-flowcell for LC-IR, optical path length: 1.5 mm, window shape: oval of 2×4 mm, synthetic sapphire aperture plate
Temperature at measurement: 140° C.

(Pump Part)

Liquid delivery pump: SSC-3461 pump, manufactured by Senshu Kagaku
Measurement Conditions:
Solvent: o-Dichlorobenzene (containing 0.5 mg/mL of BHT)
Sample concentration: 5 mg/mL
Sample injection amount: 0.1 mL
Solvent flow velocity: 1 mL/min
[Evaluation Method of Film]

(1) Tensile Modulus

The tensile modulus at a deformation of 1% in the film processing direction (MD direction) and the film width direction (TD direction) was measured in accordance with JIS K7127-1999.

(2) Film Impact

A film-shaped test specimen was fixed on a holder having a diameter of 50 mm and struck with a perforator having a specified tip diameter (a hemispherical type of 25.4 mmφ), and the energy (J/mm) required for perforation into fracture was measured. A higher value indicates that the impact strength is excellent.
A tester having a 90° arcuate arm capable of attaching a perforator to the distal end was used in accordance with JIS P8134.

(3) Transparency (Haze)

The transparency was measured in accordance with JIS K7105-1981. A smaller value indicates that the transparency is excellent.

(4) Tear Strength (Elmendorf Tearing Method)

The tear strength (N/mm) in the film processing direction (MD direction) and the film width direction (TD direction) was measured in accordance with JIS K7128-1991.
[Molding Conditions of Inflation Film and Evaluation Method of Moldability]
At the time of molding a film of 30 μm, an inflation film was molded under the following molding conditions by using the following inflation film forming machine (molding apparatus) with an extruder of 30 mmφ, and evaluated.
Apparatus: Inflation molding apparatus
Screw diameter of extruder: 30 mmφ
Die diameter: 25 mmφ
Extrusion amount: 10 kg/hr
Lip gap of die: 2.0 mm
Taking-up speed: 6.0 m/min
Blow-up ratio: 2.0
Molding resin temperature: from 170 to 190° C. (shown in Examples)
Film thickness: 30 μm
Cooling ring: Single-slit air ring
At the time of molding a film of 50 μm, an inflation film was molded under the following molding conditions by using the following inflation film forming machine (molding apparatus) with an extruder of 50 mmφ, and evaluated.
Apparatus: Inflation molding apparatus
Screw diameter of extruder: 50 mmφ
Die diameter: 75 mmφ
Extrusion amount: 20 kg/hr
Lip gap of die: 3.0 mm
Taking-up speed: 15 m/min
Blow-up ratio: 2.0
Molding resin temperature: from 170 to 190° C.
Film thickness: 50 μm
Cooling ring: Two-stage air-cooling ring Example 1a(a)

(1) Production of Ethylene-Based Polymer (A-1)

[Preparation of Metallocene Catalyst A-11]
In a catalyst preparation apparatus equipped with an electromagnetic induction stirrer, under a nitrogen flow, 1,000 ml of purified toluene, 22 g of tetraethoxyzirconium ($Zr(OEt)_4$), 75 g of indene and 88 g of methylbutylcyclopentadiene were added and while keeping the system at 90° C., 100 g of tripropylaluminum was added dropwise over 100 minutes and then reacted at the same temperature for 2 hours. The reaction product was cooled to 40° C. and thereafter, 3,200 ml of a toluene solution of methylalumoxane (concentration: 2.5 mmol/ml) was added. After stirring for 2 hours, 2,000 g of silica (#952, produced by Grace, surface area: 300 $m^2/g$) previously subjected to a calcining treatment at 450° C. for 5 hours was added and stirred at room temperature for 1 hour. Thereafter, nitrogen blow at 40° C. and reduced-pressure drying were performed to obtain Solid Catalyst A-1 having good flowability.
[Production of Ethylene.1-Hexene Copolymer]
In a continuous gas-phase polymerization apparatus (inner volume: 100 L, diameter of fluidized bed: 10 cm, seed polymer of fluidized bed (dispersant): 1.5 kg) set such that the molar ratio of 1-hexene/ethylene is 0.018, the molar ratio of hydrogen/ethylene is $2.9 \times 10^{-4}$, the nitrogen concentration is 30 mol %, the total pressure is 0.8 MPa and the temperature is 80° C., a hexane solution (0.03 mmol/ml) of triethylaluminum was fed at 7 ml/h and while keeping the gas composition and the temperature constant, polymerization was performed by intermittently feeding Solid Catalyst A-1 to achieve a production yield of about 320 g per hour. The activity was 420 g/(g of catalyst·MPa·h). When physical properties of the obtained Ethylene-Based Polymer (A-1) were measured, MFR was 2.0 g/10 min and the density was 0.918 $g/cm^3$.

(2) Production of Ethylene-Based Polymer (B-1)

[Preparation of Metallocene Catalyst B-1]
Dimethylsilylene(cyclopentadienyl)(3-methylindenyl)zirconium dichloride was synthesized using cyclopentadienyl-(3-methylindenyl)dimethylsilane according to the procedure described in Macromolecules 1995, 28, 3771-3778.
In a nitrogen atmosphere, 5 g of silica calcined at 600° C. for 5 hours was put in a 200-ml two-neck flask and dried at reduced pressure with a vacuum pump for 1 hour while heating the flask in an oil bath at 150° C. In a nitrogen atmosphere, 51.8 mg of dimethylsilylene(cyclopentadienyl)(3-methylindenyl)zirconium dichloride synthesized above was put in a separately prepared 100-ml two-neck flask and dissolved in 13.4 ml of dehydrated toluene, and thereafter, 8.6 ml of a 20% methylaluminoxane/toluene solution produced by Albemarle was further added at room temperature and stirred for 30 minutes. While heating the 200-ml two-neck flask containing vacuum-dried silica in an oil bath at 40° C. and stirring the contents, the entire amount of the toluene solution above containing a reaction product of the complex and methylaluminoxane was added and stirred at 40° C. for 1 hour. While heating the system at 40° C., the toluene solvent was removed by distillation under reduced pressure to obtain Solid Catalyst B-1.

[Production of Ethylene.1-Hexene Copolymer]

Continuous gas-phase copolymerization of ethylene.1-hexene was performed using Solid Catalyst B-1. That is, in a continuous gas-phase polymerization apparatus (inner volume: 100 L, diameter of fluidized bed: 10 cm, seed polymer of fluidized bed (dispersant): 1.8 kg) set such that the temperature is 75° C., the molar ratio of hexene/ethylene is 0.012, the molar ratio of hydrogen/ethylene is $1.5 \times 10^3$, the nitrogen concentration is 24 mol % and the total pressure is 0.8 MPa, polymerization was performed by keeping the gas composition and the temperature constant while intermittently feeding the solid catalyst at a rate of 0.38 g/hour. Also, in order to maintain the cleanliness in the system, 0.03 mol/L of a triethylaluminum (TEA) solution diluted with hexane was fed at 7 ml/hr to a gas circulating line. As a result, the average production rate of the product polyethylene became 420 g/hour. After producing a polyethylene in a cumulative amount of 5 kg or more, the MFR and density of the obtained Ethylene-Based Polymer (B-1) were 0.8 g/10 min and 0.914 g/cm$^3$, respectively.

(3) Production of Polyethylene-Based Resin Composition 1a

A polyethylene resin at a mixing ratio of 95 wt % of Ethylene-Based Polymer (A-1) and 5 wt % of Ethylene-Based Polymer (B-1) was mixed and homogenized by a mixer.

The obtained mixture was melt-kneaded by a twin-screw extruder, and the extrudate was solidified and granulated. With respect to the finally obtained Granular Polyethylene Resin Composition 1a, film moldability and film physical properties were evaluated by the above-described method of molding a 50 film. The results obtained are shown in Table 1a-1 and Table 1a-2.

Example 1a(b)

Production of Polyethylene-Based Resin Composition 1b and film molding were performed in the same manner as in (1) to (3) of Example 1a(a) except that the mixing ratio of ethylene-based polymers was changed to 90 wt % of Ethylene-Based Polymer (A-1) and 10 wt % of Ethylene-Based Polymer (B-1). The results obtained are shown in Table 1a-1 and Table 1a-2.

Example 1a(c)

Production of Polyethylene-Based Resin Composition 1c and film molding were performed in the same manner as in (1) to (3) of Example 1a(a) except that the mixing ratio of ethylene-based polymers was changed to 80 wt % of Ethylene-Based Polymer (A-1) and 20 wt % of Ethylene-Based Polymer (B-1). The results obtained are shown in Table 1a-1 and Table 1a-2.

Comparative Example C1a(a)

Production of Polyethylene-Based Resin Composition C1a and film molding were performed in the same manner as in Example 1a(c) except that in Example 1a(c), a high-pressure radical process low-density polyethylene (LF240, produced by Japan Polyethylene Corporation; MFR=0.7 g/10 min, density: 0.924 g/cm$^3$) was used in place of Ethylene-Based Polymer (B-1). The results obtained are shown in Table 1a-1 and Table 1a-2.

Comparative Example C1a(b)

Production of Polyethylene-Based Resin Composition C1b and film molding were performed in the same manner as in Example 1a(c) except that in Example 1a(c), a commercially available ethylene-based polymer having a long-chain branch (CB2001, produced by Sumitomo Chemical Co., Ltd.; MFR=1.8 g/10 min, density: 0.918 g/cm$^3$) was used in place of Ethylene-Based Polymer (B-1). The results obtained are shown in Table 1a-1 and Table 1a-2.

Comparative Example C1a(c)

Production of Polyethylene-Based Resin Composition C1c and film molding were performed in the same manner as in (3) of Example 1a(a) except that in Example 1a(a), Ethylene-Based Polymer (A-1) was used alone without using Ethylene-Based Polymer (B-1). The results obtained are shown in Table 1a-1 and Table 1a-2.

Example 2a

Production of Polyethylene-Based Resin Composition 2 and film molding were performed in the same manner as in Example 1a(c) except that in Example 1a(c), a commercially available Ethylene-Based Polymer (A-2) produced using Magnesium.Titanium Composite Ziegler Catalyst (A-2) (UF230, produced by Japan Polyethylene Corporation: MFR=1.0 g/10 min, density: 0.921 g/cm$^3$, ethylene.1-butene copolymer) was used in place of Ethylene-Based Polymer (A-1) produced by a metallocene catalyst. The results obtained are shown in Table 1a-1 and Table 1a-2.

Comparative Example 2a

Production of Polyethylene-Based Resin Composition C2 and film molding were performed in the same manner except that in Example 2a, Ethylene-Based Polymer (A-2) was used alone without using Ethylene-Based Polymer (B-1). The results obtained are shown in Table 1a-1 and Table 1a-2.

Example 3a(a)

(1) Production of Ethylene-Based Polymer (B-3)

[Preparation of Metallocene Catalyst B-3]

Solid Catalyst B-3 was obtained in the same manner as in (2) of Example 1a(a) except that as the metallocene complex, 46.6 mg of dimethylsilylene(cyclopentadienyl)(3-methylindenyl)zirconium dichloride and 5.6 mg of rac-dimethylsilylenebis(indenyl)zirconium dichloride (produced by Wako Pure Chemical Industries, Ltd.) were used in place of 51.8 mg of dimethylsilylene(cyclopentadienyl)(3-methylindenyl)zirconium dichloride.

[Production of Ethylene.1-Hexene Copolymer]

Continuous gas-phase copolymerization of ethylene.1-hexene was performed in the same manner as in (2) of Example 1a(a) by using Solid Catalyst B-3. That is, in a continuous gas-phase polymerization apparatus (inner volume: 100 L, diameter of fluidized bed: 10 cm, seed polymer of fluidized bed (dispersant): 1.8 kg) set such that the temperature is 75° C., the molar ratio of hexene/ethylene is 0.007, the molar ratio of hydrogen/ethylene is $2.5 \times 10^{-3}$, the nitrogen concentration is 20 mol % and the total pressure is 0.8 MPa, polymerization was performed by keeping the gas composition and the temperature constant while intermittently feeding the solid catalyst at a rate of 0.18 g/hour. Also, in order to maintain the cleanliness in the system, 0.03 mol/L of a triethylaluminum (TEA) solution diluted with hexane was fed at 7 ml/hr to a gas circulating line. As a result, the average production rate of the product polyethylene became 300 g/hour. After producing a polyethylene in a cumulative amount of 5 kg or more, the MFR and density of the obtained Ethylene-Based Polymer (B-3) were 0.3 g/10 min and 0.921 g/cm³, respectively.

(2) Production of Polyethylene-Based Resin Composition 3a

A polyethylene resin composed of 90 wt % of Ethylene-Based Polymer (A-1) produced in (1) of Example 1a(a) and 10 wt % of Ethylene-Based Polymer (B-3) obtained in (1) above was mixed and homogenized by a mixer.

The obtained mixture was melt-kneaded by a twin-screw extruder, and the extrudate was solidified and granulated. With respect to the finally obtained Granular Polyethylene Resin Composition 3a, film moldability and film physical properties were evaluated by the above-described method of molding a 30 p film. The results obtained are shown in Table 2a-1 and Table 2a-2.

Example 4a(a)

(1) Production of Ethylene-Based Polymer (B-4)

[Preparation of Metallocene Catalyst B-4]

Solid Catalyst B-4 was obtained in the same manner as in (2) of Example 1a(a) except that 52.5 mg of rac-ethylenebisindenylzirconium dichloride (produced by Strem Chemicals, Inc.) was used as the metallocene complex in place of 51.8 mg of dimethylsilylene(cyclopentadienyl)(3-methylindenyl)zirconium dichloride and reacted with methylaminoxane in a toluene solvent for 30 minutes in the same manner as in (2) of Example 1a(a) and was further reacted for 30 minutes by adding 10 ml of a separately prepared dehydrated toluene solution containing 201 mg of N,N-dimethylanilinium tetrakispentafluorophenylborate and thereafter, the catalyst was supported on silica.

[Production of Ethylene.1-Hexene Copolymer]

An ethylene.1-hexene copolymer was produced using Solid Catalyst B-4. That is, 800 mL of isobutane, 22 mL of 1-hexene and 0.20 mmol of triethylaluminum were added to a 2 L-volume autoclave with an induction stirring device, the temperature was raised to 75° C., 130 mL of $H_2$ was added, and the ethylene partial pressure was kept at 1.4 MPa by further introducing ethylene. Subsequently, 54 mg of Solid Catalyst B-4 was injected with nitrogen and after continuing the polymerization for 120 minutes by keeping the ethylene partial pressure of 1.4 MPa and the temperature of 75° C., the polymerization was stopped by adding ethanol. Incidentally, during the polymerization reaction, additional feeding of H2 and 1-hexene was performed at feed rates proportional to the ethylene consumption rate. As a result, the molar ratio of $H_2/C_2$ (hydrogen/ethylene) in the autoclave gas phase part at 10 minutes after the initiation of polymerization and at the completion of polymerization was 0.21% and 0.35%, respectively, and the amount of 1-hexene additionally fed was 28 mL. The amount of the thus-obtained Ethylene Polymer (B-4) was 205 g, and the MFR and density thereof were 0.3 g/10 min and 0.923 g/cm³, respectively.

(2) Production of Polyethylene-Based Resin Composition 4a

Polyethylene-Based Resin Composition 4a was produced and evaluated for film moldability and film physical properties in the same manner as in (2) of Example 3a(a) except for using Ethylene-Based Polymer (B-4) in place of Ethylene-Based Polymer (B-3). The results obtained are shown in Table 2a-1 and Table 2a-2.

Example 5a(a)

(1) Production of Ethylene-Based Polymer (B-5)

[Preparation of Metallocene Catalyst B-5]

In a nitrogen atmosphere, 10 g of silica calcined at 600° C. for 5 hours was put in a 200-ml two-neck flask and dried at reduced pressure with a vacuum pump for 1 hour while heating the flask in an oil bath at 150° C. In a nitrogen atmosphere, 46 mg (0.1 mmol) of trisindenylzirconium hydride and 118 mg (0.2 mmol) of trisbenzindenylzirconium hydride were put in a separately prepared 100-ml two-neck flask and dissolved in 20 ml of dehydrated toluene, and thereafter, 14.0 ml of a 20% methylaluminoxane/toluene solution produced by Albemarle was further added at room temperature and stirred for 30 minutes. While heating the 200-ml two-neck flask containing vacuum-dried silica in an oil bath at 40° C. and stirring the contents, the entire amount of the toluene solution above containing a reaction product of those two complexes and methylaluminoxane was added and stirred at 40° C. for 1 hour. While heating the system at 40° C., the toluene solvent was removed by distillation under reduced pressure to obtain Solid Catalyst B-5.

[Production of Ethylene.1-Hexene Copolymer]

Continuous gas-phase copolymerization of ethylene.1-hexene was performed in the same manner as in (2) of Example 1a(a) by using Solid Catalyst B-5. That is, in a continuous gas-phase polymerization apparatus (inner volume: 100 L, diameter of fluidized bed: 10 cm, seed polymer of fluidized bed (dispersant): 1.8 kg) set such that the temperature is 80° C., the molar ratio of hexene/ethylene is 0.020, the molar ratio of hydrogen/ethylene is $4.7 \times 10^{-4}$, the nitrogen concentration is 26 mol % and the total pressure is 0.8 MPa, polymerization was performed by keeping the gas composition and the temperature constant while intermittently feeding the solid catalyst at a rate of 0.19 g/hour. Also, in order to maintain the cleanliness in the system, 0.03 mol/L of a triethylaluminum (TEA) solution diluted with hexane was fed at 7 ml/hr to a gas circulating line. As a result, the average production rate of the product polyethylene became 260 g/hour. After producing a polyethylene in a cumulative amount of 5 kg or more, the MFR and density of the obtained Ethylene-Based Polymer (B-5) were 0.3 g/10 min and 0.922 g/cm³, respectively.

(2) Production of Polyethylene-Based Resin Composition 5a

Polyethylene-Based Resin Composition 5a was produced and evaluated for film moldability and film physical properties in the same manner as in (2) of Example 3a(a) except for using Ethylene-Based Polymer (B-5) in place of Ethylene-Based Polymer (B-3). The results obtained are shown in Table 2a-1 and Table 2a-2.

Comparative Example C3a(a)

Production of Polyethylene-Based Resin Composition C3a and evaluation of film moldability and film physical properties were performed in the same manner as in Example 3a(2) except that a high-pressure radical process low-density polyethylene (LF240, produced by Japan Polyethylene Corporation) was used in place of Ethylene-Based Polymer (B-3). The results obtained are shown in Table 2a-1 and Table 2a-2.

Comparative Example C4a(a)

Production of Ethylene-based Polymer (B-C4) and Polyethylene-Based Resin Composition C4a and evaluation of film moldability and film physical properties were performed in the same manner as in Example 4a(a) except that in (1) of Example 4a(a), N,N-dimethylanilinium tetrakispentafluorophenylborate was not used. The results obtained are shown in Table 2a-1 and Table 2a-2.

Comparative Example C5a

Production of Polyethylene-Based Resin Composition C5 and evaluation of film moldability and film physical properties were performed in the same manner as in (2) of Example 3a(a) except that in Example 3a(a), Ethylene-Based Polymer (A-1) was used alone without using Ethylene-Based Polymer (B-3). The results obtained are shown in Table 2a-1 and Table 2a-2.

Comparative Example C6a

Production of Polyethylene-Based Resin Composition C6 and evaluation of film moldability and film physical properties were performed in the same manner as in (2) of Example 3a(a) except that in Example 5a(a), Ethylene-Based Polymer (B-5) was used alone without using Ethylene-Based Polymer (A-1). The results obtained are shown in Table 2a-1 and Table 2a-2.

Example 3a(b)

Production of Polyethylene-Based Resin Composition 3b and evaluation of film moldability and film physical properties were performed in the same manner as in (2) of Example 3a(a) except that in (2) of Example 3a(a), the mixing ratio of Ethylene-Based Polymer (A-1) and Ethylene-Based Polymer (B-3) was changed to 80 wt %:20 wt %. The results obtained are shown in Table 2a-1 and Table 2a-2.

Example 4a(b)

Production of Polyethylene-Based Resin Composition 4b and evaluation of film moldability and film physical properties were performed in the same manner as in (2) of Example 4a(a) except that in (2) of Example 4a(a), the mixing ratio of Ethylene-Based Polymer (A-1) and Ethylene-Based Polymer (B-4) was changed to 80 wt %:20 wt %. The results obtained are shown in Table 2a-1 and Table 2a-2.

Example 5a(b)

Production of Polyethylene-Based Resin Composition 5b and evaluation of film moldability and film physical properties were performed in the same manner as in (2) of Example 5a(a) except that in (2) of Example 5a(a), the mixing ratio of Ethylene-Based Polymer (A-1) and Ethylene-Based Polymer (B-5) was changed to 80 wt %:20 wt %. The results obtained are shown in Table 2a-1 and Table 2a-2.

Comparative Example C3a(b)

Production of Polyethylene-Based Resin Composition C3b and evaluation of film moldability and film physical properties were performed in the same manner except that in Comparative Example C3a(a), the mixing ratio of Ethylene-Based Polymer (A-1) and high-pressure radical process low-density polyethylene was changed to 80 wt %:20 wt %. The results obtained are shown in Table 2a-1 and Table 2a-2.

Comparative Example C7a

Production of Polyethylene-Based Resin Composition C7 and evaluation of film moldability and film physical properties were performed in the same manner as in Comparative Example C5a except that Ethylene-Based Polymer (A-3) produced in the same manner as in (1) of Example 1a(a) except for setting the molar ratio of hexene/ethylene to 0.017 and setting the molar ratio of hydrogen/ethylene to $2.1 \times 10^{-4}$ was used in place of Ethylene-Based Polymer (A-1). The results obtained are shown in Table 2a-1 and Table 2a-2.

Example 5a(c)

Production of Polyethylene-Based Resin Composition 5c and evaluation of film moldability and film physical properties were performed in the same manner as in (2) of Example 5a(a) except that in (2) of Example 5a(a), the mixing ratio of Ethylene-Based Polymer (A-1) and Ethylene-Based Polymer (B-5) was changed to 70 wt %:30 wt %. The results obtained are shown in Table 2a-1 and Table 2a-2.

Comparative Example C8a (1) Production of Ethylene-Based Polymer (A-4)

Ethylene-Based Polymer (A-4) was produced in the same manner as in (1) of Example 1a(a) except that the molar ratio of hexene/ethylene was set to 0.011 and the molar ratio of hydrogen/ethylene was set to $3.4 \times 10^{-4}$.

(2) Production of Ethylene-Based Polymer (B-C8)

[Preparation of Metallocene Catalyst B-C8]
Solid Catalyst B-C8 was prepared in the same manner as in preparation of Metallocene Catalyst B-1 in (2) of Example 1a(a) except that 95.6 mg of dimethylsilylenebis[4-phenyl-2-(2-furyl)-indenyl]zirconium dichloride was used in place of dimethylsilylene(cyclopentadienyl)(3-methylindenyl)zirconium dichloride. Incidentally, dimethylsilylenebis[4-phenyl-2-(2-furyl)-indenyl]zirconium dichloride was synthesized according to the procedure described in JP-T-2002-535339.

[Production of Ethylene.1-Hexene Copolymer]

An ethylene. 1-hexene copolymer was produced using Solid Catalyst B-C8. That is, 800 mL of isobutane, 30 mL of 1-hexene and 2 mmol of triethylaluminum were added to a 2 L-volume autoclave with an induction stirring device, the temperature was raised to 75° C., 95 mL of H2 was added, and the ethylene partial pressure was kept at 1.4 MPa by further introducing ethylene. Subsequently, 27 mg of Solid Catalyst B-C8 was injected with nitrogen and after continuing the polymerization for 90 minutes by keeping the ethylene partial pressure of 1.4 MPa and the temperature of 75° C., the polymerization was stopped by adding ethanol. Incidentally, during the polymerization reaction, additional feeding of H2 and 1-hexene was performed at feed rates proportional to the ethylene consumption rate. As a result, the molar ratio of H2/C2 (hydrogen/ethylene) in the autoclave gas phase part at 10 minutes after the initiation of polymerization and at the completion of polymerization was 0.15% and 0.14%, respectively, and the amount of 1-hexene additionally fed was 19 mL. The amount of the thus-obtained Ethylene Polymer (B-C8) was 113 g, and the MFR and density thereof were 0.05 g/10 min and 0.894 g/cm$^3$, respectively.

(3) Production of Polyethylene-Based Resin Composition C8

Polyethylene-Based Resin Composition C8 was produced and evaluated for film moldability and film physical properties in the same manner as in Example 5a(c) except that Ethylene-Based Polymer (A-4) was used in place of Ethylene-Based Polymer (A-1) and Ethylene-Based Polymer (B-C8) was used in place of Ethylene-Based Polymer (B-5). The results obtained are shown in Table 2a-1 and Table 2a-2.

Comparative Example C9a (1) Production of Ethylene-Based Polymer (A-4)

Continuous gas-phase copolymerization of ethylene.1-hexene was performed in the same manner as in (2) of Example 1a(a) using Solid Catalyst B-5. That is, in a continuous gas-phase polymerization apparatus (inner volume: 100 L, diameter of fluidized bed: 10 cm, seed polymer of fluidized bed (dispersant): 1.8 kg) set such that the temperature is 85° C., the molar ratio of hexene/ethylene is 0.016, the molar ratio of hydrogen/ethylene is 6.2×10$^{-4}$, the nitrogen concentration is 30 mol % and the total pressure is 0.8 MPa, polymerization was performed by keeping the gas composition and the temperature constant while intermittently feeding the solid catalyst at a rate of 0.36 g/hour. Also, in order to maintain the cleanliness in the system, 0.03 mol/L of a triethylaluminum (TEA) solution diluted with hexane was fed at 7 ml/hr to a gas circulating line. As a result, the average production rate of the product polyethylene became 400 g/hour. After producing a polyethylene in a cumulative amount of 5 kg or more, the MFR and density of the obtained Ethylene-Based Polymer (B-5) were 5.9 g/10 min and 0.927 g/cm$^3$, respectively.

(2) Production of Polyethylene-Based Resin Composition C9

Polyethylene-Based Resin Composition C9 was produced and evaluated for film moldability and film physical properties in the same manner as in Example 5a(c) except that Ethylene-Based Polymer (A-5) was used in place of Ethylene-Based Polymer (A-1) and Ethylene-Based Polymer (B-C8) produced in (2) of Comparative Example C8a was used in place of Ethylene-Based Polymer (B-5). The results obtained are shown in Table 2a-1 and Table 2a-2.

Example 6a(a)

(1) Production of Ethylene-Based Polymer (A-6)

Ethylene-Based Polymer (A-6) was produced in the same manner as in (1) of Example 1a(a) except that the molar ratio of 1-hexene/ethylene was set to 0.011 and the molar ratio of hydrogen/ethylene was set to 2.7×10$^{-4}$.

(2) Production of Ethylene-Based Polymer (B-6)

Continuous gas-phase copolymerization of ethylene.1-hexene was performed in the same manner as in (1) of Example 5a(a). However, the temperature was 65° C., the molar ratio of hexene/ethylene was 0.025, the molar ratio of hydrogen/ethylene was 9.3×10$^4$, the nitrogen concentration was 24 mol % and the total pressure was 0.8 MPa. As a result, the average production rate of the product polyethylene became 290 g/hour. After producing a polyethylene in a cumulative amount of 5 kg or more, the MFR and density of the obtained Ethylene-Based Polymer (B-6) were 0.3 g/10 min and 0.906 g/cm$^3$, respectively.

(3) Production of Polyethylene-Based Resin Composition 6

Production of Polyethylene-Based Resin Composition 6 and evaluation of film moldability and film physical properties were performed in the same manner as in Example 5a(c) except that Ethylene-Based Polymer (A-6) and Ethylene-Based Polymer (B-6) were used in place of Ethylene-Based Polymer (A-1) and Ethylene-Based Polymer (B-5), respectively. The results obtained are shown in Table 3a-1 and Table 3a-2.

Comparative Example C10a(a)

Production of Polyethylene-Based Resin Composition C10 and evaluation of film moldability and film physical properties were performed in the same manner as in Comparative Example C5a except that Ethylene-Based Polymer (A-7) produced in the same manner as in (1) of Example 1a(a) except for setting the molar ratio of 1-hexene/ethylene to 0.013 and setting the molar ratio of hydrogen/ethylene to 2.3×10$^{-4}$ was used in place of Ethylene-Based Polymer (A-1). The results obtained are shown in Table 3a-1 and Table 3a-2.

Example 7a(a)

(1) Production of Ethylene-Based Polymer (A-7)

Ethylene-Based Polymer (A-7) produced by continuous gas-phase polymerization using Magnesium.Titanium Composite Ziegler Catalyst (A-2) (MFR=1.5 g/10 min, density: 0.936 g/cm$^3$, ethylene.1-butene copolymer) was used.

(2) Production of Polyethylene-Based Resin Composition 7

Production of Polyethylene-Based Resin Composition 7 and evaluation of film moldability and film physical properties were performed in the same manner as in Example 3a(a) except that Ethylene-Based Polymer (A-7) and Ethylene- Based Polymer (B-6) were used in place of Ethylene-Based Polymer (A-1) and Ethylene-Based Polymer (B-3), respectively. The results obtained are shown in Table 3a-1 and Table 3a-2.

Comparative Example C11a(a)

Production of Polyethylene-Based Resin Composition C11 and evaluation of film moldability and film physical properties were performed in the same manner as in (2) of Example 7a(a) except that in Example 7a(a), the same high-pressure radical process low-density polyethylene as in Comparative Example C1a(a) was used in place of Ethylene-Based Polymer (B-6) and the mixing proportions of Ethylene-Based Polymer (A-7) and the high-pressure radical process low-density polyethylene were set to 80 wt % and 20 wt %. The results obtained are shown in Table 3a-1 and Table 3a-2.

Comparative Example C12a(a)

(1) Production of Ethylene-Based Polymer (B-C9)

Continuous gas-phase copolymerization of ethylene.1-hexene was performed in the same manner as in (1) of Example 1a(a). However, the temperature was 65° C., the molar ratio of hexene/ethylene was 0.025 and the molar ratio of hydrogen/ethylene was $2.6 \times 10^{-4}$. As a result, the average production rate of the product polyethylene became 320 g/hour. After producing a polyethylene in a cumulative amount of 5 kg or more, the MFR and density of the obtained ethylene-based polymer were 1.0 g/10 min and 0.906 g/cm$^3$, respectively.

(2) Production of Polyethylene-Based Resin Composition C12

Production of Polyethylene-Based Resin Composition C12 was performed in the same manner as in (2) of Example 7a(a) except that in Example C11a(a), a mixture of Ethylene-Based Polymer (B-C9) and a high-pressure radical process low-density polyethylene (produced by Japan Polyethylene Corporation; MFR=0.8 g/10 min, density: 0.924 g/cm$^3$) (mixing ratio: 66 wt %:34 wt %) was used in place of Ethylene-Based Polymer (B-7) and the mixing proportions of Ethylene-Based Polymer (A-7) and the mixture were set to 62 wt % and 38 wt %.

That is, three components of Ethylene-Based Polymer (A-7), Ethylene-Based Polymer (B-C9) and the high-pressure radical process low-density polyethylene were mixed and homogenized by a mixer, and the obtained mixture was melt-kneaded by a twin-screw extruder. The extrudate was solidified and granulated, and with respect to the finally obtained Granular Polyethylene Resin Composition C12, film moldability and film physical properties were evaluated by the above-described method of molding a 30µ film. The results obtained are shown in Table 3a-1 and Table 3a-2.

Comparative Example C13a(a)

Production of Polyethylene-Based Resin Composition C13 and evaluation of film moldability and film physical properties were performed in the same manner as in (2) of Example 7a(a) except that in Example C11a(a), Ethylene-Based Polymer (A-2) of Example 2a was used in place of Ethylene-Based Polymer (A-7) and the mixing proportions of Ethylene-Based Polymer (A-2) and the high-pressure radical process low-density polyethylene were set to 90 wt % and 10 wt %. The results obtained are shown in Table 3a-1 and Table 3a-2.

Example 8a (1) Production of Ethylene-Based Polymer (B-8)

[Preparation of Metallocene Catalyst B-8]

Solid Catalyst B-8 was obtained in the same manner as in (2) of Example 1a(a) except that 68.7 mg of dimethylsilylene (cyclopentadienyl) [4-(4-trimethylsilylphenyl)indenyl]zirconium dichloride was used as the metallocene complex in place of 51.8 mg of dimethylsilylene(cyclopentadienyl)(3-methylindenyl)zirconium dichloride.

[Production of Ethylene.1-Hexene Copolymer]

Continuous gas-phase copolymerization of ethylene.1-hexene was performed in the same manner as in (2) of Example 1a(a) using Solid Catalyst B-8. That is, in a continuous gas-phase polymerization apparatus (internal volume: 100 L, diameter of fluidized bed: 10 cm, seed polymer of fluidized bed (dispersant): 1.8 kg) which is set such that the temperature is 75° C., the molar ratio of hexene/ethylene is 0.004, the molar ratio of hydrogen/ethylene is $5.5 \times 10^{-3}$, the nitrogen concentration is 20 mol % and the total pressure is 0.8 MPa, polymerization was performed by keeping the gas composition and the temperature constant while intermittently feeding the solid catalyst at a rate of 0.57 g/hour. Also, in order to maintain the cleanliness in the system, 0.03 mol/L of a triethylaluminum (TEA) solution diluted with hexane was fed at 12 ml/hr to a gas circulating line. As a result, the average production rate of the product polyethylene became 288 g/hour. After producing a polyethylene in a cumulative amount of 5 kg or more, the MFR and density of the obtained Ethylene-Based Polymer (B-8) were 0.2 g/10 min and 0.920 g/cm$^3$, respectively.

(2) Production of Polyethylene-Based Resin Composition 8a

A polyethylene resin composed of 80 wt % of a commercially available Ethylene-Based Polymer (A-2) produced using Magnesium.Titanium Composite Ziegler Catalyst (A-2) (UF230, produced by Japan Polyethylene Corporation: MFR=1.0 g/10 min, density: 0.921 g/cm$^3$, ethylene.1-butene copolymer) and 20 wt % of Ethylene-Based Polymer (B-8) obtained in (1) above was mixed and homogenized by a mixer.

The obtained mixture was melt-kneaded by a twin-screw extruder, and the extrudate was solidified and granulated. With respect to the finally obtained Granular Polyethylene Resin Composition 8a, film moldability and film physical properties were evaluated by the above-described method of molding a 50 film. The results obtained are shown in Table 4a-1 and Table 4a-2.

Comparative Example 9a

Production of a polyethylene resin composition and evaluation of film molding were performed in the same manner as in Example 8a(2) except that 90 wt % of the commercially available Ethylene-Based Polymer (A-2) and 10 wt % of Ethylene-Based Polymer (B-8) were used.

Comparative Example C14a

Production of Polyethylene-Based Resin Composition C14a and film molding were performed in the same manner as in Example 8a except that in Example 9a, a high-pressure radical process low-density polyethylene (LF240, produced by Japan Polyethylene Corporation; MFR=0.7 g/10 min, density: 0.924 g/cm³) was used in place of Ethylene-Based Polymer (B-8). The results obtained are shown in Table 4a-1 and Table 4a-2.

Comparative Example C15a

Production of Polyethylene-Based Resin Composition C15a and film molding were performed in the same manner as in Example 8a except that in Example 9a, a commercially available ethylene-based polymer having a long-chain branch (CU5001, produced by Sumitomo Chemical Co., Ltd.; MFR=0.3 g/10 min, density: 0.922 g/cm³) was used in place of Ethylene-Based Polymer (B-8). The results obtained are shown in Table 4a-1 and Table 4a-2.

TABLE 1a-1

| | Ethylene-Based Polymer (A) | | | | | Ethylene-Based Polymer (B) | | | | | | | |
|---|---|---|---|---|---|---|---|---|---|---|---|---|---|
| | Kind of Polymerization Catalyst | $MFR_A$ g/10 min | $density_A$ g/cm³ | $[Mw/Mn]_A$ | $\lambda_{max}$ (2.0) | Kind of Polymerization Catalyst | $MFR_B$ g/10 min | $density_B$ g/cm³ | $[Mw/Mn]_B$ | $\lambda_{max}$ (2.0) | $\lambda_{max}$ (0.1) | $\lambda_{max}(2.0)/\lambda_{max}(0.1)$ | g' Value | Content of $MW \geq 10^6$ % |
| Example 1a (a) | metallocene | 2.0 | 0.918 | 3.0 | 1.0 | metallocene | 0.8 | 0.914 | 3.4 | 3.1 | 1.7 | 1.8 | 0.46 | 0.10 |
| Example 1a (b) | | | | | | | | | | | | | | |
| Example 1a (c) | | | | | | | | | | | | | | |
| Comparative Example C1a (a) | | | | | | high-pressure PE | 0.7 | 0.924 | 3.9 | 4.3 | 2.6 | 1.7 | 0.26 | 2.94 |
| Comparative Example C1a (b) | | | | | | metallocene | 1.8 | 0.918 | 6.0 | 2.6 | 2.3 | 1.1 | 0.51 | 0.00 |
| Comparative Example C1a (c) | | | | | | — | — | — | — | — | — | — | — | — |
| Example 2a | Ziegler | 1.0 | 0.921 | 3.8 | 1.0 | metallocene | 0.8 | 0.914 | 3.4 | 3.1 | 1.7 | 1.8 | 0.46 | 0.10 |
| Comparative Example 2a | | | | | | — | — | — | — | — | — | — | — | — |

TABLE 1a-2

| | Polyethylene-Based Resin Composition | | | | | | Film Physical Properties | | | | | |
|---|---|---|---|---|---|---|---|---|---|---|---|---|
| | Compositional Ratio (A)/(A)+(B) wt% | MFR g/10 min | Density g/cm³ | Molding Temperature °C | Resin Pressure MPa | Film Thickness μm | 1% Tensile Modulus in MD Direction (X) MPa | Film Impact Strength (Y) J/mm | Haze % | Tear Strength in MD Direction ($Z_{MD}$) N/mm | Tear Strength in TD Direction ($Z_{TD}$) N/mm | $Z_{MD}/Z_{TD}$ |
| Example 1a (a) | 95 | 1.9 | 0.918 | 170 | 13.0 | 50 | 224 | 16.0 | 7.7 | 121 | 200 | 0.61 |
| Example 1a (b) | 90 | 1.7 | 0.918 | | 13.0 | | 211 | 15.6 | 6.5 | 87 | 219 | 0.40 |
| Example 1a (c) | 80 | 1.5 | 0.917 | | 12.9 | | 204 | 13.7 | 4.8 | 56 | 221 | 0.25 |
| Comparative Example C1a (a) | | 1.5 | 0.919 | | 13.5 | | 223 | 10.0 | 4.4 | 35 | 236 | 0.15 |
| Comparative Example C1a (b) | | 1.9 | 0.918 | | 12.2 | | 226 | 5.6 | 6.6 | 76 | 226 | 0.34 |
| Comparative Example C1a (c) | 100 | 2.0 | 0.918 | | 13.0 | | 204 | 16.9 | 17.9 | 128 | 192 | 0.67 |

TABLE 1a-2-continued

| | Polyethylene-Based Resin Composition | | | Film Physical Properties | | | | | | | | |
|---|---|---|---|---|---|---|---|---|---|---|---|---|
| | Compositional Ratio (A)/(A) + (B) wt % | MFR g/10 min | Density g/cm³ | Molding Temperature °C. | Resin Pressure MPa | Film Thickness μm | 1% Tensile Modulus in MD Direction (X) MPa | Film Impact Strength (Y) J/mm | Haze % | Tear Strength in MD Direction ($Z_{MD}$) N/mm | Tear Strength in TD Direction ($Z_{TD}$) N/mm | $Z_{MD}/Z_{TD}$ |
| Example 2a | 80 | 1.0 | 0.920 | 190 | 14.0 | 50 | 236 | 19.2 | 6.1 | 21 | 165 | 0.13 |
| Comparative Example 2a | 100 | 1.0 | 0.921 | | 15.0 | | 246 | 15.7 | 14.9 | 35 | 153 | 0.23 |

TABLE 2a-1

| | Ethylene-Based Polymer (A) | | | | | Ethylene-Based Polymer (B) | | | | | | | |
|---|---|---|---|---|---|---|---|---|---|---|---|---|---|
| | Kind of Polymerization Catalyst | $MFR_A$ g/10 min | $Density_A$ g/cm³ | $[Mw/Mn]_A$ | $\lambda_{max}$ (2.0) | Kind of Polymerization Catalyst | $MFR_B$ g/10 min | $Density_B$ g/cm³ | $[Mw/Mn]_B$ | $\lambda_{max}$ (2.0) | $\lambda_{max}$ (0.1) | $\lambda_{max}$(2.0)/ $\lambda_{max}$(0.1) | g' Value | Content of MW ≥ 10^6 % |
| Example 3a (a) | metallocene | 2.0 | 0.918 | 3.0 | 1.0 | metallocene | 0.3 | 0.921 | 3.5 | 2.5 | 2.0 | 1.3 | 0.44 | 0.02 |
| Example 4a (a) | | | | | | metallocene | 0.3 | 0.923 | 5.1 | 2.0 | 1.6 | 1.3 | 0.46 | 0.46 |
| Example 5a (a) | | | | | | metallocene | 0.3 | 0.922 | 3.9 | 1.2 | 1.0 | 1.2 | 0.60 | 1.34 |
| Comparative Example C3a (a) | | | | | | high-pressure PE | 0.7 | 0.924 | 3.9 | 4.3 | 2.6 | 1.7 | 0.26 | 2.94 |
| Comparative Example C4a (a) | | | | | | metallocene | 0.5 | 0.925 | 6.1 | 5.0 | 4.6 | 1.1 | 0.49 | 2.19 |
| Comparative Example C5a | | | | | | — | — | — | — | — | — | — | — | — |
| Comparative Example C6a | — | — | — | — | — | metallocene | 0.3 | 0.922 | 3.9 | 2.3 | 1.6 | 1.4 | 0.60 | 1.34 |
| Example 3a (b) | metallocene | 2.0 | 0.918 | 3.0 | 1.0 | metallocene | 0.3 | 0.921 | 3.5 | 2.5 | 2.0 | 1.3 | 0.44 | 0.02 |
| Example 4a (b) | | | | | | metallocene | 0.3 | 0.923 | 5.1 | 2.0 | 1.6 | 1.3 | 0.46 | 0.46 |
| Example 5a (b) | | | | | | metallocene | 0.3 | 0.922 | 3.9 | 1.2 | 1.0 | 1.2 | 0.60 | 1.34 |
| Comparative Example C3a (b) | | | | | | high-pressure PE | 0.7 | 0.924 | 3.9 | 4.3 | 2.6 | 1.7 | 0.26 | 2.94 |
| Comparative Example C7a | | 1.0 | 0.920 | 2.9 | 1.0 | — | — | — | — | — | — | — | — | — |
| Example 5a (c) | metallocene | 2.0 | 0.918 | 3.0 | 1.0 | metallocene | 0.3 | 0.922 | 3.9 | 1.2 | 1.0 | 1.2 | 0.60 | 1.34 |
| Comparative Example C8a (a) | metallocene | 4.5 | 0.931 | 2.5 | 1.0 | metallocene | 0.05 | 0.894 | 3.3 | 1.0 | 1.0 | 1.0 | 0.91 | 0.29 |
| Comparative Example C9a (a) | metallocene | 5.9 | 0.927 | 2.7 | 2.2 | | | | | | | | | |

TABLE 2a-2

| | Polyethylene-Based Resin Composition | | | Film Physical Properties | | | | | | | | |
|---|---|---|---|---|---|---|---|---|---|---|---|---|
| | Compositional Ratio (A)/(A) + (B) wt % | MFR g/10 min | Density g/cm³ | Molding Temperature °C. | Resin Pressure MPa | Film Thickness μm | 1% Tensile Modulus in MD Direction (X) MPa | Film Impact Strength (Y) J/mm | Haze % | Tear Strength in MD Direction ($Z_{MD}$) N/mm | Tear Strength in TD Direction ($Z_{TD}$) N/mm | $Z_{MD}/Z_{TD}$ |
| Example 3a (a) | 90 | 1.2 | 0.918 | 170 | 13.0 | 30 | 231 | 20.6 | 7.1 | 120 | 194 | 0.62 |
| Example 4a (a) | | 1.3 | 0.919 | | 11.5 | | 237 | 15.4 | 7.8 | 95 | 198 | 0.48 |
| Example 5a (a) | | 1.3 | 0.918 | | 11.9 | | 232 | 16.0 | 7.9 | 74 | 178 | 0.42 |
| Comparative Example C3a (a) | | 1.5 | 0.919 | | 11.8 | | 236 | 14.4 | 4.7 | 92 | 202 | 0.46 |
| Comparative Example C4a (a) | | 1.4 | 0.920 | | 12.0 | | 244 | 17.6 | 10.0 | 112 | 186 | 0.60 |
| Comparative Example C5a | 100 | 2.0 | 0.918 | | 11.8 | | 235 | 28.0 | 42.8 | 146 | 170 | 0.86 |
| Comparative Example C6a | 0 | 0.3 | 0.922 | | 12.7 | | 248 | 11.8 | 56.7 | 25 | 72 | 0.35 |
| Example 3a (b) | 80 | 1.0 | 0.920 | 170 | 13.0 | 30 | 234 | 17.1 | 8.4 | 89 | 197 | 0.45 |
| Example 4a (b) | | 1.1 | 0.922 | | 11.0 | | 250 | 13.0 | 6.7 | 83 | 207 | 0.40 |
| Example 5a (b) | | 1.1 | 0.921 | | 12.0 | | 240 | 12.1 | 13.5 | 72 | 166 | 0.43 |
| Comparative Example C3a (b) | | 1.5 | 0.920 | | 12.1 | | 240 | 9.3 | 4.7 | 35 | 283 | 0.12 |
| Comparative Example C7a | 100 | 1.0 | 0.920 | | 20.5 | | 231 | 75.8 | 38.2 | 124 | 142 | 0.87 |
| Example 5a (c) | 70 | 0.7 | 0.922 | 170 | 12.2 | 30 | 259 | 25.9 | 14.7 | 67 | 146 | 0.46 |
| Comparative Example C8a (a) | | 0.7 | 0.920 | | 17.8 | | 241 | 28.9 | 14.6 | 82 | 184 | 0.45 |
| Comparative Example C9a (a) | | 0.7 | 0.917 | | 15.0 | | 223 | 37.8 | 25.5 | 31 | 142 | 0.22 |

TABLE 3a-1

| | Ethylene-Based Polymer (A) | | | | | Ethylene-Based Polymer (B) | | | | | | | |
|---|---|---|---|---|---|---|---|---|---|---|---|---|---|
| | Kind of Polymerization Catalyst | $MFR_A$ g/10 min | $Density_A$ g/cm³ | $[Mw/Mn]_A$ | $\lambda_{max}$ (2.0) | Kind of Polymerization Catalyst | $MFR_B$ g/10 min | $Density_B$ g/cm³ | $[Mw/Mn]_B$ | $\lambda_{max}$ (2.0) | $\lambda_{max}$ (0.1) | $\lambda_{max}$ (2.0)/ $\lambda_{max}$ (0.1) | g' Value | Content of MW ≥ 10⁶ % |
| Example 6a (a) | metallocene | 2.6 | 0.932 | 3.6 | 1.1 | metallocene | 0.3 | 0.906 | 4.3 | 2.0 | 1.5 | 1.3 | 0.53 | 3.05 |
| Comparative Example C10a (a) | metallocene | 1.8 | 0.927 | 2.7 | 1.1 | — | — | — | — | — | — | — | — | — |
| Example 7a (a) | Ziegler | 1.5 | 0.936 | 4.2 | 1.0 | metallocene | 0.3 | 0.906 | 4.3 | 2.0 | 1.5 | 1.3 | 0.53 | 3.05 |
| Comparative Example C11a (a) | | | | | | high-pressure PE | 0.7 | 0.924 | 3.9 | 4.3 | 2.6 | 1.7 | 0.26 | 2.94 |

TABLE 3a-1-continued

| | Ethylene-Based Polymer (A) | | | | | Ethylene-Based Polymer (B) | | | | | | | |
|---|---|---|---|---|---|---|---|---|---|---|---|---|---|
| | Kind of Polymerization Catalyst | MFR$_A$ g/10 min | Density$_A$ g/cm³ | [Mw/Mn]$_A$ | $\lambda_{max}$ (2.0) | Kind of Polymerization Catalyst | MFR$_B$ g/10 min | Density$_B$ g/cm³ | [Mw/Mn]$_B$ | $\lambda_{max}$ (2.0) | $\lambda_{max}$ (0.1) | $\lambda_{max}(2.0)/\lambda_{max}(0.1)$ | g' Value | Content of MW ≥ 10^6 % |
| Comparative Example C12a (a) | | | | | | metallocene + high-pressure PE | 0.8 | 0.913 | 4.0 | 3.8 | 2.5 | 1.5 | 0.74 | 0.54 |
| Comparative Example C13a (a) | | 1.0 | 0.921 | 3.8 | 1.0 | high-pressure PE | 0.7 | 0.924 | 3.9 | 4.3 | 2.6 | 1.7 | 0.26 | 2.94 |

TABLE 3a-2

| | Polyethylene-Based Resin Composition | | | | | | Film Physical Properties | | | | | |
|---|---|---|---|---|---|---|---|---|---|---|---|---|
| | Compositional Ratio (A)/(A)+(B) wt % | MFR g/10 min | Density g/cm³ | Molding Temperature °C. | Resin Pressure MPa | Film Thickness µm | 1% Tensile Modulus in MD Direction (X) MPa | Film Impact Strength (Y) J/mm | Haze % | Tear Strength in MD Direction ($Z_{MD}$) N/mm | Tear Strength in TD Direction ($Z_{TD}$) N/mm | $Z_{MD}/Z_{TD}$ |
| Example 6a (a) | 70 | 2.0 | 0.925 | 150 | 16.0 | 30 | 276 | 9.8 | 15.9 | 22 | 142 | 0.15 |
| Comparative Example C10a (a) | 100 | 1.8 | 0.927 | | 21.2 | | 315 | 10.1 | 22.0 | 25 | 72 | 0.35 |
| Example 7a (a) | 90 | 1.1 | 0.933 | 180 | 12.1 | 30 | 449 | 18.3 | 10.3 | 14 | 110 | 0.13 |
| Comparative Example C11a (a) | 80 | 1.3 | 0.931 | 180 | 12.9 | 30 | 431 | 13.0 | 6.9 | 10 | 129 | 0.08 |
| Comparative Example C12a (a) | 62 | 1.2 | 0.928 | 180 | 13.1 | 30 | 422 | 16.8 | 7.0 | 12 | 168 | 0.07 |
| Comparative Example C13a (a) | 90 | 0.9 | 0.922 | 180 | 13.8 | 30 | 248 | 19.2 | 7.8 | 14 | 149 | 0.09 |

TABLE 4a-1

| | Ethylene-Based Polymer (A) | | | | | Ethylene-Based Polymer (B) | | | | | | | |
|---|---|---|---|---|---|---|---|---|---|---|---|---|---|
| | Kind of Polymerization Catalyst | MFR$_A$ g/10 min | Density$_A$ g/cm³ | [Mw/Mn]$_A$ | $\lambda_{max}$ (2.0) | Kind of Polymerization Catalyst | MFR$_B$ g/10 min | Density$_B$ g/cm³ | [Mw/Mn]$_b$ | $\lambda_{max}$ (2.0) | $\lambda_{max}$ (0.1) | $\lambda_{max}(2.0)/\lambda_{max}(0.1)$ | g' Value | Content of MW ≥ 10^6 % |
| Example 8a | Ziegler | 1.0 | 0.921 | 3.8 | 1.0 | metallocene | 0.2 | 0.920 | 5.6 | 2.6 | 2.0 | 1.3 | 0.55 | 1.72 |
| Example 9a | | | | | | | | | | | | | | |
| Comparative Example C14a | | | | | | high-pressure PE | 0.7 | 0.924 | 3.9 | 4.3 | 2.6 | 1.7 | 0.26 | 2.94 |
| Comparative Example C15a | | | | | | metallocene | 0.3 | 0.922 | 7.2 | 3.5 | 3.6 | 1.0 | 0.48 | 1.00 |

TABLE 4a-2

| | Polyethylene-Based Resin Composition | | | Film Physical Properties | | | | | | | |
|---|---|---|---|---|---|---|---|---|---|---|---|
| | Compositional Ratio (A)/(A) + (B) wt % | MFR g/10 min | Density g/cm³ | Molding Temperature °C. | Film Thickness μm | 1% Tensile Modulus in MD Direction (X) MPa | Film Impact Strength (Y) J/mm | Haze % | Tear Strength in MD Direction ($Z_{MD}$) N/mm | Tear Strength in TD Direction ($Z_{TD}$) N/mm | $Z_{MD}/Z_{TD}$ |
| Example 8a | 80 | 0.7 | 0.921 | 180 | 50 | 225 | 24.0 | 7.5 | 58 | 123 | 0.47 |
| Example 9a | 90 | 0.8 | 0.921 | | | 230 | 22.0 | 6.3 | 68 | 118 | 0.58 |
| Comparative Example C14a | | 0.9 | 0.921 | | | 231 | 21.0 | 6.4 | 47 | 95 | 0.49 |
| Comparative Example C15a | | 0.8 | 0.921 | | | 235 | 22.0 | 8.4 | 62 | 109 | 0.57 |

(Discussion on Results in Table 1a-1 and Table 1a-2)

Example 1a(a) to Comparative Example C1a(c) illustrate a case where an ethylene.1-hexene copolymer produced using a general metallocene catalyst is used for a film.

More specifically, in comparison with Comparative Example C1a(a) where as a technique commonly employed at present in general on a commercial level, about 20% of a high-pressure radical polymerization process polyethylene was blended to improve various physical properties of the copolymer for a film, in Example 1a(c) where the ethylene-based polymer (B) according to the present invention was similarly blended in a proportion of 20%, reduction in the resin pressure was observed and the melt flowability was excellent. Also, as regards film physical properties, it is apparent that a film with excellent shock strength of the impact strength being larger by nearly 40%, despite the same level of tensile modulus and haze, in other words, despite the same level of elasticity and transparency of the film, could be obtained. In Comparative Example C1a(b) where an ethylene-based copolymer that is a long-chain branch-containing ethylene-based copolymer produced using a transition metal catalyst commercially available at present but is not the ethylene copolymer (B) according to the present invention was blended similarly in a proportion of about 20%, the effect of reducing the resin pressure was obtained in the same way, but the impact strength was very small, resulting in a film having shock strength by far inferior to the film formed of the polyethylene-based resin composition of the present invention, and the transparency was also not so excellent as obtained in the present invention.

Furthermore, in Example 1a(a) and Example 1a(b), the blending amount of the ethylene-based polymer (B) according to the present invention was smaller than in the case above, and evidently, there was obtained an effect of remarkably improving the transparency by reducing the haze value from about 18% to nearly 8% without deteriorating various performances, in terms of the resin pressure or the modulus or impact strength of film, achieved in Comparative Example C1a(c) where the ethylene-based polymer (B) was not blended, Also, by the comparison between Example 2a and Comparative Example 2a, a case where the technique of the present invention is applied in using an ethylene.1-butene copolymer produced with a general Ziegler catalyst for a film was illustrated.

More specifically, in Example 2a where similarly to the above-described case of a metallocene catalyst, 20% of the ethylene-based polymer (B) according to the present invention was blended with an ethylene.1-butene copolymer produced using a Ziegler catalyst, there was produced an excellent effect that while improving the resin pressure or the impact strength of film, achieved in Comparative Example 2a where the ethylene-based polymer (B) was not blended, an effect of remarkably improving the transparency by reducing the haze value from about 15% to 6% is obtained.

(Discussion on Results in Table 2a-1 and Table 2a-2)

Example 3a(a) to Comparative Example C7a are experimental examples planned to clearly demonstrate that similarly to experimental examples shown in Table 1a-1 and Table 1a-2, suitable performances are obtained by applying the design technique of the polyethylene-based resin composition of the present invention in using an ethylene.1-hexene copolymer produced with a general metallocene catalyst for a film, and illustrate a case where a polymer produced using a different metallocene catalyst was applied as the ethylene-based polymer (B) for use in the present invention.

More specifically, in Example 3a(a), Example 4a(a) and Example 5a(a), the performance of a film formed of a polyethylene-based resin composition obtained by blending, in a proportion of 10%, each of the ethylene-based polymers (B) according to the present invention produced using different metallocene catalysts with the ethylene-based polymer (A) according to the present invention, and in Example 3a(b), Example 4a(b) and Example 5a(b), the performance of a film obtained similarly by blending the same polymer in a proportion of 20%, were demonstrated by the comparison with a case of blending a high-pressure polyethylene in the same amount. In Examples using the polyethylene-based resin composition according to the present invention, a tendency of the resin pressure being in the same level or lower was observed, and the melt flowability was excellent. As regards the film physical properties, on the condition that the tensile modulus is the same, that is, the film elasticity is the same, the transparency was slightly lower than in the case of blending a high-pressure polyethylene but was improved to a sufficiently practicable level and at the same time, the impact strength was enhanced by from nearly 10% to over 80%, clearly indicating that a film excellent in the shock strength is obtained. In Comparative Example C4a(a) illustrating a case where an ethylene-based copolymer that is a known long-chain branch-containing ethylene-based copolymer produced by a silica-supported methylalumoxane catalyst of a widely known bridged bisindenylzirconocene complex and is not the ethylene-based polymer (B) according to the present invention was blended in the same manner, the impact strength was slightly enhanced, but the haze was as bad as 10% and this may pose a problem for practical use in view of film transparency.

Example 5a(c) to Comparative Example C9a are experimental examples planned to compare Example 5a(c) using a combination of an ethylene-based polymer (A) according to the present invention and an ethylene-based polymer (B) according to the present invention, with each of, as Comparative Examples, Comparative Example C8a where an ethylene-based polymer (A) according to the present invention and an ethylene-based polymer that is not the present invention in terms of having no long-chain branch are combined, and Comparative Example C9a where an ethylene-based polymer that is not the ethylene-based polymer (A) of the present invention in terms of having a long-chain branch and an ethylene-based polymer that is not the ethylene-based polymer (B) of the present invention in terms of having no long-chain branch are combined. As compared with Example 5a(c) of the present invention, it is seen that in those Comparative Examples, the resin pressure was, on the contrary, increased or the film transparency was not improved at all, which is not preferred.

(Discussion on Results in Table 3a-1 and Table 3a-2)

Example 6a(a) to Comparative Example C13a(a) are experimental examples planned to clearly demonstrate that similarly to experimental examples shown in Table 1a-1 and Table 1a-2, suitable performances are obtained by applying the design technique of the polyethylene-based resin composition of the present invention in using an ethylene.1-hexene copolymer produced with a general metallocene catalyst or an ethylene.1-butene copolymer produced with a general Ziegler catalyst for a film. The polyethylene-based resin composition was designed to increase the ratio of density$_A$/density$_B$ by setting the density of the ethylene-based polymer (B) to be lower than in Examples above, and it was planned to prove that as a result of this design, a molded product very excellent in the shock strength is obtained.

More specifically, in Example 6a(a) aiming at improving an ethylene.1-hexene copolymer produced with a general metallocene catalyst, as compared with Comparative Example C10a(a) singularly using an ethylene.1-hexene copolymer having almost the same MFR, density and film impact strength, the resin pressure could be reduced by about 25% and furthermore, improvement of the transparency was revealed to be realizable, clearly demonstrating the superiority of the polyethylene-based resin composition of the present invention.

In Example 7a(a) aiming at an ethylene.1-butene copolymer produced with a general Ziegler catalyst, when a low-density ethylene-based polymer (B) according to the present invention was blended, as compared with Comparative Example C11a(a) as an example of a polyethylene-based resin composition obtained by blending a high-pressure polyethylene and having the same MFR and density, the resin pressure or the tensile modulus of film was slightly improved and the transparency was slightly lower than in the case of blending a high-pressure polyethylene but improved to a sufficiently practicable level. At the same time, the impact strength was enhanced by 40% or more, and it was apparent that a film with excellent shock strength is obtained. The improvement effect for this high shock strength surpassed the shock strength in Comparative Example C12a(a) that is an example of a ternary blend composition developed with the aim of achieving the same purpose.

These results clearly prove the reasonability and significance of the configuration requirements in the present invention and the superiority of the present invention to conventional techniques.

SYNTHESIS OF METALLOCENE COMPOUND

Synthesis Example 1

Synthesis of dimethylsilylene(4-tert-butylcyclopentadienyl)(indenyl)zirconium dichloride (Metallocene Compound 11)

The compound was synthesized according to the procedure described in Example 1 of JP-A-09-87314.

Synthesis Example 2

Synthesis of dimethylsilylene(cyclopentadienyl)(3-methylindenyl)zirconium dichloride (Metallocene Compound 12)

The compound was synthesized using 1-methylindene in place of indene in the ligand synthesis by referring to the procedure described in Macromolecules 1995, 28, 3771-3778.

Synthesis Example 3

Synthesis of dimethylsilylene(cyclopentadienyl)(indenyl)zirconium dichloride (Metallocene Compound 13)

The compound was synthesized according to the procedure described in Macromolecules 1995, 28, 3771-3778.

Synthesis Example 4

Synthesis of dimethylsilylene(cyclopentadienyl)(3-tert-butylindenyl)zirconium dichloride (Metallocene Compound 14)

The compound was synthesized using 1-tert-butylindene in place of indene in the ligand synthesis by referring to the procedure described in Macromolecules 1995, 28, 3771-3778.

Synthesis Example 5

Synthesis of dimethylsilylene(cyclopentadienyl)(benz[e]indenyl)zirconium dichloride (Metallocene Compound 15)

The compound was synthesized using benz[e]indene in place of indene in the ligand synthesis by referring to the procedure described in Macromolecules 1995, 28, 3771-3778.

Synthesis Example 6

Synthesis of dimethylsilylene(cyclopentadienyl)(3-tert-butylcyclopentadienyl)zirconium dichloride (Metallocene Compound 16)

The compound was synthesized using tert-butylcyclopentadiene in place of indene in the ligand synthesis by referring to the procedure described in Macromolecules 1995, 28, 3771-3778.

Synthesis Example 7

Synthesis of dimethylsilylenebis(cyclopentadienyl)zirconium dichloride (Metallocene Compound 17)

A commercial product was purchased from Wako Pure Chemical Industries, Ltd.

Synthesis Example 8

Synthesis of dimethylsilylene(cyclopentadienyl)(2-(5-methyl-2-furyl)indenyl)zirconium dichloride (Metallocene Compound 21)

The compound was synthesized according to the procedure described in Example 4 of JP-A-2012-025664.

Synthesis Example 9

Synthesis of dimethylsilylene(cyclopentadienyl)(2-(5-methyl-2-furyl)-4-(4-tert-butylphenyl)indenyl)zirconium dichloride (Metallocene Compound 22)

The compound was synthesized according to the procedure described in Example 3 of JP-A-2012-025664.

Synthesis Example 10

Synthesis of racemi-dimethylsilylenebis(2-(5-trimethylsilyl-2-furyl)-4,5-dimethylcyclopentadienyl)zirconium dichloride (Metallocene Compound 23)

The compound was synthesized according to the procedure described in Example 10 of JP-T-2002-535339.

Synthesis Example 11

Synthesis of racemi-dimethylsilylenebis(2-(5-methyl-2-furyl)-4-(4-i-propylphenyl)indenyl)zirconium dichloride (Metallocene Compound 24)

The compound was synthesized by preparing a ligand according to the procedure described in Synthesis Example 1 of Japanese Patent Application No. 2011-008562 and using zirconium tetrachloride in place of hafnium tetrachloride.

Synthesis Example 12

Synthesis of racemi-dimethylsilylenebis(2-(5-methyl-2-furyl)-4-(phenyl)indenyl)zirconium dichloride (Metallocene Compound 25)

The compound was synthesized according to the procedure described in Example 1 of JP-A-2002-47313.

Synthesis Example 13

Synthesis of isopropylidene(4-tert-butylcyclopentadienyl)(3-tert-butylindenyl)zirconium dichloride (Metallocene Compound 26)

The compound was synthesized according to the procedure described in Example 1 of JP-A-05-148284.

Synthesis Example 14

Synthesis of racemi-dimethylsilylenebis(indenyl)zirconium dichloride (Metallocene Compound 27)

A commercial product was purchased from Wako Pure Chemical Industries, Ltd.

Synthesis Example 15

Synthesis of racemi-dimethylsilylenebis(2-methyl-4-phenylindenyl)zirconium dichloride (Metallocene Compound 28)

The compound was synthesized according to the procedure described in Organometallics 1994, 13, 954-963.

Synthesis Example 16

Synthesis of racemi-isopropylidenebis(indenyl)zirconium dichloride (Metallocene Compound 29)

The compound was synthesized according to the procedure described in Examples 1 and 3 of JP-A-09-20694.

Synthesis Example 17

Synthesis of racemi-ethylenebis(indenyl)zirconium dichloride (Metallocene Compound 30)

A commercial product was purchased from Wako Pure Chemical Industries, Ltd.

Example 1b (1) Preparation of Solid Catalyst

In a nitrogen atmosphere, 5 g of silica calcined at 600° C. for 5 hours was put in a 200-ml two-neck flask and dried at reduced pressure with a vacuum pump for 1 hour while heating the flask in an oil bath at 150° C. In a nitrogen atmosphere, 22.7 mg of Metallocene Compound 11 and 23.9 mg of Metallocene Compound 21 were put in a separately prepared 100-ml two-neck flask and dissolved in 13.4 ml of dehydrated toluene, and to the resulting toluene solution of metallocene compounds, 8.6 ml of a 20% methylaluminoxane/toluene solution produced by Albemarle was added at room temperature and stirred for 30 minutes. While heating the 200-ml two-neck flask containing vacuum-dried silica in an oil bath at 40° C. and stirring the contents, the entire amount of the toluene solution above containing a reaction product of the metallocene compounds and methylaluminoxane was added and stirred at 40° C. for 1 hour. While still heating the system at 40° C., the toluene solvent was removed by distillation under reduced pressure to obtain a solid catalyst.

(2) Production of Ethylene.1-Hexene Copolymer

An ethylene.1-hexene copolymer was produced using the solid catalyst obtained in (1) Preparation of Solid Catalyst above.

That is, 800 mL of isobutane, 50 mL of 1-hexene and 0.20 mmol of triethylaluminum were added to a 2 L-volume autoclave with an induction stirring device, then, the temperature was raised to 75° C., and the ethylene partial pressure was kept at 1.4 MPa by introducing ethylene.

Subsequently, 57 mg of the solid catalyst obtain in (1) above was injected with nitrogen and after continuing the polymerization for 60 minutes by keeping the ethylene partial pressure of 1.4 MPa and the temperature of 75° C., the polymerization was stopped by adding ethanol.

Incidentally, during the polymerization reaction, additional feeding of 1-hexene was performed at a feed rate proportional to the ethylene consumption rate.

As a result, the molar ratio of $H_2/C_2$ (hydrogen/ethylene) in the autoclave gas phase part at 10 minutes after the initiation of polymerization and just prior to stopping of the polymerization was 0.125% and 0.087%, respectively, and the amount of 1-hexene additionally fed was 2.0 mL. The amount of the thus-obtained ethylene-based polymer was 20.3 g. The polymerization results and the analysis results of the polymer obtained are shown in Table 1b.

Example 2b

Production of Ethylene-Based Polymer

An ethylene-based polymer was produced by the same method as in (2) of Example 1b under the conditions shown in Table 1b by using a solid catalyst obtained in the same manner as in (1) of Example 1b except for using 30.5 mg of Metallocene Compound 22 in place of Metallocene Compound 21.

The amount of the thus-obtained ethylene-based polymer was 43.3 g. The results are shown in Table 1b.

Example 3b (1) Preparation of Solid Catalyst

Preparation of Solid Catalyst was performed in the same manner as in (1) of Example 1b except for using 22.4 mg of Metallocene Compound 27 in place of Metallocene Compound 21.

(2) Production of Ethylene.1-Hexene Copolymer

An ethylene.1-hexene copolymer was produced using the solid catalyst obtained in (1) above.

That is, 50 g of polyethylene-made pellets subjected to full dehydration and deoxidation and 0.20 mmol of triethylaluminum were added to a stainless steel-made autoclave having an internal volume of 2 liter and having stirring and temperature control devices, and the temperature was raised to 75° C. under stirring. After introducing 1.5 ml of 1-hexene and ethylene until the partial pressure became 1.4 MPa, 80 mg of the solid catalyst obtained above was injected with a nitrogen gas, and polymerization was performed for 90 minutes.

Incidentally, during the polymerization reaction, additional feeding of 1-hexene was performed at a feed rate proportional to the ethylene consumption rate. As a result, the molar ratio of $H_2/C_2$ (hydrogen/ethylene) in the autoclave gas phase part at 10 minutes after the initiation of polymerization and just prior to stopping of the polymerization was 0.065% and 0.076%, respectively, and the amount of 1-hexene additionally fed was 5.5 mL.

Production of 35.0 g of polyethylene resulted. The polymerization results are shown together in Table 1b.

Example 4b

Production of Ethylene-Based Polymer

An ethylene-based polymer was produced by the same method as in (2) of Example 3 under the conditions shown in Table 1b by using a solid catalyst obtained in the same manner as in (1) of Example 3b except for using 9.1 mg of Metallocene Compound 11 and 35.9 mg of Metallocene Compound 27.

The amount of the thus-obtained ethylene-based polymer was 28.5 g. The results are shown in Table 1b.

Example 5b

Production of Ethylene-Based Polymer:

An ethylene-based polymer was produced by the same method as in (2) of Example 4b under the conditions shown in Table 1b by using a solid catalyst obtained in the same manner as in (1) of Example 4b except for using 50.3 mg of Metallocene Compound 28 in place of Metallocene Compound 27.

Incidentally, 250 mL of $H_2$ and 1.5 ml of 1-hexene were added before initiation of the polymerization and furthermore, during the polymerization reaction, additional feeding of $H_2$ and 1-hexene was performed at feed rates proportional to the ethylene consumption rate.

The amount of the thus-obtained ethylene-based polymer was 42.0 g. The results are shown in Table 1b.

Comparative Example 1b

Production of Ethylene-Based Polymer

An ethylene-based polymer was produced by the same method as in (2) of Example 3b under the conditions shown in Table 1b by using a solid catalyst obtained in the same manner as in (1) of Example 3b except for using 45.5 mg of Metallocene Compound 11 and not using Metallocene Compound 27.

The amount of the thus-obtained ethylene-based polymer was 49.5 g. The results are shown in Table 1b.

Comparative Example 2b

Production of Ethylene-Based Polymer

An ethylene-based polymer was produced by the same method as in (2) of Example 3b under the conditions shown in Table 1b by using a solid catalyst obtained in the same manner as in (1) of Example 3b except for not using Metallocene Compound 11 and using 44.9 mg of Metallocene Compound 27.

The amount of the thus-obtained ethylene-based polymer was 22.5 g. The results are shown in Table 1b.

Comparative Example 3b

Production of Ethylene-Based Polymer

An ethylene-based polymer was produced by the same method as in Comparative Example 2b under the conditions shown in Table 1b.

The amount of the thus-obtained ethylene-based polymer was 44.5 g. The results are shown in Table 1b.

TABLE 1b

| | Catalyst | | | Amount of Catalyst | Polymerization Method | Polymerization H2/C2 | Charge Amount of 1-Hexene | Additional Amount of 1-Hexene | Activity g/g catalyst/hour | MFR g/10 min | Density g/cm3 | Analysis of Polymer $\lambda_{max}$ (0.1) | $\lambda_{max}$ (2.0) | $\lambda$max (2.0)/ $\lambda$max (0.1) | $g_C'$ Value | $W_C$ Value (MW ≥ 10^6) % |
|---|---|---|---|---|---|---|---|---|---|---|---|---|---|---|---|---|
| | Essential Component (A-1b) Kind | μmol | Essential Component (A-2b) Kind | μmol | mg | od | % | ml | ml | | | | | | | |
| Example 1b | Metallocene Compound 11 | 50 | Metallocene Compound 21 | 50 | 57 | S | 0.11 | 50 | 2.0 | 357 | 1.4 | 0.932 | 1.2 | 3.6 | 3.0 | 0.45 | 2.2 |
| Example 2b | Metallocene Compound 11 | 50 | Metallocene Compound 22 | 50 | 50 | S | 0.55 | 50 | 8.0 | 866 | 2.7 | 0.925 | 1.0 | 1.9 | 1.9 | 0.60 | 1.2 |
| Example 3b | Metallocene Compound 11 | 50 | Metallocene Compound 27 | 50 | 80 | G | 0.07 | 1.5 | 5.5 | 292 | 12 | 0.930 | 2.5 | 7.8 | 3.1 | 0.39 | 1.2 |
| Example 4b | Metallocene Compound 11 | 20 | Metallocene Compound 27 | 80 | 107 | G | 0.11 | 1.5 | 4.0 | 177 | 0.4 | 0.922 | 2.3 | 3.2 | 1.4 | 0.53 | 0.9 |
| Example 5b | Metallocene Compound 11 | 20 | Metallocene Compound 28 | 80 | 42 | G | 0.35 | 1.5 | 8.5 | 662 | 0.4 | 0.911 | 1.3 | 1.7 | 1.3 | 0.57 | 2.4 |
| Comparative Example 1b | Metallocene Compound 11 | 100 | — | — | 64 | G | 0.10 | 1.5 | 9.5 | 516 | 38 | 0.927 | — | — | — | 0.36 | 0.8 |
| Comparative Example 2b | — | — | Metallocene Compound 27 | 100 | 62 | G | 0.08 | 1.5 | 3.0 | 244 | 0.01 | 0.912 | — | — | — | 0.59 | 2.0 |
| Comparative Example 3b | — | — | Metallocene Compound 27 | 100 | 74 | G | 0.12 | 0.4 | 1.0 | 299 | 0.2 | 0.937 | 1.0 | 1.1 | 1.1 | 0.69 | 0.7 |

Metallocene Compound 11
(molecular weight: 454.6)

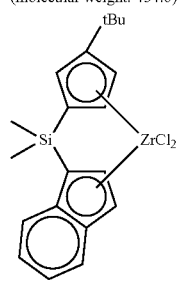

TABLE 1b-continued

| | Catalyst | | | Amount of Catalyst mg | Polymerization Method | H2/C2 % | Charge Amount of 1-Hexene ml | Additional Amount of 1-Hexene ml | Activity g/g catalyst/hour | MFR g/10 min | Density g/cm3 | Analysis of Polymer | | | | $W_C$ Value (MW ≥ 10^6) % |
|---|---|---|---|---|---|---|---|---|---|---|---|---|---|---|---|---|
| Essential Component (A-1b) Kind | μmol | Essential Component (A-2b) Kind | μmol | | | | | | | | | $\lambda_{max}$ (0.1) | $\lambda_{max}$ (2.0) | $\lambda$max (2.0)/ $\lambda$max (0.1) | $g_C'$ Value | |

Metallocene Compound 21
(molecular weight: 478.6)

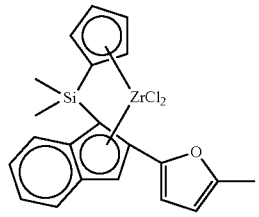

Metallocene Compound 22
(molecular weight: 610.8)

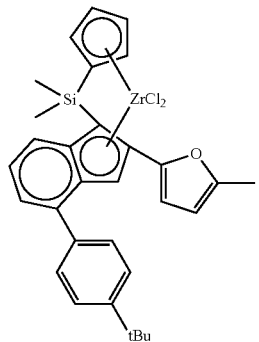

Metallocene Compound 27
(molecular weight: 448.6)

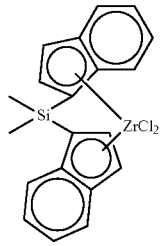

Metallocene Compound 28
(molecular weight: 628.8)

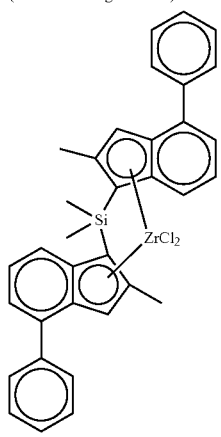

As seen from Table 1b, in the case of an ethylene-based polymer obtained using only Metallocene Compound 11 of the component (A-1b), as in Comparative Example 1b, despite low hydrogen polymerization conditions, it was difficult to sufficiently reduce MFR, and the $W_C$ value was small; and in the case of an ethylene-based polymer obtained using only Metallocene Compound 27 of the component (A-2b), as in Comparative Examples 2b and 3b, only a polymer where the $g_C'$ value is as large as about 0.6 or more or the $\lambda_{max}(2.0)$ or $\lambda_{max}(2.0)/\lambda_{max}(0.1)$ is small could be obtained, and enhancement of moldability could not be promised. On the other hand, in the case of an ethylene-based polymer obtained by the same gas-phase polymerization by using both Metallocene Compound 11 and Metallocene Compound 27, as in Example 3b, an ethylene-based polymer where all of $\lambda_{max}(2.0)$, $\lambda_{max}(2.0)/\lambda_{max}(0.1)$, $g_C'$ value and $W_C$ value were large to indicate well developing of a long-chain branched structure was obtained, and it is understood that moldability was improved. In the case of an ethylene-based polymer of Example 4b obtained by decreasing the amount of Metallocene Compound 11 and increasing the amount of Metallocene Compound 27, the $\lambda_{max}(2.0)$, $\lambda_{max}(2.0)/\lambda_{max}(0.1)$, $g_C'$ value and $W_C$ value were smaller than in Example 3b and a long-chain branched structure was slightly less developed, but it is understood that the moldability was excellent relative to ethylene-based polymers obtained by using respective metallocene compounds individually. In the case of an ethylene-based polymer of Example 5b using Metallocene Compound 28 as a different component (A-2b), the $W_C$ value was greatly improved while maintaining the $\lambda_{max}(2.0)/\lambda_{max}(0.1)$ and $g_C'$ value comparable to those in Example 4b. In the case of ethylene-based polymers of Example 1b and Example 2b where Metallocene Compound 21 or Metallocene Compound 22 was similarly used as a different component (A-2b) and a slurry polymerization method was performed, $\lambda_{max}(2.0)$, $\lambda_{max}(2.0)/\lambda_{max}(0.1)$ and $W_C$ value were large enough and the $g_C'$ value was sufficiently small, and the polymer was proved to have a long-chain branched structure useful in enhancing the molding characteristics.

Example 6b

Production of Ethylene-Based Polymer

An ethylene-based polymer was produced by the same method as in (2) of Example 3b under the conditions shown in Table 2b by using a solid catalyst obtained in the same manner as in (1) of Example 3b except for using 37.1 mg of Metallocene Compound 12 in place of Metallocene Compound 11 and using 4.5 mg of Metallocene Compound 27.

The amount of the thus-obtained ethylene-based polymer was 38.5 g. The results are shown in Table 2b.

Example 7b

Production of Ethylene-Based Polymer

An ethylene-based polymer was produced under the conditions shown in Table 2b by using a solid catalyst obtained in the same manner as in Example 6b except for using 4.3 mg of Metallocene Compound 29 in place of Metallocene Compound 27.

The amount of the thus-obtained ethylene-based polymer was 31.0 g. The results are shown in Table 2b.

Comparative Example 4b

Production of Ethylene-Based Polymer

An ethylene-based polymer was produced under the conditions shown in Table 2b by using a solid catalyst obtained in the same manner as in Example 6b except for using 41.3 mg of Metallocene Compound 12 and not using Metallocene Compound 27.

The amount of the thus-obtained ethylene-based polymer was 31.0 g. The results are shown in Table 2b.

Comparative Example 5b

Production of Ethylene-Based Polymer

An ethylene-based polymer was produced by the same method as in Comparative Example 4b under the conditions shown in Table 2b.

The amount of the thus-obtained ethylene-based polymer was 42.5 g. The results are shown in Table 2b.

Example 8b

Production of Ethylene-Based Polymer

An ethylene-based polymer was produced by the same method as in (2) of Example 1b under the conditions shown in Table 2b by using a solid catalyst obtained in the same manner as in (1) of Example 1b except for using 39.1 mg of Metallocene Compound 13 in place of Metallocene Compound 11 and using 1.5 mg of Metallocene Compound 25 in place of Metallocene Compound 21.

Incidentally, 100 mL of $H_2$ and 40 ml of 1-hexene were added before initiation of the polymerization and furthermore, during the polymerization reaction, additional feeding of $H_2$ and 1-hexene was performed at feed rates proportional to the ethylene consumption rate.

The amount of the thus-obtained ethylene-based polymer was 48.5 g. The results are shown in Table 2b.

Example 9b

Production of Ethylene-Based Polymer

An ethylene-based polymer was produced by the same method as in Example 8b under the conditions shown in Table 2b.

The amount of the thus-obtained ethylene-based polymer was 48.5 g. The results are shown in Table 2b.

Example 100b

Production of Ethylene-Based Polymer

An ethylene-based polymer was produced by the same method as in (2) of Example 3b under the conditions shown in Table 2b by using the solid catalyst obtained in Example 8b.

Incidentally, 370 mL of $H_2$ and 1.5 ml of 1-hexene were added before initiation of the polymerization and furthermore, during the polymerization reaction, additional feeding of $H_2$ and 1-hexene was performed at feed rates proportional to the ethylene consumption rate.

The amount of the thus-obtained ethylene-based polymer was 8.5 g. The results are shown in Table 2b.

Comparative Example 6b

Production of Ethylene-Based Polymer

An ethylene-based polymer was produced under the conditions shown in Table 2b by using a solid catalyst obtained in the same manner as in Example 8b except for using 39.9 mg of Metallocene Compound 13 and not using Metallocene Compound 25.

The amount of the thus-obtained ethylene-based polymer was 31.4 g. The results are shown in Table 2b.

Example 11b

Production of Ethylene-Based Polymer

An ethylene-based polymer was produced under the conditions shown in Table 2b by using a solid catalyst obtained in the same manner as in Example 6b except for using 40.9 mg of Metallocene Compound 14 in place of Metallocene Compound 12.

Incidentally, 60 mL of $H_2$ and 1.5 ml of 1-hexene were added before initiation of the polymerization and furthermore, during the polymerization reaction, additional feeding of $H_2$ and 1-hexene was performed at feed rates proportional to the ethylene consumption rate.

The amount of the thus-obtained ethylene-based polymer was 59.0 g. The results are shown in Table 2b.

Example 12b

Production of Ethylene-Based Polymer

An ethylene-based polymer was produced under the conditions shown in Table 2b by using a solid catalyst obtained in the same manner as in Example 11b except for using 35.9 mg of Metallocene Compound 15 in place of Metallocene Compound 14 and using 9.0 mg of Metallocene Compound 27. The amount of the thus-obtained ethylene-based polymer was 30.5 g. The results are shown in Table 2b.

TABLE 2b

| | Catalyst | | | Amount of Catalyst | Polymerization Method | Polymerization | | | | | Analysis of Polymer | | | | | |
|---|---|---|---|---|---|---|---|---|---|---|---|---|---|---|---|---|
| | Essential Component (A-1b) | | Essential Component (A-2b) | | | H2/C2 | Charge Amount of 1-Hexene | Additional Amount of 1-Hexene | Activity g/g catalyst/hour | MFR g/10 min | Density g/cm3 | $\lambda_{max}$ (0.1) | $\lambda_{max}$ (2.0) | $\lambda_{max}$(2.0)/$\lambda_{max}$(0.1) | $g_C'$ Value | $W_C$ Value (MW ≥ $10^6$) % |
| | Kind | μmol | Kind | μmol | mg | | % | ml | ml | | | | | | | |
| Example 6b | Metallocene Compound 12 | 90 | Metallocene Compound 27 | 10 | 60 | G | 0.11 | 1.5 | 6.0 | 426 | 0.2 | 0.919 | 1.4 | 1.9 | 1.4 | 0.45 | 0.4 |
| Example 7b | Metallocene Compound 12 | 90 | Metallocene Compound 29 | 10 | 56 | G | 0.17 | 1.5 | 5.0 | 370 | 0.4 | 0.923 | 2.3 | 3.5 | 1.5 | 0.41 | 1.2 |
| Comparative Example 4b | Metallocene Compound 12 | 100 | — | — | 44 | G | 0.12 | 1.5 | 4.0 | 470 | 0.2 | 0.924 | 1.0 | 1.5 | 1.5 | 0.42 | 0.3 |
| Comparative Example 5b | Metallocene Compound 12 | 100 | — | — | 181 | G | 0.18 | 1.5 | 6.0 | 157 | 2.7 | 0.930 | 1.9 | 4.1 | 2.2 | 0.47 | 0.2 |
| Example 8b | Metallocene Compound 13 | 98 | Metallocene Compound 25 | 2 | 175 | S | 0.39 | 40 | 8.0 | 278 | 0.3 | 0.911 | 2.0 | 3.4 | 1.7 | 0.49 | 0.7 |
| Example 9b | Metallocene Compound 13 | 98 | Metallocene Compound 25 | 2 | 175 | S | 0.95 | 40 | 8.0 | 278 | 3.9 | 0.913 | 1.7 | 5.9 | 3.5 | 0.50 | 0.2 |
| Example 10b | Metallocene Compound 13 | 98 | Metallocene Compound 25 | 2 | 49 | G | 0.48 | 2 | 1.0 | 115 | 2.7 | 0.927 | 2.8 | 4.7 | 1.7 | 0.65 | 0.2 |

TABLE 2b-continued

| | Catalyst | | | | Amount of Catalyst | Polymerization Method | H2/C2 | Charge Amount of 1-Hexene | Additional Amount of 1-Hexene | Activity g/g catalyst/hour | MFR g/10 min | Density g/cm3 | Analysis of Polymer | | | | $W_C$ Value (MW ≥ 10^6) |
|---|---|---|---|---|---|---|---|---|---|---|---|---|---|---|---|---|---|
| | Essential Component (A-1b) | | Essential Component (A-2b) | | | | | | | | | | $\lambda_{max}$ (0.1) | $\lambda_{max}$ (2.0) | $\lambda_{max}(2.0)/\lambda_{max}(0.1)$ | $g_C'$ Value | % |
| | Kind | μmol | Kind | μmol | mg | | % | ml | ml | | | | | | | | |
| Comparative Example 6b | Metallocene Compound 13 | 100 | — | — | 160 | S | 0.20 | 40 | 7.2 | 196 | 8.1 | 0.929 | 2.6 | 6.5 | 2.5 | 0.84 | 1.5 |
| Example 11b | Metallocene Compound 14 | 90 | Metallocene Compound 27 | 10 | 57 | G | 0.12 | 1.5 | 10 | 689 | 0.8 | 0.922 | 1.6 | 2.1 | 1.3 | 0.63 | 0.1 |
| Example 12b | Metallocene Compound 15 | 80 | Metallocene Compound 27 | 20 | 130 | G | 0.09 | 1.5 | 5.0 | 156 | 0.1 | 0.920 | — | — | — | 0.47 | 2.5 |

Metallocene Compound 12
(molecular weight: 412.5)

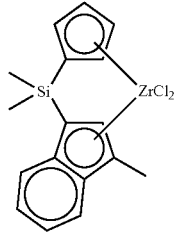

Metallocene Compound 13
(molecular weight: 398.5)

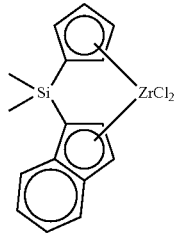

Metallocene Compound 14
(molecular weight: 454.6)

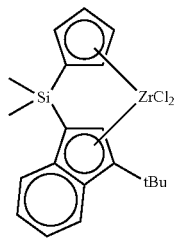

TABLE 2b-continued

| Catalyst | | | | Polymerization | | | | | | Analysis of Polymer | | | | | |
|---|---|---|---|---|---|---|---|---|---|---|---|---|---|---|---|
| | | A- | | | | Addi- tional | Ac- tiv- | | | | | | | | $W_C$ Value |
| | | mount | Polym- | | Charge | A- | ity | | | | | | | | |
| Essential Component (A-1b) | Essential Component (A-2b) | of Cata- lyst | eriza- tion Meth- | H2/ C2 | Amount of 1- Hexene | mount of 1- Hexene | g/g cata- lyst/ | MFR g/10 | Den- sity g/ | $\lambda_{max}$ | $\lambda_{max}$ | λmax (2.0)/ λmax | $g_C{}'$ Val- | (MW ≥ 10^6) |
| Kind | μmol | Kind | μmol | mg | od | % | ml | ml | hour | min | cm3 | (0.1) | (2.0) | (0.1) | ue | % |

Metallocene Compound 15
(molecular weight: 448.6)

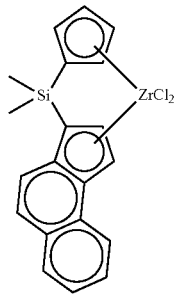

Metallocene Compound 25
(molecular weight: 761.0)

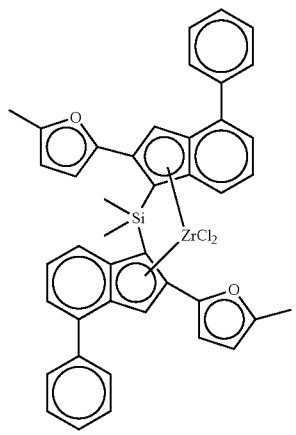

Metallocene Compound 27
(molecular weight: 448.6)

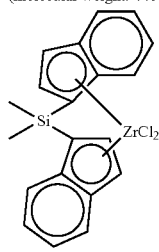

Metallocene Compound 29
(molecular weight: 432.5)

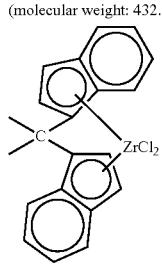

The results of the olefin polymerization catalyst of the present invention where each of Metallocene Compounds 12 to 15 as a metallocene different from the component (A-1b) used in Table 1b was combined with Metallocene Compound 27 or the like used as the component (A-2b) in Table 1b are shown in Table 2b. Comparison with Comparative Example 4b and Comparative Example 6b revealed that the ethylene-based polymers obtained are excellent in terms of $\lambda_{max}(2.0)$, $\lambda_{max}(2.0)/\lambda_{max}(0.1)$, $g_{C'}$ value and $W_C$ value relative to a polymer using the component (A-1b) alone.

Example 13b

Production of Ethylene-Based Polymer

An ethylene-based polymer was produced under the conditions shown in Table 3b by using a solid catalyst obtained in the same manner as in Example 1b except for using 36.4 mg of Metallocene Compound 16 in place of Metallocene Compound 11 and using 6.1 mg of Metallocene Compound 22 in place of Metallocene Compound 21.

The amount of the thus-obtained ethylene-based polymer was 11.0 g. The results are shown in Table 3b.

Example 14b

Production of Ethylene-Based Polymer

An ethylene-based polymer was produced under the conditions shown in Table 3b by using a solid catalyst obtained in the same manner as in Example 13b except for using 6.8 mg of Metallocene Compound 23 in place of Metallocene Compound 22.

The amount of the thus-obtained ethylene-based polymer was 30.0 g. The results are shown in Table 3b.

Example 15b

Production of Ethylene-Based Polymer

An ethylene-based polymer was produced under the conditions shown in Table 3b by using a solid catalyst obtained in the same manner as in Example 13b except for using 8.5 mg of Metallocene Compound 24 in place of Metallocene Compound 22.

The amount of the thus-obtained ethylene-based polymer was 20.0 g. The results are shown in Table 3b.

Example 16b

Production of Ethylene-Based Polymer

An ethylene-based polymer was produced in the same manner as in Example 15b under the conditions shown in Table 3b.

The amount of the thus-obtained ethylene-based polymer was 16.5 g. The results are shown in Table 3b.

Example 17b

Production of Ethylene-Based Polymer

An ethylene-based polymer was produced under the conditions shown in Table 3b by using a solid catalyst obtained in the same manner as in Example 3b except for using 20.2 mg of Metallocene Compound 16 in place of Metallocene Compound 11.

The amount of the thus-obtained ethylene-based polymer was 46.5 g. The results are shown in Table 3b.

Comparative Example 7b-1

Production of Ethylene-Based Polymer

An ethylene-based polymer was produced under the conditions shown in Table 3b by using a solid catalyst obtained in the same manner as in Example 17b except for using 40.5 mg of Metallocene Compound 16 and not using Metallocene Compound 27.

The amount of the thus-obtained ethylene-based polymer was 42.0 g. The results are shown in Table 3b.

Comparative Example 7b-2

Production of Ethylene-Based Polymer

An ethylene-based polymer was produced under the conditions shown in Table 3b by using a solid catalyst obtained in the same manner as in Example 13b except for using 12.1 mg of Metallocene Compound 16 and using 39.0 mg of Metallocene Compound 31 in place of Metallocene Compound 22.

The amount of the thus-obtained ethylene-based polymer was 13.5 g. The results are shown in Table 3b.

TABLE 3b

|  | Catalyst | | | | Polymerization | | | | | | | |
|---|---|---|---|---|---|---|---|---|---|---|---|---|
|  | Essential Component (A-1b) | | Essential Component (A-2b) | | Amount of Catalyst | Polymerization | H2/ C2 | Charge Amount of 1-Hexene | Additional Amount of 1-Hexene | Activity g/g catalyst/ | MFR g/10 | Density |
|  | Kind | μmol | Kind | μmol | mg | Method | % | ml | ml | hour | min | g/cm3 |
| Example 13b | Metallocene Compound 16 | 90 | Metallocene Compound 22 | 10 | 68 | S | 0.05 | 150 | 1.0 | 162 | 0.9 | 0.917 |
| Example 14b | Metallocene Compound 16 | 90 | Metallocene Compound 23 | 10 | 54 | S | 0.13 | 150 | 6.5 | 550 | 0.8 | 0.913 |

TABLE 3b-continued

| | | | | | | | | | | | | |
|---|---|---|---|---|---|---|---|---|---|---|---|---|
| Example 15b | Metallocene Compound 16 | 90 | Metallocene Compound 24 | 10 | 43 | S | 0.29 | 50 | 3.0 | 461 | 6.2 | 0.917 |
| Example 16b | Metallocene Compound 16 | 90 | Metallocene Compound 24 | 10 | 47 | S | 0.10 | 50 | 2.0 | 354 | 1.2 | 0.925 |
| Example 17b | Metallocene Compound 16 | 50 | Metallocene Compound 27 | 50 | 58 | G | 0.13 | 1.5 | 7.5 | 535 | 0.2 | 0.920 |
| Comparative Example 7b-1 | Metallocene Compound 16 | 100 | — | — | 62 | G | 0.13 | 1.5 | 7.5 | 451 | 24 | 0.930 |
| Comparative Example 7b-2 | Metallocene Compound 16 | 30 | Metallocene Compound 31 | 70 | 71 | S | 0.08 | 60 | 2.0 | 189 | 0.3 | 0.921 |

| | Analysis of Polymer | | | | | Amount of Soluble Fraction at −15° C. [wt %] | Amount of Soluble Fraction at 0° C. [wt %] | Amount of Soluble Fraction at 20° C. [wt %] | Amount of Soluble Fraction at 40° C. [wt %] |
|---|---|---|---|---|---|---|---|---|---|
| | $\lambda_{max}$ (0.1) | $\lambda_{max}$ (2.0) | $\lambda_{max}$ (2.0)/ $\lambda_{max}$ (0.1) | $g_C'$ Value | $W_C$ Value (MW ≥ 10^6) % | | | | |
| Example 13b | 1.0 | 2.0 | 2.0 | 0.44 | 1.7 | 0.4 | 0.4 | 1.8 | 7.7 |
| Example 14b | 1.0 | 1.8 | 1.8 | 0.68 | 0.3 | 0.4 | 0.4 | 1.3 | 10.2 |
| Example 15b | 1.0 | 1.9 | 1.9 | 0.79 | 0.1 | 3.7 | 4.8 | 17.2 | 30.7 |
| Example 16b | 1.7 | 2.6 | 1.5 | 0.69 | 0.7 | 1.3 | 1.5 | 4.4 | 15.2 |
| Example 17b | 1.0 | 1.7 | 1.7 | 0.48 | 0.3 | — | — | — | — |
| Comparative Example 7b-1 | 3.1 | 4.7 | 1.5 | 0.38 | 0.1 | 0.3 | 0.8 | 2.2 | 5.2 |
| Comparative Example 7b-2 | 1.4 | 1.3 | 0.9 | 0.78 | 0.4 | 0.6 | 0.8 | 1.3 | 3.6 |

Metallocene Compound 16
(molecular weight: 404.6)

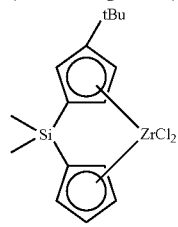

Metallocene Compound 22
(molecular weight: 610.8)

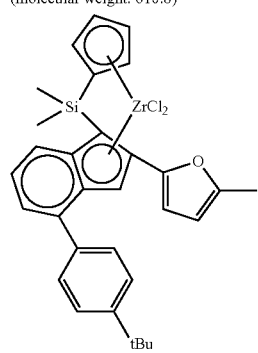

TABLE 3b-continued
Metallocene Compound 23
(molecular weight: 681.0)
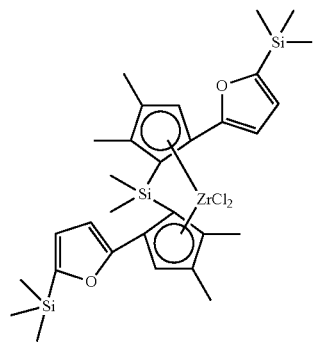
Metallocene Compound 24
(molecular weight: 845.1)
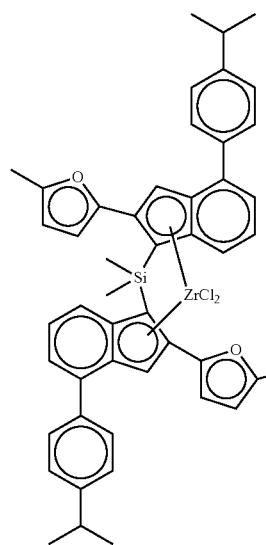
Metallocene Compound 27
(molecular weight: 448.6)
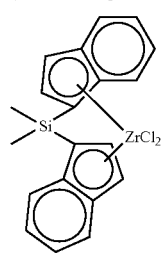
Metallocene Compound 31
(molecular weight: 556.7)
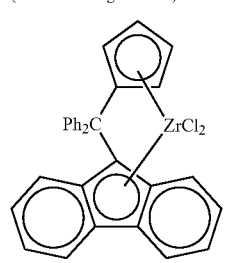

The results of the olefin polymerization catalyst of the present invention where Metallocene Compound 16 as a metallocene different from the component (A-1b) used in Table 1b or Table 2b was combined with Metallocene Compound 22, Metallocene Compound 27 or the like used as the component (A-2b) in Table 1b are shown in Table 3b. Comparison with Comparative Example 7b revealed that the ethylene-based polymers obtained are excellent in terms of $\lambda_{max}(2.0)$, $\lambda_{max}(2.0)/\lambda_{max}(0.1)$, $g_C{}'$ value and $W_C$ value relative to a polymer using Metallocene 16 as the component (A-1b) alone.

Example 18b

Production of Ethylene-Based Polymer

An ethylene-based polymer was produced under the conditions shown in Table 4b by using a solid catalyst obtained in the same manner as in Example 1b except for using 33.1 mg of Metallocene Compound 17 in place of Metallocene Compound 11 and using 3.1 mg of Metallocene Compound 22 in place of Metallocene Compound 21.

The amount of the thus-obtained ethylene-based polymer was 85.8 g. The results are shown in Table 4b.

Example 19b

Production of Ethylene-Based Polymer

An ethylene-based polymer was produced under the conditions shown in Table 4b by using a solid catalyst obtained in the same manner as in Example 18b except for using 34.5 mg of Metallocene Compound 17 and using 0.8 mg of Metallocene Compound 25 in place of Metallocene Compound 22.

The amount of the thus-obtained ethylene-based polymer was 49.5 g. The results are shown in Table 4b.

Example 20b

Production of Ethylene-Based Polymer

An ethylene-based polymer was produced by the same method as in (2) of Example 3b under the conditions shown in Table 4b by using the solid catalyst obtained in Example 19b.

The amount of the thus-obtained ethylene-based polymer was 25.5 g. The results are shown in Table 4b.

Example 21b

Production of Ethylene-Based Polymer

An ethylene-based polymer was produced by the same method as in Example 20b under the conditions shown in Table 4b.

The amount of the thus-obtained ethylene-based polymer was 23.5 g. The results are shown in Table 4b.

Example 22b

Production of Ethylene-Based Polymer

An ethylene-based polymer was produced under the conditions shown in Table 4b by using a solid catalyst obtained in the same manner as in Example 20b except for using 32.4 mg of Metallocene Compound 17 and using 3.5 mg of Metallocene Compound 26 in place of Metallocene Compound 25.

The amount of the thus-obtained ethylene-based polymer was 22.9 g. The results are shown in Table 4b.

Example 23b

Production of Ethylene-Based Polymer

An ethylene-based polymer was produced under the conditions shown in Table 4b by using a solid catalyst obtained in the same manner as in Example 18b except for using 32.4 mg of Metallocene Compound 17 and using 3.1 mg of Metallocene Compound 27 in place of Metallocene Compound 22.

The amount of the thus-obtained ethylene-based polymer was 72.0 g. The results are shown in Table 4b.

Example 24b

Production of Ethylene-Based Polymer

An ethylene-based polymer was produced by the same method as in Example 23b under the conditions shown in Table 4b.

The amount of the thus-obtained ethylene-based polymer was 47.1 g. The results are shown in Table 4b.

Example 25b

Production of Ethylene-Based Polymer

An ethylene-based polymer was produced by the same method as in Example 23b under the conditions shown in Table 4b.

The amount of the thus-obtained ethylene-based polymer was 100.2 g. The results are shown in Table 4b.

Example 26b

Production of Ethylene-Based Polymer

An ethylene-based polymer was produced under the conditions shown in Table 4b by using a solid catalyst obtained in the same manner as in Example 24b except for using 33.5 mg of Metallocene Compound 17 and using 1.8 mg of Metallocene Compound 27.

The amount of the thus-obtained ethylene-based polymer was 29.0 g. The results are shown in Table 4b.

Example 27b

Production of Ethylene-Based Polymer

An ethylene-based polymer was produced under the conditions shown in Table 4b by using a solid catalyst obtained in the same manner as in Example 20b except for using 33.8 mg of Metallocene Compound 17 and using 1.9 mg of Metallocene Compound 28 in place of Metallocene Compound 25.

The amount of the thus-obtained ethylene-based polymer was 40.0 g. The results are shown in Table 4b.

Comparative Example 8b

Production of Ethylene-Based Polymer

An ethylene-based polymer was produced under the conditions shown in Table 4b by using a solid catalyst obtained in the same manner as in Example 20b except for using 34.8 mg of Metallocene Compound 17 and not using Metallocene Compound 25.

The amount of the thus-obtained ethylene-based polymer was 56.8 g. The results are shown in Table 4b.

Comparative Example 9b

Production of Ethylene-Based Polymer

An ethylene-based polymer was produced under the conditions shown in Table 4b by using a solid catalyst obtained in the same manner as in Example 18b except for using 34.8 mg of Metallocene Compound 17 and not using Metallocene Compound 22.

The amount of the thus-obtained ethylene-based polymer was 14.5 g. The results are shown in Table 4b.

Comparative Example 10b

Production of Ethylene-Based Polymer

An ethylene-based polymer was in the same manner as in Comparative Example 9b under the conditions shown in Table 4b.

The amount of the thus-obtained ethylene-based polymer was 79.4 g. The results are shown in Table 4b.

Comparative Example 11b

Production of Ethylene-Based Polymer

An ethylene-based polymer was produced under the conditions shown in Table 4b by using a solid catalyst obtained in the same manner as in Example 23b except for using 44.9 mg of Metallocene Compound 27 and not using Metallocene Compound 17.

The amount of the thus-obtained ethylene-based polymer was 54.9 g. The results are shown in Table 4b.

Comparative Example 12b

Production of Ethylene-Based Polymer

An ethylene-based polymer was produced in the same manner as in Comparative Example 11b under the conditions shown in Table 4b.

The amount of the thus-obtained ethylene-based polymer was 37.2 g. The results are shown in Table 4b.

Comparative Example 13b

Production of Ethylene-Based Polymer

An ethylene-based polymer was produced under the conditions shown in Table 4b in the same manner as in Comparative Example 11b except for using 41.8 mg of Metallocene Compound 30 in place of Metallocene Compound 27.

The amount of the thus-obtained ethylene-based polymer was 129.6 g. The results are shown in Table 4b.

TABLE 4b

| | Catalyst | | | Polymerization | | | | | | | Analysis of Polymer | | | | |
| --- | --- | --- | --- | --- | --- | --- | --- | --- | --- | --- | --- | --- | --- | --- | --- |
| | Essential Component (A-1b) | | Essential Component (A-2b) | | Amount of Catalyst | Polymerization Method | H2/C2 | Charge Amount of 1-Hexene | Additional Amount of 1-Hexene | Activity g/g catalyst/hour | MFR g/10 min | Density g/cm3 | $\lambda_{max}$ (0.1) | $\lambda_{max}$ (2.0) | $\lambda max (2.0)/ \lambda max (0.1)$ | $g_C'$ Value | $W_C$ Value (MW ≥ 10^6) % |
| | Kind | μmol | Kind | μmol | mg | | % | ml | ml | | | | | | | | |
| Example 18b | Metallocene Compound 17 | 95 | Metallocene Compound 22 | 5 | 353 | S | 0.77 | 50 | 19 | 243 | 1.0 | 0.919 | 1.0 | 2.1 | 2.1 | 0.54 | 0.8 |
| Example 19b | Metallocene Compound 17 | 99 | Metallocene Compound 25 | 1 | 276 | S | 0.73 | 40 | 11 | 179 | 4.7 | 0.920 | 1.2 | 5.0 | 4.2 | 0.38 | 0.3 |
| Example 20b | Metallocene Compound 17 | 99 | Metallocene Compound 25 | 1 | 255 | G | 0.08 | 1.5 | 4.0 | 67 | 0.9 | 0.933 | 3.9 | 10.8 | 2.8 | 0.46 | 4.6 |
| Example 21b | Metallocene Compound 17 | 99 | Metallocene Compound 25 | 1 | 255 | G | 0.63 | 1.5 | 3.0 | 61 | 11 | 0.939 | 1.9 | 4.1 | 2.2 | 0.54 | 0.1 |
| Example 22b | Metallocene Compound 17 | 93 | Metallocene Compound 26 | 7 | 225 | G | 0.10 | 1.5 | 3.5 | 68 | 0.2 | 0.929 | 1.0 | 1.5 | 1.5 | 0.42 | 3.6 |

TABLE 4b-continued

| | Catalyst | | | | Polymerization | | | | | | | Analysis of Polymer | | | | |
| --- | --- | --- | --- | --- | --- | --- | --- | --- | --- | --- | --- | --- | --- | --- | --- | --- |
| | Essential Component (A-1b) | | Essential Component (A-2b) | | Amount of Catalyst | Polymerization Method | H2/C2 | Charge Amount of 1-Hexene | Additional Amount of 1-Hexene | Activity g/g catalyst/hour | MFR g/10 min | Density g/cm3 | $\lambda_{max}$ (0.1) | $\lambda_{max}$ (2.0) | $\lambda$max (2.0)/ $\lambda$max (0.1) | $g_C'$ Value | $W_C$ Value (MW $\geq$ 10^6) % |
| | Kind | μmol | Kind | μmol | mg | od | % | ml | ml | | | | | | | | |
| Example 23b | Metallocene Compound 17 | 93 | Metallocene Compound 27 | 7 | 396 | S | 0.18 | 40 | 16 | 182 | 5.7 | 0.931 | 2.7 | 9.3 | 3.4 | 0.42 | 1.9 |
| Example 24b | Metallocene Compound 17 | 93 | Metallocene Compound 27 | 7 | 390 | S | 0.12 | 20 | 4.5 | 121 | 4.7 | 0.946 | 1.0 | 3.7 | 3.7 | 0.43 | 2.6 |
| Example 25b | Metallocene Compound 17 | 93 | Metallocene Compound 27 | 7 | 422 | S | 0.10 | 80 | 25 | 238 | 1.6 | 0.914 | 1.1 | 1.7 | 1.5 | 0.47 | 2.8 |
| Example 26b | Metallocene Compound 17 | 96 | Metallocene Compound 27 | 4 | 381 | S | 0.09 | 20 | 2.0 | 76 | 15 | 0.950 | 2.7 | 8.4 | 3.1 | 0.39 | 1.6 |
| Example 27b | Metallocene Compound 17 | 97 | Metallocene Compound 28 | 3 | 397 | G | 0.13 | 2.0 | 8.0 | 67 | 0.6 | 0.921 | 4.4 | 7.3 | 1.7 | 0.44 | 5.5 |
| Comparative Example 8b | Metallocene Compound 17 | 100 | — | — | 533 | G | 0.13 | 3.6 | 17 | 71 | 1068 | 0.919 | — | — | — | — | — |
| Comparative Example 9b | Metallocene Compound 17 | 100 | — | — | 153 | S | 0.10 | 80 | 4.9 | 95 | 325 | 0.937 | — | — | — | — | — |
| Comparative Example 10b | Metallocene Compound 17 | 100 | — | — | 686 | S | 0.17 | 40 | 16 | 116 | 309 | 0.941 | — | — | — | — | — |
| Comparative Example 11b | — | — | Metallocene Compound 27 | 100 | 68 | S | 0.69 | 20 | 7.0 | 808 | 0.2 | 0.930 | 1.0 | 1.0 | 1.0 | 0.55 | 1.9 |
| Comparative Example 12b | — | — | Metallocene Compound 27 | 100 | 75 | S | 1.49 | 20 | 6.0 | 496 | 4.1 | 0.938 | 1.3 | 2.3 | 1.8 | 0.65 | 0.5 |

TABLE 4b-continued

| | Catalyst | | | | Polymerization | | | | | | | Analysis of Polymer | | | | |
|---|---|---|---|---|---|---|---|---|---|---|---|---|---|---|---|---|
| | Essential Component (A-1b) | | Essential Component (A-2b) | | Amount of Catalyst | Polymerization Method | H2/C2 | Charge Amount of 1-Hexene | Additional Amount of 1-Hexene | Activity g/g catalyst/hour | MFR g/10 min | Density g/cm3 | $\lambda_{max}$ (0.1) | $\lambda_{max}$ (2.0) | $\lambda$max (2.0)/ $\lambda$max (0.1) | $g_C'$ Value | $W_C$ Value (MW ≥ 10^6) % |
| | Kind | μmol | Kind | μmol | mg | | % | ml | ml | | | | | | | | |
| Comparative Example 13b | — | — | Metallocene Compound 30 | 100 | 137 | S | 0.23 | 40 | 37 | 946 | 0.5 | 0.922 | 4.6 | 5.0 | 1.1 | 0.49 | 2.2 |

Metallocene Compound 17
(molecular weight: 348.5)

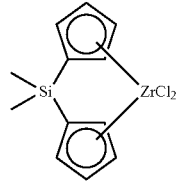

Metallocene Compound 22
(molecular weight: 610.8)

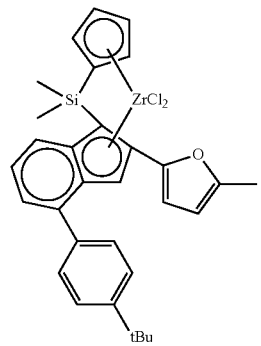

Metallocene Compound 25
(molecular weight: 761.0)

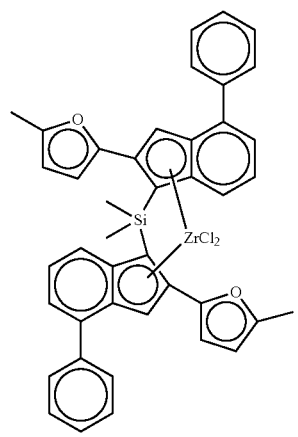

TABLE 4b-continued

| Catalyst | | | | Polymerization | | | | | | Analysis of Polymer | | | | |
|---|---|---|---|---|---|---|---|---|---|---|---|---|---|---|
| Essential Component (A-1b) | | Essential Component (A-2b) | | Amount of Catalyst | Polymerization Method | H2/C2 | Charge Amount of 1-Hexene | Additional Amount of 1-Hexene | Activity g/g catalyst/ | MFR | Density | | | λmax (2.0)/ | $g_C'$ | $W_C$ Value (MW ≥ 10^6) |
| Kind | μmol | Kind | μmol | mg | od | % | ml | ml | hour | g/10 min | g/cm3 | $\lambda_{max}$ (0.1) | $\lambda_{max}$ (2.0) | λmax (0.1) | Value | % |

Metallocene Compound 26
(molecular weight: 494.7)

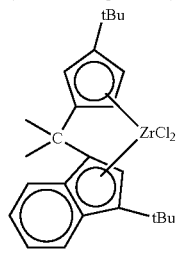

Metallocene Compound 27
(molecular weight: 448.6)

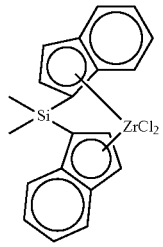

Metallocene Compound 28
(molecular weight: 628.8)

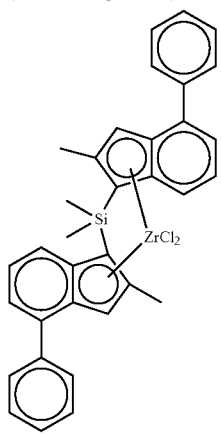

Metallocene Compound 30
(molecular weight: 418.4)

The results of the olefin polymerization catalyst of the present invention where Metallocene Compound 17 as a metallocene different from the component (A-1b) used in Tables 1b to 3b was combined with Metallocene Compound 22, Metallocene Compound 25, Metallocene Compound 27, Metallocene Compound 28 or the like used as the component (A-2b) in Table 1b are shown in Table 4b. Comparison with Comparative Example 8b to Comparative Example 12b revealed that the ethylene-based polymers obtained are excellent in terms of $\lambda_{max}(2.0)$, $\lambda_{max}(2.0)/\lambda_{max}(0.1)$, $g_C'$ value and $W_C$ value relative to a polymer where Metallocene Compound 17 as the component (A-1b) or Metallocene Compound 27 as the component (A-2b) was used alone. Furthermore, comparison with Comparative Example 13 revealed that the ethylene-based polymer obtained according to the present invention has a more proper value for the $\lambda_{max}(2.0)/\lambda_{max}(0.1)$, $g_C'$ value and $W_C$ value than the ethylene-based polymer obtained using ethylenebisindenylzirconium dichloride (Metallocene Compound 30) known to provide for an excellent long-chain branched structure.

Example 28b

Production of Ethylene-Based Polymer

An ethylene-based polymer was produced under the conditions shown in Table 5b by using the solid catalyst synthesized in Example 6b. That is, in a continuous gas-phase polymerization apparatus (internal volume: 100 L, diameter of fluidized bed: 10 cm, seed polymer of fluidized bed (dispersant): 1.5 kg) which is set such that the molar ratio of 1-hexene/ethylene is 0.007, the molar ratio of hydrogen/ethylene is $2.5 \times 10^{-3}$, the nitrogen concentration is 30 mol %, the total pressure is 0.8 MPa and the temperature is 75° C., a hexane solution (0.03 mmol/ml) of triethylaluminum was fed at 7 ml/h and while keeping the gas composition and the temperature constant, polymerization was performed by intermittently feeding the solid catalyst so as to achieve a production amount of about 300 g per hour. The activity was 336 g/(g catalyst·hour). The results are shown in Table 5b.

Example 29b

Production of Ethylene-Based Polymer

An ethylene-based polymer was produced under the conditions shown in Table 5 in the same manner as in Example 28b. The results are shown in Table 5b.

Example 30b

Production of Ethylene-Based Polymer

An ethylene-based polymer was produced under the conditions shown in Table 5b in the same manner as in Example 28b except for setting the polymerization temperature to 65° C. The results are shown in Table 5b.

Example 31b

Production of Ethylene-Based Polymer

An ethylene-based polymer was produced under the conditions shown in Table 5b in the same manner as in Example 30b except for using 6.3 mg of Metallocene Compound 28 in place of Metallocene Compound 27. The results are shown in Table 5b.

Comparative Example 14b

Production of Ethylene-Based Polymer

An ethylene-based polymer having MFR of 0.8 g/10 min and a density of 0.914 g/cm³ was obtained in the same manner as in (2) Production of Ethylene-Based Polymer (B-1) of Example 1a(a). The results are shown in Table 5b. While continuing the continuous operation, the molar ratio of hexene/ethylene was increased from 0.012 so as to produce a lower density ethylene-based polymer, as a result, despite no additional addition of hydrogen that is a molecular weight adjusting agent, MFR started increasing from 0.8 g/10 min with time, and it was difficult to produce a low-MFR and low-density ethylene-based polymer as in Examples 29b to 31b.

TABLE 5b

| | Catalyst | | | | Polymerization | | |
|---|---|---|---|---|---|---|---|
| | Essential Component (A-1b) | | Essential Component (A-2b) | | Amount of Catalyst | Polymerization | H2/C2 | 1-Hexene/C2 |
| | Kind | μmol | Kind | μmol | g/h | Method | % | mol % |
| Example 28b | metallocene Compound 12 | 90 | metallocene Compound 27 | 10 | 0.18 | G | 0.25 | 0.7 |
| Example 29b | metallocene Compound 12 | 90 | metallocene Compound 27 | 10 | 0.14 | G | 0.20 | 1.2 |
| Example 30b | metallocene Compound 12 | 90 | metallocene Compound 27 | 10 | 0.18 | G | 0.10 | 1.4 |
| Example 31b | metallocene Compound 12 | 90 | metallocene Compound 28 | 10 | 0.33 | G | 0.15 | 0.7 |
| Comparative Example 14b | metallocene Compound 12 | 100 | — | — | 0.38 | G | 0.15 | 1.2 |

| | Polymerization | | | | Analysis of Polymer | | | | |
|---|---|---|---|---|---|---|---|---|---|
| | TEA mmol/h | Activity g/g catalyst/hour | MFR g/10 min | Density g/cm3 | $\lambda_{max}$ (0.1) | $\lambda_{max}$ (2.0) | $\lambda_{max}(2.0)/\lambda_{max}(0.1)$ | $g_c'$ Value | $W_c$ Value (MW ≥ 10^6) % |
| Example 28b | 0.21 | 336 | 0.3 | 0.921 | 2.0 | 2.5 | 1.3 | 0.44 | 0.02 |
| Example 29b | 0.23 | 620 | 0.7 | 0.913 | 1.8 | 2.7 | 1.5 | 0.56 | 0.01 |

TABLE 5b-continued

| Example 30b | 0.23 | 516 | 1.6 | 0.907 | 1.8 | 3.7 | 2.1 | 0.55 | 0.01 |
| Example 31b | 0.25 | 420 | 0.3 | 0.901 | 1.5 | 2.6 | 1.7 | 0.53 | 0.7 |
| Comparative Example 14b | 0.23 | 320 | 0.8 | 0.914 | 1.7 | 3.1 | 1.8 | 0.46 | 0.1 |

(I) [Synthesis of Metallocene Compound]

Metallocene Compound A: Synthesis of dimethylsilylene(4-(4-trimethylsilyl-phenyl)-indenyl)(cyclopentadienyl)zirconium dichloride (1-1) Synthesis of 4-(4-trimethylsilyl-phenyl)-indene In a 500-ml flask, 10.0 g (51.5 mmol) of 4-trimethylsilylphenylboronic acid and 200 ml of dimethoethane were added to make a solution and thereafter, 27.3 g (128 mmol) of potassium phosphate, 100 ml of water, 8.37 g (43.0 mmol) of 4-bromoindene, 0.22 g (0.86 mmol) of triphenylphosphine, and 0.300 g (0.430 mmol) of $PdCl_2(PPh_3)_2$ were added in sequence and stirred under reflux for 12 hours. After cooling to room temperature, 100 ml of water was added. The organic phase was separated and then, the aqueous phase was extracted twice with 100 ml of ethyl acetate. The obtained organic phases were mixed and washed with a saline solution, and the resulting organic phase was dried by adding sodium sulfate. Sodium sulfate was filtered, and the solvent was removed by distillation under reduced pressure. The residue was purified on a silica gel column to obtain 9.0 g (yield: 79%) of 4-(4-trimethylsilyl-phenyl)-indene as a yellow liquid.

(1-2) Synthesis of (4-(4-trimethylsilyl-phenyl)-indenyl)(cyclopentadienyl)dimethylsilane In a 200-ml flask, 16.2 g (61.2 mmol) of 4-(4-trimethylsilyl-phenyl)-indene and 100 ml of THF were added to make a solution and after cooling to −78° C., 29.4 ml (173.5 mmol) of an n-butyllithium/hexane solution (2.5M) was added. The system was returned to room temperature and stirred for 4 hours. In a separately prepared 300-ml flask, 14.8 ml (122 mmol) of dimethyldichlorosilane and 20 ml of THF were added to make a solution and after cooling to −78° C., the reaction solution obtained above was added. The system was returned to room temperature and stirred for 12 hours. The volatile matter was removed by distillation under reduced pressure to obtain 21.8 g of a yellow solution. To this yellow solution, 80 ml of THF was added to make a solution, and 36.7 ml (73.5 mmol) of a CpNa/THF solution (2M) was added at −30° C. The system was returned to room temperature and stirred for 1 hour and after adding 100 ml of ice water thereto, the solution was extracted twice with 100 ml of ethyl acetate. The obtained organic phases were mixed and washed with a saline solution, and the resulting organic phase was dried by adding sodium sulfate. Sodium sulfate was filtered, and the solvent was removed by distillation under reduced pressure. The residue was purified on a silica gel column to obtain 12.0 g (yield: 51%) of (4-(4-trimethylsilyl-phenyl)-indenyl)(cyclopentadienyl)dimethylsilane as a yellow liquid.

(1-3) Synthesis of dimethylsilylene(4-(4-trimethylsilyl-phenyl)-indenyl)(cyclopentadienyl)zirconium dichloride In a 300-ml flask, 1.20 g (3.00 mmol) of (4-(4-trimethylsilylphenyl)indenyl)(cyclopentadienyl)dimethylsilane and 20 ml of diethyl ether were added, and the mixture was cooled to −70° C. Thereto, 2.60 ml (6.60 mmol) of a 2.5 mol/L n-butyllithium-n-hexane solution was added dropwise and after the completion of dropwise addition, the system was returned to room temperature and stirred for 2 hours. The solvent of the reaction solution was removed by distillation under reduced pressure, and 30 ml of dichloromethane was added. The resulting solution was cooled to −70° C. in a dry ice-methanol bath, and 0.770 g (3.30 mmol) of zirconium tetrachloride was added thereto. The mixture was stirred one night while allowing it to gradually return to room temperature and from a solution obtained by filtering the reaction solution, the solvent was removed by distillation under reduced pressure, as a result, a yellow powder was obtained. This powder was recrystallized from 10 ml of toluene to obtain 0.500 g (yield: 31%) of dimethylsilylene(4-(4-trimethyl-silylphenyl)indenyl)(cyclopentadienyl)zirconium dichloride as a yellow crystal.

$^1$H-NMR Values ($CDCl_3$): δ0.21 (s, 3H), δ0.23 (s, 9H), δ0.43 (s, 3H), δ5.48 (m, 1H), δ5.51 (m, 1H), δ5.81 (d, 1H), δ6.60 (m, 1H), δ6.66 (m, 1H), δ6.95 (dd, 1H), δ7.13 (s, 1H), δ7.39 (dd, 2H), δ7.57 (d, 2H), δ7.95 (d, 2H).

Metallocene Compound B: Synthesis of dimethylsilylene(4-(4-chloro-phenyl)-indenyl)(cyclopentadienyl)zirconium dichloride (2-1) Synthesis of 4-(4-chloro-phenyl)-indene The synthesis was performed by the same procedure as in Metallocene Compound A (1-1) by using 4-chlorophenylboronic acid in place of 4-trimethylsilylphenylboronic acid in the synthesis of 4-(4-trimethylsilyl-phenyl)-indene to obtain a white solid of 4-(4-chloro-phenyl)-indene in a yield of 69%.

(2-2) Synthesis of (4-(4-chloro-phenyl)-indenyl)(cyclopentadienyl)dimethylsilane The synthesis was performed by the same procedure as in Metallocene Compound A (1-2) by using 4-(4-chloro-phenyl)-indene in place of 4-(4-trimethylsilyl-phenyl)-indene to obtain a pale yellow solid of (4-(4-chloro-phenyl)-indenyl)(cyclopentadienyl)dimethylsilane in a yield of 52%.

(2-3) Synthesis of dimethylsilylene(4-(4-chloro-phenyl)-indenyl)(cyclopentadienyl)zirconium dichloride The synthesis was performed by the same procedure as in Metallocene Compound A (1-3) by using (4-(4-chlorophenyl)indenyl)(cyclopentadienyl)dimethylsilane in place of (4-(4-trimethylsilylphenyl)indenyl)(cyclopentadienyl)dimethylsilane to obtain dimethylsilylene(4-(4-chloro-phenyl)-indenyl)(cyclopentadienyl)zirconium dichloride as a yellow crystal.

$^1$H-NMR Values ($CDCl_3$): δ0.87 (s, 3H), δ1.08 (s, 3H), δ5.89 (m, 1H), δ5.94 (m, 1H), δ6.24 (d, 1H), δ6.78 (m, 1H), δ6.84 (m, 1H), δ7.12 (d, 1H), δ7.19 (dd, 1H), δ7.39 (d, 1H), δ7.44 (m, 3H), δ7.61 (d, 2H).

Metallocene Compound C: Synthesis of dimethylsilylene(4-(2-(5-methyl)-furyl)-indenyl)(cyclopentadienyl)zirconium dichloride

(3-1) Synthesis of 4-(2-(5-methyl)-furyl)-indene

In a 500-ml flask, 2.52 g (30.7 mmol) of 2-methylfuran and 30 ml of THF were added to make a solution and after cooling to −78° C., 14.7 ml (36.9 mmol) of an n-butyllithium-hexane solution (2.5M) was added. The system was returned to room temperature and stirred for 4 hours. In a separately prepared 300-ml flask, 4.18 g (30.7 mmol) of zinc chloride and 10 ml of THF were added to make a suspension and after cooling to 0° C., the reaction solution obtained above was added. The system was returned to room temperature and stirred for 1 hour. Furthermore, in a separately prepared 300 ml-volume flask, 0.35 g (1.84 mmol) of copper(I) iodide, 0.690 g (0.932 mmol) of Pd(dppf)Cl$_2$,3.00 g (15.3 mmol) of 4-bromoindene and 5 ml of DMA were added to make a suspension, and the reaction solution obtained above was added and stirred under reflux for 15 hours. After cooling to room temperature, 50 ml of water was added. The organic phase was separated and then, the aqueous phase was extracted twice with 50 ml of ethyl acetate. The obtained organic phases were mixed and washed twice with 50 ml of water and washed once with 50 ml of a saline solution, and the resulting organic phase was dried by adding sodium sulfate. Sodium sulfate was filtered, and the solvent was removed by distillation under reduced pressure. The residue was purified on a silica gel column to obtain 2.10 g (yield: 70%) of 4-(2-(5-methyl)-furyl)-indene as a yellow liquid.

(3-2) Synthesis of (4-(2-(5-methyl)-furyl)-indenyl)(cyclopentadienyl)dimethylsilane The synthesis was performed by the same procedure as in Metallocene Compound A (1-2) by using 4-(2-(5-methyl)-furyl)-indene in place of 4-(4-trimethylsilyl-phenyl)-indene to obtain a pale yellow solid of (4-(2-(5-methyl)-furyl)-indenyl)(cyclopentadienyl)dimethylsilane in a yield of 38%.

(3-3) Synthesis of dimethylsilylene(4-(2-(5-methyl)-furyl)-indenyl)(cyclopentadienyl)zirconium dichloride The synthesis was performed by the same procedure as in Metallocene Compound A (1-3) by using (4-(2-(5-methyl)-furyl)-indenyl)(cyclopentadienyl)dimethylsilane in place of (4-(4-trimethylsilylphenyl)indenyl)(cyclopentadienyl)dimethylsilane to obtain dimethylsilylene(4-(2-(5-methyl)-furyl)-indenyl)(cyclopentadienyl)zirconium dichloride as a yellow crystal (yield: 25%).

$^1$H-NMR Values (CDCl$_3$): δ0.00 (s, 3H), δ0.18 (s, 3H), δ1.79 (s, 3H), δ5.22 (m, 1H), δ5.32 (m, 1H), δ5.64 (m, 1H), δ5.72 (d, 1H), δ6.33 (m, 1H), δ6.35 (m, 1H), δ6.70 (m, 2H), δ6.82 (d, 1H), δ7.43 (d, 1H), δ7.60 (d, 1H).

Metallocene Compound D: Synthesis of dimethylsilylene(4-(4-methoxy-phenyl)-indenyl)(cyclopentadienyl)zirconium dichloride

(4-1) Synthesis of 4-(4-methoxy-phenyl)-indene

The synthesis was performed by the same procedure as in Metallocene Compound A (1-1) by using 4-methoxyphenyl-boronic acid in place of 4-trimethylsilylphenylboronic acid in the synthesis of 4-(4-trimethylsilyl-phenyl)-indene to obtain a yellow liquid of 4-(4-methoxy-phenyl)-indene in a yield of 89%.

(4-2) Synthesis of (4-(4-methoxy-phenyl)-indenyl)(cyclopentadienyl)dimethylsilane The synthesis was performed by the same procedure as in Metallocene Compound A (1-2) by using 4-(4-methoxy-phenyl)-indene in place of 4-(4-trimethylsilyl-phenyl)-indene to obtain a yellow liquid of (4-(4-methoxy-phenyl)-indenyl)(cyclopentadienyl)dimethylsilane in a yield of 35%.

(2-3) Synthesis of dimethylsilylene(4-(4-methoxy-phenyl)-indenyl)(cyclopentadienyl)zirconium dichloride The synthesis was performed by the same procedure as in Metallocene Compound A (1-3) by using (4-(4-methoxy-phenyl)indenyl)(cyclopentadienyl)dimethylsilane in place of (4-(4-trimethylsilylphenyl)indenyl)(cyclopentadienyl)dimethylsilane to obtain dimethylsilylene(4-(4-methoxy-phenyl)-indenyl)(cyclopentadienyl)zirconium dichloride as a yellow crystal (yield: 54%).

$^1$H-NMR Values (CDCl$_3$): δ0.86 (s, 3H), δ1.07 (s, 3H), δ3.86 (s, 3H), δ5.88 (m, 1H), δ5.92 (m, 1H), δ6.22 (d, 1H), δ6.77 (m, 1H), δ6.84 (m, 1H), δ7.00 (d, 2H), δ7.18 (m, 2H), δ7.40 (t, 2H), δ7.61 (d, 2H).

Metallocene Compound E: Synthesis of dimethylsilylene(4-phenylindenyl)(cyclopentadienyl)zirconium dichloride The synthesis was performed by the same procedure as in Metallocene Compound A (1-3) by using (4-phenylindenyl)(cyclopentadienyl)dimethylsilane in place of (4-(4-trimethylsilylphenyl)indenyl)(cyclopentadienyl)dimethylsilane to obtain dimethylsilylene(4-phenylindenyl)(cyclopentadienyl)zirconium dichloride as a yellow crystal.

Metallocene Compound F: Synthesis of dimethylsilylene(3-methylindenyl)(cyclopentadienyl)zirconium dichloride The synthesis was performed by the same procedure as in Metallocene Compound A (1-3) by using (3-methylindenyl)(cyclopentadienyl)dimethylsilane in place of (4-(4-trimethylsilylphenyl)indenyl)(cyclopentadienyl)dimethylsilane to obtain dimethylsilylene(3-methylindenyl)(cyclopentadienyl)zirconium dichloride as a yellow crystal.

Metallocene Compound G: Synthesis of dimethylsilylene(cyclopentadienyl)(indenyl)zirconium dichloride The synthesis of dimethylsilylene(cyclopentadienyl)(indenyl)zirconium dichloride was performed according to the procedure described in Macromolecules 1995, 28, 3771-3778.

Example 1-1

(1) Preparation of Solid Catalyst

In a nitrogen atmosphere, 5 g of silica calcined at 600° C. for 5 hours was put in a 200-ml two-neck flask and dried at reduced pressure with a vacuum pump for 1 hour while heating the flask in an oil bath at 150° C. In a nitrogen atmosphere, 68 mg of Metallocene Compound A was put in a separately prepared 100-ml two-neck flask and dissolved in 13.4 ml of dehydrated toluene, and to the resulting toluene solution of Metallocene Compound A, 8.6 ml of a 20% methylaluminoxane/toluene solution produced by Albemarle was added at room temperature and stirred for 30 minutes. While heating the 200-ml two-neck flask containing vacuum-dried silica in an oil bath at 40° C. and stirring the contents, the entire amount of the toluene solution above containing a reaction product of Metallocene Compound A and methylaluminoxane was added and stirred at 40° C. for 1 hour. While still heating the system at 40° C., the toluene solvent was removed by distillation under reduced pressure to obtain a solid catalyst.

(2) Production of Ethylene.1-Hexene Copolymer

An ethylene.1-hexene copolymer was produced using the solid catalyst obtained in (1) Preparation of Solid Catalyst above.

That is, 30 ml of 1-hexene, 0.20 mmol of triethylaluminum, 200 ml of hydrogen and 800 mL of isobutane were added to a 2 L-volume autoclave with an induction stirring device, then, the temperature was raised to 75° C., and the ethylene partial pressure was kept at 1.4 MPa by introducing ethylene. Subsequently, 123 mg of the solid catalyst obtain in (1) Preparation of Solid Catalyst above was injected with nitrogen, and the polymerization was continued for 60 minutes by keeping the ethylene partial pressure of 1.4 MPa and the temperature of 75° C. Incidentally, during the polymerization reaction, additional feeding of 1-hexene was performed at a feed rate proportional to the ethylene consumption rate. The amount of 1-hexene fed additionally was 16.5 mL. The polymerization was stopped by adding ethanol. The amount of the thus-obtained ethylene.1-hexene copolymer was 130.3 g. The polymerization results are shown in Tables 5a-1 and 5a-2.

Example 1-2

An ethylene.1-hexene copolymer was produced in the same manner as in Example 1-1 except that 202 mg of the solid catalyst obtained in Example 1-1 was used, 40 ml of 1-hexene and 150 ml of hydrogen were added, and the amount of 1-hexene fed additionally was 9.0 mL. As a result, 55.0 g of an ethylene.1-hexene copolymer was produced. The polymerization results are shown in Tables 5a-1 and 5a-2.

Example 1-3

An ethylene.1-hexene copolymer was produced in the same manner as in Example 1-1 except that 206 mg of the solid catalyst obtained in Example 1-1 was used and the amount of 1-hexene fed additionally was 9.0 mL. As a result, 82.0 g of an ethylene.1-hexene copolymer was produced. The polymerization results are shown in Tables 5a-1 and 5a-2.

Example 1-4

An ethylene.1-hexene copolymer was produced in the same manner as in Example 1-1 except that 217 mg of the solid catalyst obtained in Example 1-1 was used, 500 ml of hydrogen was added, and the amount of 1-hexene fed additionally was 6.0 mL. As a result, 54.8 g of an ethylene.1-hexene copolymer was produced. The polymerization results are shown in Tables 5a-1 and 5a-2.

Example 1-5

An ethylene.1-hexene copolymer was produced in the same manner as in Example 1-1 except that 204 mg of the solid catalyst obtained in Example 1-1 was used, 640 ml of hydrogen was added, and the amount of 1-hexene fed additionally was 5.0 mL. As a result, 45.5 g of an ethylene.1-hexene copolymer was produced. The polymerization results are shown in Tables 5a-1 and 5a-2.

Comparative Example 1-1

(1) Preparation of Solid Catalyst

A solid catalyst was prepared in the same manner as in Example 1-1 except for using 59 mg of Metallocene Compound E in place of 68 mg of Metallocene Compound A.

(2) Production of Ethylene.1-Hexene Copolymer

An ethylene.1-hexene copolymer was produced in the same manner as in Example 1-1 except that 222 mg of the solid catalyst obtained in (1) Preparation of Solid Catalyst above was used in place of 123 mg of the solid catalyst obtained in Example 1-1, 40 ml of 1-hexene was added, and the amount of 1-hexene fed additionally was 13.5 mL. As a result, 111.8 g of an ethylene.1-hexene copolymer was produced. The polymerization results are shown in Tables 5a-1 and 5a-2.

Comparative Example 1-2

An ethylene.1-hexene copolymer was produced in the same manner as in Comparative Example 1-1 except that 218 mg of the solid catalyst obtained in Comparative Example 1-1 was used, 70 ml of 1-hexene and 20 ml of hydrogen were added, and the amount of 1-hexene fed additionally was 1.5 mL. As a result, 24.0 g of an ethylene.1-hexene copolymer was produced. The polymerization results are shown in Tables 5a-1 and 5a-2.

Comparative Example 1-3

(1) Preparation of Solid Catalyst

A solid catalyst was prepared in the same manner as in Example 1-1 except for using 52 mg of Metallocene Compound F in place of 68 mg of Metallocene Compound A.

(2) Production of Ethylene.1-Hexene Copolymer

An ethylene.1-hexene copolymer was produced in the same manner as in Example 1-1 except that 236 mg of the solid catalyst obtained in (1) Preparation of Solid Catalyst above was used in place of 123 mg of the solid catalyst obtained in Example 1-1, 70 ml of 1-hexene and 20 ml of hydrogen were added, and the amount of 1-hexene fed additionally was 18.0 mL. As a result, 146.0 g of an ethylene.1-hexene copolymer was produced. The polymerization results are shown in Tables 5a-1 and 5a-2.

Comparative Example 1-4

(1) Preparation of Solid Catalyst

A solid catalyst was prepared in the same manner as in Example 1-1 except for using 50 mg of Metallocene Compound G in place of 68 mg of Metallocene Compound A.

(2) Production of Ethylene.1-Hexene Copolymer

An ethylene.1-hexene copolymer was produced in the same manner as in Example 1-1 except that 160 mg of the solid catalyst obtained in (1) Preparation of Solid Catalyst above was used in place of 123 mg of the solid catalyst obtained in Example 1-1, 40 ml of 1-hexene and 100 ml of hydrogen were added, and the amount of 1-hexene fed additionally was 7.2 mL. As a result, 31.4 g of an ethylene.1-hexene copolymer was produced. The polymerization results are shown in Tables 5a-1 and 5a-2.

Comparative Example 1-6

(1) Preparation of Solid Catalyst

A solid catalyst was prepared in the same manner as in Example 1-1 except for using 64 mg of Metallocene Compound B in place of 68 mg of Metallocene Compound A.

(2) Production of Ethylene.1-Hexene Copolymer

An ethylene.1-hexene copolymer was produced in the same manner as in Example 1-1 except that 233 mg of the solid catalyst obtained in (1) Preparation of Solid Catalyst above was used in place of 123 mg of the solid catalyst obtained in Example 1-1, 40 ml of 1-hexene and 100 ml of hydrogen were added, and the amount of 1-hexene fed additionally was 2.0 mL. As a result, 29.2 g of an ethylene.1-hexene copolymer was produced. The polymerization results are shown in Tables 5a-1 and 5a-2.

Comparative Example 1-7

An ethylene.1-hexene copolymer was produced in the same manner as in Example 1-6 except that 270 mg of the solid catalyst obtained in Example 1-6 was used, 70 ml of 1-hexene and 20 ml of hydrogen were added, and the amount of 1-hexene fed additionally was 2.5 mL. As a result, 28.0 g of an ethylene.1-hexene copolymer was produced. The polymerization results are shown in Tables 5a-1 and 5a-2.

Example 1-8

(1) Preparation of Solid Catalyst

A solid catalyst was prepared in the same manner as in Example 1-1 except for using 63 mg of Metallocene Compound D in place of 68 mg of Metallocene Compound A.

(2) Production of Ethylene.1-Hexene Copolymer

An ethylene.1-hexene copolymer was produced in the same manner as in Example 1-1 except that 180 mg of the solid catalyst obtained in (1) Preparation of Solid Catalyst above was used in place of 123 mg of the solid catalyst obtained in Example 1-1, 40 ml of 1-hexene and 100 ml of hydrogen were added, and the amount of 1-hexene fed additionally was 9.0 mL. As a result, 41.0 g of an ethylene.1-hexene copolymer was produced. The polymerization results are shown in Tables 5a-1 and 5a-2.

Example 1-9

An ethylene.1-butene copolymer was produced using the solid catalyst obtained in (1) Preparation of Solid Catalyst of Example 1-1.

That is, 80 g of polyethylene-made pellets subjected to full dehydration and deoxidation and 33 mg of triethylaluminum were introduced into a stainless steel-made autoclave having an internal volume of 1 liter and having stirring and temperature control devices, and the temperature was raised to 90° C. under stirring. After introducing ethylene containing 10 wt % of 1-butene until the partial pressure became 2.0 MPa, 53 mg of the solid catalyst obtained above was injected with an argon gas, and polymerization was continued for 60 minutes by keeping the ethylene partial pressure of 2.0 MPa and the temperature of 90° C.

As a result, 14.6 g of an ethylene.1-butene copolymer was produced. The obtained copolymer had FR of 26.2 and a density of 0.918 g/cm$^3$. The polymerization results are shown in Tables 6a-1 and 6a-2.

Example 1-10

An ethylene.1-butene copolymer was produced in the same manner as in Example 1-9 except that 54 mg of the solid catalyst obtained in Example 1-1 was used and 102 ml of hydrogen was added before the initiation of polymerization.

As a result, 10.8 g of an ethylene.1-butene copolymer was produced. The obtained copolymer had FR of 13.3 and a density of 0.930 g/cm$^3$, and the number of terminal double bonds was 0.40 bonds/1000 carbons. The polymerization results are shown in Tables 6a-1 and 6a-2.

Example 1-11

An ethylene.1-butene copolymer was produced in the same manner as in Example 1-9 except that 104 mg of the solid catalyst obtained in Example 1-1 was used, 272 ml of hydrogen was added before the initiation of polymerization, ethylene containing 5 wt % of 1-butene was introduced in place of ethylene containing 10 wt % of 1-butene, and the polymerization was performed for 56 minutes.

As a result, 25.8 g of an ethylene.1-butene copolymer was produced. The FR of the obtained copolymer was 9.6. The polymerization results are shown in Tables 6a-1 and 6a-2.

Example 1-12

An ethylene.1-butene copolymer was produced in the same manner as in Example 1-9 except that 58 mg of the solid catalyst obtained in Example 1-1 was used and 51 ml of hydrogen was added before the initiation of polymerization.

As a result, 11.1 g of an ethylene.1-butene copolymer was produced. The FR of the obtained copolymer was 25.7. The polymerization results are shown in Tables 6a-1 and 6a-2.

Example 1-13

An ethylene.1-butene copolymer was produced in the same manner as in Example 1-9 except that 55 mg of the solid catalyst obtained in Example 1-1 was used and 153 ml of hydrogen was added before the initiation of polymerization.

As a result, 10.4 g of an ethylene.1-butene copolymer was produced. The polymerization results are shown in Tables 6a-1 and 6a-2.

Comparative Example 1-5

An ethylene.1-butene copolymer was produced in the same manner as in Example 1-9 except that 60 mg of the solid catalyst obtained in (1) Preparation of Solid Catalyst of Comparative Example 1-1 was used in place of 53 mg of the solid catalyst obtained in Example 1-1.

As a result, 13.2 g of an ethylene.1-butene copolymer was produced. The density of the obtained copolymer was 0.935 g/cm$^3$, and the number of terminal double bonds was 0.30 bonds/1000 carbons. The polymerization results are shown in Tables 6a-1 and 6a-2.

Example 1-14

An ethylene.1-butene copolymer was produced in the same manner as in Example 1-9 except that 205 mg of the solid catalyst obtained in Example 1-6 was used in place of 53 mg of the solid catalyst obtained in Example 1-1 and 34 ml of hydrogen was added before the initiation of polymerization.

As a result, 29.1 g of an ethylene.1-butene copolymer was produced. The density of the obtained copolymer was 0.936 g/cm$^3$, and the number of terminal double bonds was 0.40 bonds/1000 carbons. The polymerization results are shown in Tables 6a-1 and 6a-2.

Example 1-15

An ethylene.1-butene copolymer was produced in the same manner as in Example 1-9 except that 208 mg of the solid catalyst obtained in Example 1-6 was used in place of 53 mg of the solid catalyst obtained in Example 1-1 and 17 ml of hydrogen was added before the initiation of polymerization.

As a result, 25.8 g of an ethylene.1-butene copolymer was produced. The density of the obtained copolymer was 0.936 g/cm$^3$, and the number of terminal double bonds was 0.40 bonds/1000 carbons. The polymerization results are shown in Tables 6a-1 and 6a-2.

Example 16

(1) Preparation of Solid Catalyst

A solid catalyst was prepared in the same manner as in Example 1-1 except for using 60 mg of Metallocene Compound C in place of 68 mg of Metallocene Compound A.

(2) Production of Ethylene.1-Butene Copolymer

An ethylene.1-butene copolymer was produced in the same manner as in Example 1-9 except that 203 mg of the solid catalyst obtained in (1) Preparation of Solid Catalyst above was used in place of 53 mg of the solid catalyst obtained in Example 1-1 and the polymerization was performed for 47 minutes.

As a result, 29.5 g of an ethylene.1-butene copolymer was produced. The FR of the obtained copolymer was 9.4. The polymerization results are shown in Tables 6a-1 and 6a-2.

TABLE 5a-1

| | Catalyst | | | | | | Polymerization Conditions | | | | | | |
|---|---|---|---|---|---|---|---|---|---|---|---|---|---|
| | Component (A) | Component (B) | | Component (C) | | Amount of Solid | | | Hydrogen | Comonomer | | | |
| | Metallocene Compound | Amount Used (mmol) | Compound | Amount Used (mmol) | Compound | Amount Used (g) | Catalyst (g) | TEA (mmol) | Solvent | H2/C2 (%) | Initial Charge (ml) | Additional Amount (ml) | Temperature (° C.) | C2 Partial Pressure (MPa) | Polymerization Time (min) |
| Example 1-1 | A | 0.00238 | MAO | 0.48 | silica | 0.095 | 0.123 | 0.20 | isobutane | 0.39 | 30.0 | 16.5 | 75 | 1.4 | 60 |
| Example 1-2 | A | 0.00389 | MAO | 0.78 | silica | 0.156 | 0.202 | 0.20 | isobutane | 0.31 | 40.0 | 9.0 | 75 | 1.4 | 60 |
| Example 1-3 | A | 0.00397 | MAO | 0.79 | silica | 0.159 | 0.206 | 0.20 | isobutane | 0.43 | 30.0 | 9.0 | 75 | 1.4 | 60 |
| Example 1-4 | A | 0.00418 | MAO | 0.84 | silica | 0.167 | 0.217 | 0.20 | isobutane | 1.16 | 30.0 | 6.0 | 75 | 1.4 | 60 |
| Example 1-5 | A | 0.00393 | MAO | 0.79 | silica | 0.157 | 0.204 | 0.20 | isobutane | 1.55 | 30.0 | 5.0 | 75 | 1.4 | 60 |
| Comparative Example 1-1 | E | 0.00428 | MAO | 0.86 | silica | 0.171 | 0.222 | 0.20 | isobutane | 0.31 | 40.0 | 13.5 | 75 | 1.4 | 60 |
| Comparative Example 1-2 | E | 0.00420 | MAO | 0.84 | silica | 0.168 | 0.218 | 0.20 | isobutane | 0.09 | 70.0 | 1.5 | 75 | 1.4 | 60 |

TABLE 5a-1-continued
| | | | | | | | | | | | | | | |
|---|---|---|---|---|---|---|---|---|---|---|---|---|---|---|
| Comparative Example 1-3 | F | 0.00455 | MAO | 0.91 | silica | 0.182 | 0.236 | 0.20 | isobutane | 0.16 | 70.0 | 18.0 | 75 | 1.4 | 60 |
| Comparative Example 1-4 | G | 0.00309 | MAO | 0.62 | silica | 0.124 | 0.160 | 0.20 | isobutane | 0.20 | 40.0 | 7.2 | 75 | 1.4 | 60 |
| Example 1-6 | B | 0.00448 | MAO | 0.90 | silica | 0.179 | 0.233 | 0.20 | isobutane | 0.11 | 40.0 | 2.0 | 75 | 1.4 | 60 |
| Example 1-7 | B | 0.00520 | MAO | 1.04 | silica | 0.208 | 0.270 | 0.20 | isobutane | 0.07 | 70.0 | 2.5 | 75 | 1.4 | 60 |
| Example 1-8 | D | 0.00346 | MAO | 0.69 | silica | 0.138 | 0.180 | 0.20 | isobutane | 0.20 | 40.0 | 9.0 | 75 | 1.4 | 60 |
Metallocene Compound
A
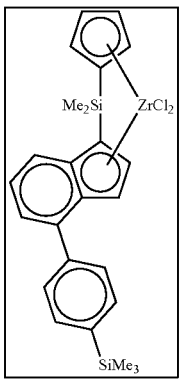
B
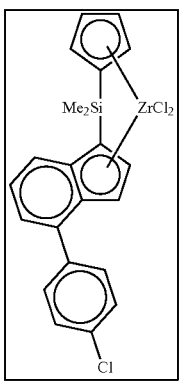

TABLE 5a-1-continued
C
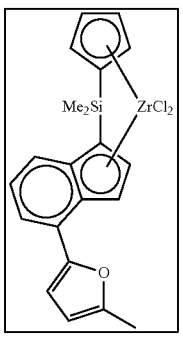
D
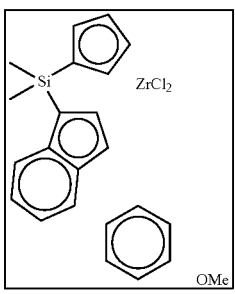
E
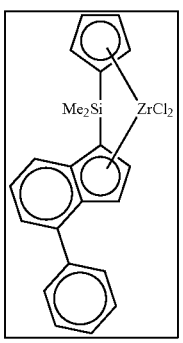
F
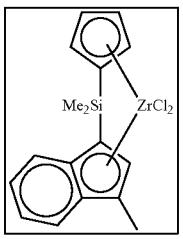
G
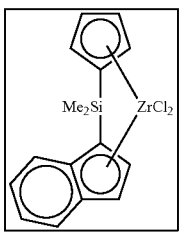

TABLE 5a-2

| | Catalyst | | Results | | | | | | |
|---|---|---|---|---|---|---|---|---|---|
| | Component (A) | | | Activity | MFR | | | | |
| | Metallocene Compound | Amount Used (mmol) | Yield (g) | (g-PE/ g-Cat/hr) | (g/10 min) | FR | Density (g/cm3) | $\lambda_{max}$ (2.0) | $\lambda_{max}$ (0.1) | $\lambda_{max}(2.0)/\lambda_{max}(0.1)$ |
| Example 1-1 | A | 0.00238 | 130.3 | 576 | 0.5 | 22.4 | 0.914 | 1.6 | 1.0 | 1.6 |
| Example 1-2 | A | 0.00389 | 55.0 | 272 | 0.9 | 16.7 | 0.909 | 1.7 | 1.1 | 1.6 |
| Example 1-3 | A | 0.00397 | 82.0 | 398 | 0.2 | 30.5 | 0.914 | 4.5 | 3.0 | 1.5 |
| Example 1-4 | A | 0.00418 | 54.8 | 253 | 4.1 | 15.6 | 0.924 | 11.4 | 6.7 | 1.7 |
| Example 1-5 | A | 0.00393 | 45.5 | 223 | 17.7 | 10.7 | 0.921 | 9.3 | 2.5 | 3.8 |
| Comparative Example 1-1 | E | 0.00428 | 111.8 | 503 | 1.1 | 17.4 | 0.914 | 1.4 | 1.0 | 1.4 |
| Comparative Example 1-2 | E | 0.00420 | 24.0 | 110 | 8.5 | 5.9 | 0.907 | 6.4 | 1.2 | 5.5 |
| Comparative Example 1-3 | F | 0.00455 | 146.0 | 618 | 3.2 | 13.4 | 0.920 | 3.8 | 1.7 | 2.2 |
| Comparative Example 1-4 | G | 0.00309 | 31.4 | 196 | 8.1 | 9.5 | 0.929 | 6.5 | 2.6 | 2.5 |
| Example 1-6 | B | 0.00448 | 29.2 | 125 | 0.3 | 20.6 | 0.924 | — | — | — |
| Example 1-7 | B | 0.00520 | 28.0 | 104 | 4.8 | 8.1 | 0.917 | 3.5 | 1.3 | 2.8 |
| Example 1-8 | D | 0.00346 | 41.0 | 228 | 19.2 | 9.4 | 0.934 | — | — | — |

| | | | | Results | | | | |
|---|---|---|---|---|---|---|---|---|
| | Mw ×10$^4$ | Mw/Mn | $g_c'$ Value | $W_c$ Value (MW ≥ 10$^6$) | Amount of Soluble Fraction at −15° C. [wt %] | Amount of Soluble Fraction at 0° C. [wt %] | Amount of Soluble Fraction at 20° C. [wt %] | Amount of Soluble Fraction at 40° C. [wt %] |
| Example 1-1 | 12.9 | 7.4 | 0.41 | 4.5 | 0.3 | 0.5 | 1.6 | 4.5 |
| Example 1-2 | 13.1 | 7.5 | 0.42 | 5.5 | 0.3 | 0.5 | 1.7 | 7.3 |
| Example 1-3 | 15.3 | 9.2 | 0.42 | 5.8 | 0.3 | 0.4 | 1.4 | 4.0 |
| Example 1-4 | 7.9 | 8.0 | 0.44 | 2.0 | 0.6 | 0.7 | 1.4 | 3.8 |
| Example 1-5 | 5.9 | 6.8 | 0.45 | 0.9 | 1.0 | 1.2 | 2.3 | 7.4 |
| Comparative Example 1-1 | 10.4 | 7.4 | 0.42 | 2.2 | 1.2 | 1.6 | 2.9 | 5.8 |
| Comparative Example 1-2 | 10.2 | 6.3 | 0.60 | 2.9 | 2.1 | 2.5 | 4.1 | 13.0 |
| Comparative Example 1-3 | 6.9 | 4.3 | 0.50 | 0.07 | 0.4 | 0.7 | 1.4 | 3.7 |
| Comparative Example 1-4 | 5.8 | 3.7 | — | — | — | — | — | — |
| Example 1-6 | 14.0 | 7.7 | 0.41 | 5.0 | 0.4 | 0.8 | 2.2 | 4.4 |
| Example 1-7 | 10.3 | 6.1 | 0.45 | 3.0 | 0.7 | 1.0 | 2.5 | 9.7 |
| Example 1-8 | — | — | — | — | — | — | — | — |

TABLE 6a-1

| | Catalyst | | | | | | | Polymerization Conditions | | | | | |
|---|---|---|---|---|---|---|---|---|---|---|---|---|---|
| | Component (A) | | | | | Amount of Solid Catalyst (g) | | Hydrogen H2/C2 (%) | Comonomer | | | | |
| Example | Metallocene Compound | Amount Used (mmol) | Component (B) Compound | Amount Used (mmol) | Component (C) Compound | | TEA (mmol) | Solvent | | Initial Charge (ml) | Additional Amount (ml) | Temperature (° C.) | C2 Partial Pressure (MPa) | Polymerization Time (min) |
| Example 1-9 | A | 0.00103 | MAO | 0.21 | silica | 0.041 | 0.053 | 0.30 | gas phase | 0.04 | C4/C2 = 5.0 mol % | | 90 | 2.0 | 60 |
| Example 1-10 | A | 0.00105 | MAO | 0.21 | silica | 0.042 | 0.054 | 0.30 | gas phase | 0.36 | C4/C2 = 5.0 mol % | | 90 | 2.0 | 60 |
| Example 1-11 | A | 0.00202 | MAO | 0.40 | silica | 0.081 | 0.104 | 0.30 | gas phase | 0.78 | C4/C2 = 2.5 mol % | | 90 | 2.0 | 56 |

TABLE 6a-1-continued
| | | | | | | | | | | | | | | | |
|---|---|---|---|---|---|---|---|---|---|---|---|---|---|---|---|
| Example 1-12 | A | 0.00113 | MAO | 0.23 | silica | 0.045 | 0.058 | 0.30 | gas phase | 0.20 | C4/C2 = 5.0 mol % | 90 | 2.0 | 60 |
| Example 1-13 | A | 0.00107 | MAO | 0.21 | silica | 0.043 | 0.055 | 0.30 | gas phase | 0.41 | C4/C2 = 5.0 mol % | 90 | 2.0 | 60 |
| Comparative Example 1-5 | E | 0.00116 | MAO | 0.23 | silica | 0.046 | 0.060 | 0.30 | gas phase | 0.36 | C4/C2 = 5.0 mol % | 90 | 2.0 | 60 |
| Example 1-14 | B | 0.00398 | MAO | 0.80 | silica | 0.159 | 0.205 | 0.30 | gas phase | 0.11 | C4/C2 = 5.0 mol % | 90 | 2.0 | 60 |
| Example 1-15 | B | 0.00404 | MAO | 0.81 | silica | 0.162 | 0.208 | 0.30 | gas phase | 0.03 | C4/C2 = 5.0 mol % | 90 | 2.0 | 60 |
| Example 1-16 | C | 0.00394 | MAO | 0.79 | silica | 0.158 | 0.203 | 0.30 | gas phase | 0.06 | C4/C2 = 5.0 mol % | 90 | 2.0 | 47 |
Metallocene Compound
A
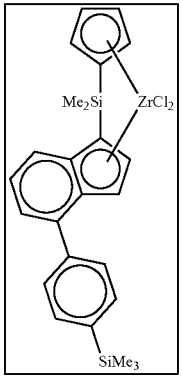
B
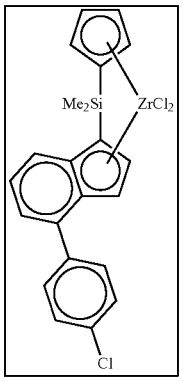

TABLE 6a-1-continued
C
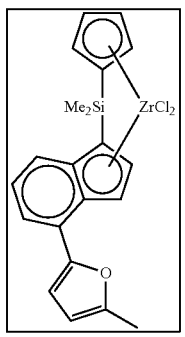
D
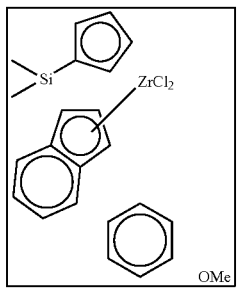
E
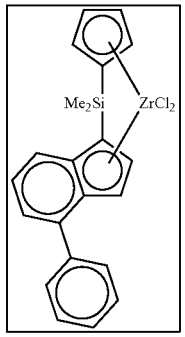
F
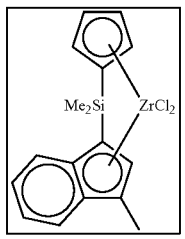
G
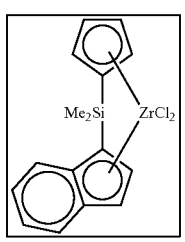

TABLE 6a-2

| Example | Catalyst Component (A) Metallocene Compound | Amount Used (mmol) | Yield (g) | Activity (g-PE/ g-Cat/ hr) | MFR (g/10 min) | FR | Density (g/cm3) | Melting Point (°C.) | $\lambda_{max}$ (2.0) | $\lambda_{max}$ (0.1) | $\lambda_{max}(2.0)/\lambda_{max}(0.1)$ | Mw ×10$^4$ | Mw/Mn | Terminal Double Bond (bonds/ 1000 C.) | $g_C{'}$ Value | $W_C$ Value (MW ≥ 10$^6$) |
|---|---|---|---|---|---|---|---|---|---|---|---|---|---|---|---|---|
| Example 1-9 | A | 0.00103 | 14.6 | 275 | 0.05 | 26.2 | 0.918 | 104.5 | — | — | — | 20.4 | 5.7 | — | — | — |
| Example 1-10 | A | 0.00105 | 10.8 | 200 | 1.7 | 13.3 | 0.930 | 121.2 | 2.7 | 1.0 | 2.7 | 8.4 | 5.0 | 0.40 | 0.52 | 0.97 |
| Example 1-11 | A | 0.00202 | 25.8 | 266 | 16.1 | 9.6 | — | 126.6 | 5.7 | 1.9 | 3.0 | 4.6 | 4.8 | — | 0.77 | 0.29 |
| Example 1-12 | A | 0.00113 | 11.1 | 191 | 0.1 | 25.7 | — | 119.2 | 3.8 | 3.8 | 1.0 | 13.5 | 5.8 | — | 0.48 | 3.2 |
| Example 1-13 | A | 0.00107 | 10.4 | 189 | 9.5 | — | — | 104.4 | 8.7 | 2.0 | 4.4 | 6.6 | 4.9 | — | 0.46 | 0.58 |
| Comparative Example 1-5 | E | 0.00116 | 13.2 | 220 | 6.4 | — | 0.935 | 120.5 | 6.9 | 2.1 | 3.3 | 6.6 | 3.7 | 0.30 | 0.44 | 0.7 |
| Example 1-14 | B | 0.00398 | 29.1 | 142 | 12.3 | — | 0.936 | 121.9 | 5.2 | 1.9 | 2.7 | 7.2 | 4.4 | 0.40 | 0.49 | 0.71 |
| Example 1-15 | B | 0.00404 | 25.8 | 124 | 9.4 | — | 0.936 | 122.1 | 4.5 | 2.4 | 1.9 | 7.5 | 4.6 | 0.40 | 0.47 | 0.96 |
| Example 1-16 | C | 0.00394 | 29.5 | 186 | 8.5 | 9.4 | — | 109.5 | 13.5 | 10.7 | 1.3 | 8.4 | 4.5 | — | 0.41 | 1.6 |

<Evaluation>

As seen from the results shown in Tables 5a-1 and 5a-2, comparing Example 1-1 and Comparative Example 1-1, in Comparative Example 1-1 where the polymer was obtained using a catalyst not satisfying the requirements of the metallocene compound of the present invention, the amount of 1-hexene used as a comonomer was large, nevertheless, the density of the ethylene-based polymer was not reduced and therefore, it is apparent that the catalyst containing the metallocene compound of the present invention as a catalyst component is excellent in the activity as well as in the copolymerizability. Furthermore, in the same Comparative Example 1-1, the amount of hydrogen used as a chain transfer agent of polymerization was small, nevertheless, MFR of the ethylene-based polymer was not reduced, indicating no increase in the molecular weight, and therefore, it is apparent that the catalyst containing the metallocene compound of the present invention as, a catalyst component has an excellent ability of producing an ethylene-based polymer having low MFR (high molecular weight). Moreover, in Example 1-1, all of $[\lambda max(2.0)]_B$, $[\lambda max(2.0)]_B/[\lambda max(0.1)]_B$, $g_C{'}$ and $W_C$, which are characteristic values indicative of the property of a long-chain branch of enhancing the moldability of the ethylene-based polymer produced, were not inferior to those in Comparative Example 1-1 and in addition, the amount of soluble matter at −15° C. ($W_{-15}$) was small, from which it is apparent that the olefin polymerization catalyst containing the metallocene compound of the present invention as a catalyst component is excellent in the moldability, mechanical properties and the like relative to the ethylene-based polymer obtained in Comparative Example 1-1 by using Metallocene Compound E that is known in Patent Document 4.

The results of Example 1-2 and Comparative Example 1-2 show that the superiority of the metallocene compound of the present invention is more clearly proved by performing an experiment of producing an ethylene-based polymer more reduced in the density than in Example 1-1. More specifically, in Comparative Example 1-2 where a catalyst not satisfying the requirements of the metallocene compound of the present invention was used, the influence due to increase of 1-hexene as a comonomer, that is, reduction in activity, increase of $g_C{'}$ (namely, decrease in the degree of long-chain branching) and increase in the amount of low-temperature soluble fraction, was prominent, whereas in Example 1-2 where the same experiment was performed, a drop of activity was recognized but the drop width was greatly smaller than in Comparative Example 1-2 and at the same time, neither all of characteristic values indicative of long-chain branching were deteriorated nor increase in the amount of low-temperature elution was observed. In other words, it is apparent from Tables 5a-1 and 5a-2 that the catalyst containing the metallocene compound of the present invention as a catalyst component has a marked superiority in the polymerization characteristics such as activity, the long-chain branching characteristics of an ethylene-based polymer, and the amount of a low-temperature eluting component.

Similarly, by comparing the results of Comparative Examples 1-3 and 1-4 using Metallocene Compound F or G known in Patent Document 5 with those of Examples 1-1 to 1-5, it is apparent that the metallocene compound of the present invention is excellent as an olefin polymerization catalyst component in terms of overall performance taking into account all of the polymerization activity, the copolymerizability, the ability to increase the molecular weight, the long-chain branching characteristics and the amount of a low-temperature eluting component.

Also, Examples 1-6 to 1-8 of Tables 5a-1 and 5a-2 show polymerization examples of Metallocene Compound B and Metallocene Compound D, which are the metallocene compound of the present invention different from that of Example 1-1. These metallocene compounds of the present invention were less effective than Metallocene Compound A of Example 1 or the like but exhibited high polymerization activity and furthermore, exhibited excellent long-chain branching characteristics represented by large λmax(2) value, large λmax(2)/λmax(0.1), small $g_C{'}$ value and large $W_C$ value and in addition, since the $W_{-15}$ was small and excellent product characteristics can be promised, it was confirmed that these are meaningful metallocene compounds.

In Tables 6a-1 and 6a-2, the catalyst containing the metallocene compound of the present invention is proved to have usefulness as a catalyst component also in gas-phase polymerization that is a polymerization process different from that of Tables 5a-1 and 5a-2. More specifically, comparing Examples 1-9 to 1-13 with Comparative Example 1-5, in Comparative Example 1-5 where the polymer was obtained using a catalyst not satisfying the requirements of the metallocene compound of the present invention, despite the same amount of 1-butene used as a comonomer, the density of the ethylene-based polymer was increased and therefore, it is apparent that the catalyst containing the metallocene compound of the present invention as a catalyst component is excellent in the activity and at the same time, excellent in the copolymerizability. Furthermore, in the same Comparative Example 1-5, the amount of hydrogen used as a chain transfer agent of polymerization was equal, nevertheless, MFR of the ethylene-based polymer was not reduced relative to Example 1-10, indicating no increase in the molecular weight, and therefore, it is apparent that the catalyst containing the metallocene compound of the present invention as a catalyst component has an excellent ability of producing an ethylene-based polymer having low MFR (high molecular weight). Moreover, in Examples 1-9 to 1-13, all of $[\lambda max(2.0)]_B$, $[\lambda max(2.0)]_B/[\lambda max(0.1)]_B$, $g_C'$ and $W_C$, which are characteristic values indicative of the property of a long-chain branch of enhancing the moldability of the ethylene-based polymer produced, were not inferior to those in Comparative Example 1-5.

Also, Examples 1-14 to 1-16 of Tables 6a-1 and 6a-2 show polymerization examples of Metallocene Compound B and Metallocene Compound C, which are the metallocene compound of the present invention different from those of Examples 1-9 to 1-13. These metallocene compounds of the present invention exhibited high polymerization activity comparable to that of Metallocene Compound A of Example 1-10 or the like and furthermore, exhibited any of large λmax (2) value, large λmax(2)/λmax(0.1), small $g_C'$ value and large $W_C$ value and since product characteristics excellent in the moldability can be promised, it was confirmed that these are meaningful metallocene compounds.

(II) Synthesis Of Metallocene Compound

The following metallocene compounds were synthesized and the used as a catalyst component.

[Synthesis Example 1 of Metallocene Compound](hereinafter, sometimes simply referred to as "Metallocene Compound A")

Synthesis of dimethylsilylene(4-tert-butylcyclopentadienyl)(indenyl)zirconium dichloride was performed according to the procedure described in Example 1 of JP-A-09-87314.

[Synthesis Example 2 of Metallocene Compound](hereinafter, sometimes simply referred to as "Metallocene Compound E")

Synthesis of dimethylsilylene(3-tert-butylcyclopentadienyl)(cyclopentadienyl)zirconium dichloride was performed according to the procedure described in J. AM. CHEM. SOC. 2004, 126, 2089-2104.

[Synthesis Example 3 of Metallocene Compound](hereinafter, sometimes simply referred to as "Metallocene Compound F")

Synthesis of dimethylsilylene(cyclopentadienyl)(indenyl)zirconium dichloride was performed according to the procedure described in Macromolecules 1995, 28, 3771-3778.

[Synthesis Example 4 of Metallocene Compound](hereinafter, sometimes simply referred to as "Metallocene Compound B")

Synthesis of dimethylsilylene(4-tert-butylcyclopentadienyl)(indenyl)hafnium dichloride was performed by the same method as in [Synthesis Example 1] by using hafnium tetrachloride.

[Synthesis Example 5 of Metallocene Compound](hereinafter, sometimes simply referred to as "Metallocene Compound C")

Synthesis of dimethylsilylene(3-trimethylsilylcyclopentadienyl)(indenyl)zirconium dichloride was performed by the same method as in [Synthesis Example 1] by using (3-trimethylsilylcyclopentadienyl)(indenyl)dimethylsilane.

[Synthesis Example 6 of Metallocene Compound](hereinafter, sometimes simply referred to as "Metallocene Compound D")

Synthesis of isopropylidene(4-tert-butylcyclopentadienyl)(indenyl)zirconium dichloride was performed by the same method as in [Synthesis Example 1] by using (4-tert-butylcyclopentadienyl)(indenyl)dimethylmethane, and the target metallocene was obtained as an isomeric mixture.

Example 2-1

(1) Preparation of Solid Catalyst

In a nitrogen atmosphere, 5 g of silica calcined at 600° C. for 5 hours was put in a 200-ml two-neck flask and dried at reduced pressure with a vacuum pump for 1 hour while heating the flask in an oil bath at 150° C. In a nitrogen atmosphere, 57 mg of Metallocene Compound A was put in a separately prepared 100-ml two-neck flask and dissolved in 13.4 ml of dehydrated toluene, and to the resulting toluene solution of Metallocene Compound A, 8.6 ml of a 20% methylaluminoxane/toluene solution produced by Albemarle was added at room temperature and stirred for 30 minutes. While heating the 200-ml two-neck flask containing vacuum-dried silica in an oil bath at 40° C. and stirring the contents, the entire amount of the toluene solution above containing a reaction product of Metallocene Compound A and methylaluminoxane was added and stirred at 40° C. for 1 hour. While still heating the system at 40° C., the toluene solvent was removed by distillation under reduced pressure to obtain a solid catalyst.

(2) Production of Ethylene.1-Butene Copolymer

An ethylene.1-butene copolymer was produced using the solid catalyst obtained in (1) Preparation of Solid Catalyst above.

That is, 80 g of polyethylene-made pellets subjected to full dehydration and deoxidation and 33 mg of triethylaluminum were introduced into a stainless steel-made autoclave having an internal volume of 1 liter and having stirring and temperature control devices, and the temperature was raised to 90° C. under stirring. After introducing ethylene containing 10 wt % of 1-butene until the partial pressure became 2.0 MPa, 50 mg of the solid catalyst obtained above was injected with an argon gas, and polymerization was performed for 60 minutes.

As a result, 20.3 g of an ethylene.1-butene copolymer was produced. The polymerization results are shown in Tables 7a-1 and 7a-2.

Comparative Example 2-1

(1) Preparation of Solid Catalyst

A solid catalyst was prepared in the same manner as in Example 2-1 except for using 51 mg of Metallocene Compound E obtained in Synthesis Example 2 in place of 57 mg of Metallocene Compound A.

(2) Production of Ethylene.1-Butene Copolymer

An ethylene.1-butene copolymer was produced in the same manner as in Example 2-1 except that 56 mg of the solid catalyst obtained in Preparation of Solid Catalyst above was used in place of 50 mg of the solid catalyst obtained in Example 2-1 and the polymerization was performed at a polymerization temperature of 80° C. for 51 minutes.

As a result, 25.8 g of an ethylene.1-butene copolymer was produced. The polymerization results are shown in Tables 7a-1 and 7a-2.

Example 2-2

(2) Production of Ethylene.1-Hexene Copolymer

An ethylene.1-hexene copolymer was produced using the solid catalyst obtained in Example 2-1.

That is, 50 g of polyethylene-made pellets subjected to full dehydration and deoxidation and 0.20 mmol of triethylaluminum were introduced into a stainless steel-made autoclave having an internal volume of 2 liter and having stirring and temperature control devices, and the temperature was raised to 75° C. under stirring. After introducing 1.5 ml of 1-hexene and ethylene until the partial pressure became 1.4 MPa, 64 mg of the solid catalyst obtained above was injected with a nitrogen gas, and polymerization was performed for 90 minutes. Incidentally, during the polymerization reaction, additional feeding of 1-hexene was performed at a feed rate proportional to the ethylene consumption rate. As a result, the molar ratio of $H_2/C_2$ (hydrogen/ethylene) in the autoclave gas phase part at 10 minutes after the initiation of polymerization and just prior to stopping of the polymerization was 0.093% and 0.104%, respectively, and the amount of 1-hexene additionally fed was 9.5 mL. As a result, 49.5 g of an ethylene.1-hexene copolymer was produced. The polymerization results are shown in Tables 7a-1 and 7a-2.

Comparative Example 2-2

An ethylene.1-hexene copolymer was produced in the same manner as in Example 2-2 except that 62 mg of the solid catalyst obtained in Preparation of Solid Catalyst of Comparative Example 2-1 was used in place of 64 mg of the solid catalyst obtained in Example 2-1. However, the amount of 1-hexene additionally fed was 7.5 mL. The molar ratio of $H_2/C_2$ (hydrogen/ethylene) in the autoclave gas phase part at 10 minutes after the initiation of polymerization and just prior to stopping of the polymerization was 0.122% and 0.137%, respectively. As a result, 42.0 g of an ethylene.1-hexene copolymer was produced. The polymerization results are shown in Tables 7a-1 and 7a-2.

Comparative Example 2-3

(1) Preparation of Solid Catalyst

A solid catalyst was prepared in the same manner as in Example 2-1 except for using 50 mg of Metallocene Compound F obtained in Synthesis Example 3 in place of 57 mg of Metallocene Compound A.

(2) Production of Ethylene.1-Hexene Copolymer

An ethylene.1-hexene copolymer was produced in the same manner as in Example 2-1 except that 194 mg of the solid catalyst obtained in (1) Preparation of Solid Catalyst above was used, ethylene containing 10 wt % of 1-hexene was used in place of ethylene containing 10 wt % of 1-butene, and the polymerization temperature was set to 70° C.

As a result, 13.7 g of an ethylene.1-hexene copolymer was produced. The polymerization results are shown in Tables 7a-1 and 7a-2.

Reference Example 2-1

(2) Production of Ethylene.1-Hexene Copolymer

An ethylene.1-hexene copolymer was produced in the same manner as in Example 2-1 except that 52 mg of the solid catalyst obtained in Example 2-1 was used and ethylene containing 10 wt % of 1-hexene was used in place of ethylene containing 10 wt % of 1-butene.

As a result, 17.5 g of an ethylene.1-hexene copolymer was produced. The polymerization results are shown in Tables 7a-1 and 7a-2.

Comparative Example 2-4

(1) Preparation of Solid Catalyst

A solid catalyst was prepared in the same manner as in Example 2-1 except for using 44 mg of Metallocene Compound G produced by Wako Pure Chemical Industries, Ltd. in place of 57 mg of Metallocene Compound A.

(2) Production of Ethylene.1-Hexene Copolymer

An ethylene.1-hexene copolymer was produced in the same manner as in Example 2-1 except that 49 mg of the solid catalyst obtained in Preparation of Solid Catalyst above was used and ethylene containing 5 wt % of 1-hexene was used in place of ethylene containing 10 wt % of 1-butene.

As a result, 4.5 g of an ethylene.1-hexene copolymer was produced. The polymerization results are shown in Tables 7a-1 and 7a-2.

Comparative Example 2-5

(1) Production of Ethylene Polymer

An ethylene polymer was produced using the solid catalyst obtained in Preparation of Solid Catalyst of Comparative Example 2-4.

That is, 800 mL of isobutane and 0.20 mmol of triethylaluminum were added to a 2 L-volume autoclave with an induction stirring device, the temperature was raised to 75° C., and the ethylene partial pressure was kept at 1.4 MPa by introducing ethylene. Subsequently, 525 mg of the solid catalyst of Comparative Example 2-4 was injected with nitrogen and after continuing the polymerization for 60 minutes by keeping the ethylene partial pressure of 1.4 MPa and the temperature of 75° C., the polymerization was stopped by adding ethanol. The molar ratio of $H_2/C_2$ (hydrogen/ethylene) in the autoclave gas phase part just prior to stopping of the polymerization was 0.088%. The amount of the thus-obtained ethylene polymer was 60.0 g. The polymerization results are shown in Tables 7a-1 and 7a-2.

Example 2-3

(2) Production of Ethylene.1-Butene Copolymer

An ethylene.1-butene copolymer was produced in the same manner as in Example 2-1 except that 55 mg of the solid catalyst obtained in Example 2-1 was used and the polymerization was performed at a polymerization temperature of 70° C. for 31 minutes.

As a result, 25.6 g of an ethylene.1-butene copolymer was produced. The polymerization results are shown in Tables 7a-1 and 7a-2.

Reference Example 2-2

(1) Preparation of Triethylaluminum-Treated Montmorillonite

In a nitrogen atmosphere, 3.0 g of commercially available montmorillonite was put in a 200-ml two-neck flask and dried at reduced pressure with a vacuum pump for 1 hour while heating the flask in an oil bath at 200° C. After cooling to room temperature, 75 ml of heptane was added to make a slurry, and 14.4 ml of triethylaluminum (a heptane solution at a concentration of 70 g/liter) was added with stirring. After stirring at room temperature for 1 hour, the solid was washed by decantation to a dilution ratio of 1/100. Finally, heptane was added until reaching a liquid volume of 150 ml to obtain a slurry of triethylaluminum-treated montmorillonite.

(2) Production of Ethylene.1-Hexene Copolymer

An ethylene.11-hexene copolymer was produced using the triethylaluminum-treated montmorillonite of (1) above.

That is, 500 ml of heptane subjected to full dehydration, 55 mg of triethylaluminum and 10 ml of 1-hexene were introduced into a stainless steel-made autoclave having an internal volume of 1 liter and having stirring and temperature control devices, and the temperature was raised to 80° C. under stirring. After introducing ethylene until the partial pressure became 1.5 MPa, 50 mg of the triethylaluminum-treated montmorillonite (2.5 ml of a heptane slurry) and 2.5 micromol of Metallocene Compound A were injected with an argon gas, and polymerization was performed for 60 minutes. During the polymerization reaction, the pressure was kept at 1.5 MPa by introducing ethylene containing 10 wt % of 1-hexene according to the ethylene consumption in the system.

As a result, 3.0 g of an ethylene.1-hexene copolymer was produced. The polymerization results are shown in Tables 7a-1 and 7a-2.

Example 2-4

(1) Preparation of Solid Catalyst

A solid catalyst was prepared in the same manner as in Example 2-1 except for using 68 mg of Metallocene Compound B obtained in Synthesis Example 2-4 in place of 57 mg of Metallocene Compound A.

(2) Production of Ethylene.1-Butene Copolymer

An ethylene.1-butene copolymer was produced in the same manner as in Example 2-1 except that 210 mg of the solid catalyst obtained in Preparation of Solid Catalyst above was used in place of 50 mg of the solid catalyst obtained in Example 2-1 and 34 ml of hydrogen was added.

As a result, 10.0 g of an ethylene.1-butene copolymer was produced. The polymerization results are shown in Tables 7a-1 and 7a-2.

Example 2-5

(1) Preparation of Solid Catalyst

A solid catalyst was prepared in the same manner as in Example 2-1 except for using 59 mg of Metallocene Compound C obtained in Synthesis Example 5 in place of 57 mg of Metallocene Compound A.

(2) Production of Ethylene.1-Butene Copolymer

An ethylene.1-butene copolymer was produced in the same manner as in Example 2-1 except that 54 mg of the solid catalyst obtained in Preparation of Solid Catalyst above was used in place of 50 mg of the solid catalyst obtained in Example 2-1.

As a result, 16.5 g of an ethylene.1-butene copolymer was produced. The polymerization results are shown in Tables 7a-1 and 7a-2.

Example 2-6

(1) Preparation of Solid Catalyst

A solid catalyst was prepared in the same manner as in Example 2-1 except for using 55 mg of Metallocene Compound D obtained in Synthesis Example 6 in place of 57 mg of Metallocene Compound A.

(2) Production of Ethylene.1-Hexene Copolymer

An ethylene.1-hexene copolymer was produced using the solid catalyst obtained in (1) Preparation of Solid Catalyst above.

That is, 800 mL of isobutane, 40 mL of 1-hexene and 0.20 mmol of triethylaluminum were added to a 2 L-volume autoclave with an induction stirring device, the temperature was raised to 75° C., and the ethylene partial pressure was kept at 1.4 MPa by introducing ethylene.

Subsequently, 180 mg of the solid catalyst obtained in (1) above was injected with nitrogen and after continuing the polymerization for 60 minutes by keeping the ethylene partial pressure of 1.4 MPa and the temperature of 75° C., the polymerization was stopped by adding ethanol. Incidentally, during the polymerization reaction, additional feeding of 1-hexene was performed at a feed rate proportional to the ethylene consumption rate. As a result, the average molar ratio of $H_2/C_2$ (hydrogen/ethylene) in the autoclave gas phase part at 10 minutes after the initiation of polymerization and just prior to stopping of the polymerization was 0.098%, and the amount of 1-hexene fed additionally was 12 mL. The amount of the thus-obtained ethylene-based polymer was 48.5 g. The polymerization results are shown in Tables 7a-1 and 7a-2.

TABLE 7a-1

| | Catalyst | | | | | Amount of Solid Catalyst (g) | Polymerization Conditions | | | | | | |
|---|---|---|---|---|---|---|---|---|---|---|---|---|---|
| | Component (A) | | Component (B) | | Component (C) | | | | Hydrogen | Comonomer | | | |
| | Metallocene Compound | Amount Used (mmol) | Compound | Amount Used (mmol) | Compound | Amount Used (g) | | TEA (mmol) | Solvent | H2/C2 (%) | Initial Charge (ml) | Additional Amount (ml) | Temperature (° C.) | C2 Partial Pressure (MPa) | Polymerization Time (min) |
| Example 2-1 | A | 0.00097 | MAO | 0.19 | silica | 0.039 | 0.050 | 0.30 | gas phase | 0.030 | C4/C2 = 5.0 mol % | | 90 | 2.0 | 60 |
| Comparative Example 2-1 | E | 0.00109 | MAO | 0.22 | silica | 0.044 | 0.056 | 0.30 | gas phase | 0.028 | C4/C2 = 5.0 mol % | | 80 | 2.0 | 51 |
| Example 2-2 | A | 0.00123 | MAO | 0.25 | silica | 0.049 | 0.064 | 0.20 | gas phase | 0.098 | 1.5 ml | 9.5 ml | 75 | 1.4 | 90 |
| Comparative Example 2-2 | E | 0.00120 | MAO | 0.24 | silica | 0.048 | 0.062 | 0.20 | gas phase | 0.129 | 1.5 ml | 7.5 ml | 75 | 1.4 | 90 |
| Comparative Example 2-3 | F | 0.00376 | MAO | 0.75 | silica | 0.150 | 0.194 | 0.30 | gas phase | 0.022 | C6/C2 = 3.3 mol % | | 70 | 2.0 | 60 |
| Reference Example 2-1 | A | 0.00099 | MAO | 0.20 | silica | 0.040 | 0.052 | 0.30 | gas phase | 0.009 | C6/C2 = 3.3 mol % | | 90 | 2.0 | 60 |
| Comparative Example 2-4 | G | 0.00142 | MAO | 0.28 | silica | 0.057 | 0.049 | 0.30 | gas phase | 0.015 | C6/C2 = 1.7 mol % | | 90 | 2.0 | 105 |
| Comparative Example 2-5 | G | 0.01010 | MAO | 2.02 | silica | 0.404 | 0.525 | 0.20 | iso-butane | 0.088 | — | — | 75 | 1.4 | 60 |
| Example 2-3 | A | 0.00107 | MAO | 0.21 | silica | 0.043 | 0.055 | 0.30 | gas phase | 0.026 | C4/C2 = 5.0 mol % | | 70 | 2.0 | 31 |
| Reference Example 2-2 | A | 0.00250 | montmorillonite | 0.050 g | — | — | 0.050 | 0.50 | heptane | 0.004 | 10 ml | C6/C2 = 3.3 mol % | 80 | 1.5 | 60 |
| Example 2-4 | B | 0.00407 | MAO | 0.81 | silica | 0.163 | 0.210 | 0.30 | gas phase | 0.080 | C4/C2 = 5.0 mol % | | 90 | 2.0 | 60 |

TABLE 7a-1-continued
| Example 2-5 | C | 0.00105 | MAO | 0.21 | silica | 0.042 | 0.054 | 0.30 | gas phase | 0.030 | C4/C2 = 5.0 mol % | | 90 | 2.0 | 60 |
|---|---|---|---|---|---|---|---|---|---|---|---|---|---|---|---|
| Example 2-6 | D | 0.00346 | MAO | 0.69 | silica | 0.138 | 0.180 | 0.20 | iso-butane | 0.098 | 40 ml | 12 ml | 75 | 1.4 | 60 |
Metallocene Compound
A
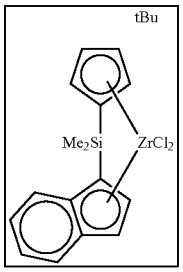
B
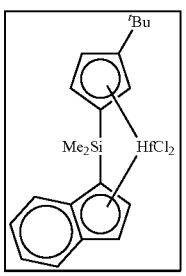
C (isomeric mixture)
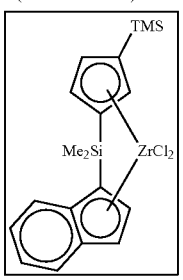
D (isomeric mixture)
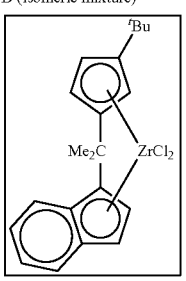
E
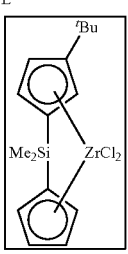

TABLE 7a-1-continued

F

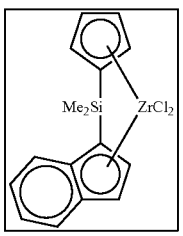

G

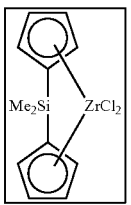

TABLE 7a-2

| | Catalyst | | Results | | | | | | | | | | | |
| --- | --- | --- | --- | --- | --- | --- | --- | --- | --- | --- | --- | --- | --- | --- |
| | Component (A) | | | Activity | | | | | | | | | Terminal | | |
| | Metallocene Compound | Amount Used (mmol) | Yield (g) | (g-PE/ g-Cat/ hr) | MFR (g/10 min) | FR | Density (g/cm3) | $\lambda_{max}$ (2.0) | $\lambda_{max}$ (0.1) | $\lambda_{max}$ (2.0)/ $\lambda_{max}$ (0.1) | Mw ×10$^4$ | Mw/ Mn | Double Bond (bonds/ 1000 C.) | $g_c'$ Value | $W_c$ Value (MW ≥ 10^6) |
| Example 2-1 | A | 0.00097 | 20.3 | 406 | 16.6 | — | 0.938 | 7.0 | 4.9 | 1.4 | 6.1 | 3.8 | 0.30 | 0.44 | 1.0 |
| Comparative Example 2-1 | E | 0.00109 | 25.8 | 542 | 11.3 | — | 0.940 | 4.2 | 3.4 | 1.2 | 5.9 | 2.7 | 0.63 | 0.62 | 0.1 |
| Example 2-2 | A | 0.00123 | 49.5 | 516 | 38.3 | — | 0.927 | — | — | — | 4.4 | 3.3 | — | 0.36 | 0.8 |
| Comparative Example 2-2 | E | 0.00120 | 42.0 | 451 | 23.9 | 8.0 | 0.930 | 4.7 | 3.1 | 1.5 | 4.9 | 3.2 | — | 0.38 | 0.09 |
| Comparative Example 2-3 | F | 0.00376 | 13.7 | 70 | 15.1 | 6.1 | 0.931 | 36.7 | 19.6 | 1.9 | 5.5 | 3.8 | 0.35 | 0.79 | 0.7 |
| Reference Example 2-1 | A | 0.00099 | 17.5 | 337 | 0.05 (HL) | — | 0.912 | — | — | — | 58.4 | 3.4 | 0.00 | — | — |
| Comparative Example 2-4 | G | 0.00142 | 4.5 | 52 | 22.7 | — | 0.958 | 10.9 | 18.9 | 0.6 | 5.3 | 4.1 | 1.31 | 0.90 | 0.9 |
| Comparative Example 2-5 | G | 0.01010 | 60.0 | 114 | 11.5 | 9.5 | 0.960 | 7.0 | 7.0 | 1.0 | 5.7 | 3.9 | — | — | — |
| Example 2-3 | A | 0.00107 | 25.6 | 902 | 1.3 | 13.0 | 0.930 | 2.8 | 1.5 | 1.9 | 7.5 | 3.7 | — | — | — |
| Reference Example 2-2 | A | 0.00250 | 3.0 | 60 | 0.02 (HL) | — | 0.920 | — | — | — | 106.0 | 2.9 | 0.23 | — | — |
| Example 2-4 | B | 0.00407 | 10.0 | 48 | 7.8 | 7.9 | 0.945 | — | — | — | 6.8 | 4.1 | — | 1.00 | 0.5 |
| Example 2-5 | C | 0.00105 | 16.5 | 306 | 9.7 | 6.9 | 0.942 | 3.0 | 1.8 | 1.7 | 7.2 | 4.0 | — | 1.00 | 0.2 |
| Example 2-6 | D | 0.00346 | 48.5 | 270 | 116 | — | 0.935 | — | — | — | 2.8 | 3.3 | — | 0.74 | 0.2 |

As seen from the results shown in Tables 7a-1 and 7a-2, comparing Example 2-1 and Comparative Example 2-1 or comparing Example 2-2 and Comparative Example 2-2, in the ethylene-based polymers of Comparative Examples 2-1 and 2-2 obtained using a catalyst not satisfying the requirements of the metallocene compound of the present invention, the $[\lambda max(2.0)]_B$ of the requirement (B-4'-i) or $[\lambda max(2.0)]_B/[\lambda max(0.1)]_B$ of the requirement (B-4'-ii) was inferior, $g_C'$ of the requirement (B-4'-iii) was not sufficiently reduced, or $W_C$ of the requirement (B-4'-iv) was poor. From these, it is apparent that the ethylene-based polymer produced in Examples according to the present invention is excellent in the moldability.

Also, as compared with the polymerization activity in Examples 2-1 and 2-2 of Tables 7a-1 and 7a-2, the polymerization activity in ethylene polymerization by a catalyst not satisfying the requirements of the metallocene compound of the present invention was significantly low as seen in Comparative Examples 2-3 to 2-5, and evidently, there is a problem in profitability as the production method of an ethylene-based polymer. Furthermore, $[\lambda max(2.0)]_B$ of the ethylene-based polymer obtained in Comparative Example 2-3 was too large, and this clearly indicates that only an ethylene-based polymer with poor strength can be obtained. In addition, the ethylene-based polymer obtained in Comparative Example 2-4 or 2-5 was poor in the $[\lambda max(2.0)]_B/[\lambda max(0.1)]_B$ of the requirement (B-4'-ii). From these, it is apparent that the ethylene-based polymer produced in Examples according to the present invention is excellent in the moldability and excellent also in the profitability.

Examples 2-4 to 2-6 of Tables 7a-1 and 7a-2 are a case using a metallocene compound differing in the structure from the catalyst satisfying the requirements of the metallocene compound of the present invention used in Examples 2-1 to 2-3.

In the case of the metallocene compound of Example 2-4 which differs from the metallocene compound of Example 2-1 only in that the center metal species is Hf or Zr, while having the same ligand structure, the activity was inferior to that in Example 2-1, but $W_C$ of the requirement (B-4'-iv) of the present invention showed a relatively large value, and it is estimated that the ethylene-based polymer has adequately excellent moldability.

In the case of the metallocene compound of Example 2-5 which differs from the metallocene compound of Example 2-1 only in that the substituent on the cyclopentadienyl ring is a trimethylsilyl group or a tert-butyl group, while having the same structure in the rest, high activity equal to that in Example 2-1 was exhibited and the requirements (B-4'-i), (B-4'-ii) and (B-4'-iv) of the present invention were fully satisfied, indicating that the ethylene-based polymer is excellent in the moldability.

In the case of the metallocene compound of Example 2-6 which differs from the metallocene compound of Example 2-1 only in that the bridging group connecting the cyclopentadienyl ring and the indenyl ring is an i-propyl group or a dimethylsilylene group, while having the same structure in the rest, high activity equal to that in Example 2-1 was exhibited and the requirements (B-4'-iv) was satisfied, indicating that the ethylene-based polymer is excellent in the moldability.

From these, it is verified that all of ethylene-based polymers produced with catalysts using metallocene compounds belonging to the present invention can express sufficiently improved moldability.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-073937) filed on Mar. 30, 2011, and Japanese Patent Application (Patent Application No. 2011-073945) filed on Mar. 30, 2011, the contents of which are incorporated herein by way of reference.

INDUSTRIAL APPLICABILITY

As clearly understood from the description in the foregoing pages, the polyethylene-based resin composition of the present invention has excellent molding characteristics and at the same time, has an effect that the balance between impact strength and stiffness is excellent and furthermore, the transparency is excellent. In addition, the molded product obtained by the injection molding, compression-injection molding, rotational molding, extrusion molding, hollow molding or blow molding of the polyethylene-based resin composition is also excellent in the balance between impact strength and stiffness as well as in the transparency, so that a molded product reduced in the wall thickness can be provided in an economically advantageous manner.

Accordingly, the polyethylene-based resin composition of the present invention capable of providing a molded product having such desired properties in an economically advantageous manner has a significantly high industrial value.

Moreover, an olefin polymerization catalyst capable of introducing a sufficiently large number of appropriate length long-chain branches into an olefin polymer is obtained by using the olefin polymerization catalyst component of the present invention, and an olefin-based polymer useful, for example, in substituting for a high-pressure low-density polyethylene excellent in moldability, substituting for a high-density polyethylene obtained with a chromium-based catalyst, or improving the moldability of a metallocene polymer is obtained. For these reasons, the olefin polymerization catalyst of the present invention is of high significance and has very great industrial applicability.

The invention claimed is:
1. A polyethylene-based resin composition, comprising:
(A) from 41 to 99 wt % of an ethylene-based polymer (A) satisfying the following condition (A-1) to condition (A-4); and
(B) from 1 to 59 wt % of an ethylene-based polymer (B) satisfying the following condition (B-1) to condition (B-6),
wherein:
MFR of the composition as a whole is from 0.05 to 50 g/10 min and the density is from 0.910 to 0.960 g/cm$^3$;
conditions of ethylene-based polymer (A):
(A-1) MFR$_A$=0.3 to 100 g/10 min measured under conditions of 190° C. and a load of 21.18 N (2.16 kg) in accordance with JIS K7210,
(A-2) Density$_A$=0.915 to 0.970 g/cm$^3$,
(A-3) [Mw/Mn]$_A$=2.0 to 10.0, and
(A-4) in a double logarithmic plot of elongation viscosity η(t) (unit: Pa·sec) and elongation time t (unit: sec) measured at a temperature of 170° C. and an elongation strain rate of 2 (unit: 1/sec), assuming that the maximum elongation viscosity after strain hardening is $\eta_{A;max}(t_1)$ and the approximate straight line of the elongation viscosity before hardening is $\eta_{A;Linear}(t)$, the degree of strain hardening $[\lambda max(2.0)]_A$ defined by $\eta_{A;max}(t_1)/\eta_{A;Linear}(t_1)$ is from 1.0 to 2.0;

conditions of ethylene-based polymer (B):
(B-1) $MFR_B=0.01$ to 1.5 g/10 min and $100>MFR_A/MFR_B>1.0$ min measured under conditions of 190° C. and a load of 21.18 N (2.16 kg) in accordance with JIS K7210,
(B-2) $Density_B=0.880$ to 0.940 g/cm³,
(B-3) $[Mw/Mn]_B=2.0$ to 10.0,
(B-4) $[\lambda max(2.0)]_B$ defined in the same manner as in the condition (A-4) is from 1.2 to 20.0 and $20>[\lambda max(2.0)]_B/[\lambda max(2.0)]_A>1.0$,
(B-5) the ratio $[\lambda max(2.0)]_B/[\lambda max(0.1)]_B$ of $[\lambda max(2.0)]_B$ defined in the same manner as in the condition (A-4) and $[\lambda max(0.1)]_B$ measured similarly by setting the elongation strain rate to 0.1 (unit: 1/sec) is from 1.2 to 10.0, and
(B-6) the polymer is produced by an ethylene polymerization reaction in the presence of a transition metal-containing catalyst.

2. The polyethylene-based resin composition as claimed in claim 1, wherein ethylene-based polymer (B) further satisfies at least one of the following condition (B-7) and condition (B-8):
(B-7) the branching index ($g_c'$) at a molecular weight of 1,000,000 as measured by a GPC measurement apparatus combining a differential refractometer, a viscosity detector and a light scattering detector is from 0.30 to 0.70, and
(B-8) the content ($W_c$) of components having a molecular weight of 1,000,000 or more as measured by a GPC measurement apparatus combining a differential refractometer, a viscosity detector and a light scattering detector is from 0.01 to 30%.

3. The polyethylene-based resin composition as claimed in claim 1, wherein said ethylene-based polymer (B) further satisfies the following condition (B-2'):
(B-2') $1.070>density_A/density_B>0.990$.

4. The polyethylene-based resin composition as claimed in claim 1, wherein said ethylene-based polymer (A) is an ethylene polymer or ethylene·α-olefin copolymer produced by homopolymerization of ethylene or copolymerization with an α-olefin caused by a Ziegler-Natta catalyst produced with a magnesium compound and a titanium compound.

5. A molded product comprising the polyethylene-based resin composition claimed in claim 1, wherein said molded product is obtained by injection molding, compression-injection molding, rotational molding, extrusion molding, hollow molding or blow molding of the polyethylene-based resin composition.

6. A film comprising the polyethylene-based resin composition claimed in claim 1, wherein said film is obtained by extrusion molding, hollow molding, blow molding or inflation molding of the polyethylene-based resin composition.

7. The polyethylene-based resin composition according to claim 3, wherein ethylene-based polymer (B) is produced by an ethylene polymerization reaction in the presence of an olefin polymerization catalyst comprising the following components (A) and (B):
Component (A): at least any one of the following catalyst components (A-i) to (A-iii):
(A-i) an olefin polymerization catalyst component, comprising the following component (A-1b) and component (A-2b):
Component (A-1b): a metallocene compound represented by the following formula (1b):

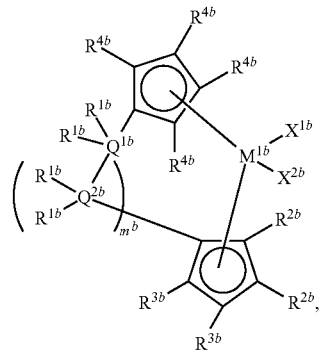

(1b)

wherein:
$M^{1b}$ represents any one transition metal of Ti, Zr and Hf;
each of $X^{1b}$ and $X^{2b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20;
each of $Q^{1b}$ and $Q^{2b}$ independently represents a carbon atom, a silicon atom or a germanium atom;
each $R^{1b}$ independently represents a hydrogen atom or a hydrocarbon group having a carbon number of 1 to 10 and at least two members out of four $R^{1b}$ optionally combine to form a ring together with $Q^{1b}$ and $Q^{2b}$;
$m^b$ is 0 or 1 and when $m^b$ is 0, $Q^{1b}$ is bonded directly to the conjugated 5-membered ring including $R^{2b}$ and $R^{3b}$; and
each of $R^{2b}$, $R^{3b}$ and $R^{4b}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40 and out of $R^{2b}$, $R^{3b}$ and $R^{4b}$, only either one pair of adjacent $R^{3b}$ and $R^{3b}$ and adjacent $R^{2b}$ and $R^{3b}$ may form a ring together with the carbon atoms to which the pair is bonded; and
Component (A-2b): a metallocene compound represented by the following formula (2b):

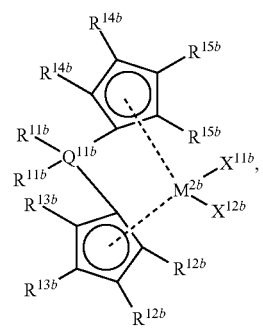

(2b)

wherein:
$M^{2b}$ represents any one transition metal of Ti, Zr and Hf;
each of $X^{11b}$ and $X^{12b}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20;

$Q^{11b}$ represents a carbon atom, a silicon atom or a germanium atom;

each $R^{11b}$ independently represents a hydrogen atom or a hydrocarbon group having a carbon number of 1 to 10 and two $R^{11b}$ may combine with each other to form a ring together with $Q^{11b}$;

each of $R^{12b}$, $R^{14b}$ and $R^{15b}$ independently represents an atom or a group selected from a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, and a silyl group substituted with a hydrocarbon group having a carbon number of 1 to 40, provided that at least one member is not a hydrogen atom;

each $R^{13b}$ independently represents a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom or a sulfur atom and having a carbon number of 1 to 40, or a silyl group substituted with a hydrocarbon group having a carbon number of 1 to 40; and out of $R^{12b}$, $R^{13b}$, $R^{14b}$ and $R^{15b}$, any only one pair of adjacent $R^{12b}$ and $R^{12b}$, adjacent $R^{13b}$ and $R^{13b}$ and adjacent $R^{12b}$ and $R^{13b}$ and any only one pair of adjacent $R^{14b}$ and $R^{14b}$, adjacent $R^{15b}$ and $R^{15b}$ and adjacent $R^{14b}$ and $R^{15b}$ may form a ring together with the carbon atoms to which the pair is bonded;

(A-ii) the olefin polymerization catalyst component comprising a metallocene compound represented by the following formula (1c):

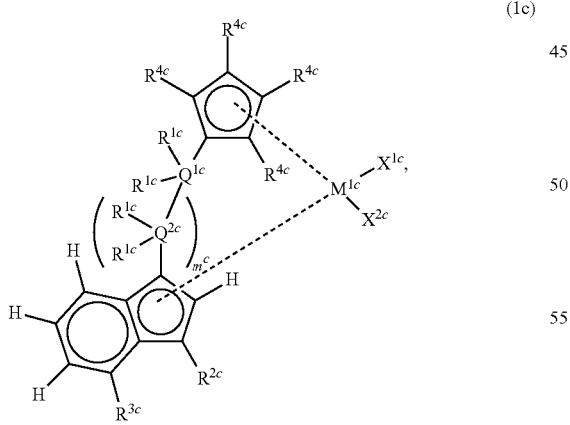

(1c)

wherein:
$M^{1c}$ represents any one transition metal of Ti, Zr and Hf;
each of $X^{1c}$ and $X^{2c}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of to 20, or an alkoxy group having a carbon number of 1 to 20;

each $Q^{1c}$ and $Q^{2c}$ independently represents a carbon atom, a silicon atom or a germanium atom;

each $R^{1c}$ independently represents a hydrogen atom or a hydrocarbon group having a carbon number of 1 to 10 and at least two members out of four $R^{1c}$ may combine to form a ring together with $Q^{1c}$ and $Q^{2c}$;

$m^c$ is 0 and when $m^c$ is 0, $Q^{1c}$ is bonded directly to the conjugated 5-membered ring including $R^{2c}$;

each of $R^{2c}$ and $R^{4c}$ independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and $R^{3c}$ represents a substituted aryl group represented by the following formula (1-ac)]:

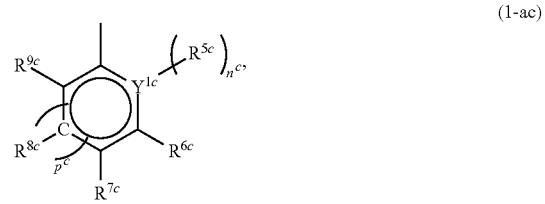

(1-ac)

wherein:
$Y^{1c}$ represents an atom of Group 14, Group 15 or Group 16 of the periodic table;

each of $R^{5c}$, $R^{6c}$, $R^{7c}$, $R^{8c}$ and $R^{9c}$ independently represents a hydrogen atom, a fluorine atom, a chlorine atom, a bromine atom, a hydrocarbon group having a carbon number of 1 to 20, a hydrocarbon group containing oxygen or nitrogen and having a carbon number of 1 to 20, a hydrocarbon group-substituted amino group having a carbon number of 1 to 20, an alkoxy group having a carbon number of 1 to 20, a silicon-containing hydrocarbon group containing from 1 to 6 silicons and having a carbon number of 1 to 18, a halogen-containing hydrocarbon group having a carbon number of 1 to 20, or a hydrocarbon group-substituted silyl group having a carbon number of 1 to 20;

adjacent groups of $R^{5c}$, $R^{6c}$, $R^{7c}$, $R^{8c}$ and $R^{9c}$ may combine with each other to form a ring together with the atoms bonded to these groups;

$n^c$ is 0 or 1 and when $n^c$ is 0, the susbitituent $R^{5c}$ is not present on $Y^{1c}$; and $p^c$ is 0 or 1 and when $p^c$ is 0, the carbon atom to which $R^{7c}$ is bonded and the carbon atom to which $R^{9c}$ is bonded are bonded directly;

provided that when $Y^{1c}$ is a carbon atom, at least one of $R^{5c}$, $R^{6c}$, $R^{7c}$, $R^{8c}$ and $R^{9c}$ is not a hydrogen atom, and (A-iii) an olefin polymerization catalyst component containing a metallocene compound represented by the following formula (1d):

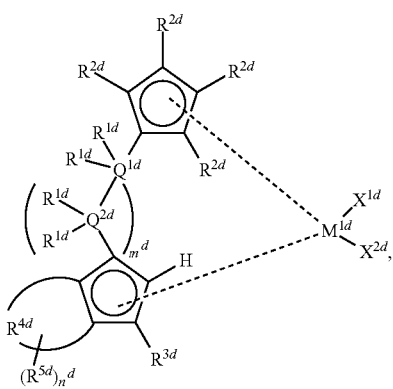

(1d)

wherein:
$M^{1d}$ represents any one transition metal of Ti, Zr and Hf;
each of $X^{1d}$ and $X^{2d}$ independently represents a hydrogen atom, a halogen atom, a hydrocarbon group having a carbon number of 1 to 20, a hydrocarbon group containing an oxygen atom or a nitrogen atom and having a carbon number of 1 to 20, a hydrocarbon group-substituted amino group having a carbon number of 1 to 20, or an alkoxy group having a carbon number of 1 to 20;
each of $Q^{1d}$ and $Q^{2d}$ independently represents a carbon atom, a silicon atom or a germanium atom; each $R^{1d}$ independently represents a hydrogen atom or a hydrocarbon group having a carbon number of 1 to 10 and at least two members out of four $R^{1d}$ may combine to form a ring together with $Q^{1d}$ and $Q^{2d}$;
$m^d$ is 0 or 1 and when $m^d$ is 0, $Q^{1d}$ is bonded directly to the conjugated 5-membered ring including $R^{2d}$ and $R^{3d}$;
each of $R^{2d}$ and $R^{3d}$ represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20, provided that at least one $R^{2d}$ is not a hydrogen atom;
$R^{4d}$ represents a saturated or unsaturated divalent hydrocarbon group having a carbon number of 4 or 5 for forming a condensed ring with the 5-membered ring to which $R^{4d}$ is bonded;
$R^{5d}$ is an atom or a group bonded to a carbon atom of $R^{4d}$ and each independently represents a hydrogen atom, a halogen atom, a hydrocarbon group having a carbon number of 1 to 20, a silicon-containing hydrocarbon group containing from 1 to 6 silicons and having a carbon number of 1 to 18, a halogen-containing hydrocarbon group having a carbon number of 1 to 20, a hydrocarbon group containing an oxygen atom and having a carbon number of 1 to 20, or a hydrocarbon group-substituted silyl group having a carbon number of 1 to 20; and
$n^d$ represents an integer of 0 to 10 and when $n^d$ is 2 or more, at least two $R^{5d}$ may form a ring together with the carbon atoms to which $R^{5d}$ are bonded, and
Component (B): a compound capable of reacting with a metallocene compound of the component (A) to produce a cationic metallocene compound.

8. The polyethylene-based resin composition according to claim 7, wherein ethylene-based polymer (B) is produced by an ethylene polymerization reaction in the presence of an olefin polymerization catalyst comprising component (A-1b).

9. The polyethylene-based resin composition according to claim 7, wherein ethylene-based polymer (B) is produced by an ethylene polymerization reaction in the presence of an olefin polymerization catalyst comprising component (A-2b).

10. The polyethylene-based resin composition according to claim 7, wherein ethylene-based polymer (B) is produced by an ethylene polymerization reaction in the presence of an olefin polymerization catalyst comprising component (A-ii).

11. The polyethylene-based resin composition according to claim 7, wherein ethylene-based polymer (B) is produced by an ethylene polymerization reaction in the presence of an olefin polymerization catalyst comprising component (A-iii).

12. The polyethylene-based resin composition as claimed in claim 2, wherein ethylene-based polymer (B) satisfies condition (B-7).

13. The polyethylene-based resin composition as claimed in claim 2, wherein ethylene-based polymer (B) satisfies condition (B-8).

14. The polyethylene-based resin composition as claimed in claim 2, wherein ethylene-based polymer (B) satisfies condition (B-7) and condition (B-8).

15. The polyethylene-based resin composition as claimed in claim 1, wherein ethylene-based polymer (A) has an $MFR_A$=0.9 to 20 g/10 min measured under conditions of 190° C. and a load of 21.18 N (2.16 kg) in accordance with JIS K7210.

16. The polyethylene-based resin composition as claimed in claim 1, wherein ethylene-based polymer (A) has a Density$_A$=0.917 to 0.950 g/cm$^3$.

17. The polyethylene-based resin composition as claimed in claim 1, comprising 75 to 89 wt % of the ethylene-based polymer (A) and 11 to 25 wt % of the ethylene-based polymer (B).

* * * * *